(12) United States Patent
Ternoey

(10) Patent No.: US 10,559,224 B2
(45) Date of Patent: Feb. 11, 2020

(54) DIGIT CARD CALCULATOR

(71) Applicant: Chris Steven Ternoey, Lucerne (CH)

(72) Inventor: Chris Steven Ternoey, Lucerne (CH)

( * ) Notice: Subject to any disclaimer, the term of this patent is extended or adjusted under 35 U.S.C. 154(b) by 0 days.

(21) Appl. No.: 16/093,673

(22) PCT Filed: Apr. 20, 2017

(86) PCT No.: PCT/US2017/028520
§ 371 (c)(1),
(2) Date: Oct. 15, 2018

(87) PCT Pub. No.: WO2017/184812
PCT Pub. Date: Oct. 26, 2017

(65) Prior Publication Data
US 2019/0180644 A1    Jun. 13, 2019

Related U.S. Application Data

(63) Continuation of application No. 29/563,484, filed on May 5, 2016, now Pat. No. Des. 805,526, and a
(Continued)

(51) Int. Cl.
*G06F 15/00* (2006.01)
*G09B 19/02* (2006.01)
*G09B 5/02* (2006.01)

(52) U.S. Cl.
CPC .......... *G09B 19/025* (2013.01); *G06F 15/00* (2013.01); *G09B 5/02* (2013.01)

(58) Field of Classification Search
CPC ........ G06F 3/017; G06F 3/0488; G06F 15/00
See application file for complete search history.

(56) References Cited

U.S. PATENT DOCUMENTS 1,173,298 A   2/1916  Montessori
2,933,252 A   4/1960  Lanning
(Continued)

FOREIGN PATENT DOCUMENTS

EP   0 042 488 A2   12/1981
EP   0 335 737 A2   10/1989
(Continued)

OTHER PUBLICATIONS

English translation of JP 2005 242176 A published Sep. 8, 2005.
(Continued)

*Primary Examiner* — Chuong D Ngo
(74) *Attorney, Agent, or Firm* — Mark Nowotarski

(57) ABSTRACT

A digit card calculator is implemented on a touch screen computer. The calculator presents a user input area to receive input of an arithmetic problem. The calculator then presents a workspace area where the digits of the numbers in the arithmetic problem are presented as rectangular digit cards. The digit cards are arranged in place value columns. Bead tokens are presented on digit cards. Each bead token shows or implies the number of beads in the place value of a column. The number of bead tokens on a digit card is equal to the number on the digit card. Individual columns in the arithmetic problem are solved by touching a digit card and moving it down. Carrying in an addition problem is shown by the movement of carry cards. Borrowing in a subtraction problem is shown by the movement of digit tokens from one column to the next.

19 Claims, 108 Drawing Sheets

Related U.S. Application Data continuation-in-part of application No. 29/563,489, filed on May 5, 2016, now Pat. No. Des. 805,527, and a continuation-in-part of application No. 29/592,030, filed on Jan. 26, 2017, now Pat. No. Des. 837,806.

(60) Provisional application No. 62/416,835, filed on Nov. 3, 2016, provisional application No. 62/325,593, filed on Apr. 21, 2016.

(56) References Cited

U.S. PATENT DOCUMENTS

| | | |
|---|---|---|
| 3,787,988 A | 1/1974 | Nakajima et al. |
| 3,971,924 A | 7/1976 | Ozawa et al. |
| 4,016,411 A | 4/1977 | Genin |
| 4,117,607 A | 10/1978 | Gill |
| 4,225,932 A | 9/1980 | Hirano et al. |
| D257,360 S | 10/1980 | McCarthy et al. |
| 4,954,977 A | 9/1990 | Colombat |
| 5,130,939 A | 7/1992 | Yoshino |
| 5,135,398 A | 8/1992 | Thornton et al. |
| 5,137,457 A | 8/1992 | Howard et al. |
| 5,139,423 A | 8/1992 | McCormack et al. |
| 5,346,399 A | 9/1994 | Sakow |
| 5,674,075 A | 10/1997 | Sherman |
| 5,732,001 A | 3/1998 | Nakayama et al. |
| D469,108 S | 1/2003 | Lorenzo |
| 6,518,988 B1 | 2/2003 | Aghevli |
| 6,716,033 B1 | 4/2004 | Lassowsky |
| 6,938,060 B2 | 8/2005 | Good et al. |
| D599,806 S | 9/2009 | Brown et al. |
| D603,421 S | 11/2009 | Ebeling et al. |
| D613,300 S | 4/2010 | Chaudhri |
| D625,323 S | 10/2010 | Matsushima et al. |
| D638,853 S | 5/2011 | Brinda |
| D650,789 S | 12/2011 | Arnold |
| D651,608 S | 1/2012 | Allen et al. |
| D652,841 S | 1/2012 | Arnold |
| D653,260 S | 1/2012 | Vance et al. |
| D664,555 S | 7/2012 | Gleasman et al. |
| D664,561 S | 7/2012 | Gleasman et al. |
| 8,230,360 B2 | 7/2012 | Ma et al. |
| D664,973 S | 8/2012 | Gleasman et al. |
| D664,984 S | 8/2012 | Lee et al. |
| D664,987 S | 8/2012 | Gleasman et al. |
| D664,988 S | 8/2012 | Gleasman et al. |
| D667,419 S | 9/2012 | Rai et al. |
| D668,262 S | 10/2012 | Gleasman et al. |
| D668,671 S | 10/2012 | Zaman et al. |
| D669,493 S | 10/2012 | Guss et al. |
| 8,371,858 B2 | 2/2013 | Vanova |
| 8,423,898 B2 | 4/2013 | Hale et al. |
| D682,855 S | 5/2013 | Iden |
| 8,589,458 B2 | 11/2013 | Uejima |
| D695,770 S | 12/2013 | Tagliabue et al. |
| D695,777 S | 12/2013 | Edwards et al. |
| D695,778 S | 12/2013 | Edwards et al. |
| D695,780 S | 12/2013 | Edward et al. |
| D695,781 S | 12/2013 | Edwards et al. |
| D695,783 S | 12/2013 | Edward et al. |
| D701,875 S | 4/2014 | D'Amore et al. |
| D703,691 S | 4/2014 | Brinda et al. |
| 8,708,703 B2 | 4/2014 | Fluster |
| D705,244 S | 5/2014 | Arnold et al. |
| D705,251 S | 5/2014 | Pearson et al. |
| D708,207 S | 7/2014 | Yang et al. |
| D714,821 S | 10/2014 | Chand et al. |
| D716,339 S | 10/2014 | Lee |
| D718,332 S | 11/2014 | Lacour et al. |
| D718,333 S | 11/2014 | Lacour et al. |
| 8,892,614 B2 | 11/2014 | Brothers et al. |
| D719,583 S | 12/2014 | Edwards et al. |
| D720,770 S | 1/2015 | Lacour et al. |
| D720,771 S | 1/2015 | Lacour et al. |
| D721,382 S | 1/2015 | Brinda et al. |
| D721,722 S | 1/2015 | Lee |
| D724,615 S | 3/2015 | Brinda et al. |
| D725,127 S | 3/2015 | Aoshima |
| D725,670 S | 3/2015 | Zhang et al. |
| D728,594 S | 5/2015 | Myette et al. |
| D730,364 S | 5/2015 | Inose et al. |
| D730,933 S | 6/2015 | Lee et al. |
| D736,247 S | 8/2015 | Chen et al. |
| D736,248 S | 8/2015 | Chen et al. |
| D736,806 S | 8/2015 | Fujioka |
| D738,396 S | 9/2015 | Kenmochi et al. |
| D738,910 S | 9/2015 | Drozd et al. |
| D740,847 S | 10/2015 | Yampolskiy et al. |
| D745,036 S | 12/2015 | Joynes |
| D746,866 S | 1/2016 | Memoria et al. |
| D748,668 S | 2/2016 | Kim et al. |
| D751,081 S | 3/2016 | Kim et al. |
| D753,170 S | 4/2016 | Kim |
| D755,828 S | 5/2016 | Kimura et al. |
| D756,401 S | 5/2016 | Soldner et al. |
| D757,047 S | 5/2016 | Cornwell et al. |
| D760,275 S | 6/2016 | Zhang |
| D760,770 S | 7/2016 | Zhu |
| D761,867 S | 7/2016 | Tursi et al. |
| D763,281 S | 8/2016 | Leftwich et al. |
| D763,310 S | 8/2016 | Min et al. |
| D765,099 S | 8/2016 | Kim et al. |
| D765,101 S | 8/2016 | Park et al. |
| D766,308 S | 9/2016 | Park et al. |
| D766,923 S | 9/2016 | Osotio et al. |
| D769,901 S | 10/2016 | Kim et al. |
| D770,506 S | 11/2016 | Moroney |
| D770,515 S | 11/2016 | Cho et al. |
| D771,063 S | 11/2016 | Yang et al. |
| D771,118 S | 11/2016 | Yao et al. |
| D772,923 S | 11/2016 | Seul |
| D773,502 S | 12/2016 | Park et al. |
| D777,205 S | 1/2017 | Orr |
| 9,552,744 B2 | 1/2017 | Tan et al. |
| D778,311 S | 2/2017 | Denis et al. |
| D778,319 S | 2/2017 | Kang et al. |
| D781,328 S | 3/2017 | Fong et al. |
| D781,338 S | 3/2017 | Barajas et al. |
| D781,912 S | 3/2017 | Napper et al. |
| D782,513 S | 3/2017 | Park et al. |
| D782,530 S | 3/2017 | Paek et al. |
| D784,375 S | 4/2017 | Tanaka |
| D788,123 S | 5/2017 | Shan et al. |
| D789,956 S | 6/2017 | Ortega et al. |
| D790,570 S | 6/2017 | Butcher et al. |
| D790,585 S | 6/2017 | Kim et al. |
| D791,173 S | 7/2017 | Hart et al. |
| D791,174 S | 7/2017 | Hart et al. |
| D792,421 S | 7/2017 | Day, II et al. |
| D792,437 S | 7/2017 | Cianflone et al. |
| D792,445 S | 7/2017 | Sun |
| D792,897 S | 7/2017 | Gaur et al. |
| D792,903 S | 7/2017 | Park et al. |
| D795,291 S | 8/2017 | Gottlieb |
| D795,922 S | 8/2017 | Bouroullec et al. |
| D805,526 S | 12/2017 | Ternoey |
| D807,903 S | 1/2018 | Kim et al. |
| D808,982 S | 1/2018 | Kavanagh et al. |
| D809,524 S | 2/2018 | Kato et al. |
| D809,526 S | 2/2018 | Wichman |
| D815,126 S | 4/2018 | Iketsuki et al. |
| D815,662 S | 4/2018 | Kim et al. |
| D816,113 S | 4/2018 | Schwartz et al. |
| D818,478 S | 5/2018 | Piguet et al. |
| D819,682 S | 6/2018 | Howard et al. |
| D820,867 S | 6/2018 | Dickens et al. |
| D827,657 S | 9/2018 | Cuebas et al. |
| D837,245 S | 1/2019 | Kuo et al. |
| 2004/0115602 A1 | 6/2004 | Ding |
| 2004/0214146 A1 | 10/2004 | Harris et al. |
| 2006/0024649 A1 | 2/2006 | Vernon |
| 2007/0218433 A1 | 9/2007 | Vanova |
| 2008/0193903 A1 | 8/2008 | Suh |
| 2009/0325137 A1 | 12/2009 | Peterson et al. |

(56) References Cited

U.S. PATENT DOCUMENTS

| | | |
|---|---|---|
| 2010/0209896 A1 | 8/2010 | Weary et al. |
| 2010/0281350 A1 | 11/2010 | Xie et al. |
| 2013/0191424 A1 | 7/2013 | Hale et al. |
| 2014/0122549 A1 | 5/2014 | Ambs |
| 2014/0129986 A1 | 5/2014 | Hautala |
| 2014/0227669 A1 | 8/2014 | Khan et al. |
| 2014/0322680 A1 | 10/2014 | Vasconcellos |
| 2015/0104760 A1 | 4/2015 | Tepavich |
| 2015/0113456 A1 | 4/2015 | Li |
| 2015/0128084 A1 | 5/2015 | Hughes et al. |
| 2016/0307463 A1 | 10/2016 | Langley et al. |

FOREIGN PATENT DOCUMENTS

| | | |
|---|---|---|
| EP | 0 475 058 A2 | 3/1992 |
| GB | 17890 | 8/1913 |
| GB | 2 130 782 A | 6/1984 |
| GB | 2 217 090 A | 10/1989 |
| GB | 2 249 211 A | 4/1992 |
| JP | 2005 242176 A | 9/2005 |
| JP | 2014 134571 A | 7/2014 |
| KR | 101071969 B1 | 10/2011 |
| KR | 20120009889 | 2/2012 |
| KR | 101462091 B1 | 12/2014 |
| WO | WO 2015/112111 A1 | 7/2015 |

OTHER PUBLICATIONS

English translation of KR101071969 B1 published Oct. 11, 2011.
English translaton of JP 2014 134571 A published Jul. 24, 2014.
English translation of KR 101462091 B1 published Dec. 9, 2014.
English transation KR 20120009889 published Feb. 2, 2012.
BETYL, CalcStep: Learn, teach & discuss, Apr. 7, 2016.
BETYL Pty Ltd, CalcStep—Math Steps in Pics through iTunes.com, Apr. 19, 2016.
Calculator images, Aug. 30, 2017.
Cell Aggregation and Sphere Packing, http://www.tiem.utk.edu/~gross/bioed/webmodules/spherepacking.htm, Dec. 23, 2016.
Uptown Arts, Cheater Pans Calulator—Show-your-work arithmetic! through iTunes.com, Apr. 10, 2017.
Wyzant, Inc., Decimal Place Value, Apr. 3, 2017.
Flick Calculators, Feb. 21, 2017.
Google Image Search results as of Dec. 16, 2016. Original URLs are provided where known.
Heffelfinger and Flom, Abacus Tutorial 2004—How to use an Abacus. The Bead Unbaffled, http://webhome.idirect.com/~totton/abacus/pages.htm#Addition1, Mar. 28, 2017.
Ivo Mynttinen, The iOS Design Guidelines, https://ivomynttinen.com/blog/ios-design-guidelines, Mar. 28, 2017.
Chirhart, Teacherswithapps, MegoPro Calculator 5000, http://www.teacherswithapps.com/megapro-calculator-5000/, dated Jun. 24, 2016.
Ravitch, Kids Math Teacher.com, Teaching math with hands-on activities and adventures as a children's author dated Jun. 11, 2016.
Montessori adding large numbers, Aug. 30, 2017.
Montessori Numbers iPad app screen shot Mar. 27, 2017.
MontessoriTech Stamp Game, http://montessoritech.net/StampGame.html, Aug. 30, 2017.
Modern teaching aids, Mathematics—Base Ten & MAB, Mar. 21, 2017.
Number Line, https://sites.google.com/site/entorwellian/Tutorials/tutorialsold/01numberline, Apr. 3, 2017.
Paplinski, Course Materials "Components and Design Techniques for Digital Systems", University of California San Diego dated Aug. 18, 2003.
See 'N' Solve Visual Calculator, Mar. 28, 2017.
PSDchat, Skeuomorphism vs Flat Design, http://www.psdchat.com/editorials/skeuomorphic-vs-flat-design/, Mar. 20, 2017.
App Detail, Vizulator the Visual Calculator, http://www.148apps.com/app/499285179/, Mar. 28, 2017.
en.wikipedia.org, 2048 (video game), https://en.wikipedia.org/wiki/2048_(video_game), Apr. 19, 2016.
en.wikipedia.org, Number sense, https://en.wikipedia.org/wiki/Number_sense, Apr. 8, 2017.
en.wikipedia.org, Numerical digit, https://en.wikipedia.org/wiki/Numerical_digit, Apr. 19, 2016.
en.wikipedia.org, Positional notation, https://en.wikipedia.org/wiki/Positional_notation#Digits_and_numerals, Nov. 1, 2016.
en.wikipedia.org, Rod calculus, https://en.wikipedia.org/wiki/Rod_calculus#Addition, Mar. 21, 2017.
en.wikipedia.org, Skeuomorph, https://en.wikipedia.org/wiki/Skeuomorph, Mar. 20, 2017.
ISA International Search Report for PCT/US/2017/028520 dated Aug. 2, 2017.
ISA Written Opinion for PCT/US2017/028520 dated Aug. 2, 2017.

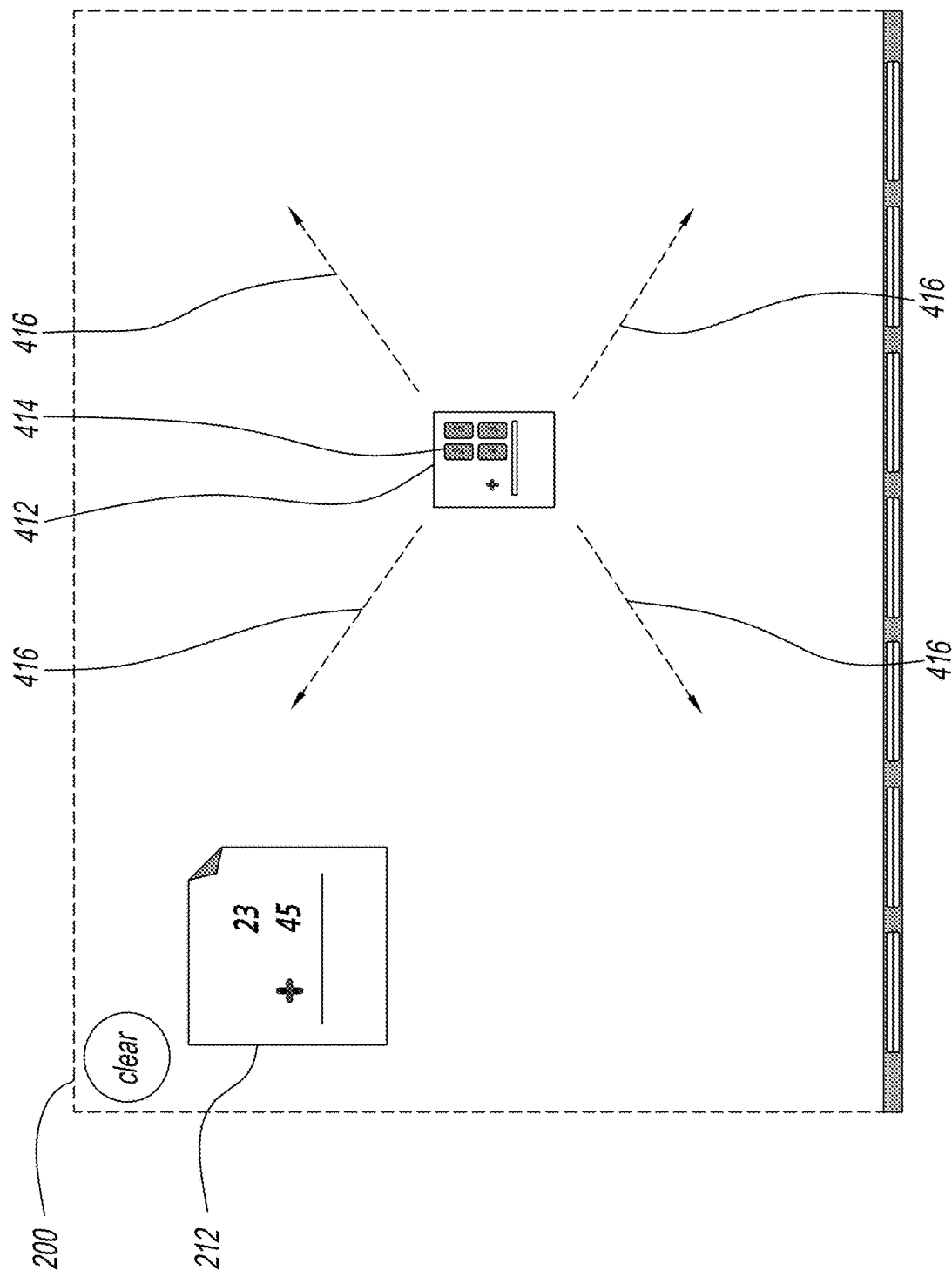

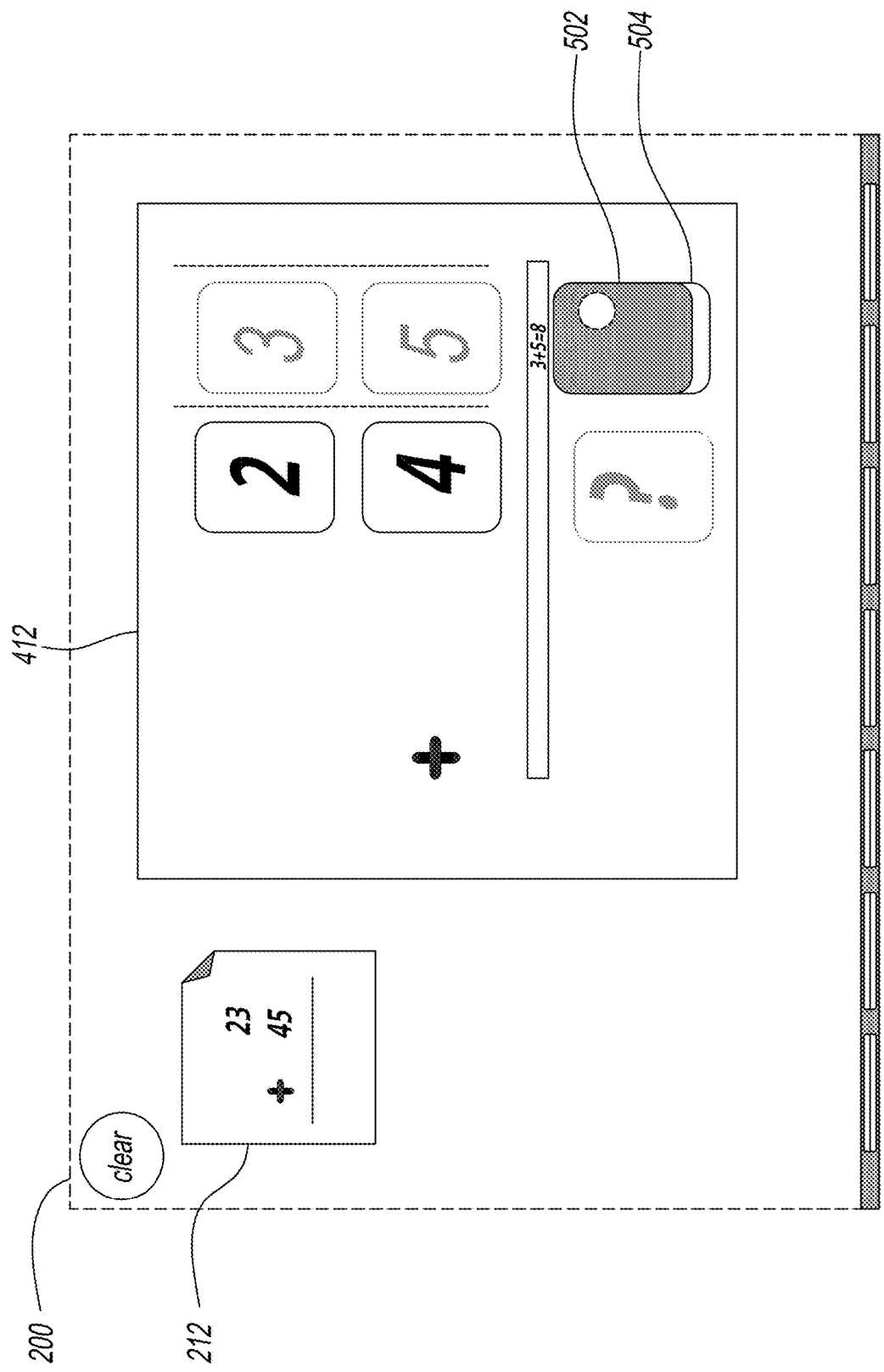

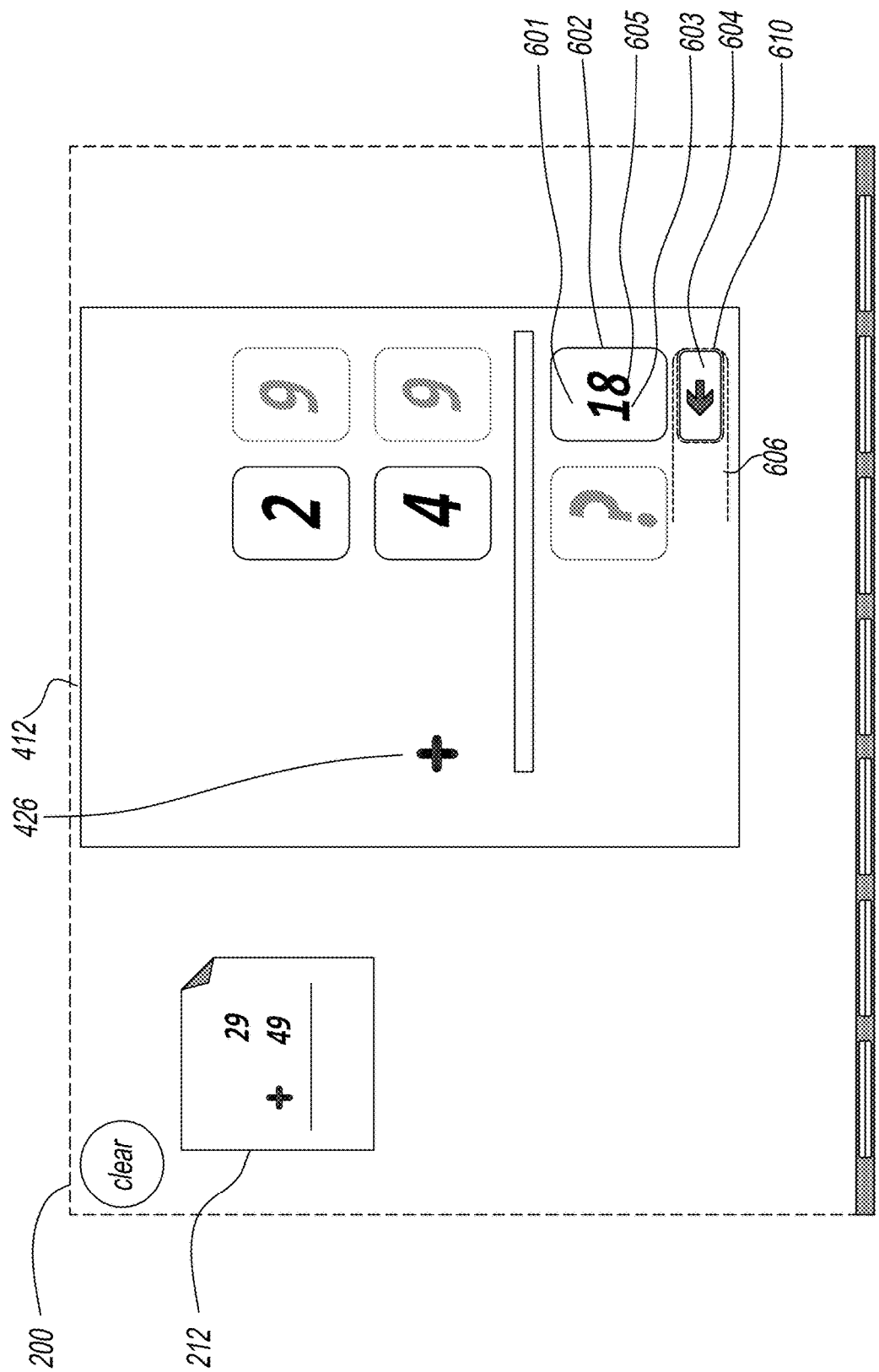

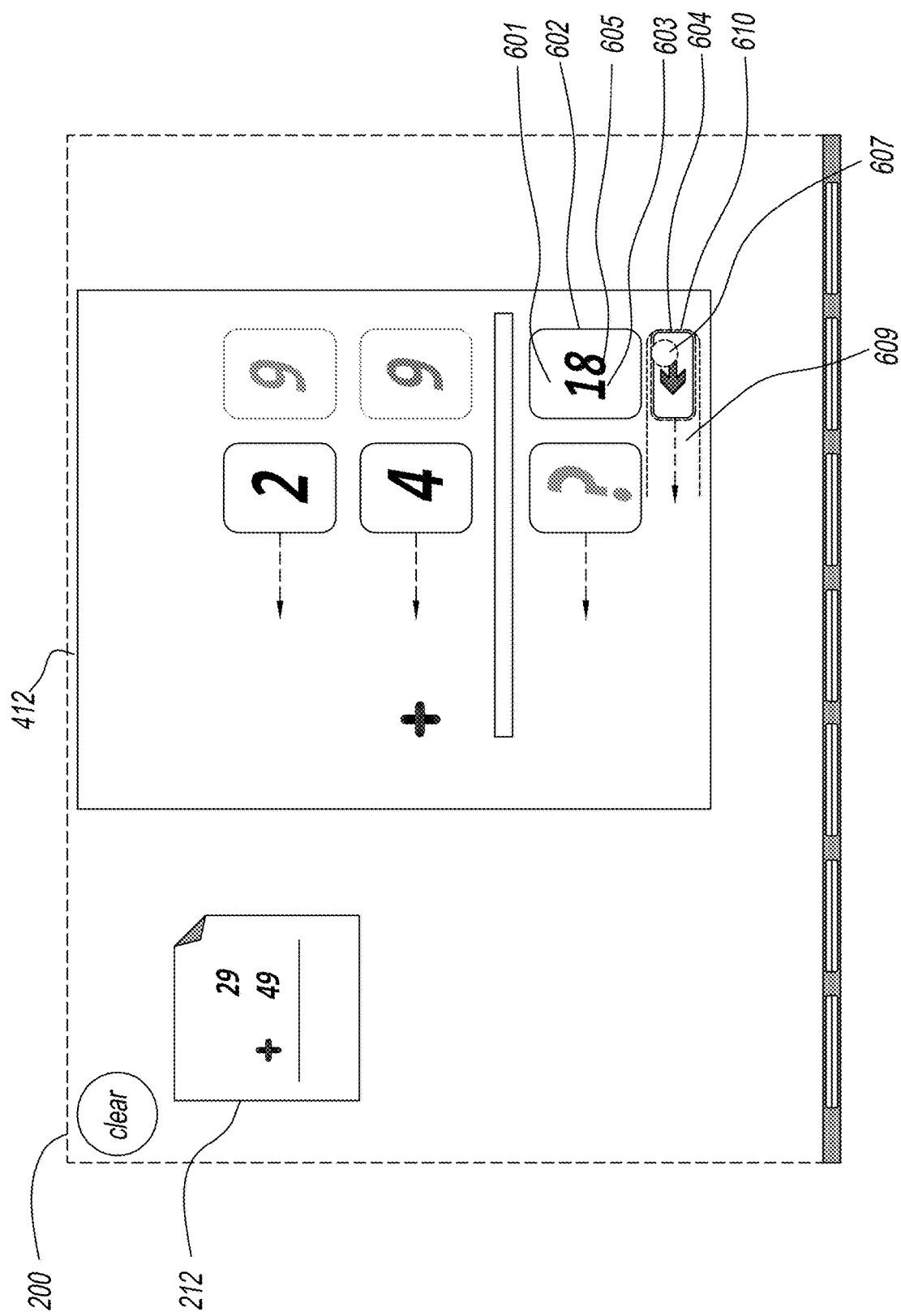

DIGIT CARD CALCULATOR

TECHNICAL FIELD

The inventions described herein are in the field of calculators.

BACKGROUND ART

Presently, educators face a difficult choice when they decide whether to permit young children to use calculators in school. Advocates of calculators appreciate the way they enable children to solve challenging problems without being constrained by their hand-calculating abilities. Detractors are concerned that children who use calculators might never develop basic skills in arithmetic. Clearly, a need exists for a calculating device that will enable children to quickly complete arithmetic operations while simultaneously teaching them the skill of hand calculation.

A solution to this problem was proposed in 1976 by Hirano et al. (U.S. Pat. No. 4,225,932). Their invention makes some possibility for children to understand the arithmetic performed by a calculator by presenting a handwritten calculation one step at a time on the calculator screen, rather than displaying simply the answer. From the adult perspective, this solution might appear complete. However, it does not give any visual indication of the logic behind each step. This constitutes a major limitation.

Another solution was proposed by Vanova in 2006 (U.S. Pat. No. 8,371,858). This invention illustrates the meaning of the calculation by use of icons, giving a far higher chance that the student really understands the logic behind the calculation. Unfortunately, it does not present the solution in a manner that has any correspondence to hand-calculation. Thus students might understand how the answer was reached, but not how they might have gotten this answer on their own by use of pencil and paper. This constitutes a major limitation.

A third solution is provided by CalcStep, an iPhone® app by Betyl Pty Ltd. This solution is hard to understand. It requires that students respond to questions, which is tedious and for some children impossible.

The presently disclosed invention overcomes all the shortcomings of the prior art and provides many additional features and benefits as well.

DISCLOSURE OF INVENTION

The disclosure of invention is provided as a guide to understanding the invention. It does not necessarily describe the most generic embodiment of the invention or the broadest range of alternative embodiments.

Among other things, techniques and systems are disclosed for providing a graphical user interface (GUI) to enable user calculation of sums and differences of integer and decimal numbers.

In one embodiment of the invention, the GUI includes a user input area to receive numeric values and operators in a like manner to how sums and differences are entered into a hand calculator. The GUI also includes a display area to display the received numeric input. The display area includes a presentation of the received numeric input arranged in two or more rows, with one row for each numeric value entered. Numeric values are aligned according to place value, so that digits of like value within numeric values appear in distinct columns.

The user input area provides an easy way for children to enter the numbers they intend to add, subtract or perform other arithmetic operation on. The display area provides a natural and familiar way for children to see what they have entered. The alignment of the numbers reminds children about the distinct meaning of each digit and further reminds them of the recommended arrangement of these digits when performing hand calculations on paper.

After the user has finished entering the values and operations of the calculation, the display presents a new graphic object referred to as the "workspace" or "workspace area". The workspace presents the values of the calculation in a like manner to the paper graphic, except that it provides additional graphic objects that facilitate user interaction with the digits of the values. Within the workspace, vertically constrained touch drop gestures facilitate the movement of digits individually or in groups to holding areas at the bottom of each column. When two or more digits are placed in a common holding area, the digit values are combined into a derived numeric value in accordance with the entered arithmetic operators.

In the case of an addition operator, these gestures allow children to combine digits from distinct rows into a sum at the bottom of the display area in a manner that is similar to how a paper-based addition would proceed. In the case of a subtraction operator, these gestures would work in a similar manner, except that the difference between the values of the digits would appear. The gesture might be disabled or otherwise dysfunctional in cases of subtraction where the resulting derived numeric value would be negative. This corresponds to the hand-calculation rule that students must sometimes "borrow ten from the next column" to proceed further with a subtraction calculation. The horizontal constraints on digit movement provide a clear understanding to children that digits can only be directly added or subtracted to other digits in the same column. Note that the resulting value that appears in the holding area might in some cases exceed 9 and this is why we refer to it as a "derived numeric value" rather than a digit.

Also within the workspace, vertically constrained touch drop gestures facilitate the separation of the tens digits of a derived value and the automatic transfer of the tens digit to a holding area at the top of the next vertical column to the left. This gesture corresponds naturally to a step in paper-based calculation that is traditionally referred to as "regrouping" or "carrying the one".

Also within the workspace, vertically constrained touch drop gestures facilitate the transformation of digits or derived values into two parts, the first part being a decremented derived value and the second part being a digit of value 1, which moves automatically to the next vertical column to the right where it is transformed into a numeric value of 10 and combined additively with digits or derived values already present in this region of the workspace. This gesture corresponds naturally to a step in paper-based calculation that is traditionally referred to as "regrouping" or "borrowing from the next column."

Additional improvements are also disclosed. The additional improvements relate to support for "flick" gestures, utilizing the paper graphic to illustrate a paper based calculation, support for decimal numbers, support for pointing devices, support for oversized touch zones and support for out of sequence interactions.

By integrating these display techniques and gestures, an environment can be provided that facilitates calculation of sums and differences in a manner that is distinctly easier than hand-calculation, while still being recognizably similar to hand calculation, thus facilitating the education of children in hand calculation skills while enabling them to face higher academic challenges prior to their mastering those skills.

BRIEF DESCRIPTION OF DRAWINGS

FIGS. 4a to 4c show the transition of the GUI to a GUI with a workspace area after the user has input an arithmetic problem to be solved.

FIGS. 5a to 5i are successive GUIs for a touch drop addition of digit cards.

FIGS. 6a to 6g are successive GUIs for a carry operation.

FIGS. 7a to 7i are successive GUIs for a touch drop addition of three digit cards.

BEST MODE FOR CARRYING OUT THE INVENTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

As used herein, a "computer", "computer based system", "computer implemented" or the like comprises an input device for receiving data, an output device for outputting data in tangible form (e.g. printing or displaying on a computer screen), a permanent digital memory for storing data, computer code and other digital instructions, and a digital processor for executing digital instructions wherein said digital instructions resident in said permanent memory will physically cause said digital processor to read in data via said input device, process said data within said microprocessor and output said processed data via said output device. The digital processor may be a microprocessor. The digital processor and permanent memory may have a distributed form, such as a cloud-based platform.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

Techniques and systems are disclosed for providing a computer implemented GUI that enables a user to calculate sums and differences of integer and decimal numbers.

Figure 1:
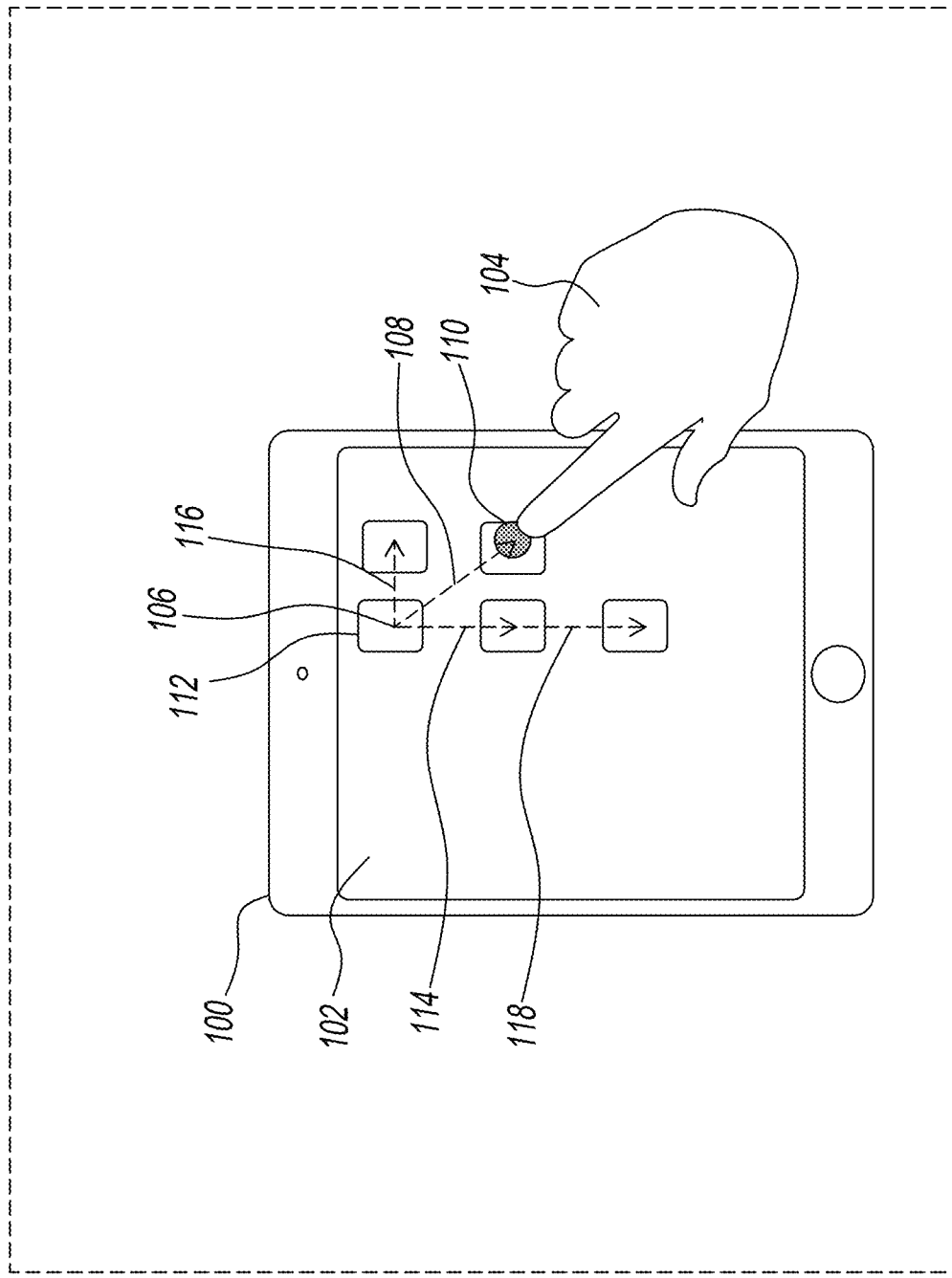
FIG. 1 is a top rendering of a calculator according to the present invention.

FIG. 1 is an illustration of a general purpose computer 100 with a touch-sensitive screen 102. The touch sensitive screen may serve as an output device for displaying digital images. The touch screen may also serve as an input device adapted to sense an action by a user. As used herein, "receive from a user . . . " means to receive from an input device an action made by a user.

A user's hand 104 is shown in FIG. 1 after it has touched a first point 106 on the touch screen and moved 108 to a second point 110 on said touch screen. The touch may be interpreted by the computer as a selection or choice of an object 112 displayed on said touch screen. The sliding of the finger may be interpreted as moving said object to said second point. The computer would sense the motion of said finger and display the selected object moving with said motion. The motion of the object may be constrained to be either vertical 114, horizontal 116 or some other constrained motion, such as motion along a path. If the motion was constrained to be vertical, then the selected object would only move vertically to correspond to the vertical component of the user's finger motion. As used herein, "vertically constrained" means only vertical motion is allowed. "Horizontally constrained" means only horizontal motion of a selected object is allowed. An object that can be activated by touching is referred to as a "touch target".

The user may lift said finger from the touch screen at the end of the motion. This may be interpreted as the end of the user's input. The app may then take other actions, such as completing 118 the movement of the object to an intended destination if the user ends the motion before the object reaches said intended destination. The entire action is referred to as a "touch drop". The portion executed after the user ceases to touch the screen is referred to as "auto complete".

A software application (sometime called simply an "app") can be installed on a permanent digital memory of such a device. The software application may physically be in the form of digital instructions. The app may be an iOS app for use on iPhones® and iPads®. The app may be created by using Apple®'s Xcode OSX application to compile code files as well as graphics files, audio files, and other code assets into a package for general distribution via Apple®'s App Store. More specifically, the SpriteKit API provided by Apple for game development was utilized in conjunction with objective-C code files edited in Xcode, image files edited in Adobe®'s Photoshop application and sound files from third party sound libraries to create apps that functioned as an embodiments of the calculators described herein.

In one embodiment of the calculator, the GUI includes a user input area to receive numeric values and operators in a like manner to how sums and differences are entered into a hand calculator. The GUI also includes a display area to display the received numeric input. The display area includes a presentation of the received numeric input arranged in two or more rows, with one row for each numeric value entered. Numeric values are aligned according to place value, so that digits of like place value within numeric values appear in distinct columns. As used herein, a "place value" is the multiplier for a digit in a given column of a number that provides the actual value of said digit. For example, the number "25" has two columns. The right column is a ones column with the digit of 5 and place value of 1. The left column is a tens column with the digit of 2 and a place value of 10. Thus the "2" in the tens column has an actual value of "20".

Figure 2:
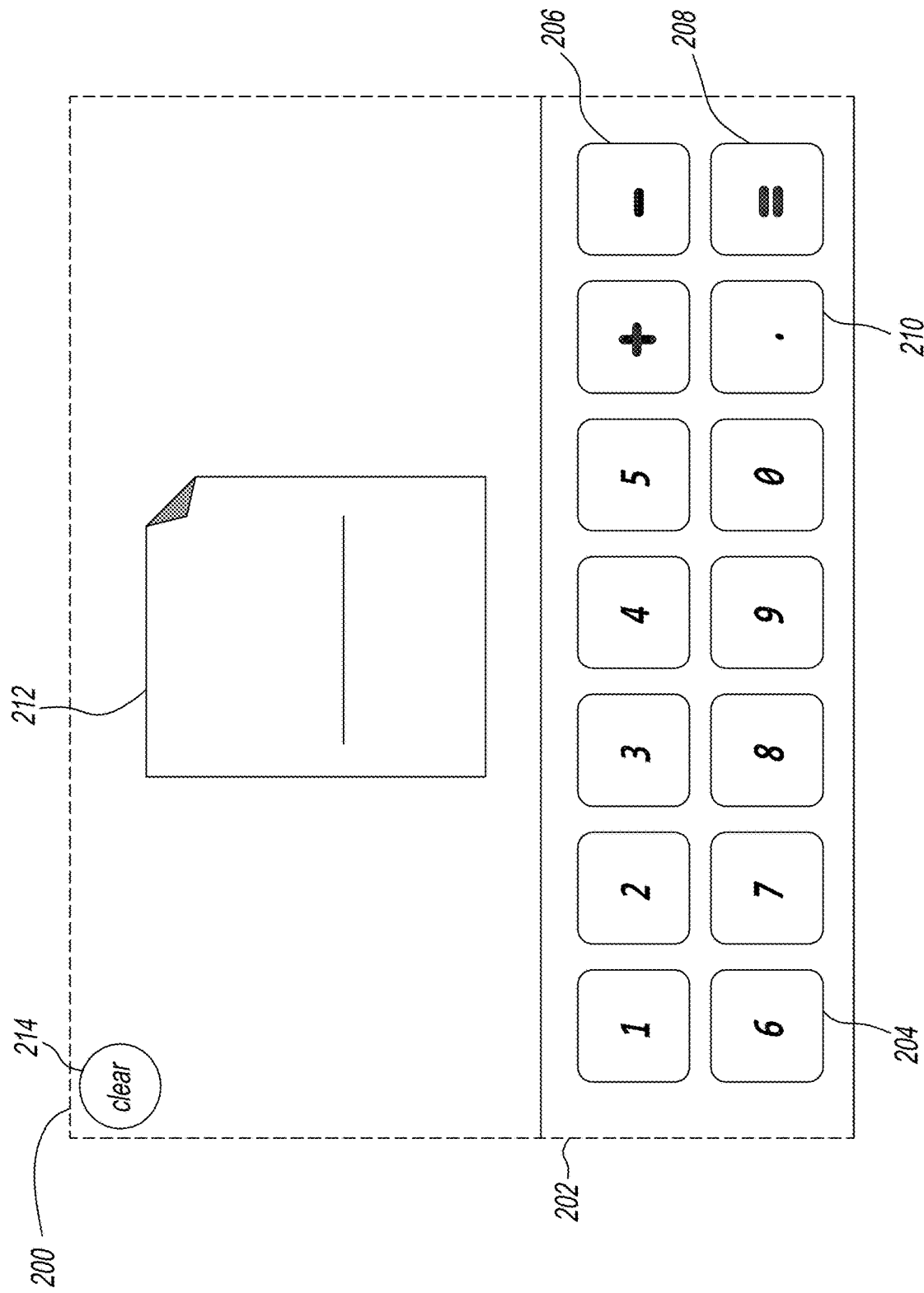
FIG. 2 is a GUI for a user input screen.

FIG. 2 illustrates the initial presentation of a GUI 200 in an embodiment of the present invention. The GUIs illustrated herein are surrounded by a combination of broken and solid lines. Item numbers are presented inside and outside of GUIs with curved call out lines identifying elements of a GUI. Broken line arrows and other broken line objects may be presented within a GUI indicating the movement or presence of different elements within a GUI. Broken lines presented within a GUI are not displayed by the GUI.

An input area 202 in the lower portion of the GUI is presenting a virtual keyboard for entering an arithmetic problem. The keyboard comprises keys illustrating a set of single digit numbers 204, one or more arithmetic operators 206 and an execution icon 208. An equal bar is an execution icon. Other symbols 210 useful for entering other elements, such as a decimal point, may be presented. The keys of the keyboard are surrounded by rectangular perimeters with rounded corners. The design element of a rectangle with rounded corners may be used to indicate areas of a touch screen that are adapted to receive user selection by touching.

A display area 212, which may suggest paper, is present in the upper region of the GUI. The display area will show the arithmetic problem entered by the user as the user selects the keys of the keyboard.

A "Clear" button 214 appears in the top left corner in case the user would like to reset the app to its initial state. Other utility buttons, such as backspace, information, exit etc. may also be presented. Round icons on a GUI may also indicate areas that are adapted to receive user selection.

The user input area provides an easy way for children to enter the numbers they intend to perform an arithmetic operation on. The display area provides a natural and familiar way for children to see what they have entered. The alignment of the numbers in the display area reminds children about the distinct meaning of each digit of a number in light of a digit's place value and further reminds them of the recommended arrangement of these digits when performing hand calculations on paper.

Figure 3:
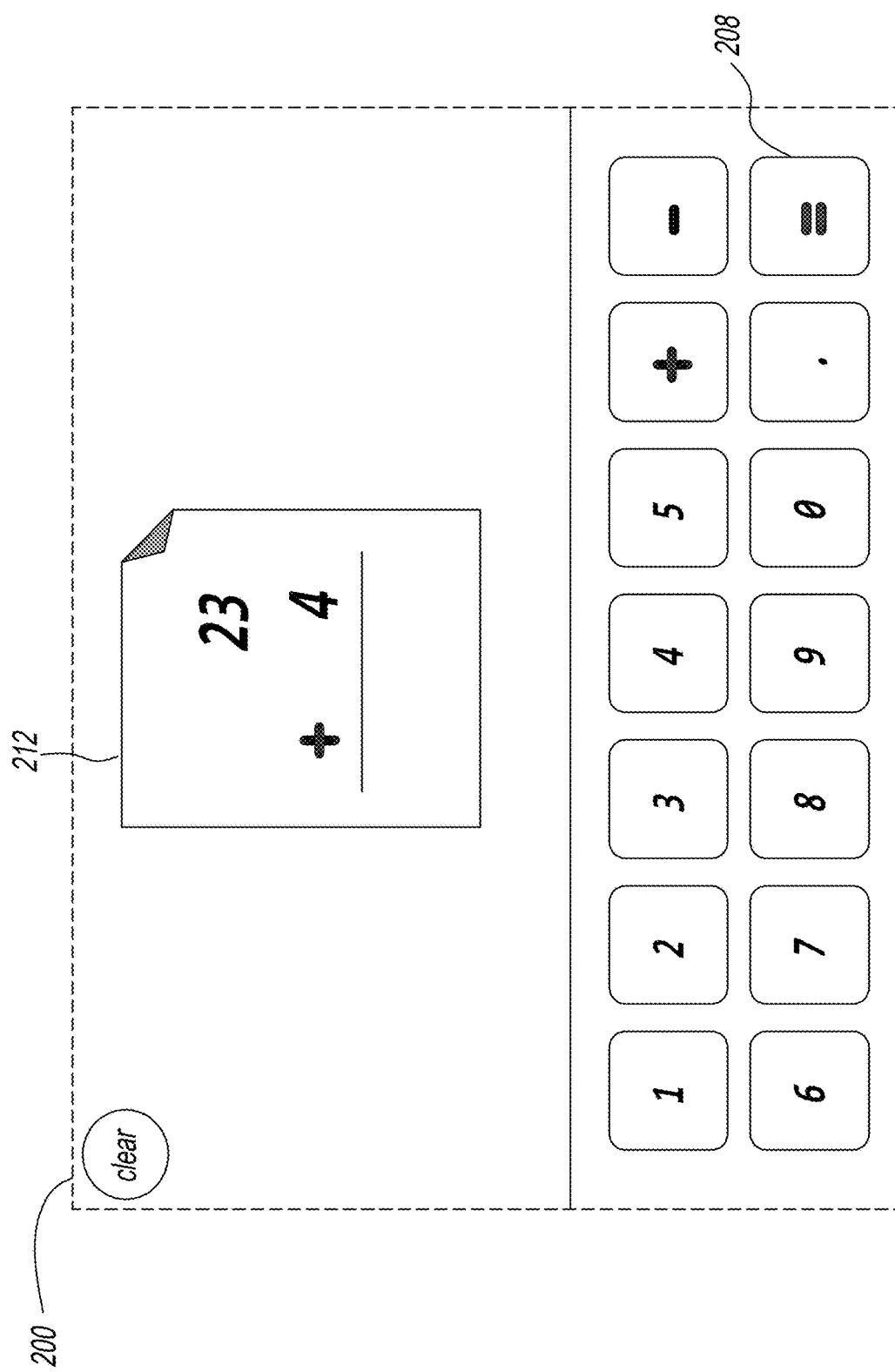
FIG. 3 is a GUI for the user input screen of FIG. 2 after an arithmetic problem has been entered.

FIG. 3 shows an example presentation of GUI 200 after the digital processor has received from the input device (e.g. touch screen) actions by the user (e.g. touching) indicating a choice of the single digit numerals "2", the single digit numeral "3", the arithmetic operator "+", and the single digit numeral "4". The arithmetic problem is presented in the display area 212 in accordance with said choices. A backspace button may be provided to undo entries. The user, however, has not chosen the execution icon and so the problem is not complete and the calculator takes no further action.

Figure 4A:
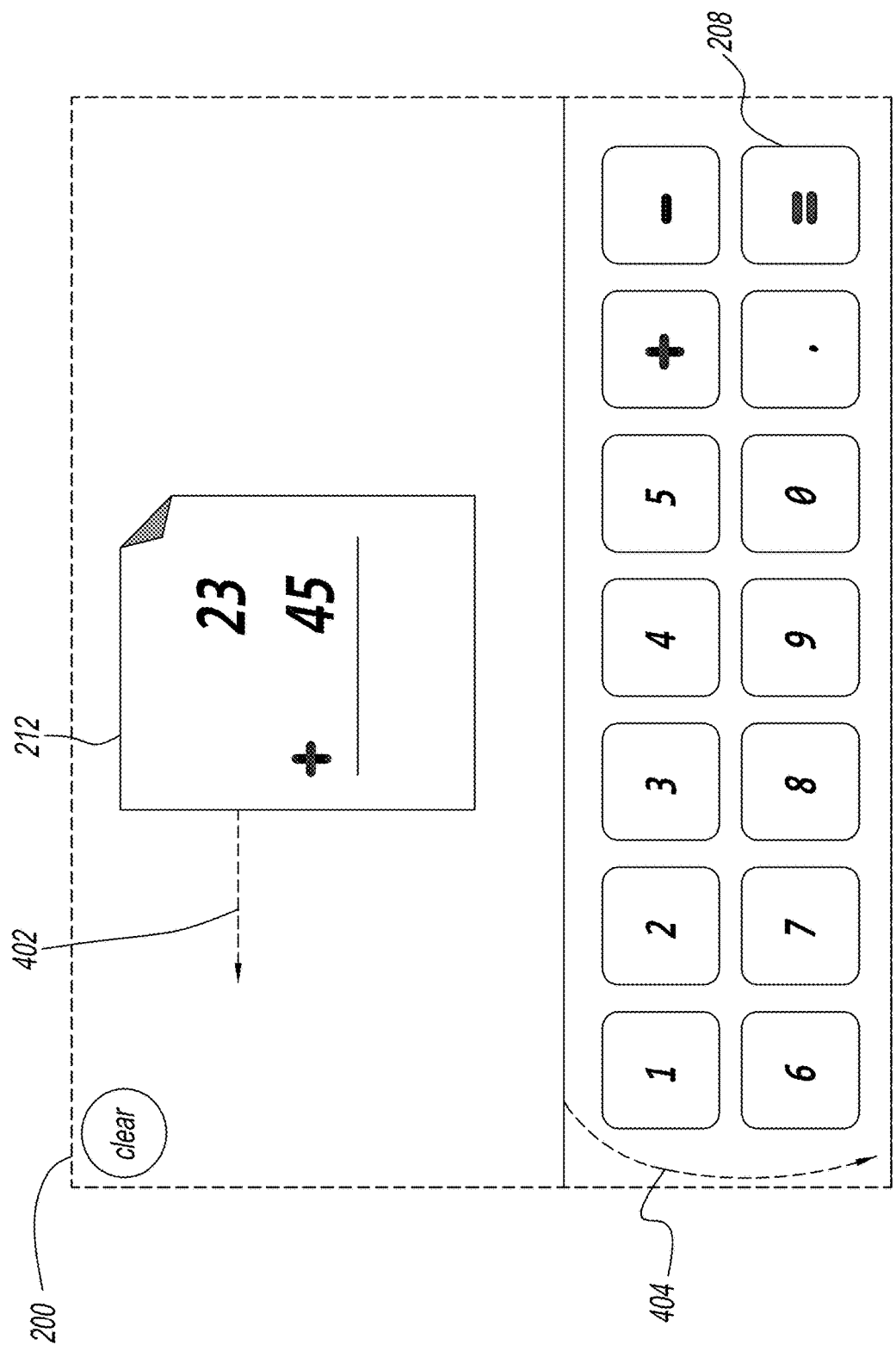

FIG. 4a shows the GUI 200 after the user has finished entering said arithmetic problem by touching single digit key "5". The full problem of 23+45 is presented in the display area. The user then selects the execution icon "=" (item 208). The calculator then executes steps to present a workspace area in the GUI. At this point, an animation commences and the display area 212 along with the arithmetic problem moves in the direction indicated by the broken line straight arrow 402, while the virtual keyboard retracts downward in the direction indicated by the broken line curved arrow 404.

FIG. 4b shows a subsequent moment in the commencing animation whereby a new graphic 412 appears on the screen. This graphic presents the numeric data 414 of the arithmetic problem in an alternative style that is more suggestive of the fact that the digits can be individually moved. The region of the display that is covered by this new graphic is hereafter referred to as the "workspace" or "workspace area". Broken line arrows 416 indicate how the workspace will grow as the commencing animation progresses.

Figure 4C:
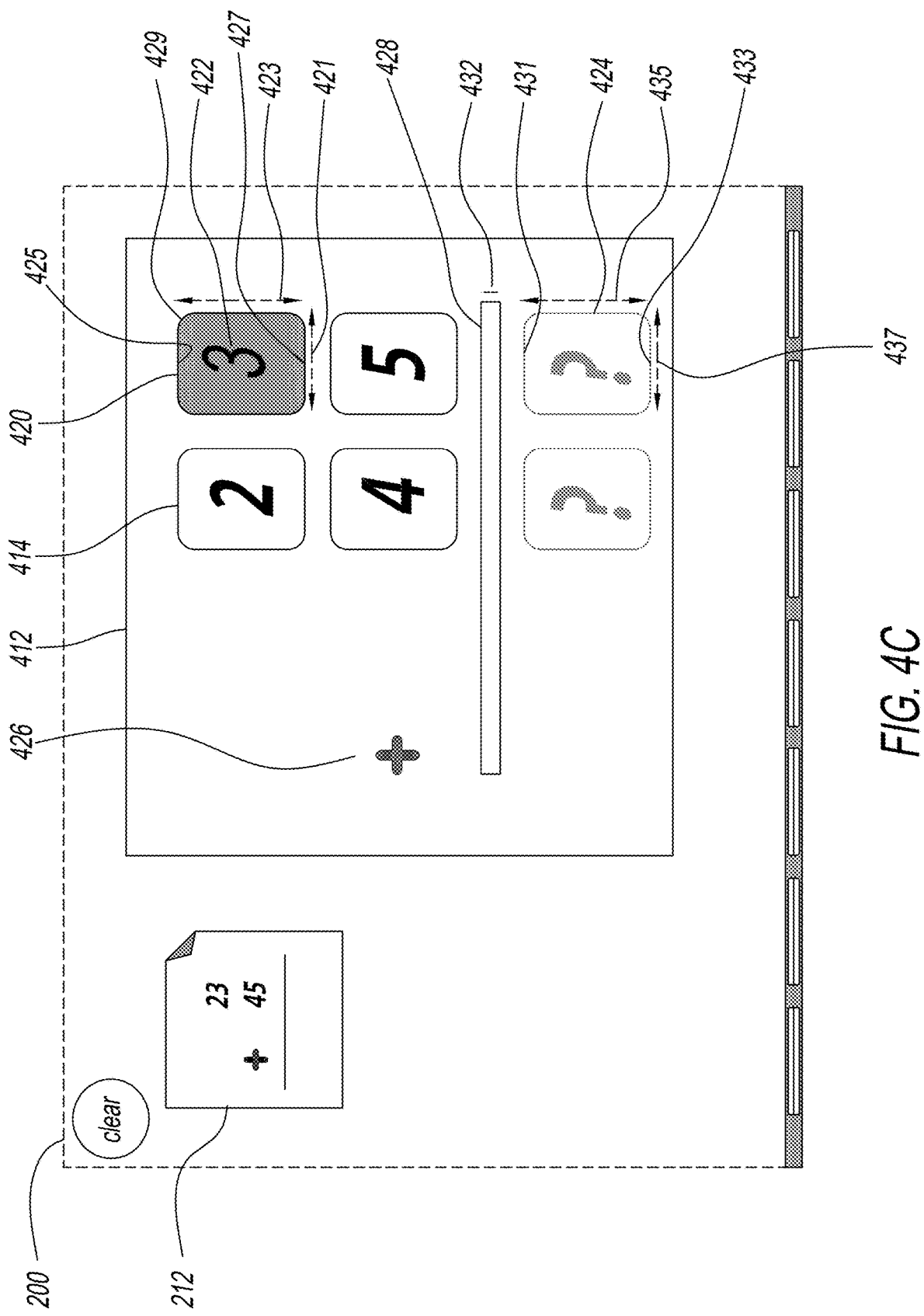

FIG. 4c shows how the GUI 200 appears when the animation has concluded. The workspace area 412 has become larger, which draws the user's attention to it and also makes it easy for individual digits 414 to be presented as touch targets for the user to manipulate.

Each digit is surrounded by a rectangular graphic with rounded corners. This shape is an example of a generally rectangular shape. We refer to this graphic surrounding a digit as the "digit card" for the digit, in consideration of how it resembles in shape a card from a deck of playing cards. The digit cards may each have a width 421, a height 423, a top 425, a bottom 427 and a perimeter or border 429. The widths of all digit cards in a given column are the same. The widths of digit cards in different columns with different place values, however, may be different. Thus digit cards may have aspect ratios that are different from that of playing cards.

The digit cards are arranged in original positions in columns and rows corresponding to the arithmetic problem. The digits cards of the first number in the arithmetic problem are displayed in an upper row. The digits cards of the second number in an arithmetic problem are displayed in a lower row immediately below the upper row. The arithmetic problem may comprise more than two numbers. Additional numbers are displayed in additional rows. The term "original positions" anticipates that the digit cards may be moved as the solution to the arithmetic problem is calculated. Some digit cards may be moved initially. Other digit cards may remain in their original positions to be moved later. As described below, digit cards may be shifted from their original positions during a carrying operation and returned to their original positions at the conclusion of the carrying operation. The digit cards may be rendered to appear to be in the same plane as if they were playing cards resting on a flat surface. As will be described below, other objects may be presented on the workspace that appear to extend in the normal direction from the plane of the digit cards. These objects may include beads, which are rendered as spheres, and bead tokens, which are stacks of beads rendered in an oblique projection. Any dimensional projection may be used.

The operator 426 of the arithmetic problem may be displayed in the workspace area. As described below, the operator will indicate what operation is performed on the digits cards of a given place value column as said digit cards are moved to a holding area.

An equals bar area 428 may be presented below the digit cards. The equals bar area may have a height 432. The height may be large enough so that numerals can be displayed in said equals bar area and be readily viewable by a user. A height corresponding to a font size of 6 points or greater is suitable.

It is natural for users to expect clear boundaries on anything rendered on a touch screen that can be affected by touch. A boundary or perimeter may be presented as a line of any style (e.g. solid, dashed, double, thick, thin), distinct change in shading (e.g. light for digit card changing to dark shade at perimeter), a diffuse change in shading (e.g. a fuzzy border) or any method of perceiving a perimeter. We want to encourage the user to manipulate the digits directly by dragging one or more of them to new positions. This is why we enclose each digit in a digit card. Any shape digit card can be used. A generally rectangular shape allows for clear arrangement of the digit cards in rows and columns. The provision of rounded corners may be a visual clue for a touch target object as opposed to an object not activated by touch. Any design element may be used, such as color or texture. The display area 212 and other inactive areas may have relatively sharp corners and thus a user might consciously or unconsciously perceive the display area as an area that would not be activated by touch. Experimentation by the user may teach the user this difference.

As the user interacts with the digit cards of the workspace, the value inside a digit card may exceed 9 and is, therefore, no longer a proper digit. In this case, we shall refer to the value inside the digit card as a "pseudodigit" because it is still functioning as a digit for a given place value while nevertheless exceeding 9 in numerical value. The graphic object surrounding a pseudodigit is still referred to simply as a "digit card". Note that pseudodigits are especially prominent in the case of "overflow" and "insufficiency", which are discussed later in this application.

The workspace in FIG. 4c presents one digit card 420 differently than the rest. The "3" digit card has a distinct appearance in order to suggest that it is the unique digit card that presently can be moved when touched. Alternative embodiments of the invention might present additional digit cards or even all digit cards in this same manner, and these embodiments may indeed permit direct manipulation of additional digit cards at the outset. However, this embodiment especially distinguishes the right-most digit in the top row 422 when an addition problem is initially presented, thus indicating to a user that work must begin here. This choice of highlighting only the digit card that can me moved next is made in order to maximize the correspondence between the calculator function and the "standard algorithm" for performing addition and subtraction calculations on paper.

Before explaining additional figures, it will be helpful to first establish some terminology that can be used to explain them. Such terms as "dragable", "touch drag", "touch drop", "flick" and more now will be clarified.

"Dragable" refers to a graphic of the display that can be directly moved to a new location by touch.

"Touch drag" refers to a user interaction whereby the user touches a dragable graphic and moves it to a new location by moving his/her finger to the new location and then terminating the touch.

"Touch drop" may be used as a synonym for "touch drag". It may also include an auto completion of an action.

"Flick" refers to a touch drop that is auto completed. Thus a user might touch drag a digit card half way to the holding area and then lift said user's finger from a touch screen. The calculator may be adapted to auto complete the touch drop by rendering the digit card completing its intended motion to the holding area.

In some cases, it is appropriate for dragables to move only up and down, not left or right. In this case, the app may be programmed to change only the vertical position of the dragable in response to the user's touch irrespective of the touch's horizontal movement. We refer to this as a "vertically constrained" because only vertical movement is allowed. This can be helpful when digit cards are small and a user's touch may obscure the selected card. The user can view the card and its vertical motion by moving his/her finger to the side after touching the card.

In some cases, it is appropriate for dragables to move only left and right, not up or down. In this case, the app may be programmed to change only the horizontal position of the dragable in response to the user's touch. We refer to this as a "horizontally constrained" because only horizontal movement is allowed. Other more complicated constraints, such as constraints to a predetermined path, may also be provided.

Within the workspace, vertically constrained touch drop gestures facilitate the movement of digits individually or in groups to holding areas 424 at the bottom of each column below the equals bar area. "Holding areas" are regions of the display at the bottom of the workspace that are depicted in a manner that suggests they are the furthest allowable position of a dragable moving in their direction. Holding areas may be indicated by a grey or faint perimeter thus distinguishing themselves from movable touch cards which may have a dark or distinct perimeter. Holding areas are helpful because they suggest to the user where dragables should be moved to. When two or more digit cards are placed in a common holding area, the digit values are combined into a derived numeric value in accordance with the entered arithmetic operators. A holding area may have a top 431, bottom 433, a width 437 and a height 435. The height of a holding area may be at least as large as the height of the digit cards. The width of the holding area may be about the same as the width of the digit cards in the same place value column.

In the case of an addition operator, these gestures allow children to combine digits from distinct rows into a sum at the bottom of the display area in a manner that is similar to how a paper-based addition calculation would proceed. In the case of a subtraction operator, these gestures would work in a similar manner, except that the difference between the values of the digits would appear. The gesture might be disabled or otherwise dysfunctional in cases of subtraction where the resulting derived numeric value would be negative. This corresponds to the hand-calculation rule that students must sometimes "borrow ten from the next column" to proceed further with a subtraction calculation. The horizontal constraints on digit movement provide a clear understanding to children that digits can only be directly added or subtracted to other digits in the same column. The resulting value that appears in the holding area might in some cases exceed 9 and this is why we refer to it as a "derived numeric value" rather than a digit.

To further clarify the presentation of the GUI as well as its interaction possibilities, a series of example scenarios are presented which are illustrated by detailed figures. Many of the figures depict a white circle with black broken line circumference. This broken line circle depicts a position of the display that is being touched by a user. Ordinarily this circle would not actually be visible on the display while in use. It is simply added to a figure in this patent application in order to clarify how the user is interacting with the device. The area in the circle is filled with white to indicate that the area under the circle might be obscured from the user by the user's finger when using a touch screen display device.

The function of the GUI after user input has concluded depends on what input data has been received. As a first case, we describe the functionality that is provided after the user has input integer data separated by an addition operator. As an example of this case, we will assume the user has entered "2", "3", "+", "4", "5", "=".

Addition

FIGS. 5a to 5i illustrate a vertically constrained touch drop interaction that constitutes the first step for completing the specified calculation. More specifically, this interaction shows a user moving two digits (items 502 and 504) collectively to a "holding area" 506 at the bottom of the workspace 412, whereby they are transformed into their sum. As mentioned previously, "holding areas" are regions of the display at the bottom of the workspace that are depicted in a manner that suggests they are the furthest allowable position of a dragable moving in their direction. In the figures, holding areas may be depicted as gray border rounded corner rectangles with gray "?" characters inside.

The user is able to move both digit cards with a single interaction. This is possible because appropriate logic is encoded in the app to move both digit cards together as soon as the top digit card (e.g. the "3") is positioned in such a way that it touches the bottom digit card (e.g. the "5").

Figure 5A:
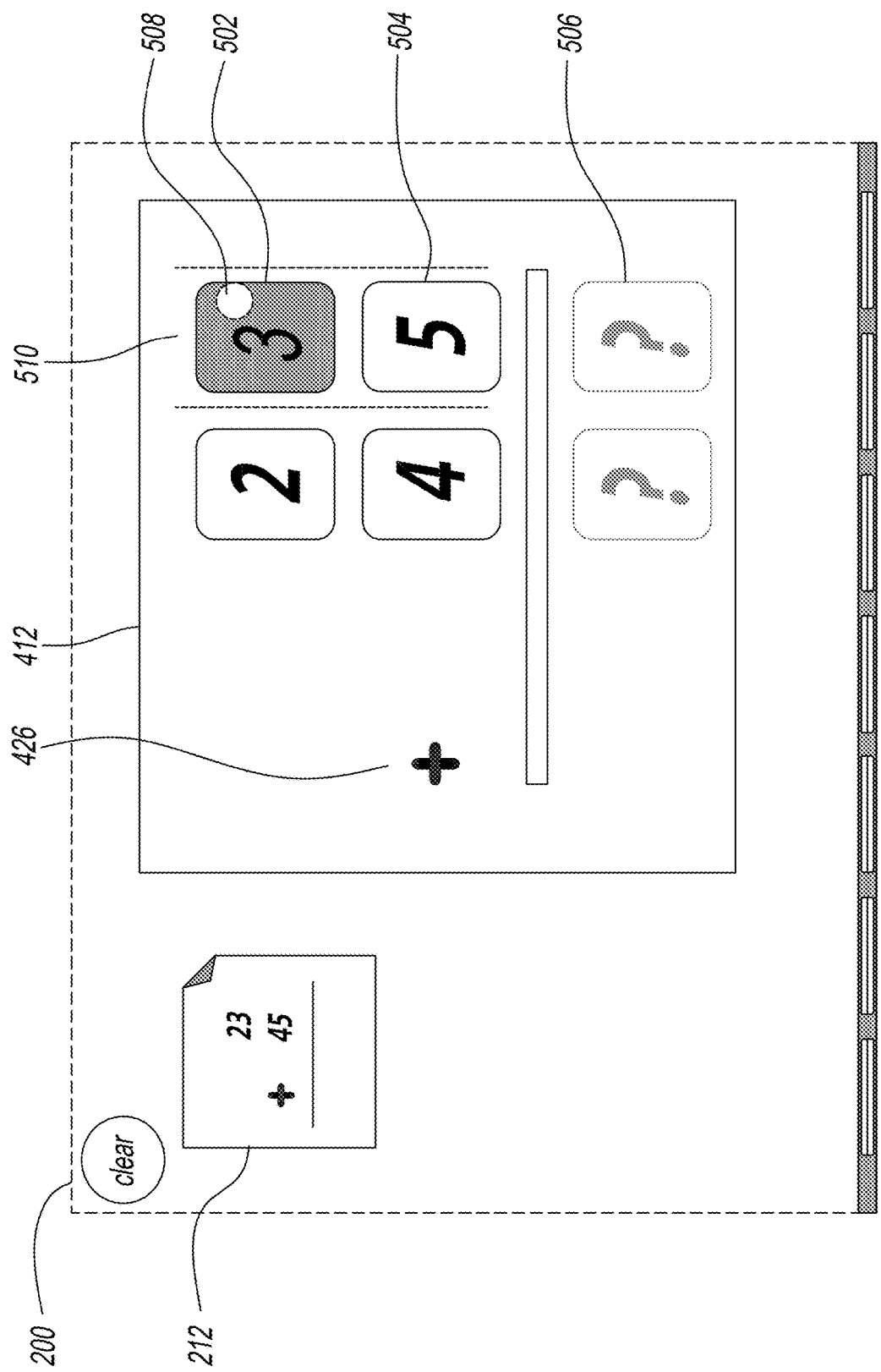

Referring to FIG. 5a, the interaction begins with the calculator receiving from the touch screen (e.g. an input device) a selection 508 by a user of an upper digit card 502 of the first number (e.g. "23") in the arithmetic problem, wherein said upper digit card is in a selected column 510 in said workspace area. The selection of the upper digit card may be by the user touching the digit card on the touch screen. This also selects the selected column. The selected column is indicated by two vertical broken lines which are not shown on the screen. The calculator may make an initiation tone indicating the commencement of the interaction. The selected card may also change shade in response to being selected.

Figure 5B:
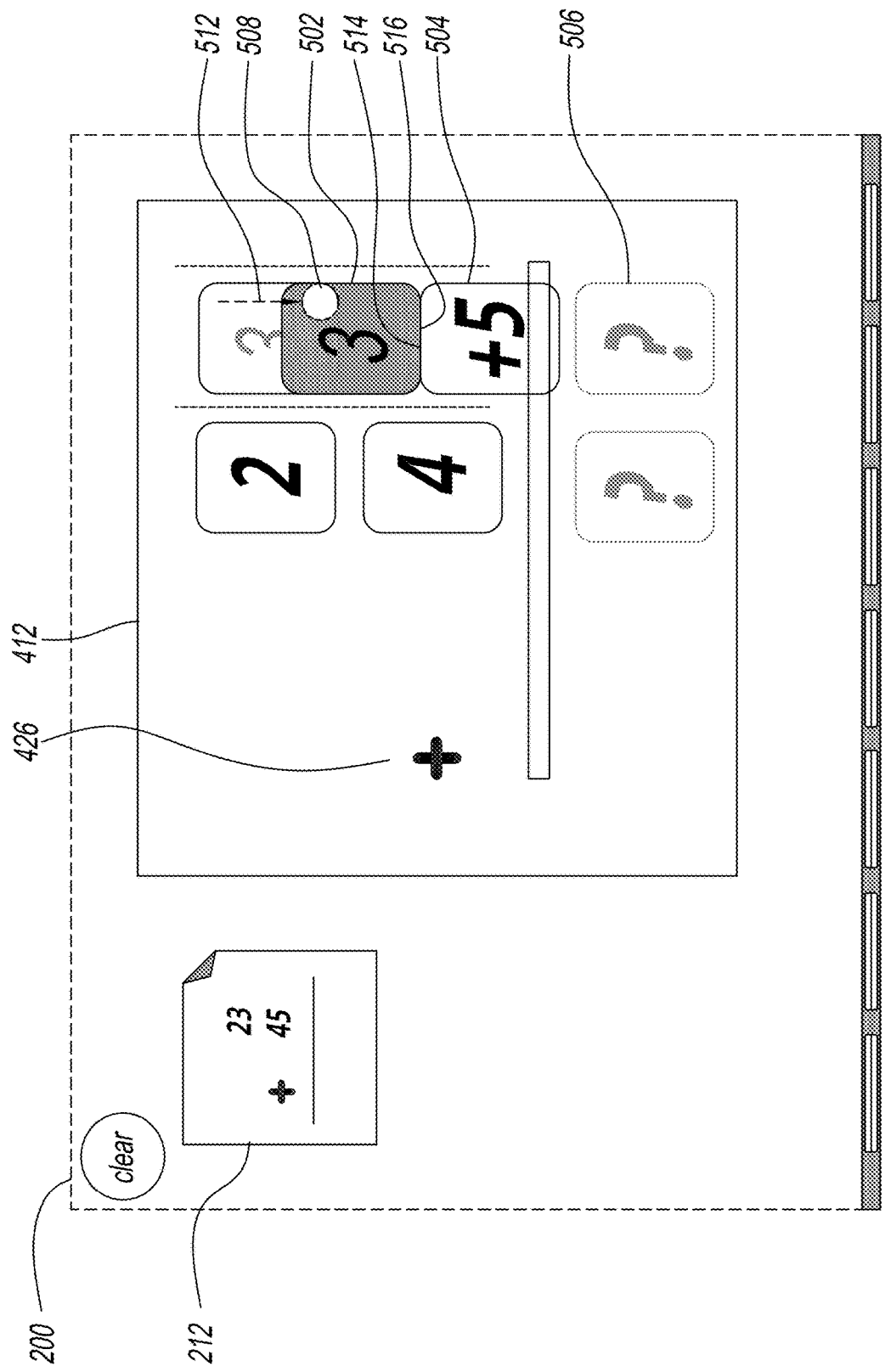

Referring to FIG. 5b, the interaction continues with the calculator receiving from the touch screen an indication by said user of a gesture 512 towards the holding area 506. The indication in this instance is the user sliding said user's finger touch point 508 downward. Said downward motion is indicated by a broken line arrow. In response to said user motion, the calculator moves said upper digit card 502 towards said holding area 506. The calculator then moves the lower digit card 504 that is below said upper digit card when the bottom 514 of said upper digit card touches the top 516 of said lower digit card such that said upper digit card appears to be pushing said lower digit card down. Said touch may not be exact, but may be approximate.

Figure 5C:
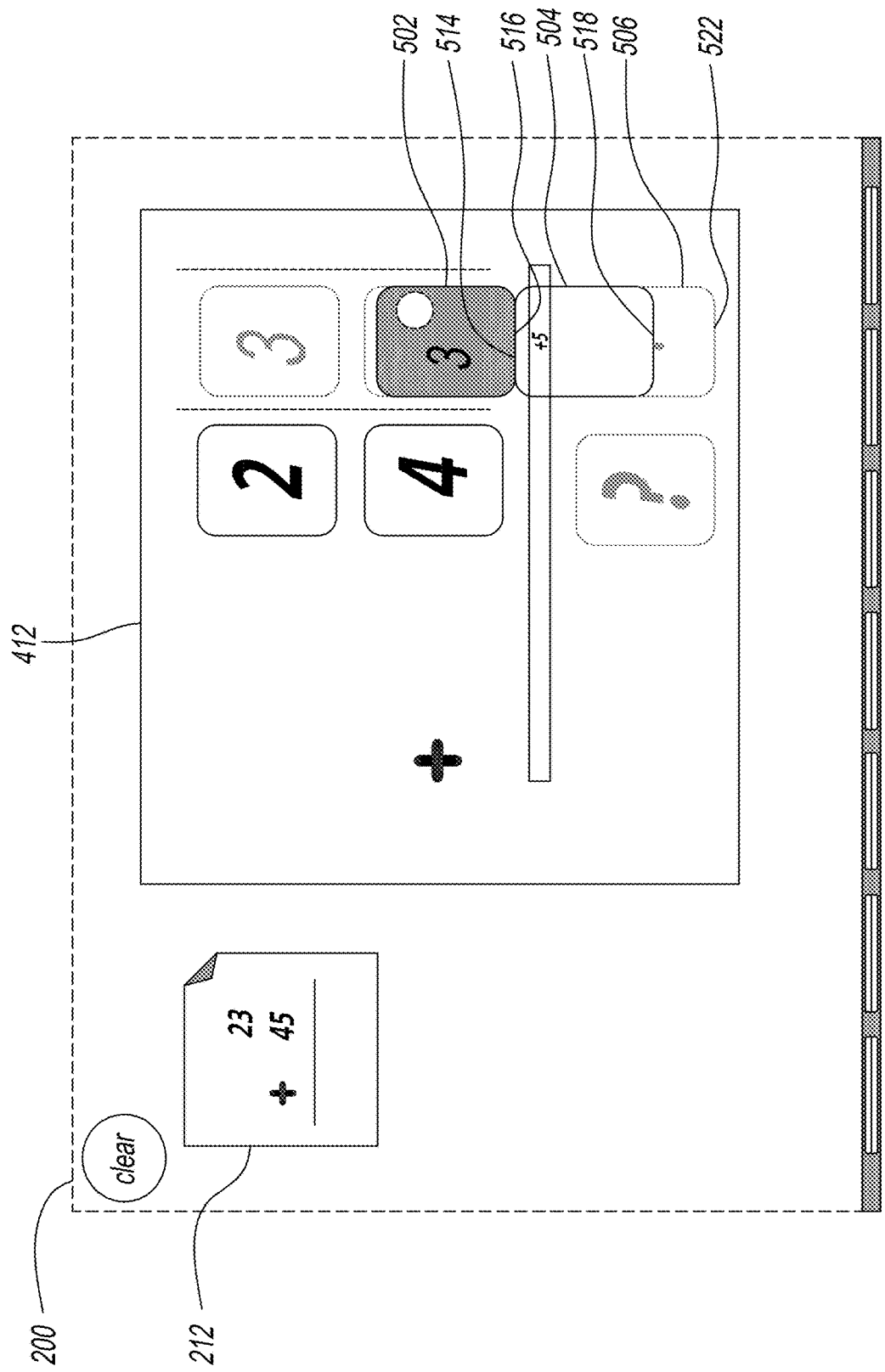
Figure 5D:
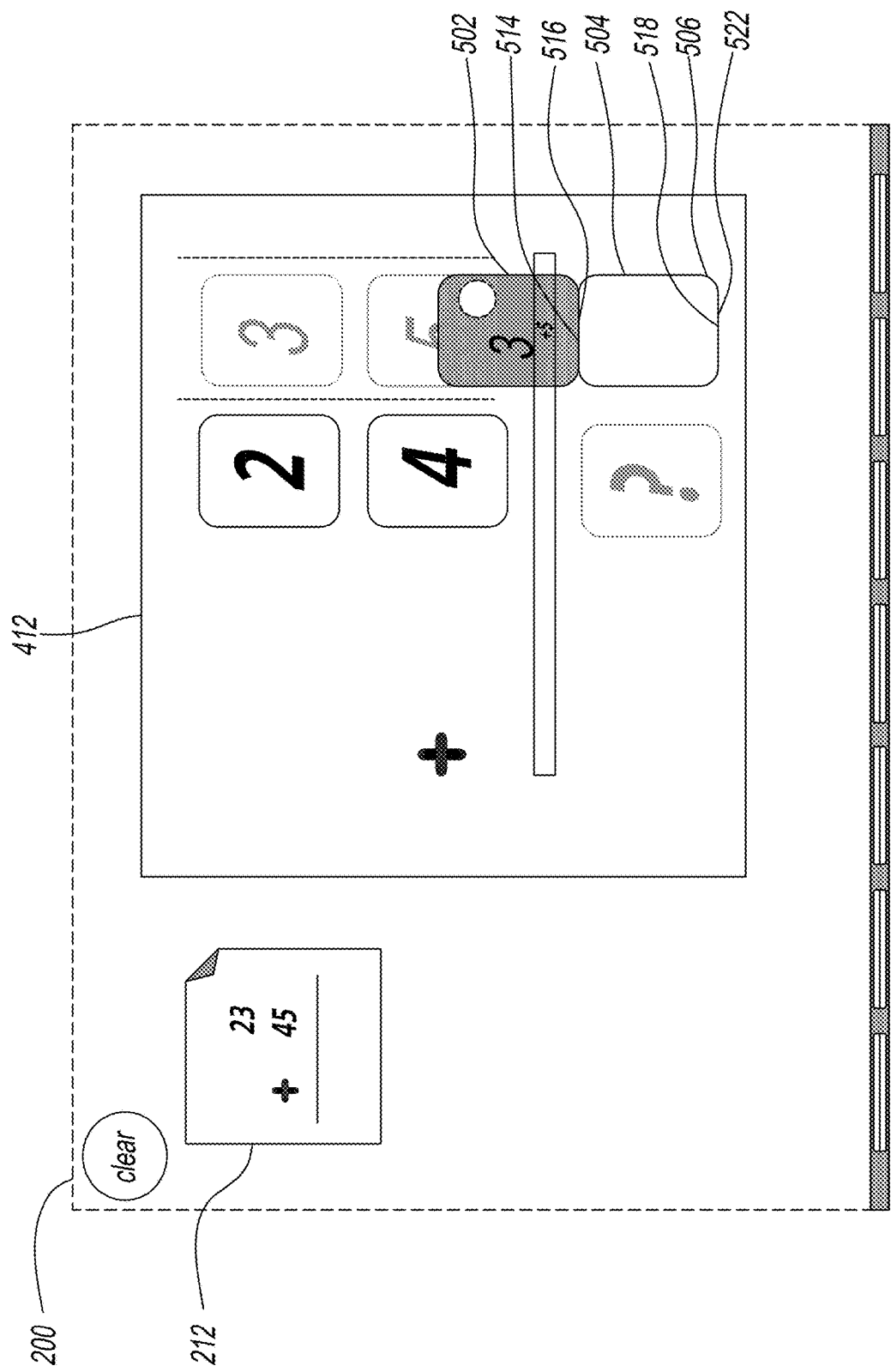

Neither digit card is allowed to move past the holding area at the bottom of the workspace. Once the bottom digit card has reached the holding area, it ceases to move, while the top digit card continues to move until it has also reached the holding area. As the digit cards reach the holding area, these distinct graphic objects begin to occupy the same region of the display. This makes it difficult to fully depict all three graphic objects (e.g. the holding area, the bottom digit card and the top digit card) simultaneously. An intuitive choice is to show the bottom digit card covering the holding area as the bottom digit card arrives at the holding area and to further show the top digit card covering the bottom digit card as the top digit card arrives in this same space. FIGS. 5c to 5e illustrate how this part of the interaction would appear.

Referring to FIG. 5c, the downward motion of the upper digit card 502 and lower digit card 504 will continue until the bottom 518 of the lower digit card reaches the bottom 522 of the holding area 506. The downward motion of the lower digit card will then stop.

Referring to FIG. 5d, the downward motion of said lower digit card 504 was stopped when said bottom 518 of said lower digit card reached said bottom 522 of said holding area 506.

Referring to FIG. 5e, the upper digit card 502 has been displayed with continued downward motion such that said upper digit card covers an overlapping portion of said lower digit card 504 after said lower digit card stops said downward motion.

Figure 5F:
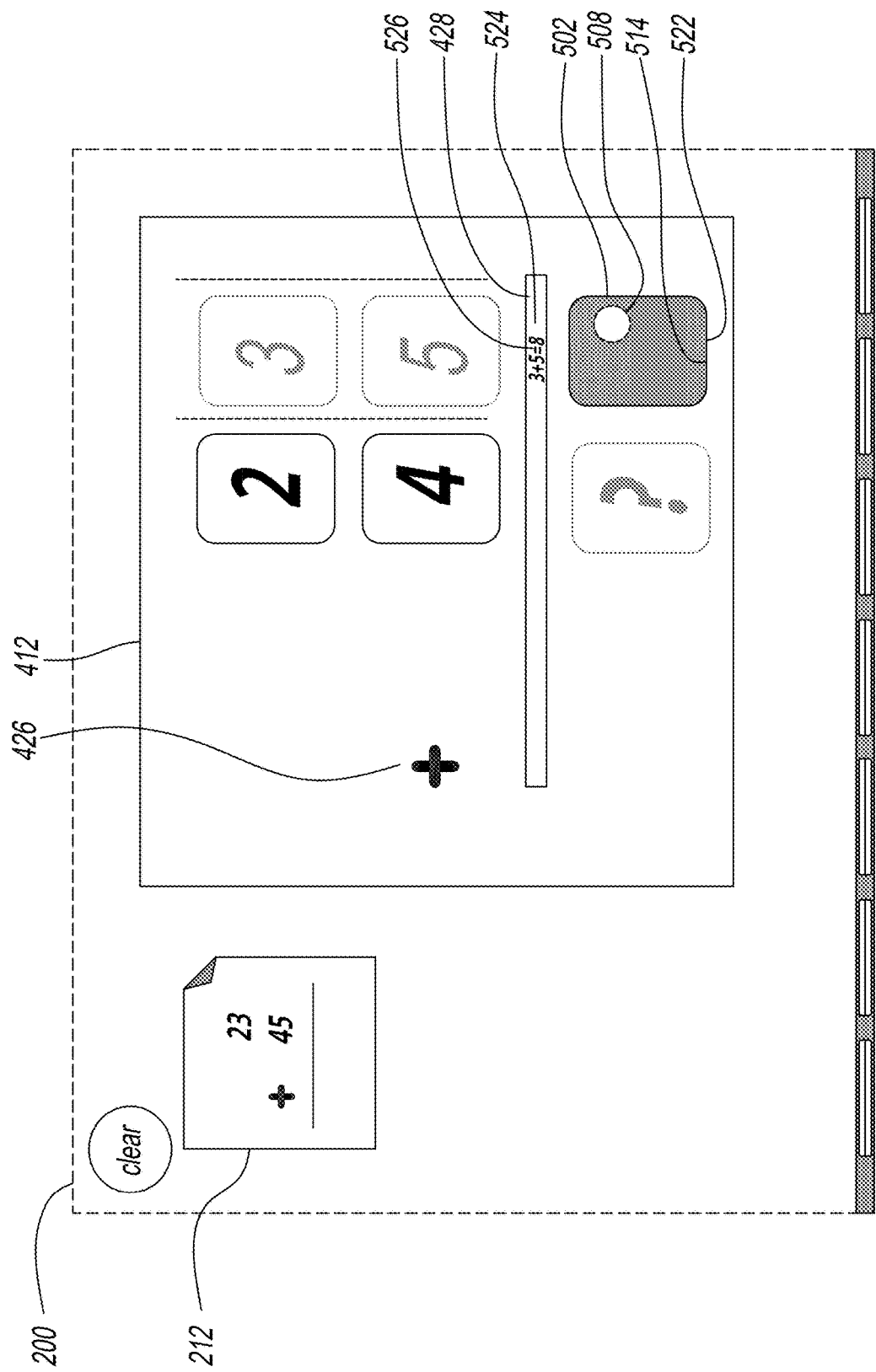
Figure 5G:
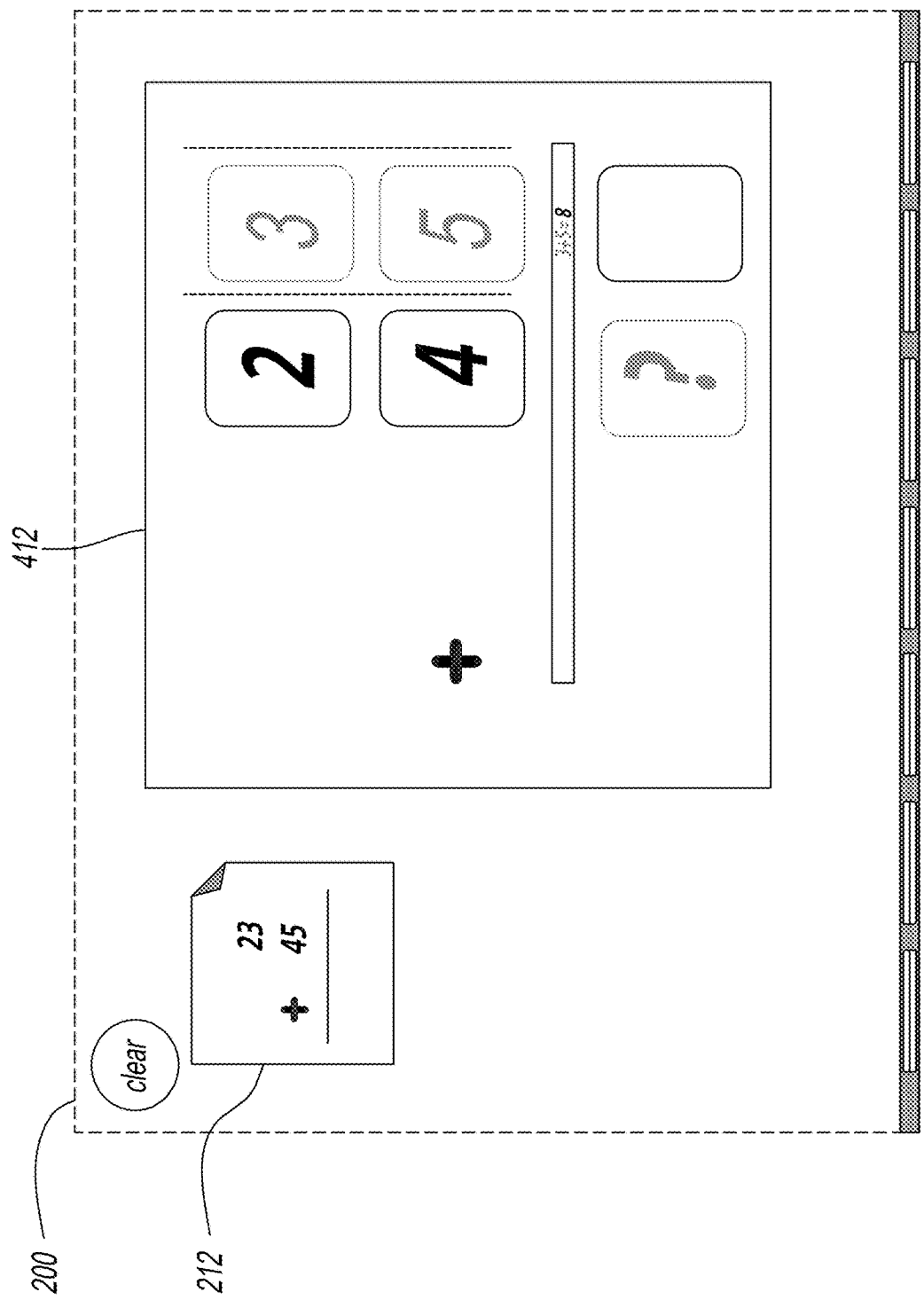
Figure 5H:
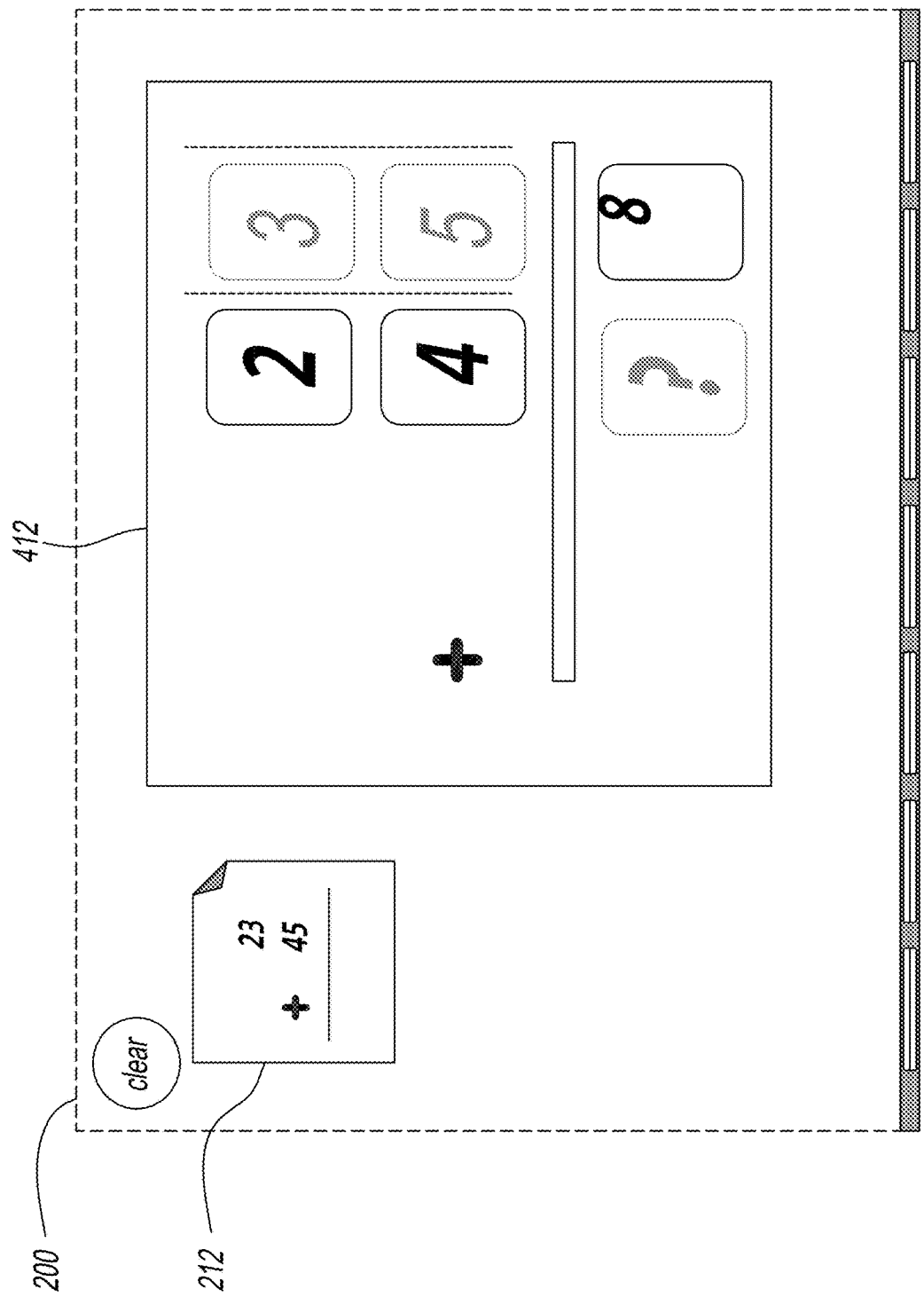

Referring to FIG. 5f, the downward motion of the upper digit card 502 is halted when the bottom 514 of said upper digit card reaches the bottom 522 of the holding area. The calculator has also calculated a derived value (item 524) of the operator 426 operating on said digits in said upper digit card and said lower digit card. An equation 526 illustrating this calculation is displayed in the equals bar area 428. At this point, the actions by the calculator may pause. The calculator may be programmed to reverse the process in response to the user moving said user's finger up on the touch screen. Thus the user can experiment before committing to an action. If the user lifts his/her user's finger off of the touch screen thus breaking the touch 508 with the touch screen, the calculator will interpret said lifting as the user completing the motion. An "end of action" tone may sound. The user can no longer reverse the motion. The calculator may then proceed to auto complete the actions shown in FIGS. 5g to 5i. Similarly, the calculator may be programmed to auto complete a touch drop if the user merely touches a card and gestures partway down a selected column. This is considered a flick gesture. The upper digit card would continue to push the lower digit card until both were in the holding area.

In addition to relocating two digit cards to the holding area, the interaction has replaced the two original digits with a new derived value that is equal to their sum. The replacement is not instantaneous, but rather the final result of a series of intermediate transformations intended to clarify the logic behind the transformation. These transformations are illustrated in FIGS. 5a to 5i. More specifically, as the digit cards move toward the holding area, the digits of these digit cards are presented in ever smaller sizes. Furthermore, the vertical position of the digits is constrained so that they do not enter the holding area along with their associated digit card, but rather remain just above the holding area in the equals bar area. Furthermore, the digits are repositioned so as to not overlap and an addition operator and equals operator appear as well as the sum of the two digits. All of these details are intended to clarify as well as possible that this vertically constrained touch drop interaction will result in a summation of the digits of this column in the workspace. To complete the transformation, the original digits as well as the operators all fade out while the derived value (e.g. the "8" digit) gradually increases in size and moves down into the holding area.

Figure 5I:
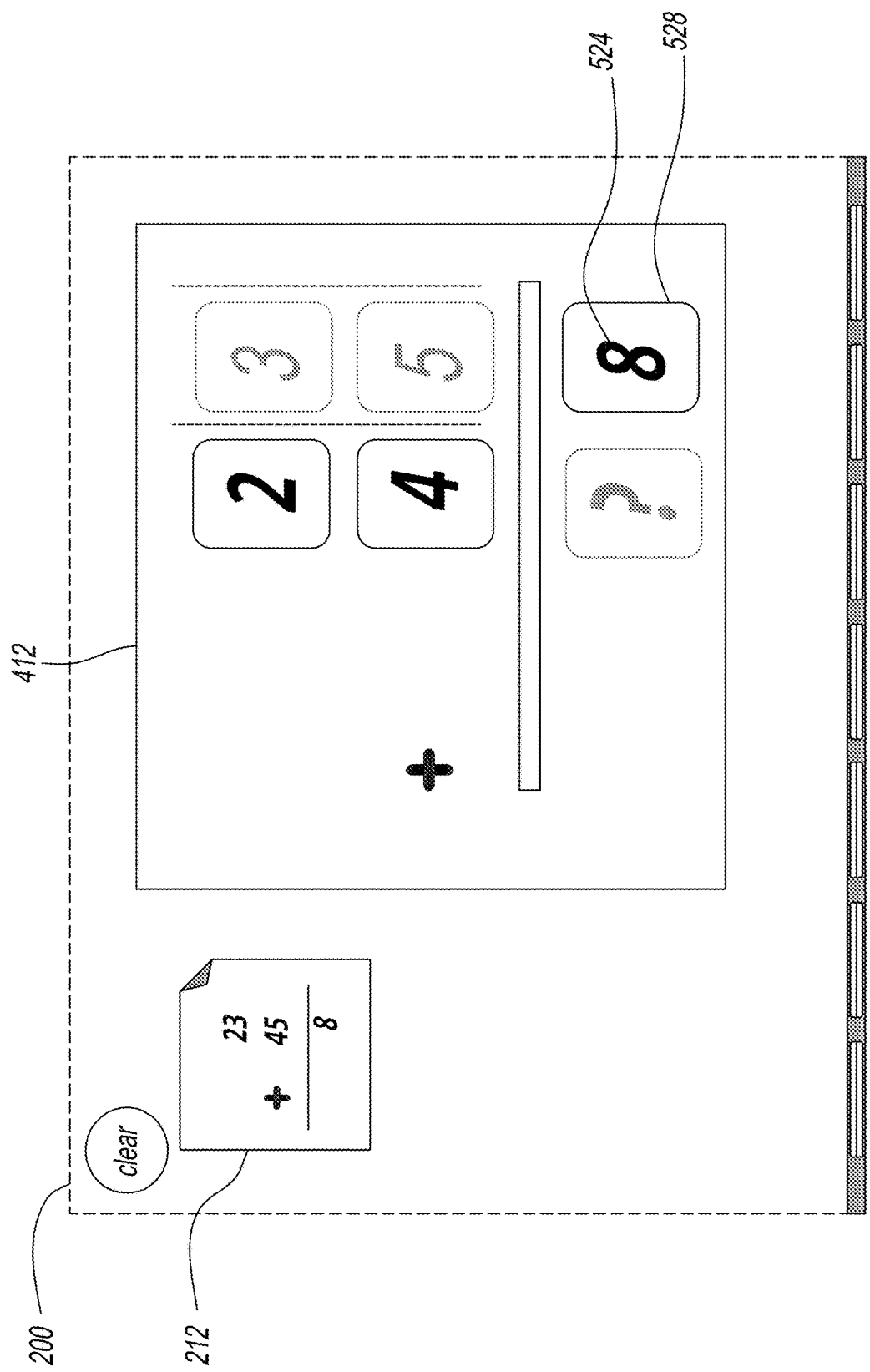

Referring to FIG. 5*i*, the calculator displays the derived value (item 524) in said upper digit card at the end of the touch drop. The upper digit card then becomes a "derived value card" 528.

Carrying

In many cases, the derived value will not exceed 9. In such cases, the user may directly proceed with manipulating digits in the next column to the left in the workspace in a like manner to how the digits in the first column were manipulated. In other cases, the derived value will exceed 9. Thus, the holding area now contains a derived value card which is presenting a pseudodigit rather than a proper digit. An example of such a presentation appears in FIG. 6*a*. The derived value card 602 shows the pseudodigit "18". We refer to this circumstance as "overflow."

In the case of overflow, a horizontally constrained touch drop gesture facilitates the separation of the tens digits of a derived value and the automatic transfer of the tens digit to an upper holding area at the top of the next vertical column to the left. More specifically, the circumstance of overflow causes a new graphic to appear on the workspace area. This new graphic should appear just below the holding area for the digit card that contains the pseudodigit. This graphic takes the form of an arrow surrounded by a rectangle that has similar features to a digit card in the workspace. We refer to this new graphic as a "carry arrow card" 604. FIG. 6*a* illustrates how the workspace area presents the carry arrow card when an overflow circumstance has arisen. The carry arrow card helps facilitate an interaction that corresponds to a step in the standard algorithm for hand calculation of sums, which is referred to sometimes as "regrouping" or "carrying the one."

FIG. 6*a*-6*g* illustrate an interaction that constitutes an appropriate handling of an overflow circumstance. Unlike the previous touch drop interaction for summing digit cards, in this embodiment, the interaction is initiated by touching the carry arrow card rather than by touching a digit card. Furthermore, while the previous touch drop interaction was vertically constrained, this interaction will be horizontally constrained 606. This means that the user will be allowed to move the carry arrow card horizontally but not vertically. Furthermore in this embodiment, the carry arrow card can only be moved to the left. As the user moves the carry arrow card to the left, the display will present a new graphic object on the workspace. This new graphic object will resemble a digit card in appearance. In this embodiment it may be presented so that it appears to be sliding out from underneath the existing digit card in the holding area just above the carry arrow card. This new graphic object is hereafter referred to as the "carry card".

Figure 6C:
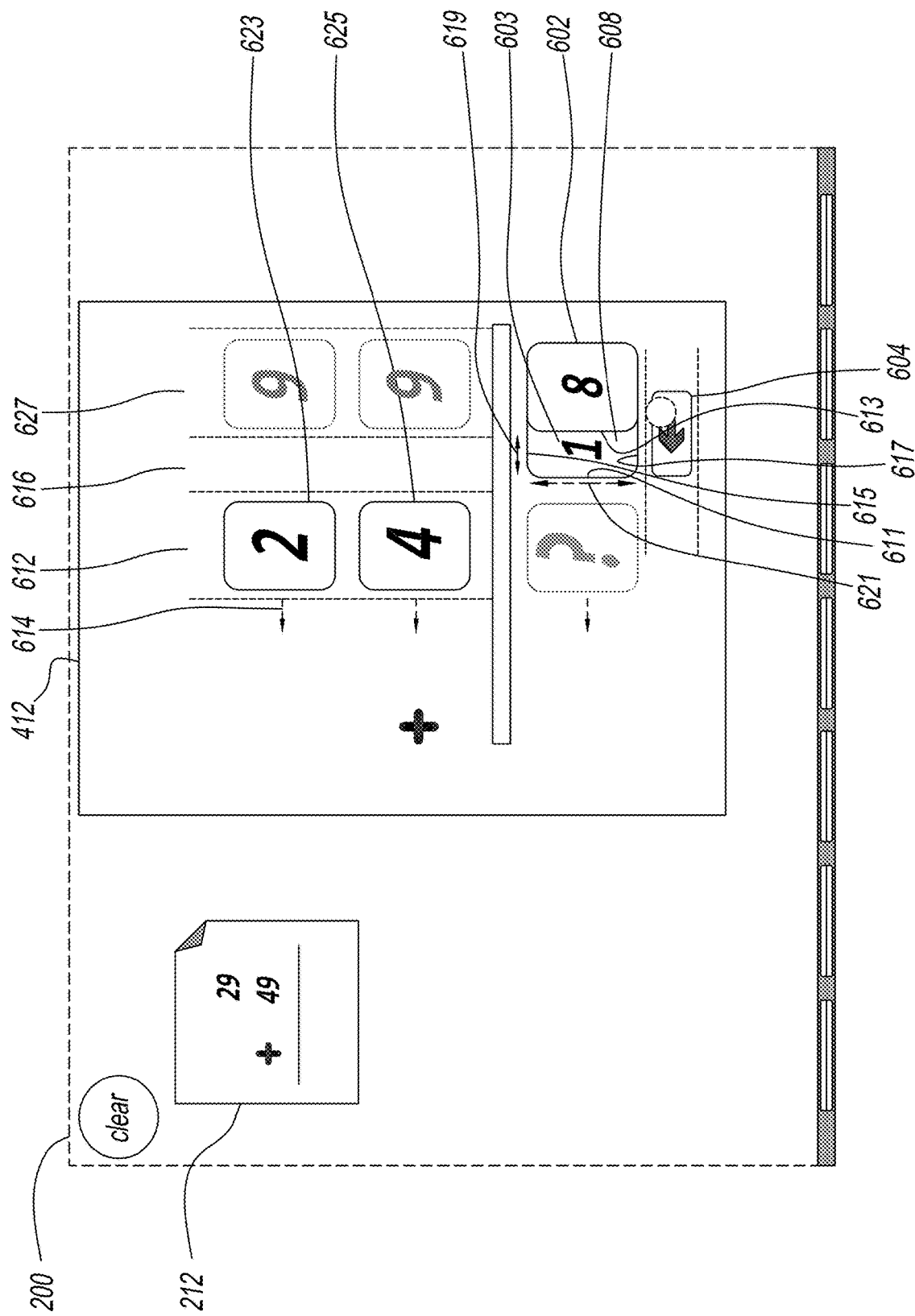

Referring to FIG. 6*c*, as the carry card 608 moves out from under the derived value card in correspondence with the associated movement of the carry arrow card 604, the tens digit (item 603) of the derived value moves with it. As this movement proceeds, the carry card eventually reaches a position whereby it has become fully visible and separated slightly from the derived value card that remains in the holding area. The associated carry arrow card is not permitted to move beyond the point needed to bring the carry card into clear view.

During the interaction, all columns 612 that are initially positioned to the left of the carry arrow card move further to the left 614 as the carry arrow card is moved to the left. This ensures that a clear passage way 616 becomes available for transporting the carry card up to the top of the workspace and above the next column. The appropriate movement is well illustrated in FIGS. 6*b*-6*d*.

Figure 6D:
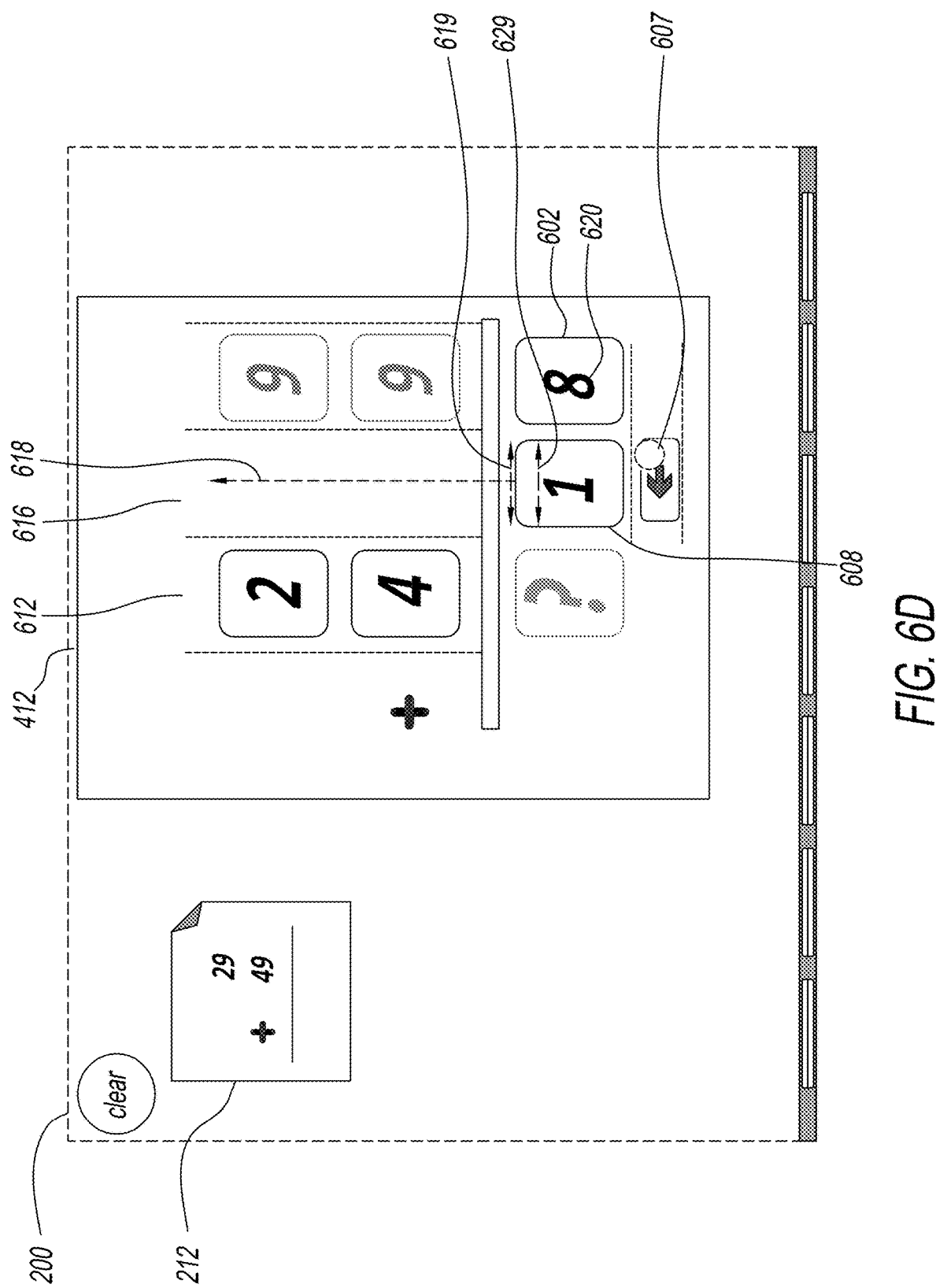
Figure 6E:
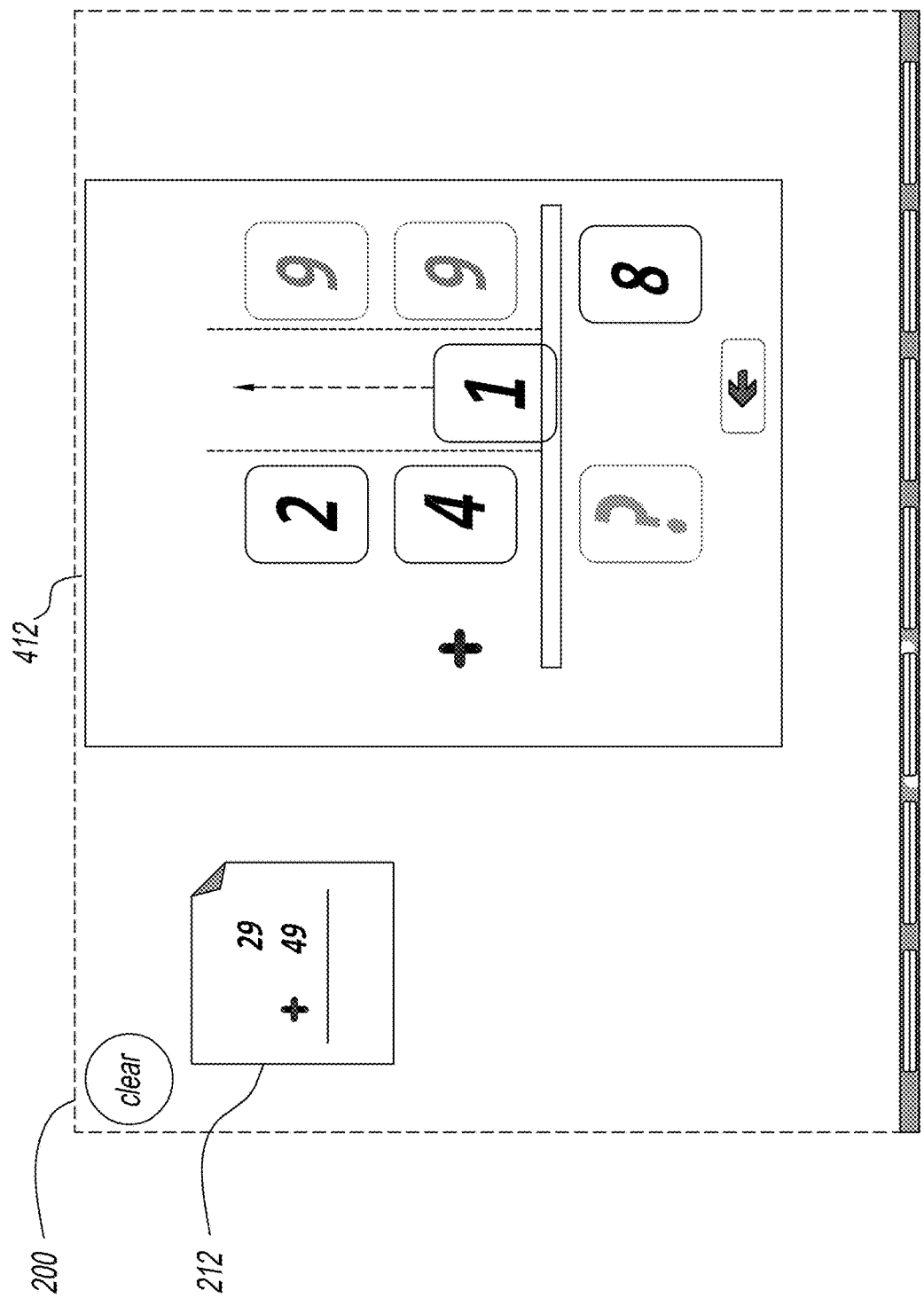
Figure 6F:
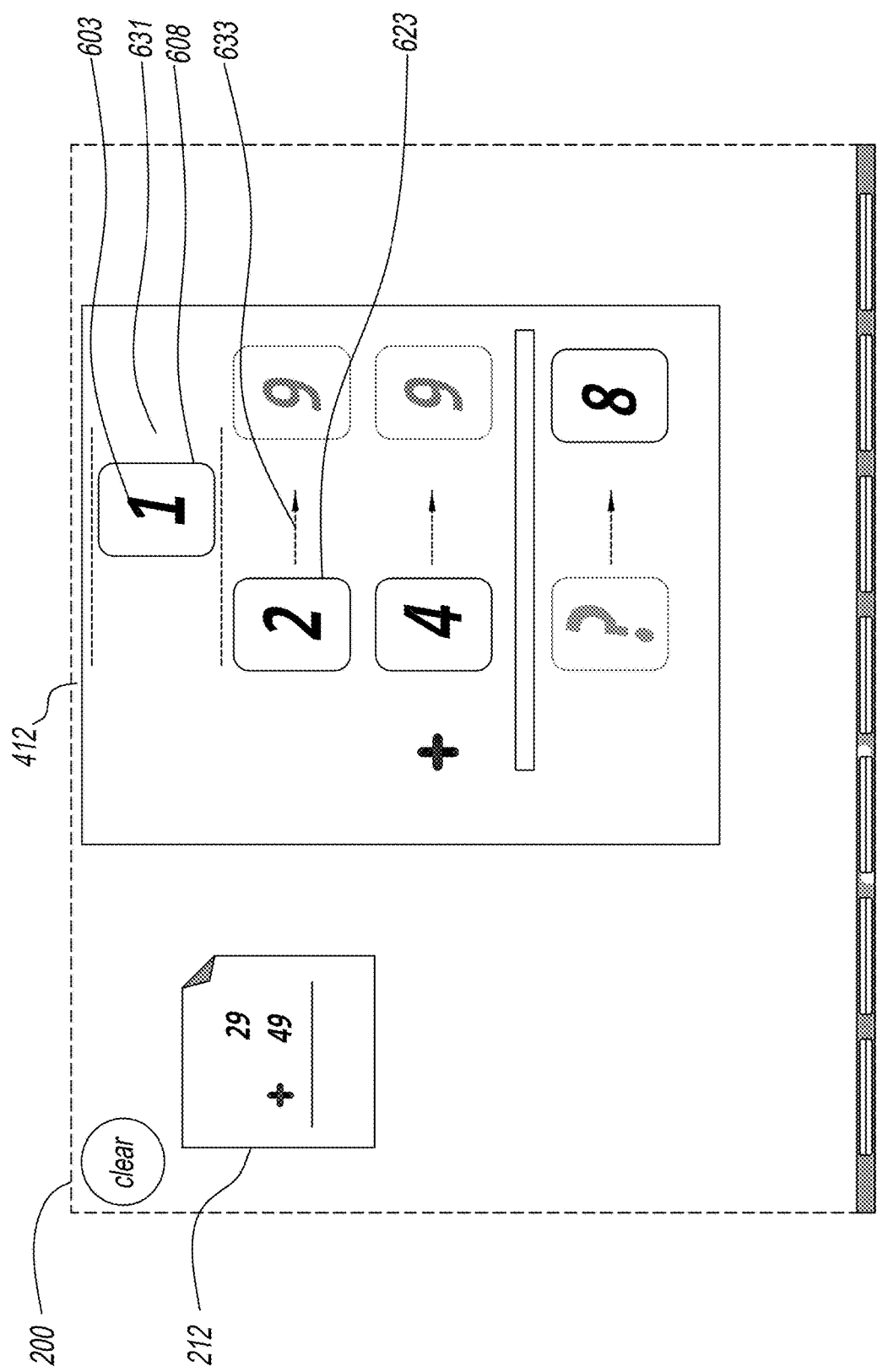

Referring to FIG. 6*d*, once the carry card 608 has come into clear view, further movement is disallowed. At this point, it will be clear to the user that the carry card is now a digit card for the "1" that has moved with it, while the derived value card is a digit card for the digit left behind (item 620). The user may then terminate his/her touch 607, at which point the carry arrow card will fade out of the workspace while the carry card moves automatically 618 upward through the passageway 616 until it reaches the topmost area of the workspace. Next, all columns 612 that were repositioned in order to clear a passageway for the carry card move automatically back to their original positions.

Figure 6G:
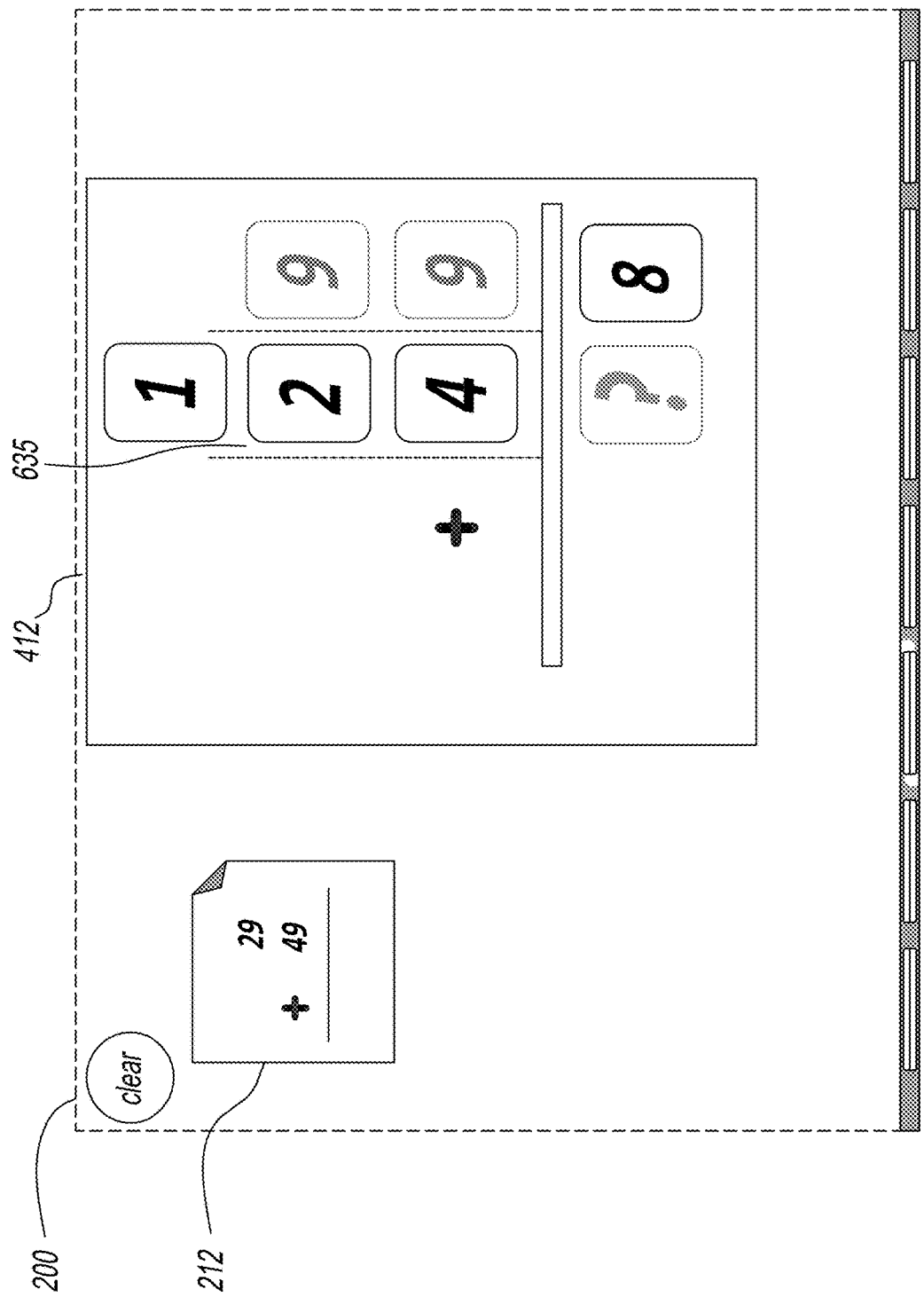
Figure 7A:
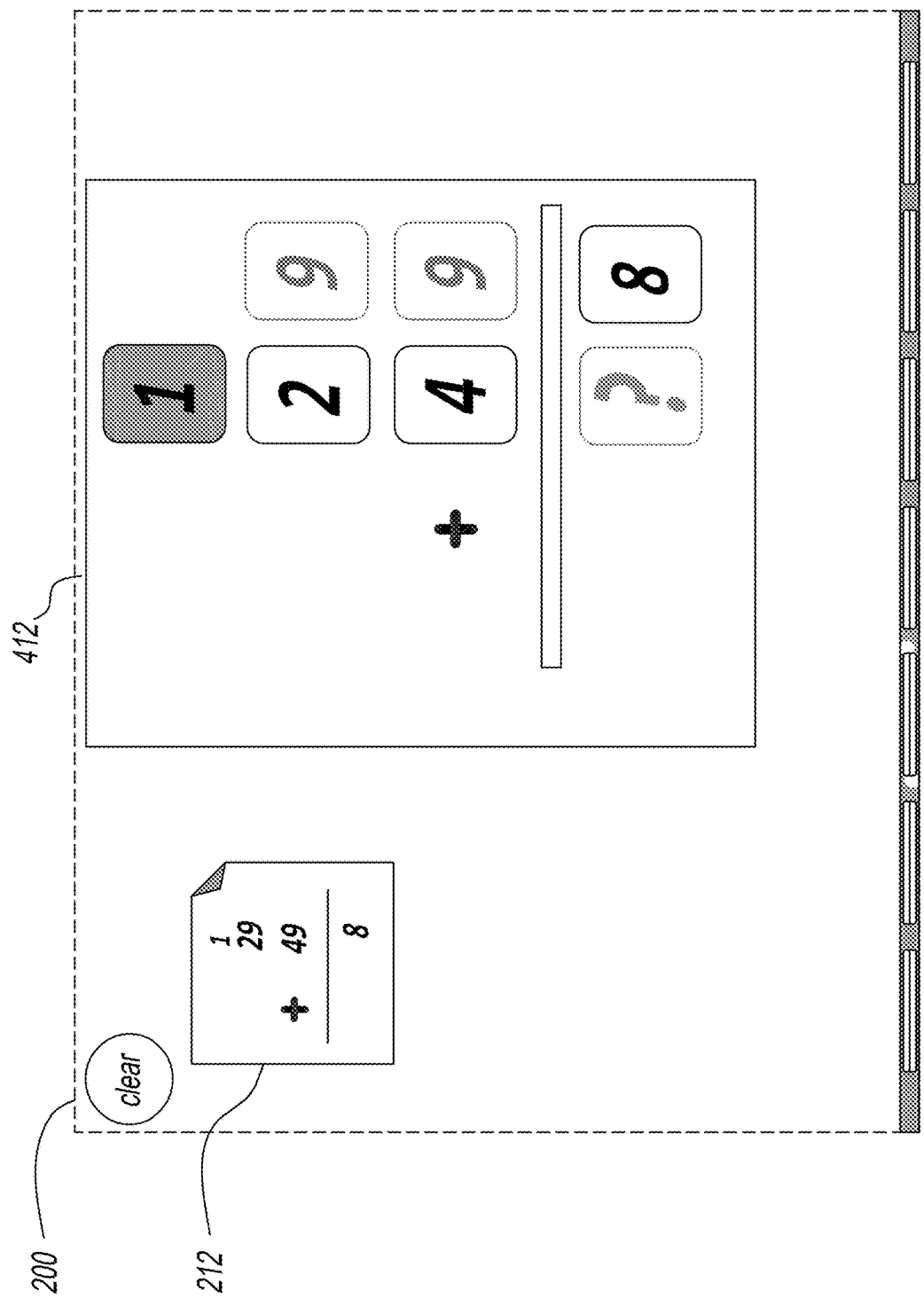
Figure 7B:
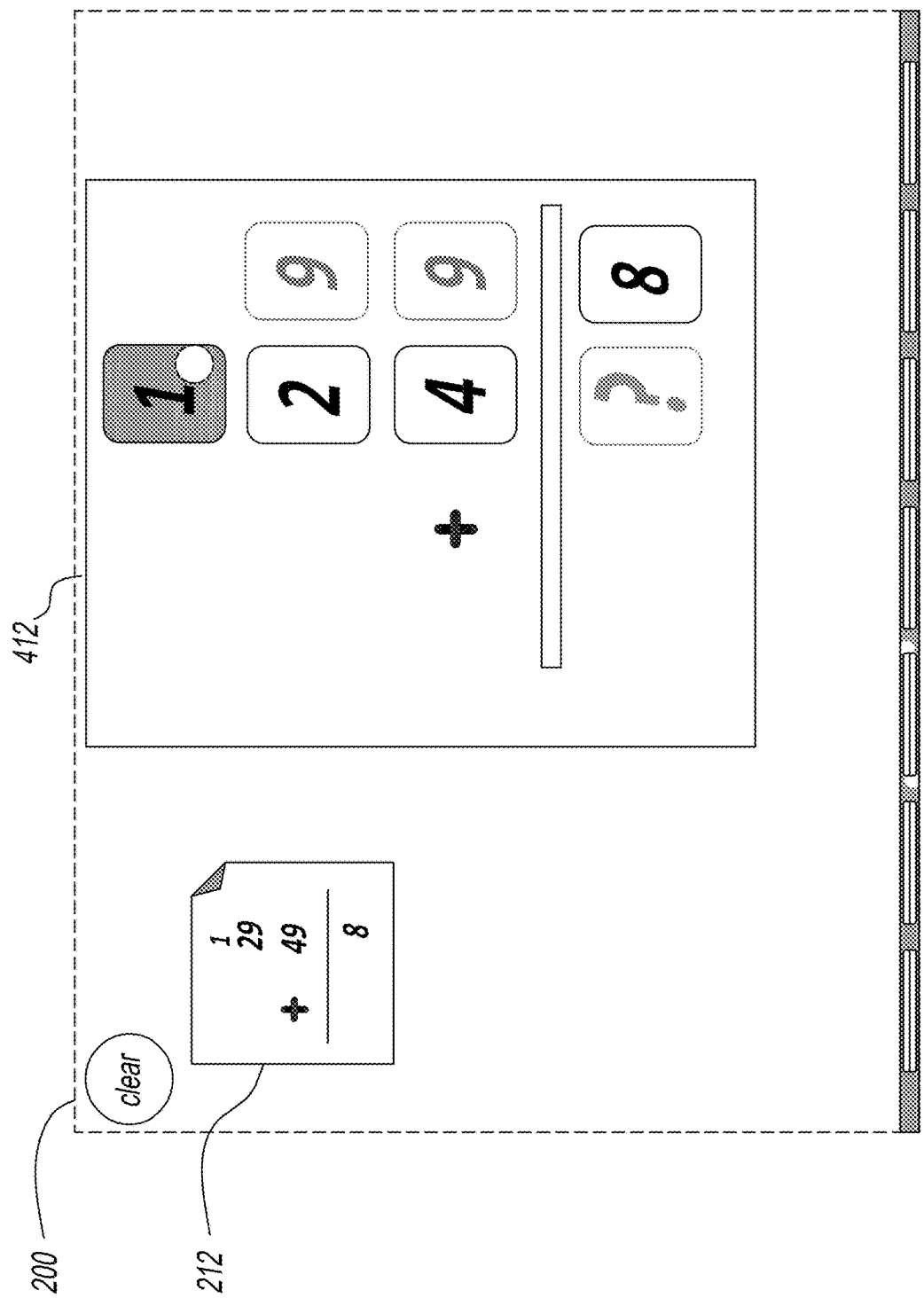
Figure 7C:
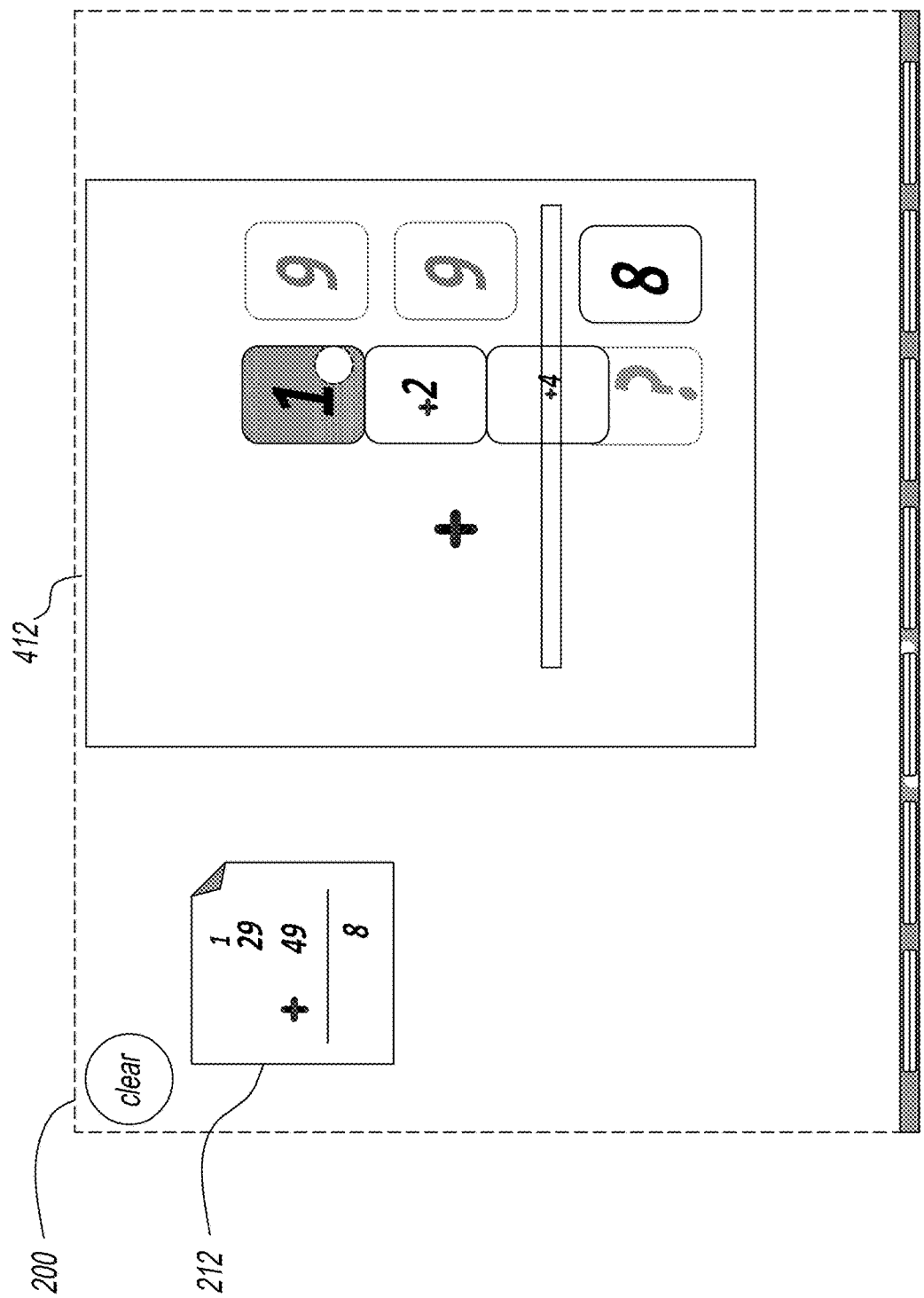
Figure 7D:
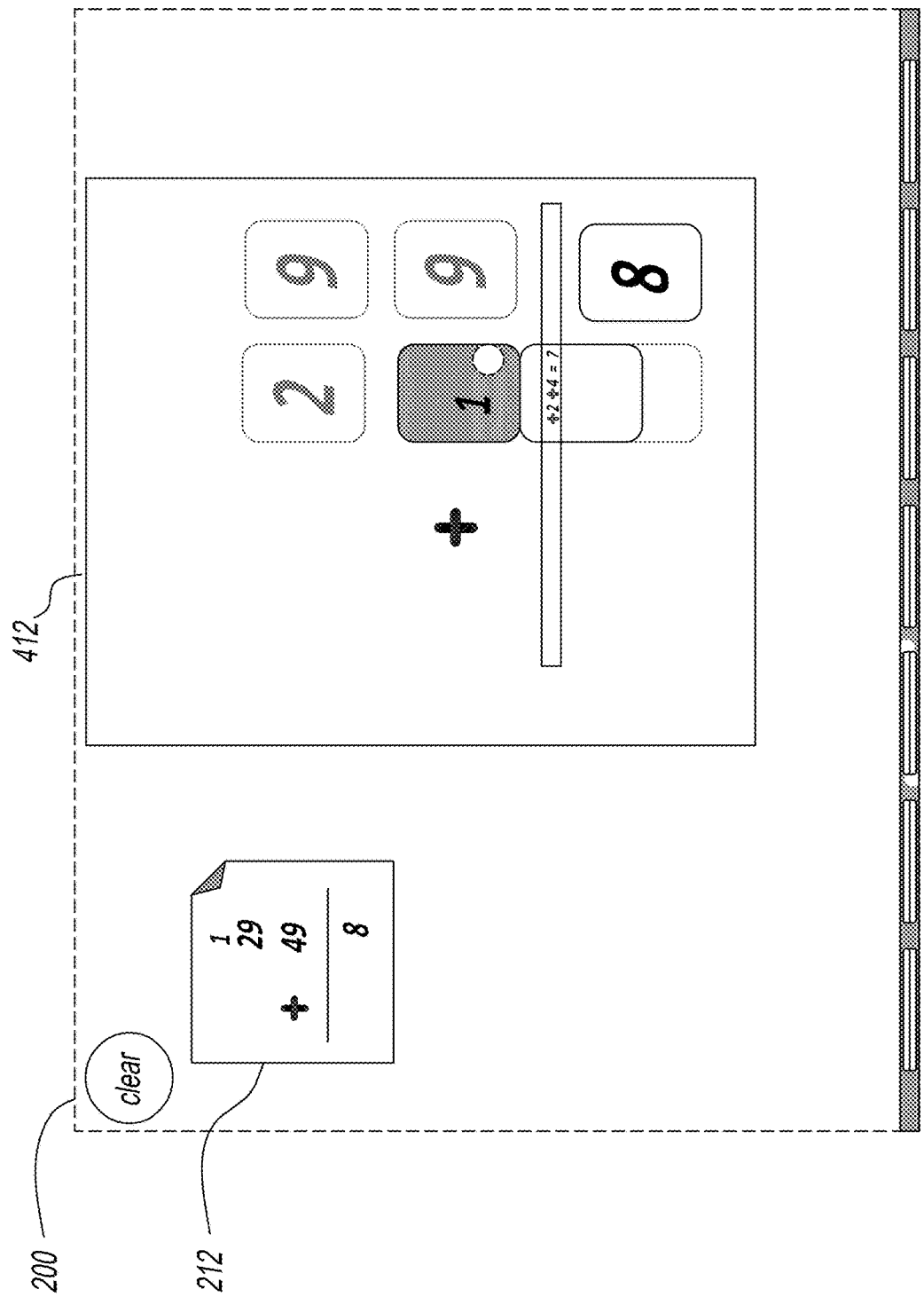
Figure 7E:
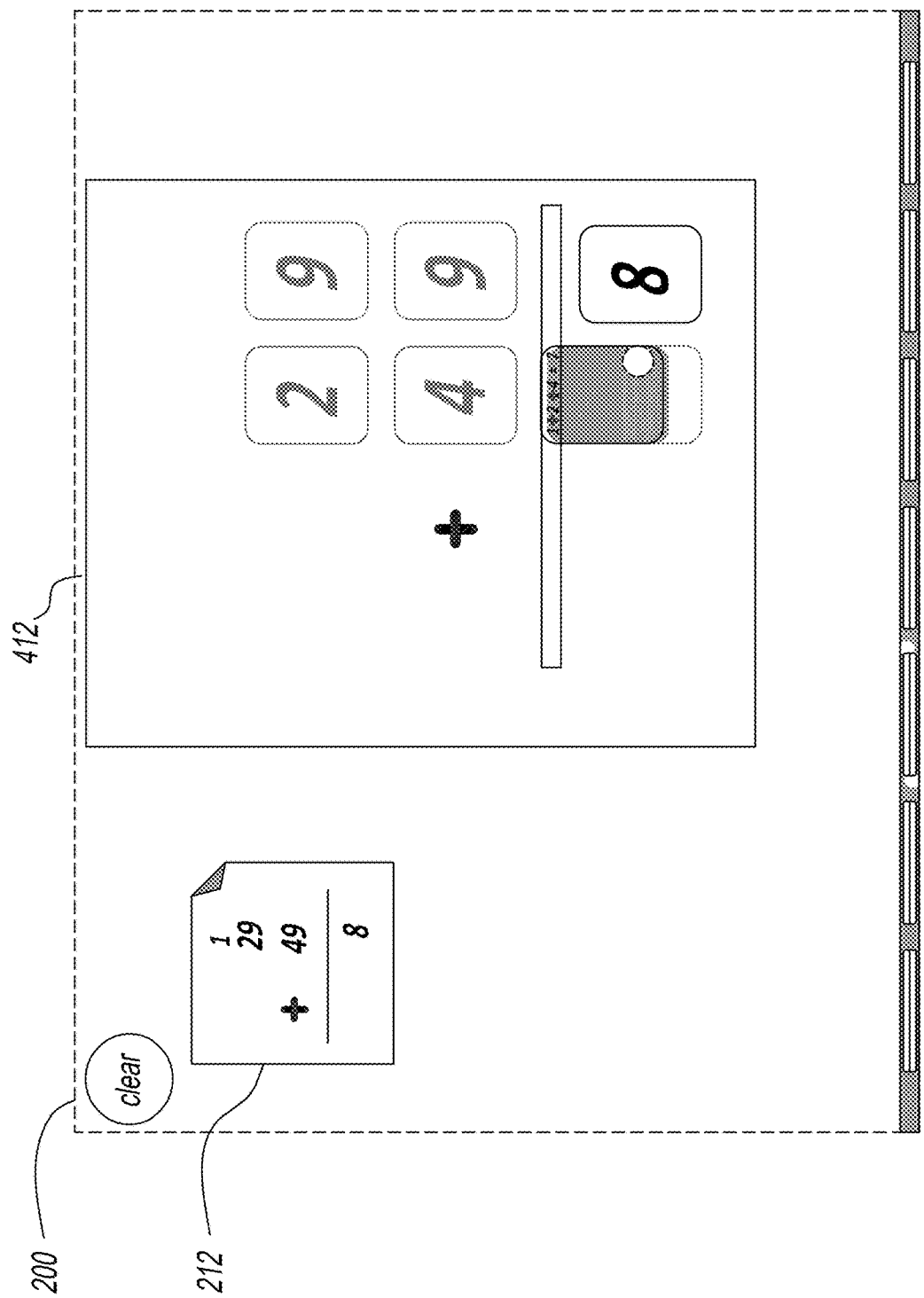
Figure 7F:
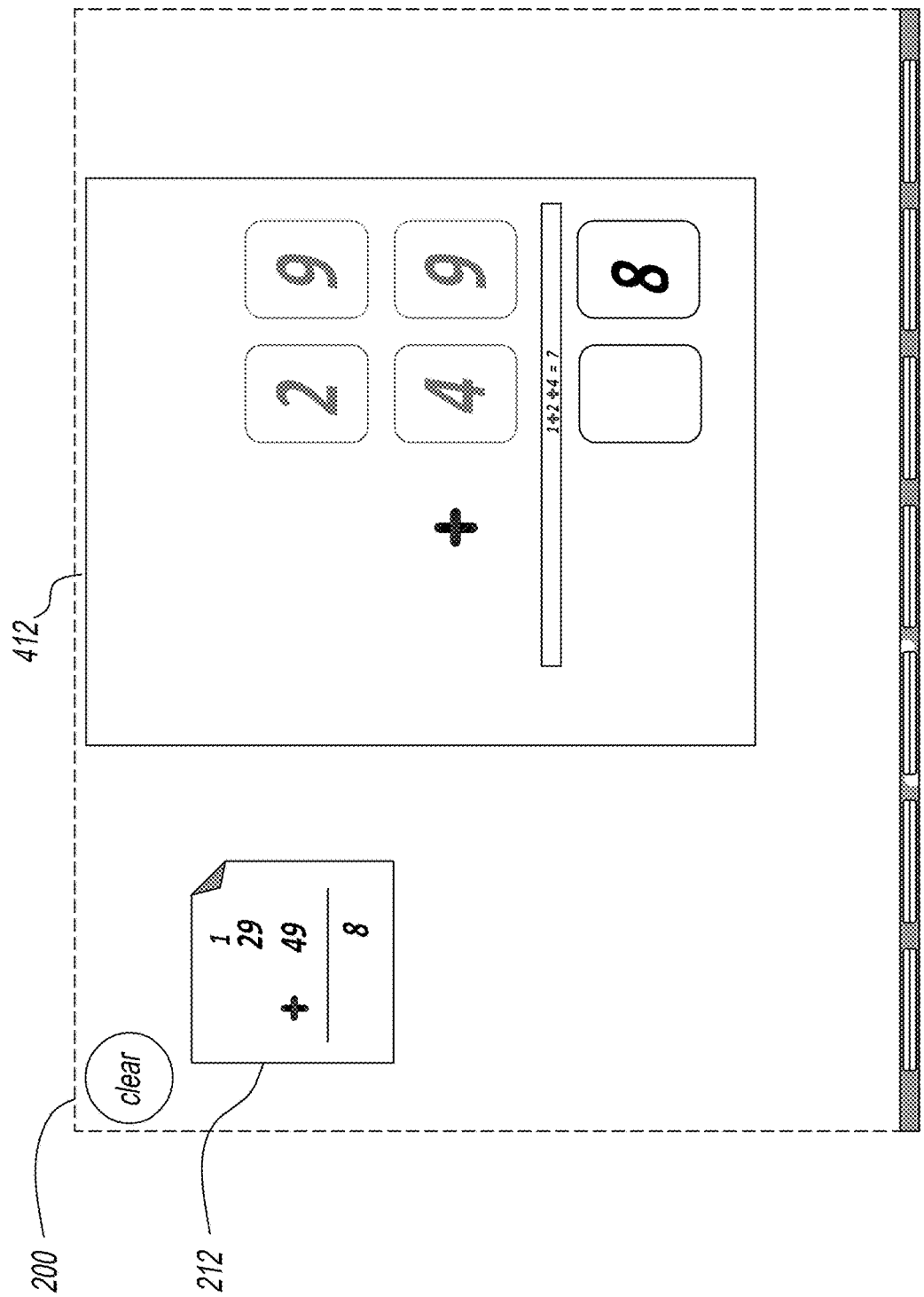
Figure 7G:
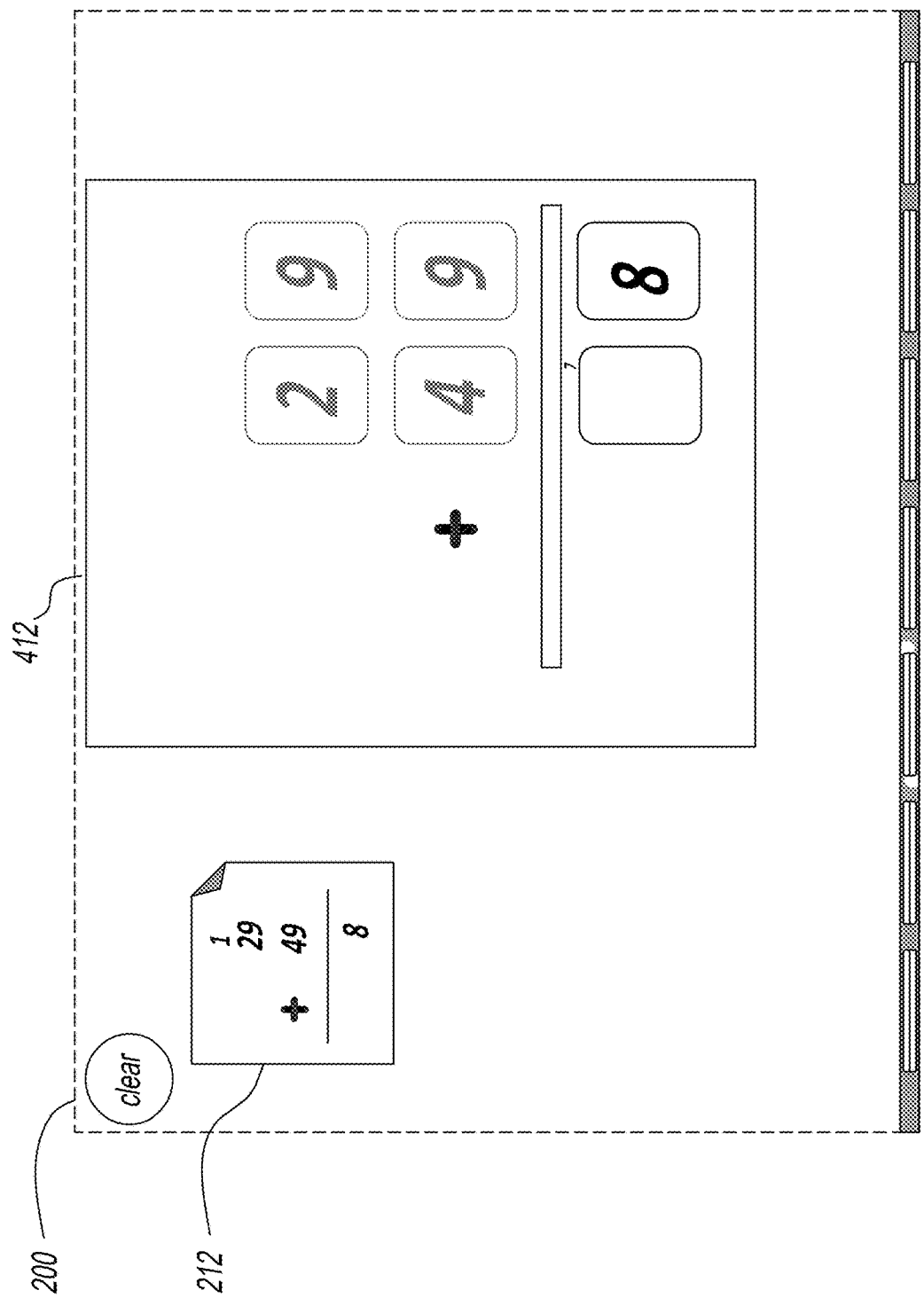
Figure 7H:
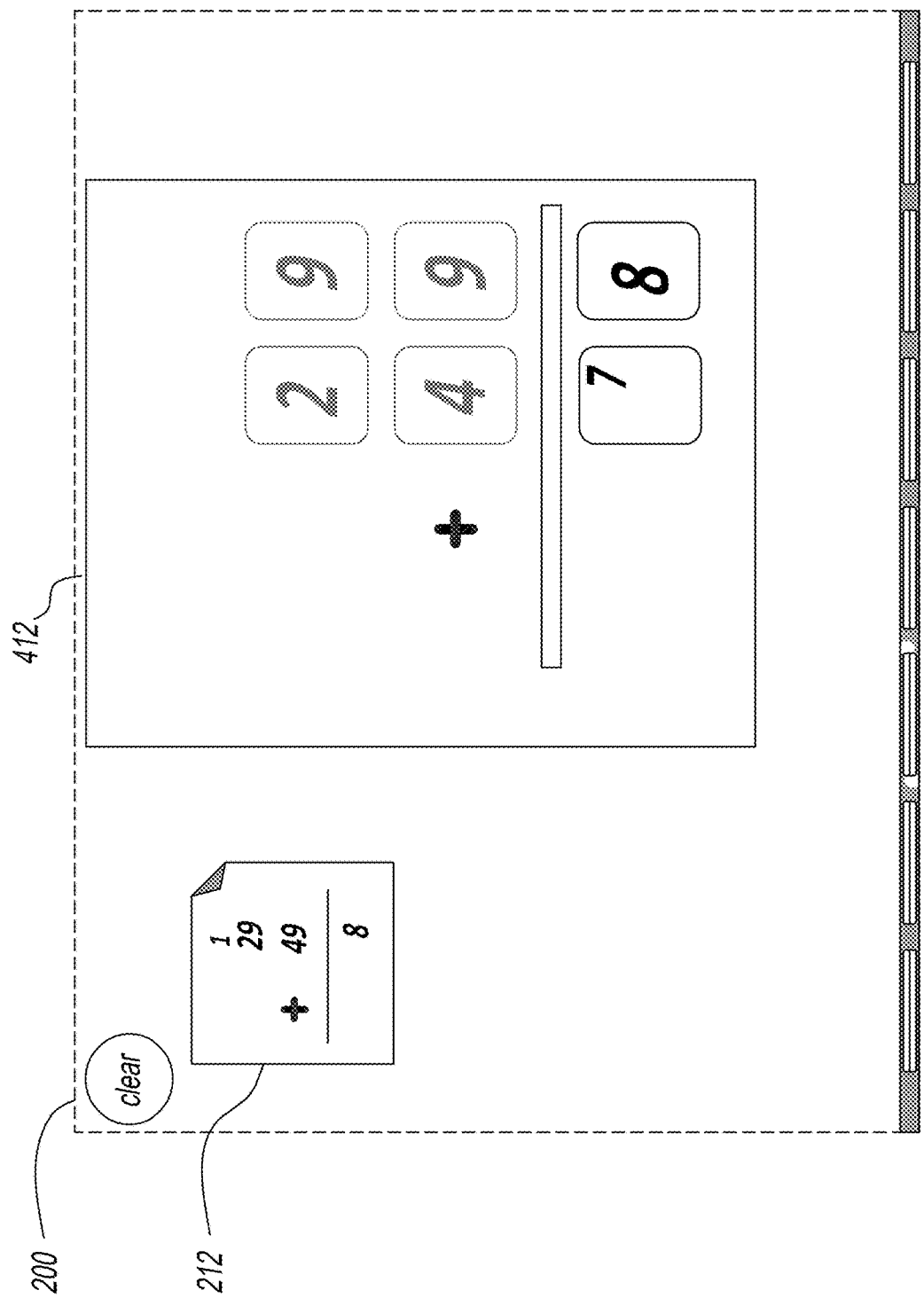
Figure 71:
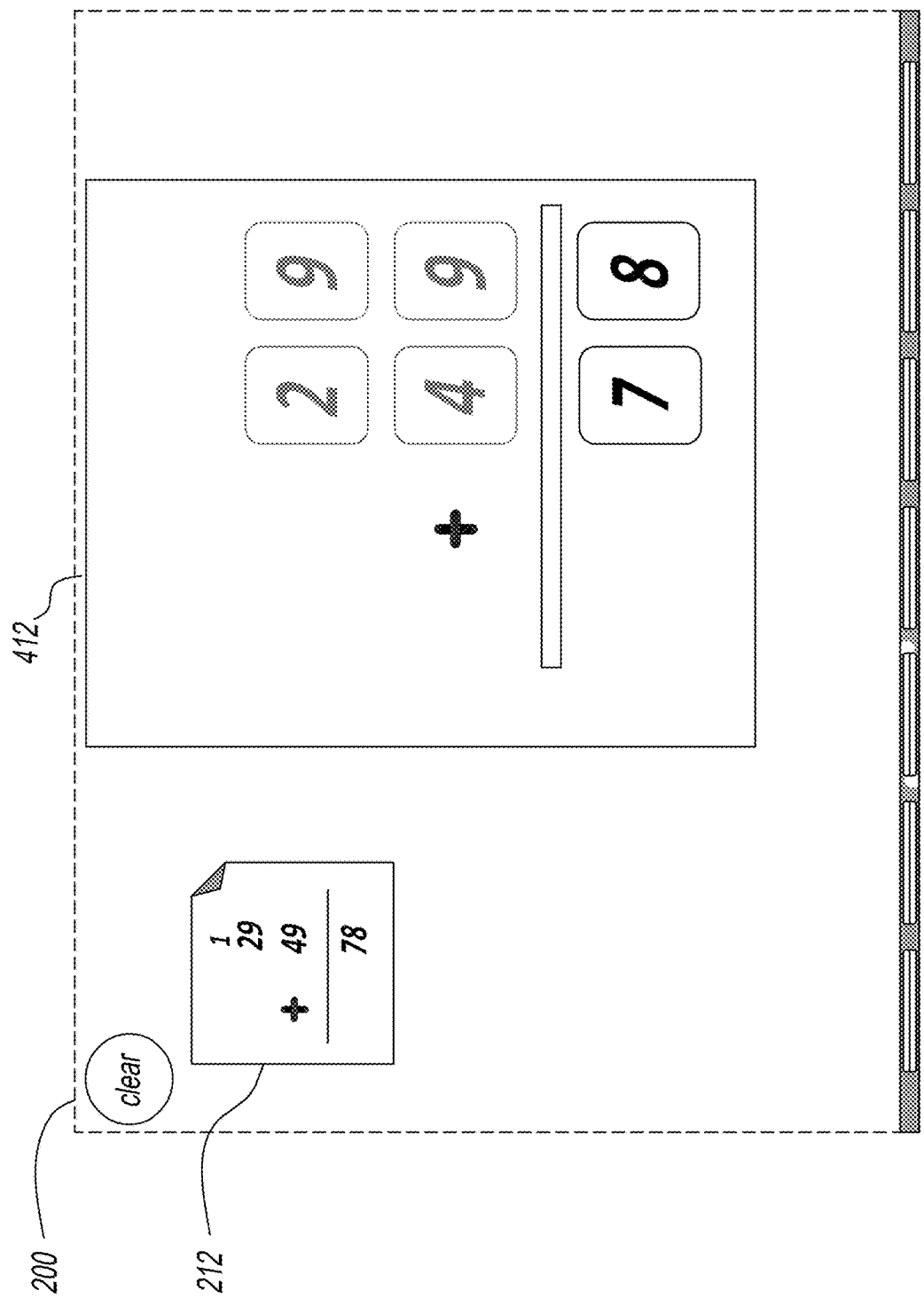
Figure 8A:
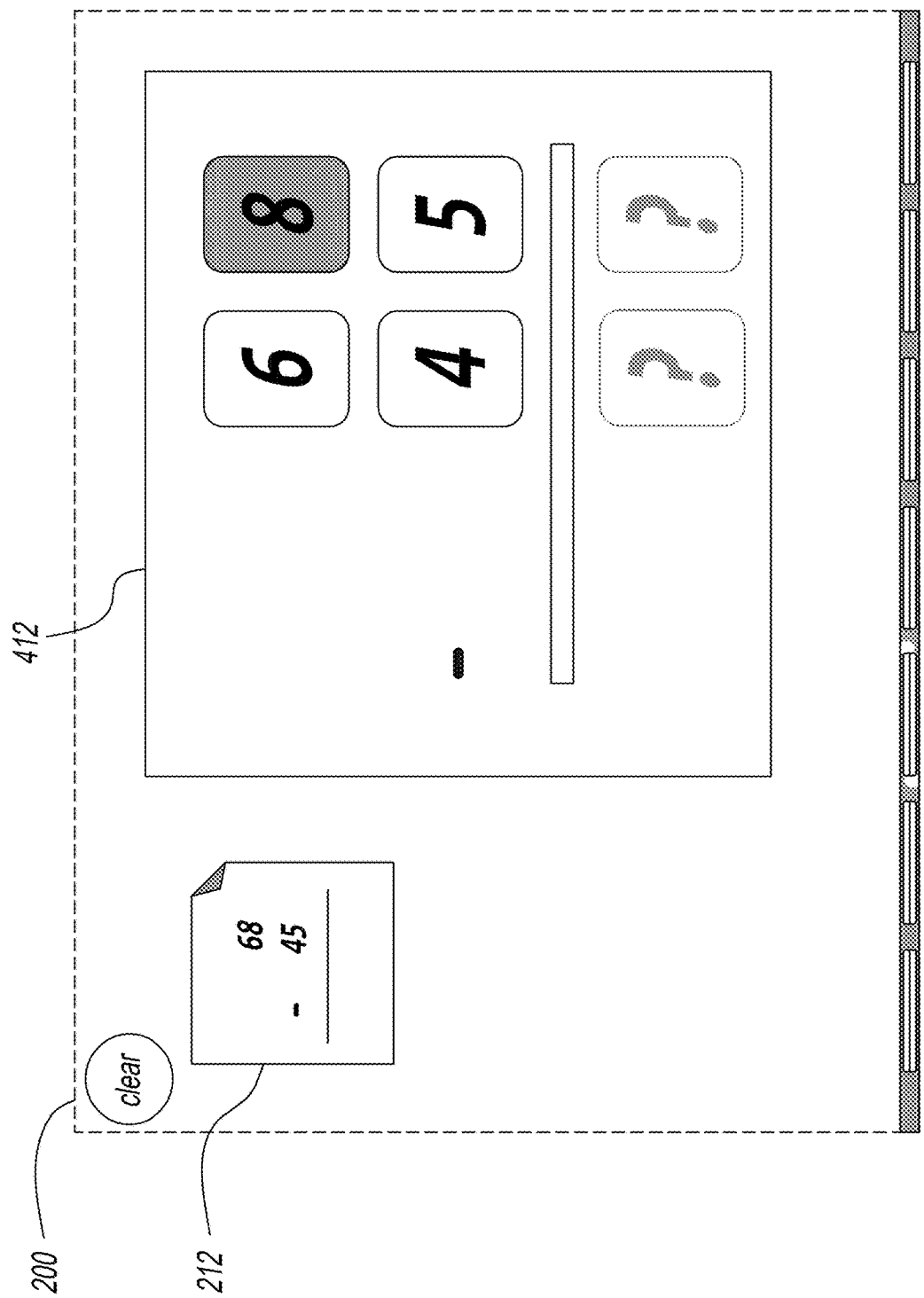
FIGS. 8a to 8j are successive GUIs for a touch drop subtraction of two digit cards.
Figure 8B:
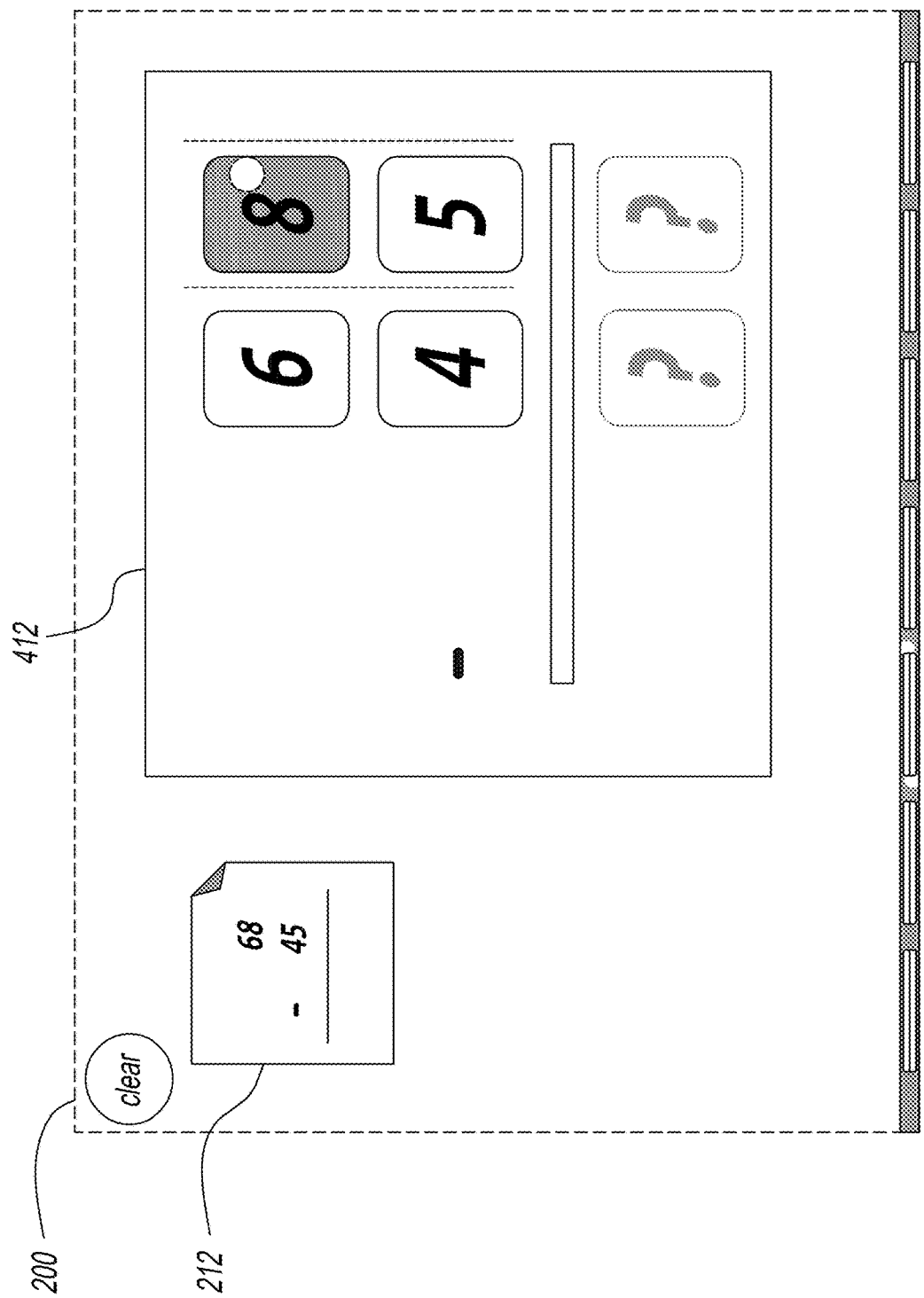
Figure 8C:
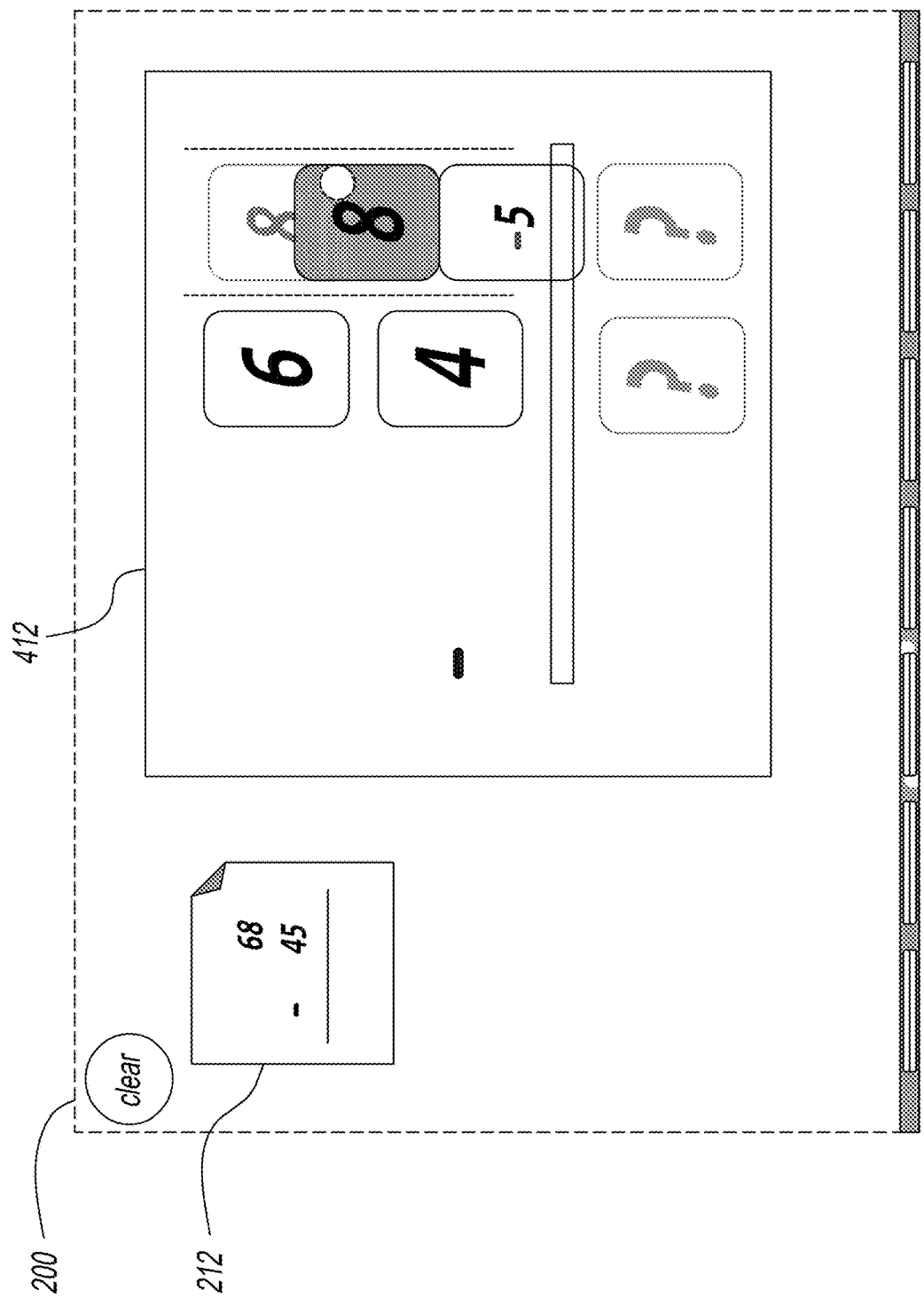
Figure 8D:
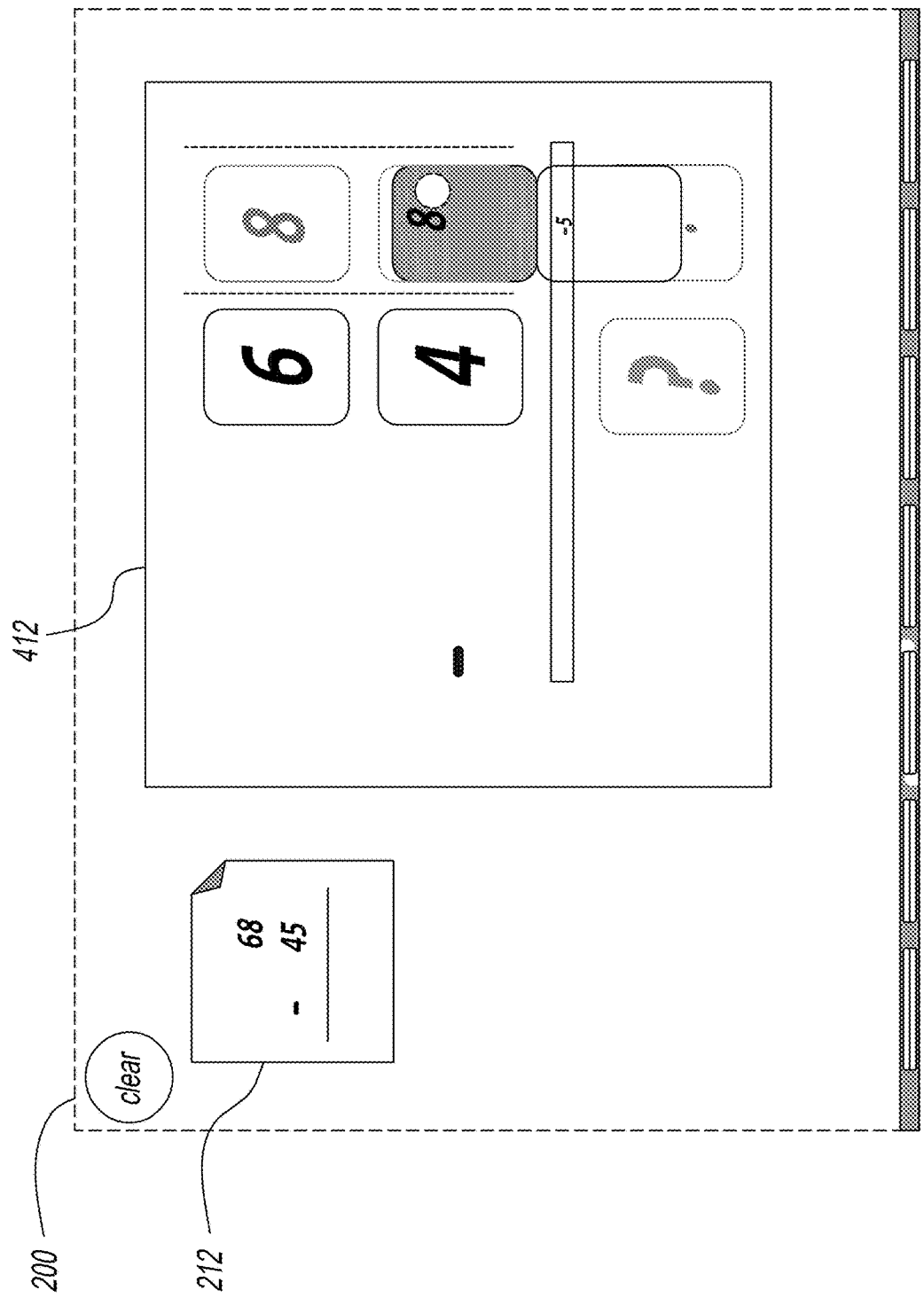
Figure 8E:
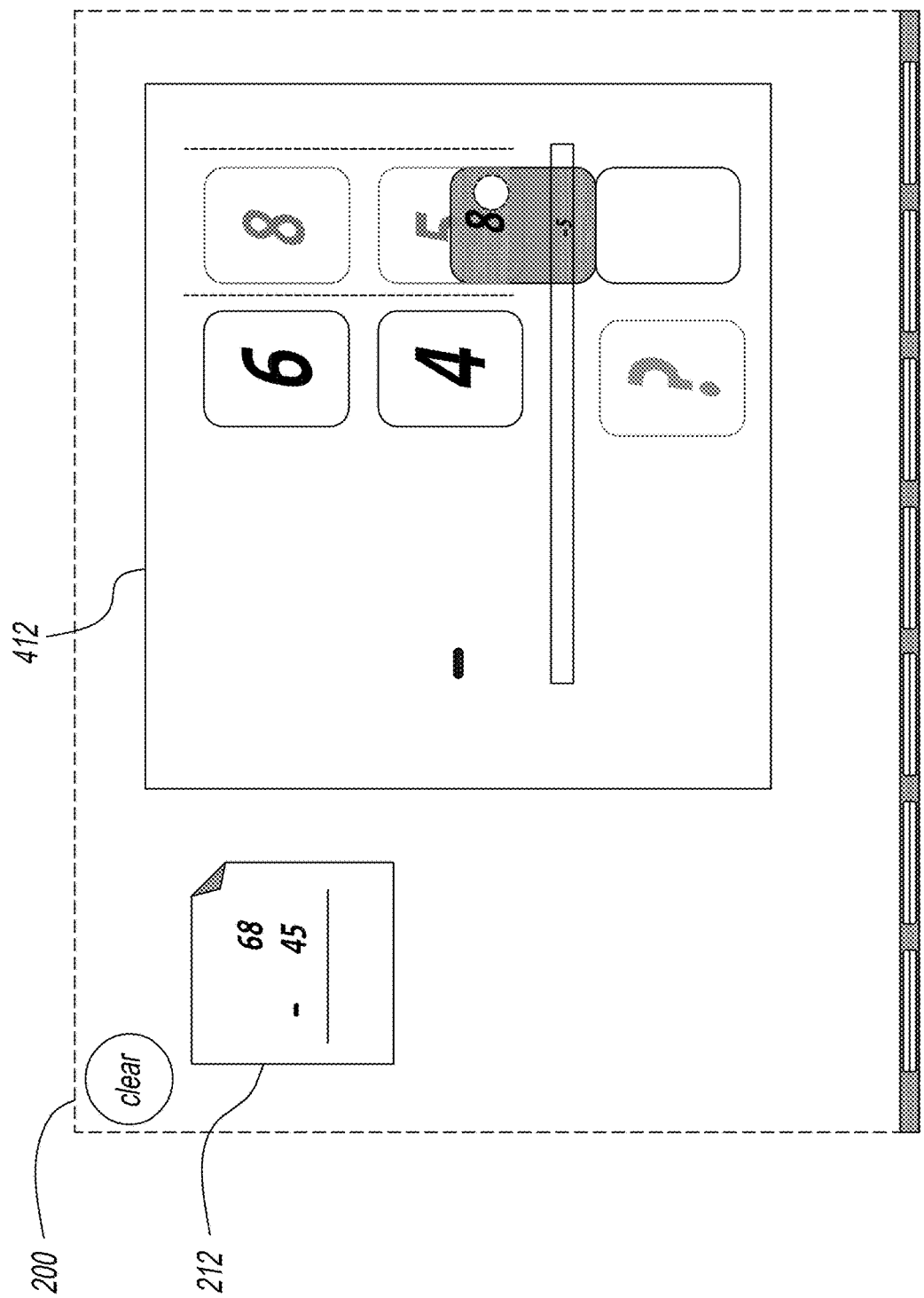
Figure 8F:
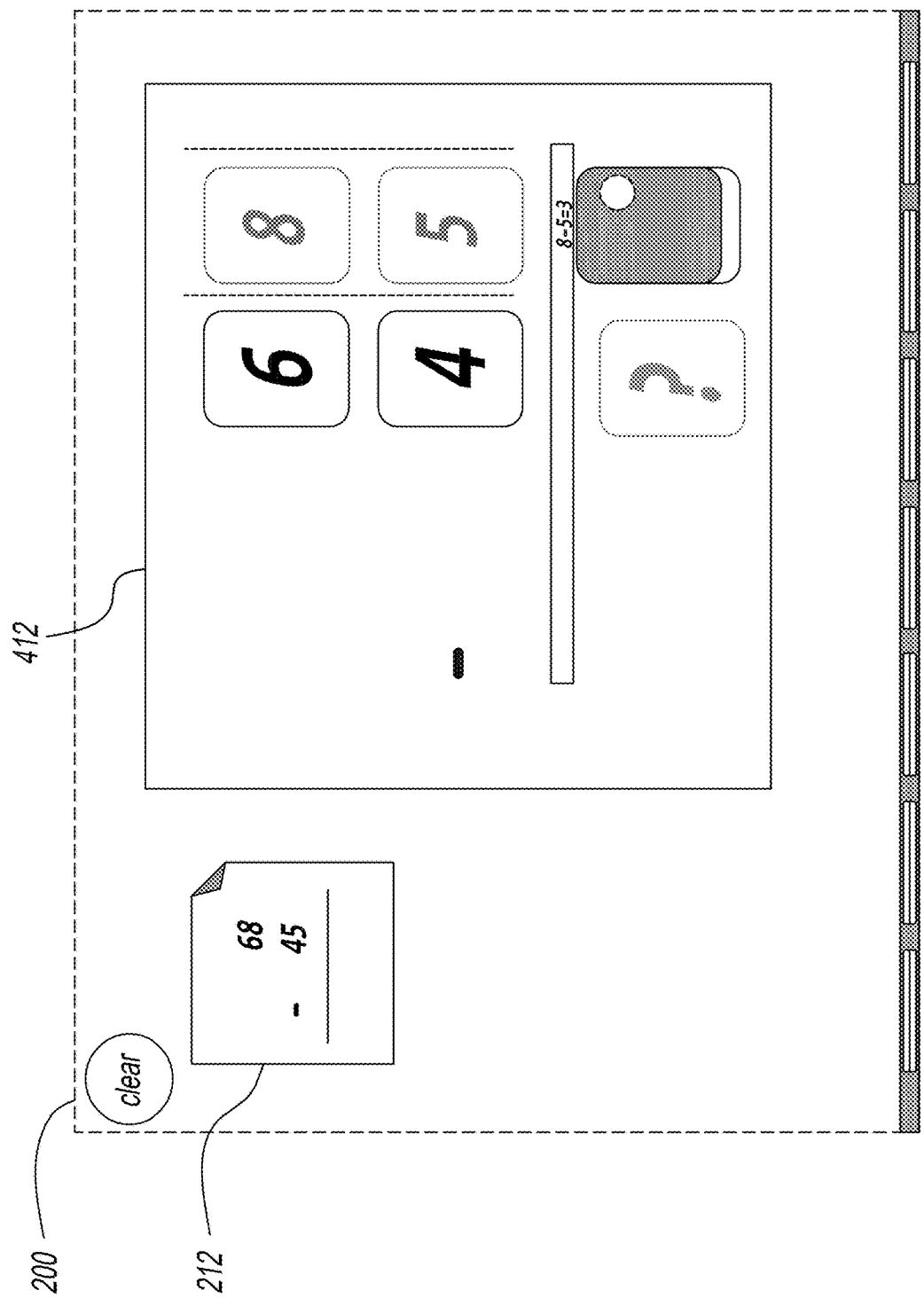
Figure 8G:
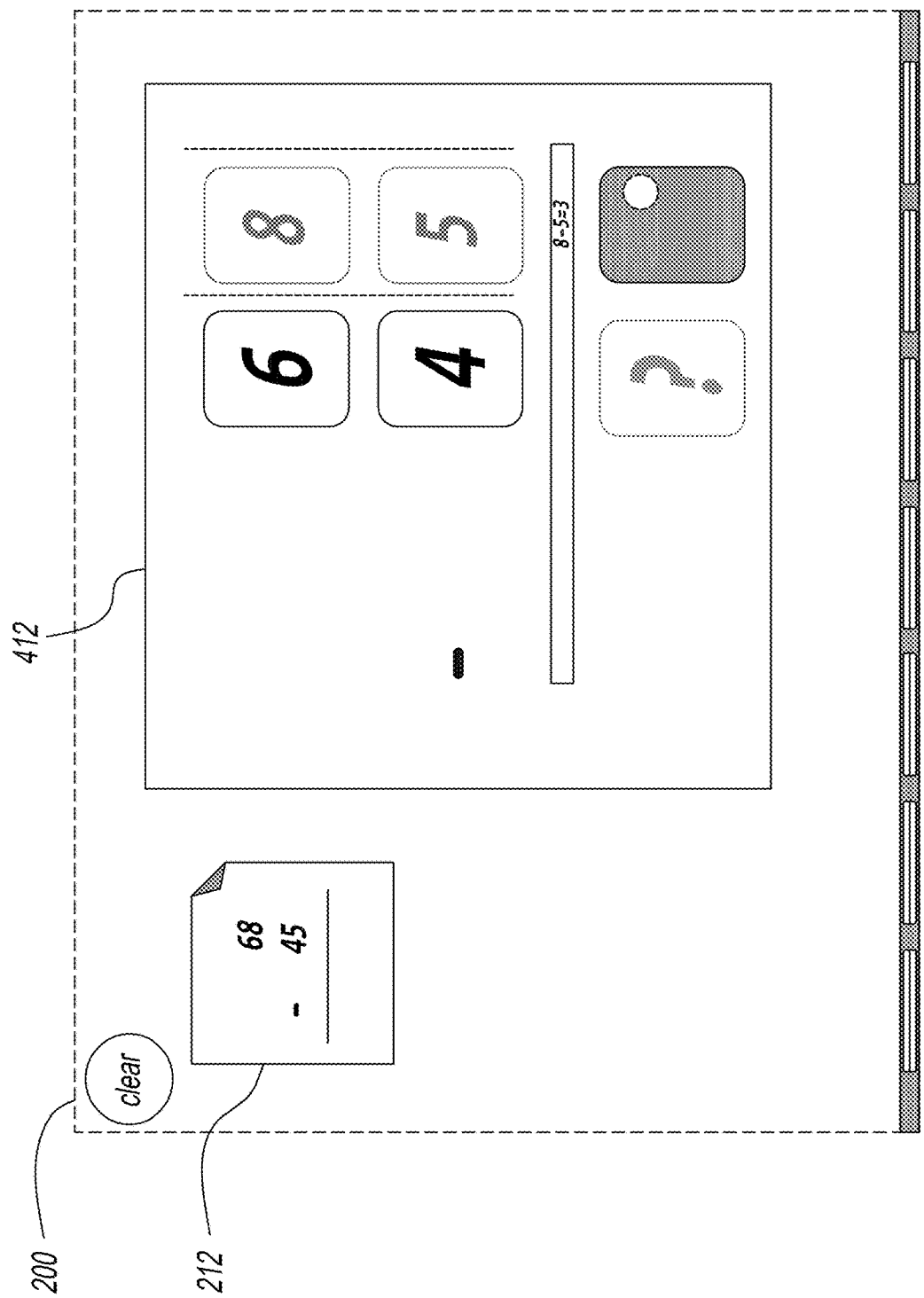
Figure 8H:
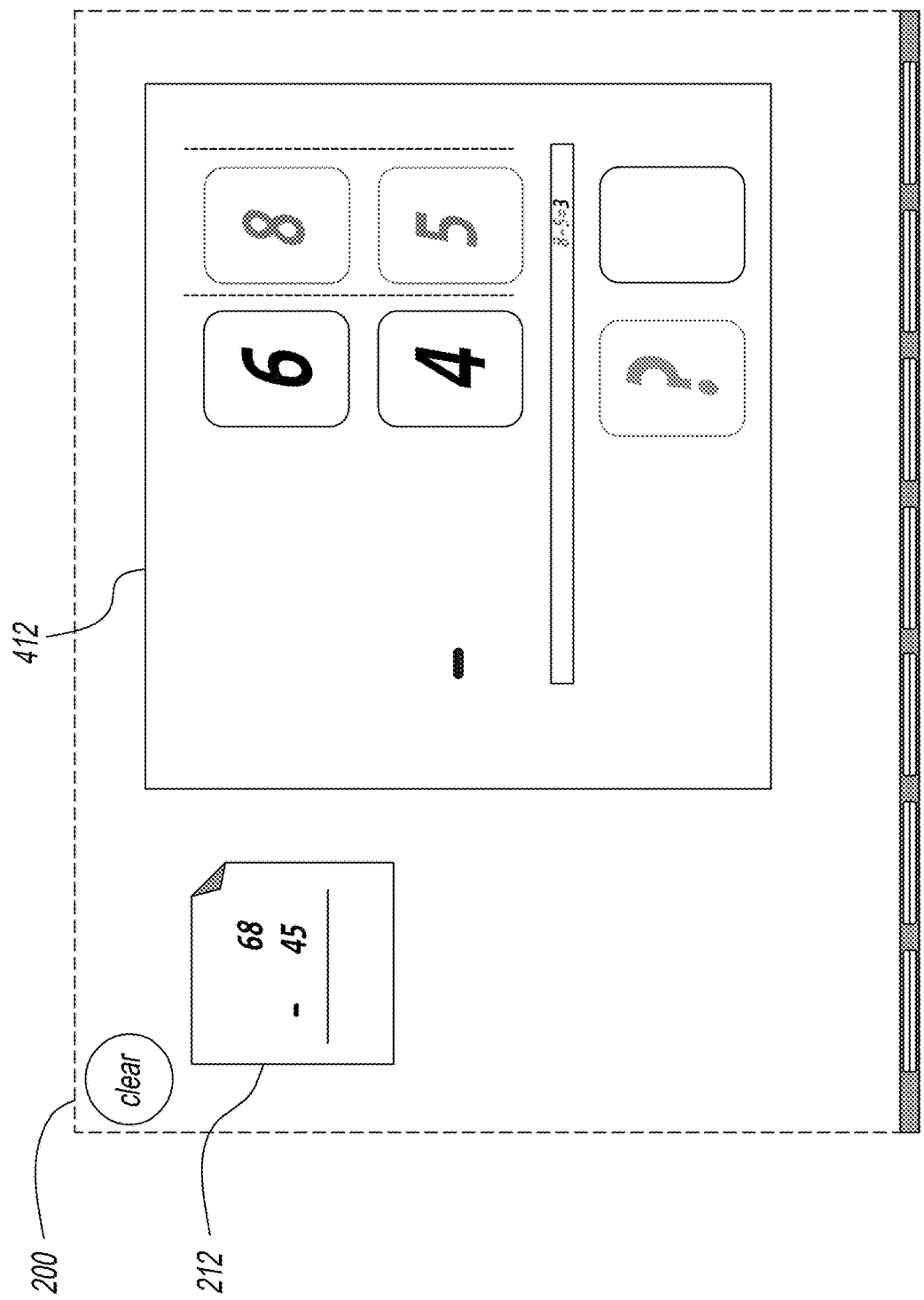
Figure 8I:
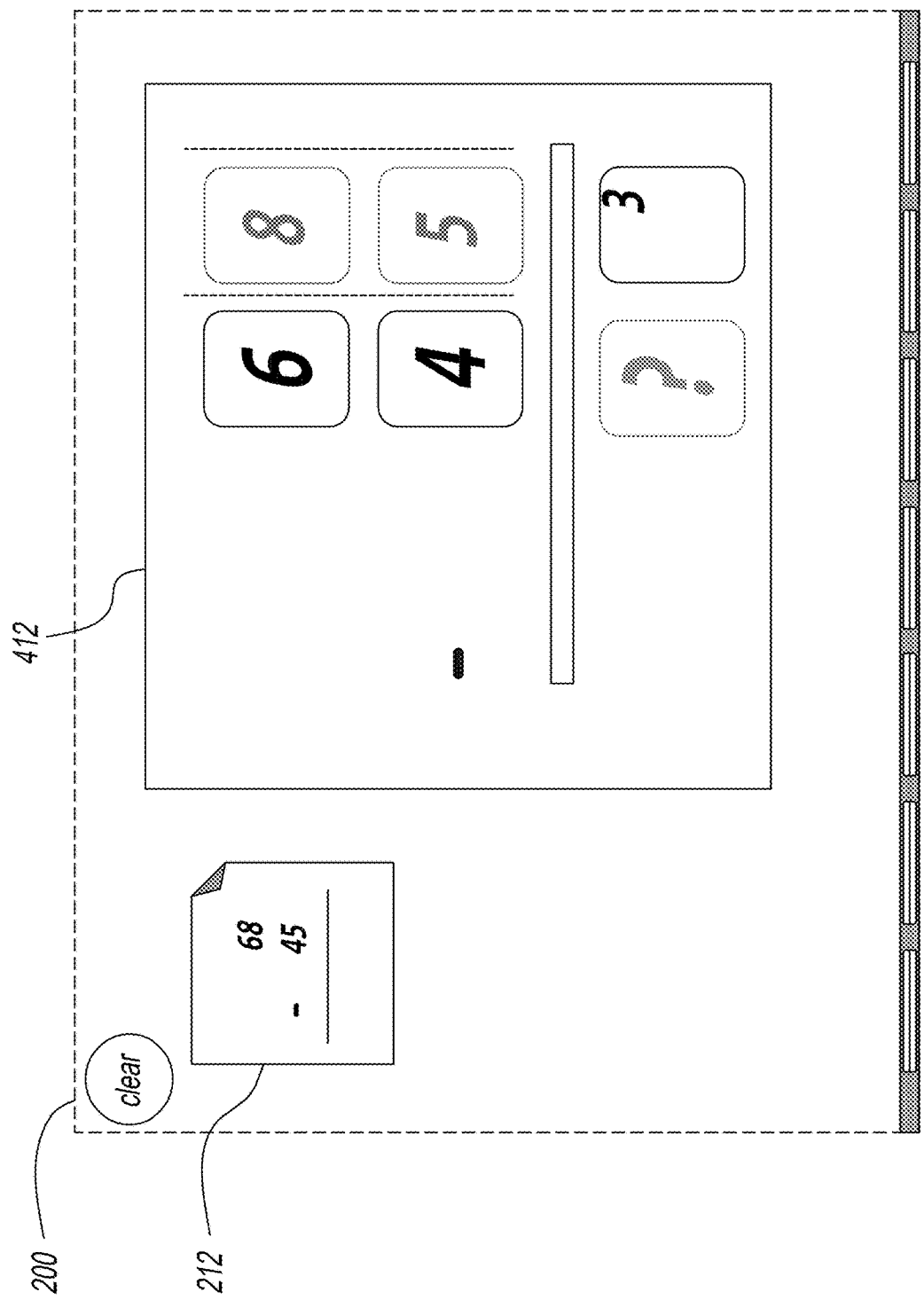
Figure 8J:
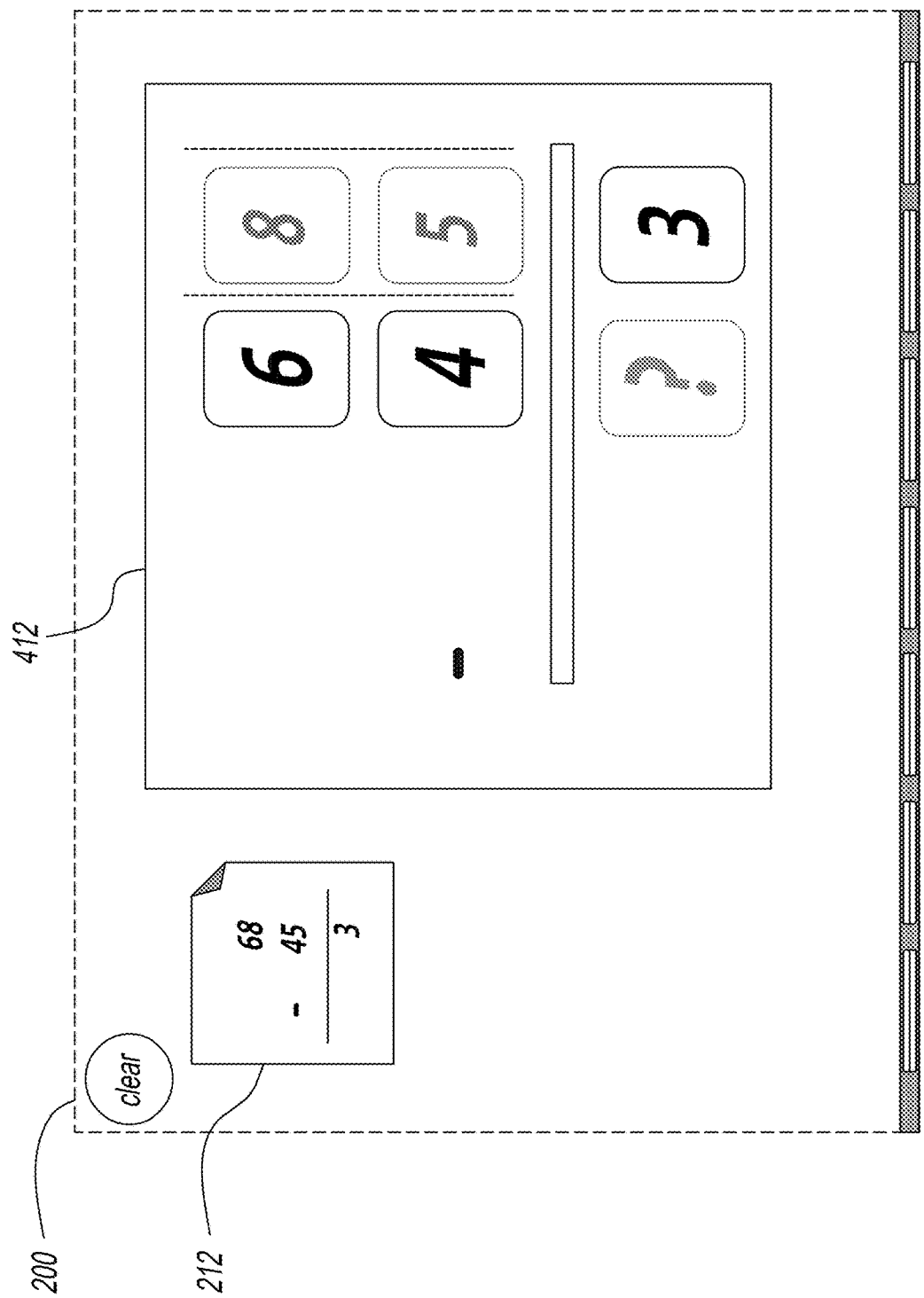

The final state of such an interaction is clearly illustrated in FIG. 6*g*. Now, the user may directly proceed with manipulating the next digits further to the left in the workspace in a like manner to how the digits of the right most column were manipulated. In such cases as where a column contains more than two digit cards due to a carry card moving automatically to the top of a column, the top most digit card (e.g. the carry card from a prior column) may be presented as a touch target, and all digit cards in the column would subsequently collect in the holding area at the bottom in a like manner to the case with only two digit cards, which was described already. For sake of clarity, FIGS. 7*a*-7*i* illustrate this kind of interaction.

Referring again to FIGS. 6*a* to 6*g*, the carry operation may be generically described as follows:

The calculator comprises a permanent digital memory which comprises digital instructions to cause the digital processor of the calculator to execute the steps of:
  a) when said operator is an addition operator (item 426 FIG. 6*a*), determine if the derived value (item 601) is a two digit number wherein said two digit number comprises a tens digit (item 603) and a ones digit (item 605); and
  b) when said derived value is a two digit number, execute the steps of:
    i) activate a carry area 610 in said workspace area 412;
    ii) receive from said user a selection (item 607 FIG. 6*b*) of said carry area 610;
    iii) receive from said user a gesture 609 to the left;
    iv) display a carry card (item 608 FIG. 6*c*) to the left of said derived value card 602 wherein said carry card has a left edge 611, a right edge 613, a top edge 615, a bottom edge 617, a width 619, and a height 621 and wherein said width of said carry card is variable; and v) in response to said gesture to the left, execute the steps of:
1) increase said width of said carry card;
2) shift to the left 614 all higher order digit cards in said first 623 and second 625 numbers that are in their original positions and are to the left of the selected column 627 above the derived value card 602 such that said shifting to the left of said higher order digit cards forms a vertical passage 616 to the left of said selected column;
3) shift said tens digit 603 in said derived value to the left such that said tens digit is aligned with said vertical passage; and
4) halt said shift of said higher order digit cards when said width of said carry card equals a first desired carry card width (item 629, FIG. 6*d*); and
vi) after said width of said carry card equals said first desired carry card width, execute the steps of:
1) move said carry card vertically 618 through said vertical passage 616 to a row (item 631 FIG. 6*f*) above said digit cards 623 of said first number in the arithmetic problem being solved;
2) display said tens digit 603 of said derived value in said carry card 608; and
3) shift 633 said higher order digit cards back to said original positions (item 635 FIG. 6*g*).

Subtraction

The interactions described thus far have related to the case where the user has input integer values that should be added. An alternative embodiment of the present invention also gives support for the case of calculating differences. We proceed now with disclosures relating specifically to handling of input that should be differenced.

As much as possible, the GUI will handle the case of subtraction in a like manner to the case of addition. So long as every digit of the subtrahend is equal to or smaller than the corresponding digit of the minuend, the interaction protocol for addition can be used also for supporting subtraction. FIGS. 8*a* to 8*j* illustrate an interaction for this case of subtrahend digits not exceeding minuend digits. These figures correspond with FIGS. 5*a*-5*i*.

Borrowing

On the other hand, additional innovations are needed to handle the case where a digit of the subtrahend does exceed the corresponding digit of the minuend. We refer to this circumstance as "insufficiency". An alternative embodiment of the present invention handles insufficiency by presenting a new graphic object that we shall hereafter refer to as the "borrow arrow card". This graphic resembles the carry arrow card except for the fact that it is pointing to the right instead of to the left. The borrow arrow card is presented above the next non-zero digit in the minuend, where next is understood to mean "next in the leftward direction". The borrow arrow card helps facilitate an interaction that corresponds to a step that is known as "regrouping" or "borrowing" in the standard algorithm for paper based subtraction.

FIGS. 9*a*-9*g* illustrate an interaction that constitutes an appropriate handling of an insufficiency circumstance. The interaction is initiated by touching the borrow arrow card (item 902, FIG. 9*a*). Alternatively, the interaction could be initiated by touching a borrow area 910. The allowed interaction is a horizontally constrained touch drop interaction with movement permitted only in the rightward direction. This gesture will facilitate the transformation of digits or pseudodigits into two parts, the first part being a decremented minuend value and the second part being a digit of value 1, which moves automatically to the next vertical column to the right where it is transformed into a numeric value of 10 and combined additively with digits or derived values already present in this region of the workspace.

More specifically, as soon as the user touches (item 904 FIG. 9*b*) the borrow arrow card, the digit just below the borrow arrow card will be replaced by a pair of values, the first of which (item 906) is a decremented digit and second of which (item 908) is a "+1".

Figure 9A:
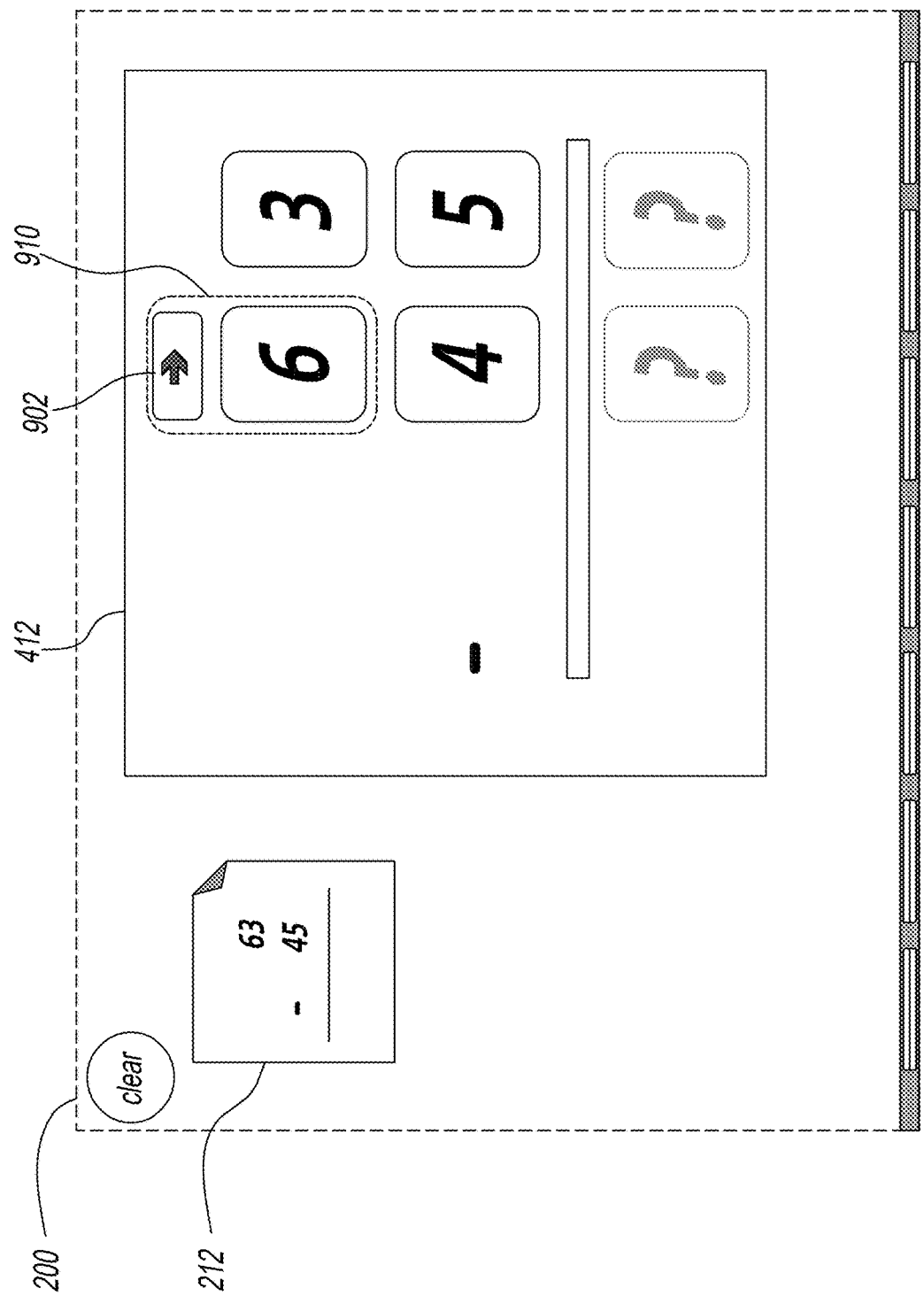
FIGS. 9a to 9g are successive GUIs for a borrowing operation.
Figure 9B:
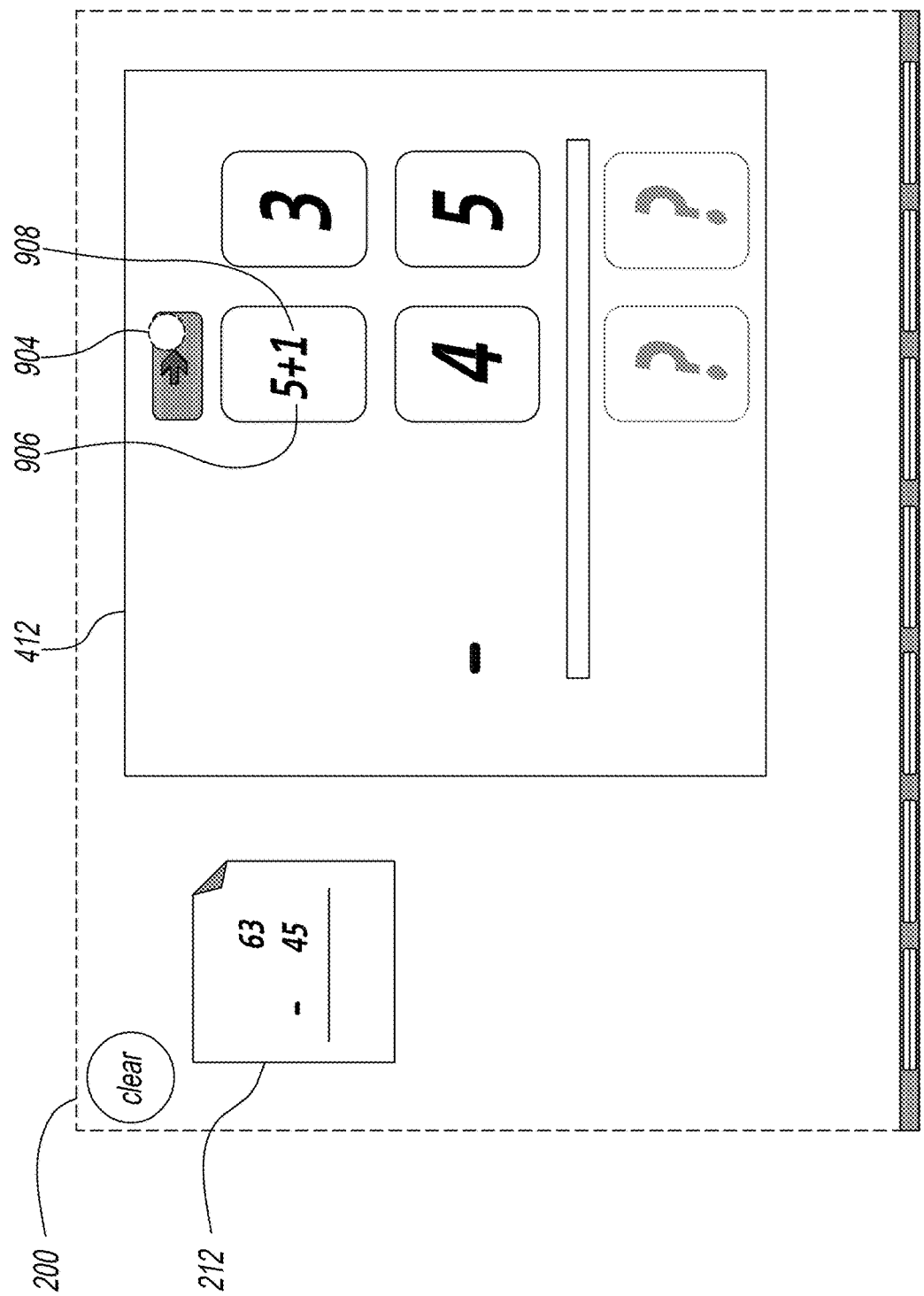
Figure 9C:
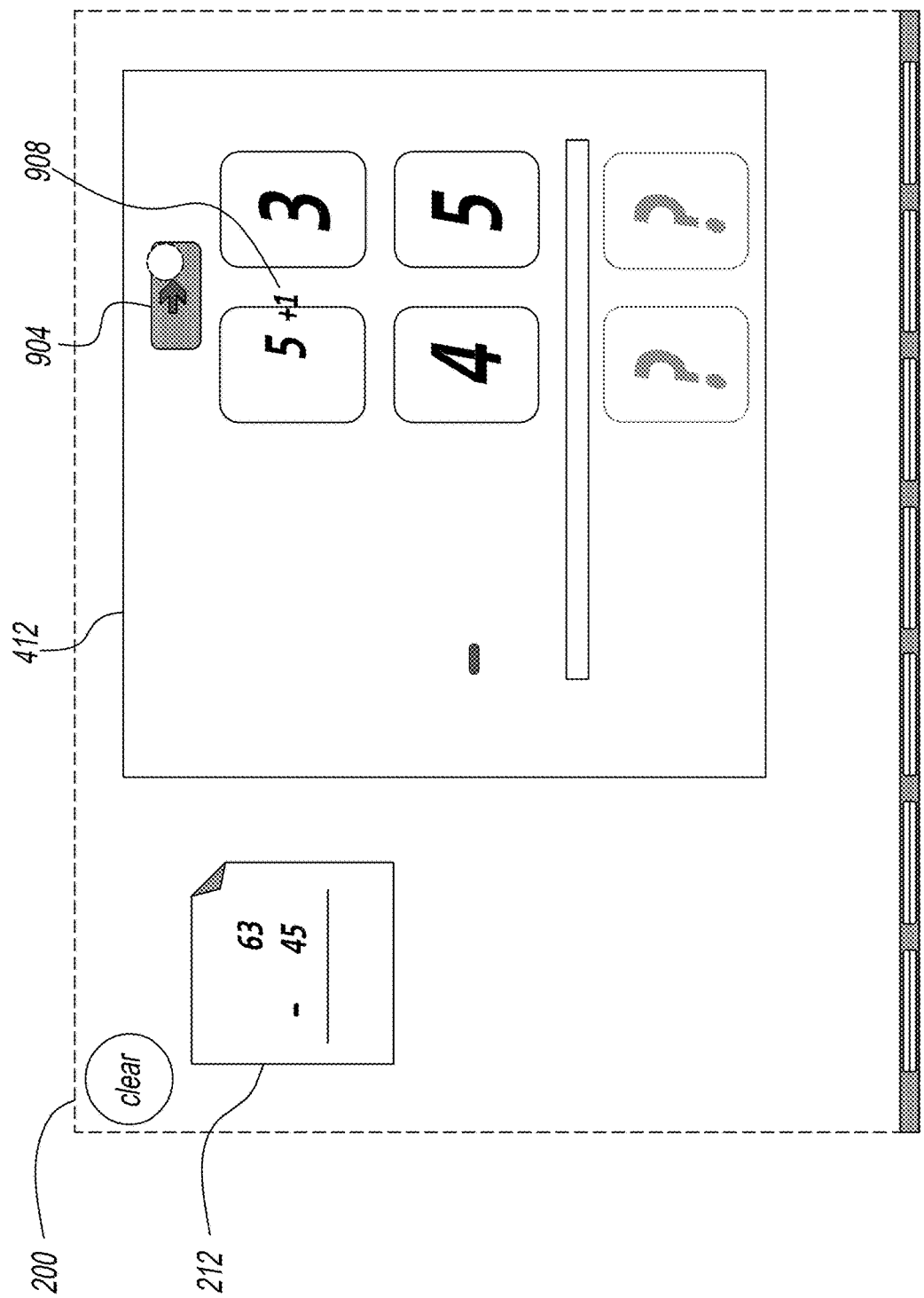
Figure 9D:
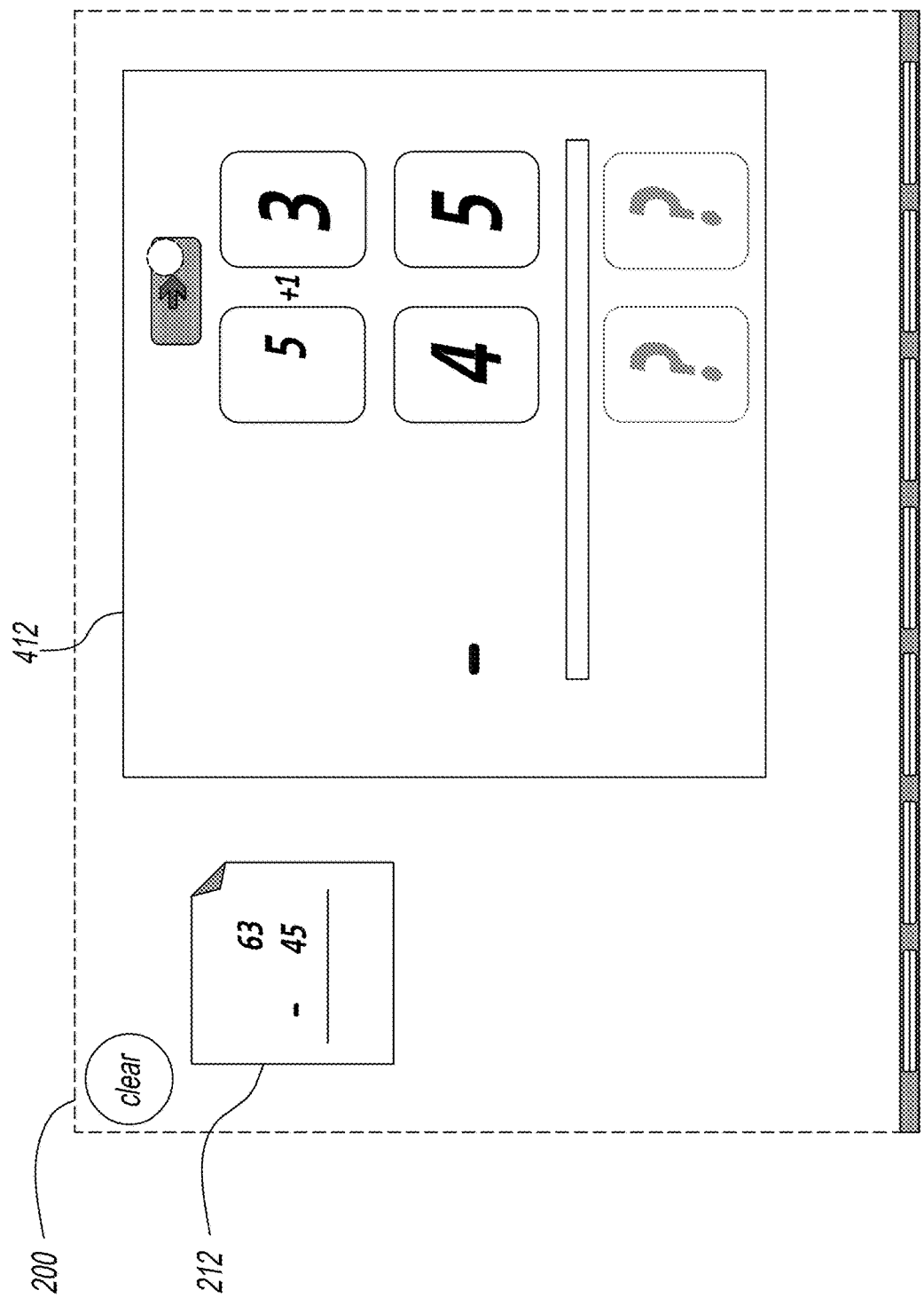
Figure 9E:
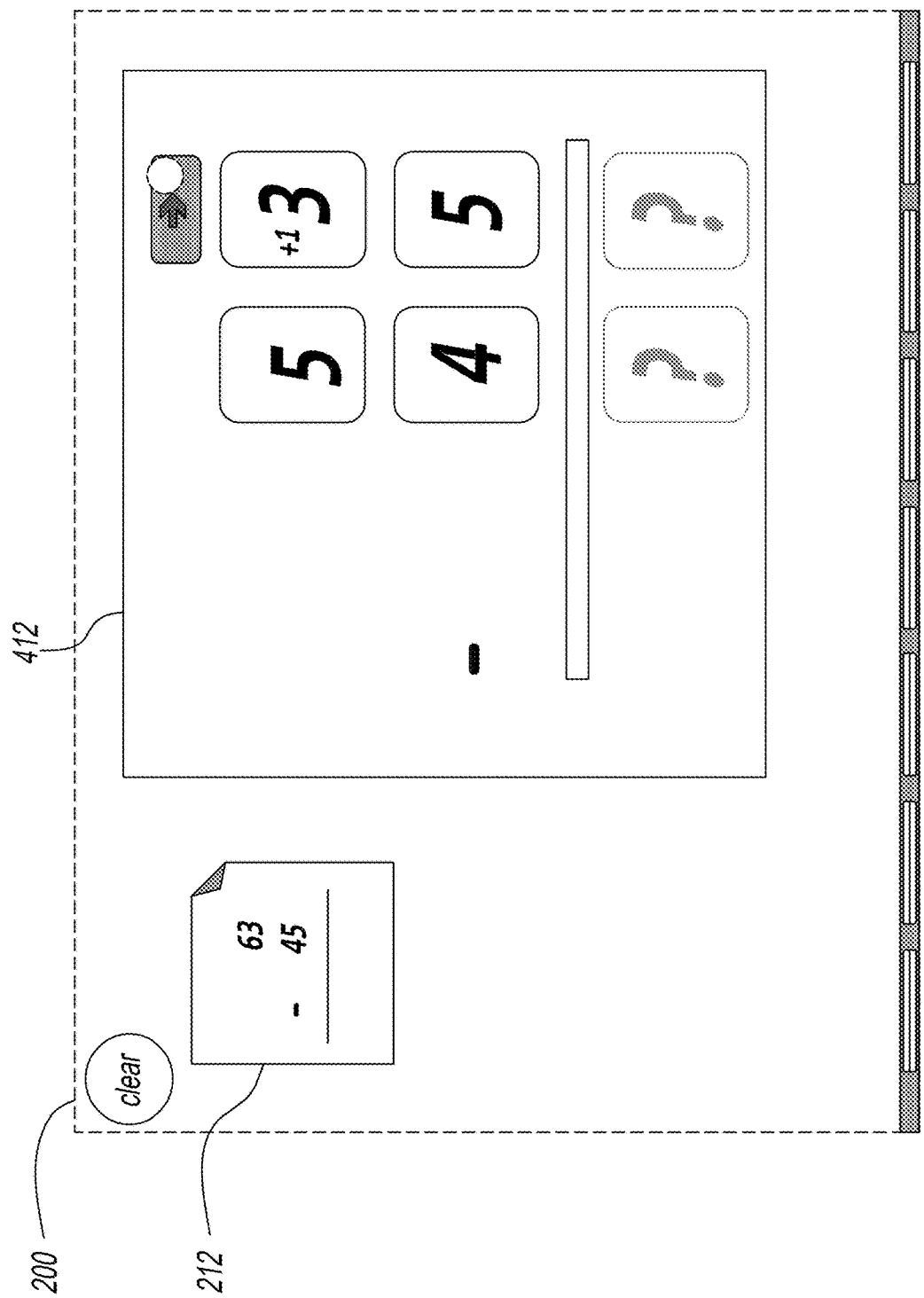
Figure 9F:
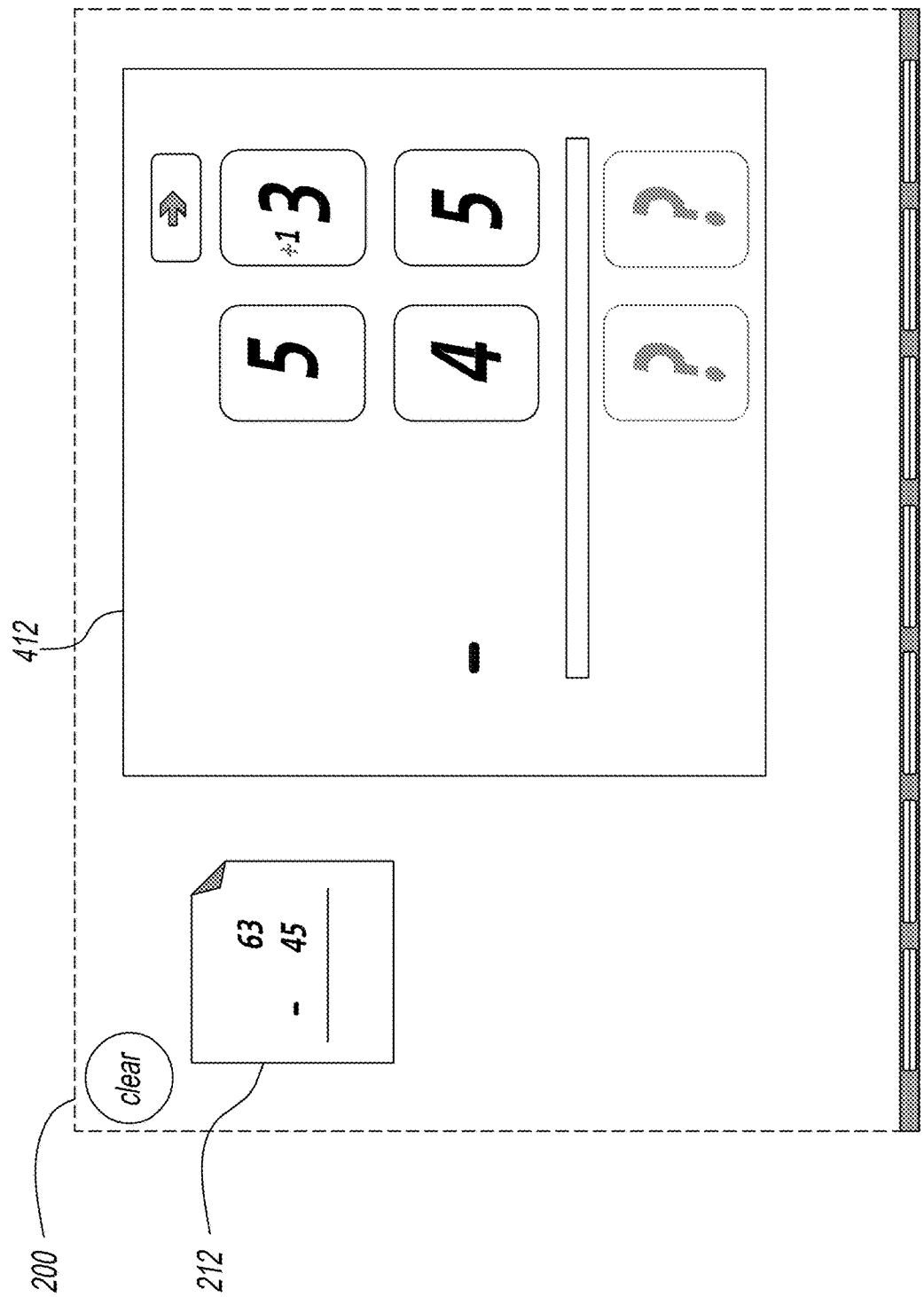

Referring to FIG. 9*c*, as the user continues moving the borrow arrow card 904 in the rightward direction, the "+1" (item 908) moves rightward as well. Both the borrow arrow card and "+1" move further rightward until they reach a position whereby further rightward movement would cause the "+1" to intrude on the space of the digit existing in the next column to the right (i.e. the "3" digit). At this point, further movement of the borrow arrow card is not permitted. When the user terminates his/her touch, the "+" portion of the "+1" fades out and the "1" remains, adjusting in size and position to more clearly present itself as a digit of a larger derived value or pseudodigit (e. g. "13"). This progression is illustrated in FIGS. 9*e* to 9*g*.

Figure 9G:
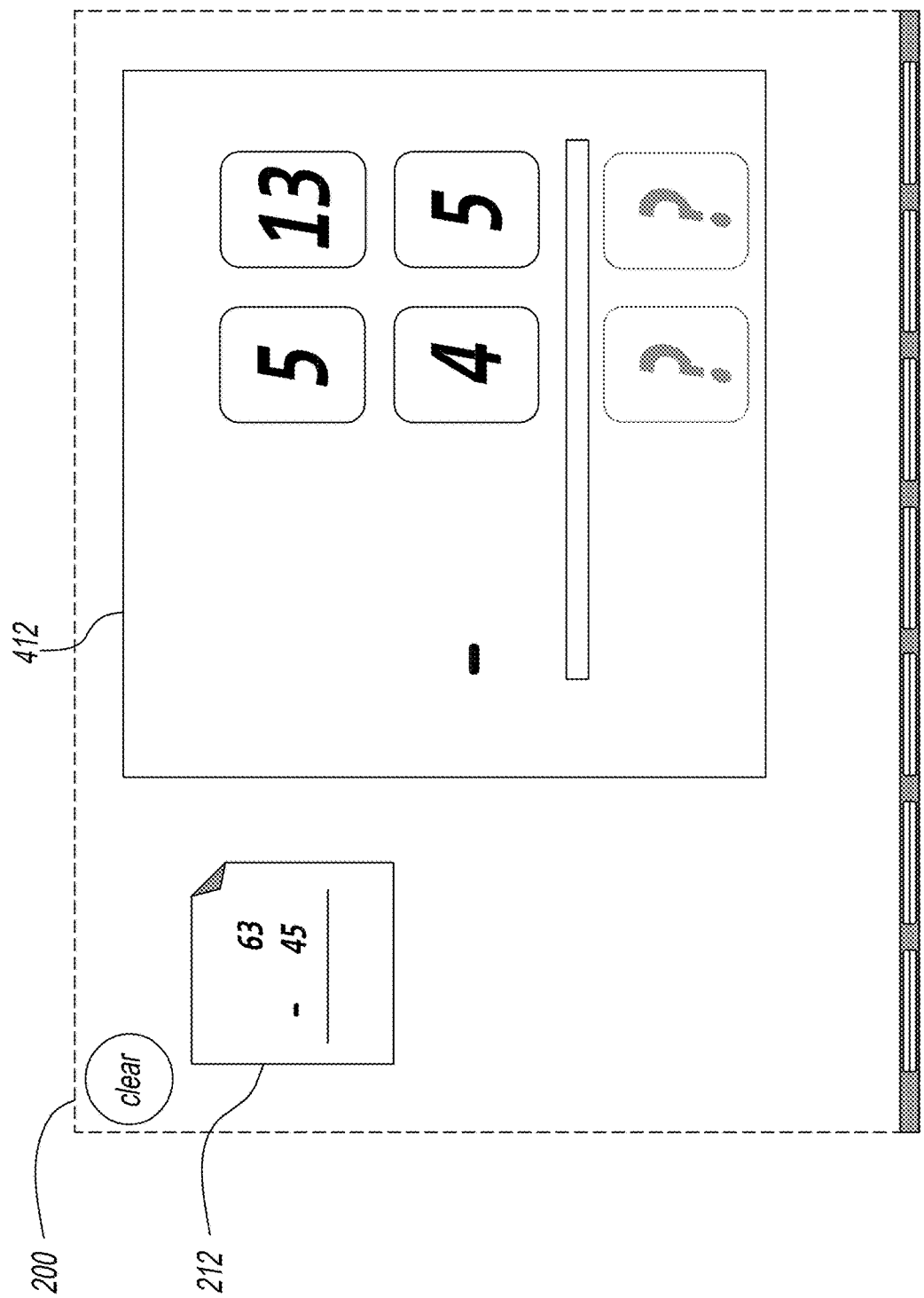

The final state of such an interaction is clearly illustrated in FIG. 9*g*. From this point, the user will usually proceed by initiating a vertically constrained touch drop interaction applied to the resulting pseudodigit. In some cases, additional interactions with a borrow arrow card may be necessary. In any case, the interactions already described are sufficient for supporting the user with his/her intended calculation, provided that the appropriate interaction is always supported at the appropriate time. The calculator may be configured so that there is no ambiguity about which interaction should be supported at which time. The calculator would then determine the next allowed interaction by reference to the "standard algorithm for hand calculating differences," with borrowing steps in the standard algorithm corresponding to interactions with a borrow arrow card and differencing steps corresponding to touch drop interactions with digit cards.

Alternative Embodiments

A first improvement is possible by providing programmatic support for "flick" gestures. "Flick" refers to an interaction whereby the user begins moving a dragable in a given direction and then releases the dragable and the dragable continues moving after release until it reaches the final position permissible in this direction. The flick allows users to more or less throw a dragable in a given direction and trust that it will automatically move to the farthest allowed position in that direction. In the interactions described above, we do have a clear and unique final position for the repositioned graphic objects. This affords us the possibility to give support for flick interactions where we already have support for touch drop interactions.

Figure 10:
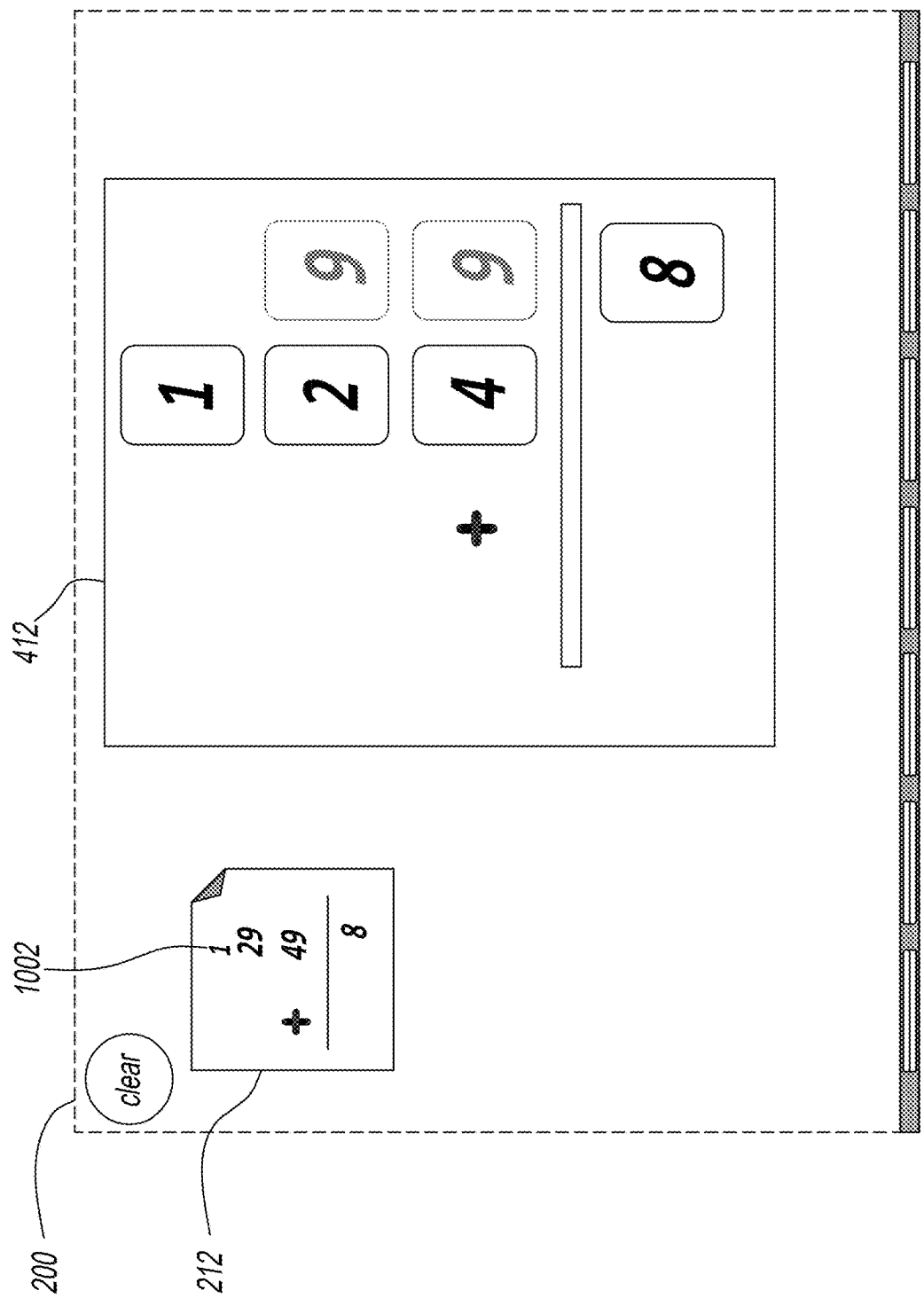
FIG. 10 is a GUI showing updating of a display area.
Figure 11:
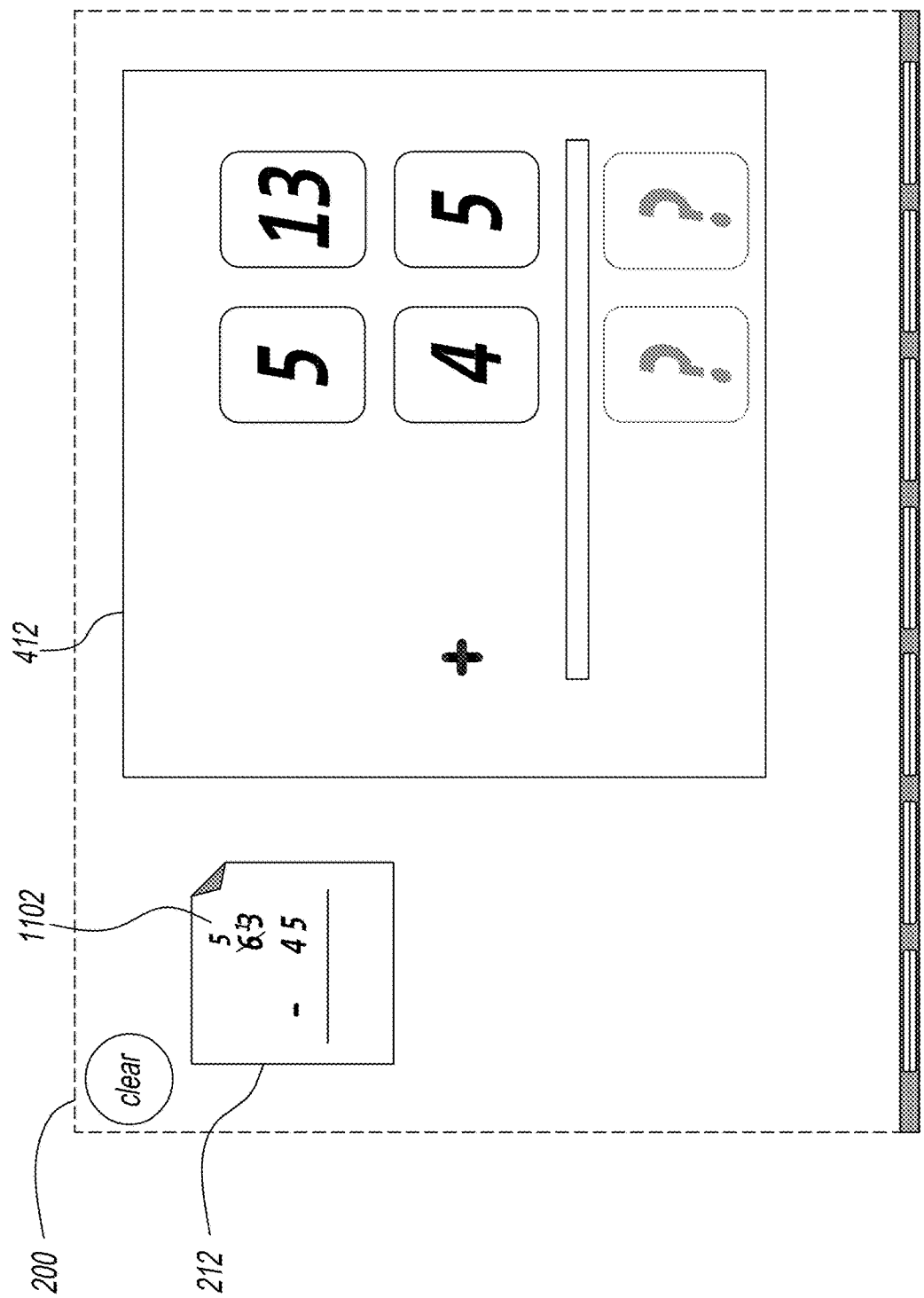
FIG. 11 is a GUI showing updating of a display area after borrowing in a subtraction problem.

Referring to FIGS. 10 and 11, a second improvement is possible by utilizing the display area 212 to the left of the workspace area 412 to illustrate subsequent steps of a hand-calculation in correspondence to the progress the user makes in the workspace area. Item 1002 in FIG. 10 illustrates this possibility for a sum. It shows the 1 being carried to the tens column. Item 1102 in FIGS. 11 illustrates this possibility for a difference. It shows 10 being borrowed from the tens column to the ones column.

Figure 12:
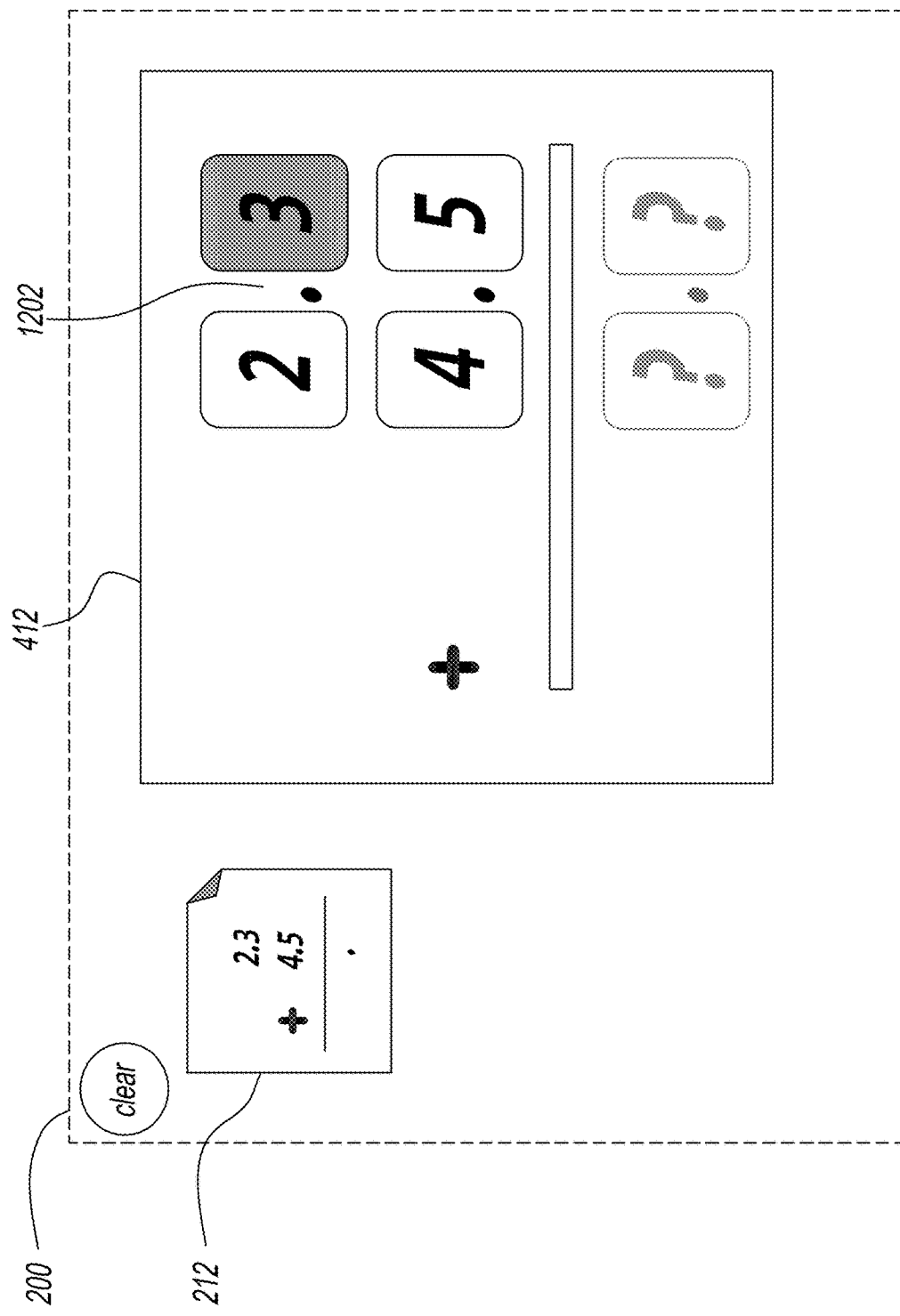
FIG. 12 is a GUI showing decimal numbers in an arithmetic problem.

Referring to FIG. 12, a third improvement is possible by providing support for the cases where a user has entered decimal numbers rather than integers. In the simplest such case, these decimal numbers will have a like number of digits after the decimal place. In such case, the GUI 200 can provide interaction alternatives to the user exactly as if no decimal had been entered at all. The only necessary change is for the GUI to present an additional graphic object 1202, 1204 to indicate the position of the decimal in each row of the workspace as well as in each row presented in the paper.

In case decimal numbers entered by the user do not have a like number of digits after the decimal point, the GUI can append zeros to whichever value has fewer digits after the decimal point until both decimal numbers do indeed have the same number of digits after their decimal point. At this point, the GUI can provide interaction alternatives exactly as if the number had been entered from the beginning with these additional zeros, which is a case already addressed.

A fourth improvement is for the app to support interactions from alternative inputs besides touch screen actions. Any computer pointing device such as a computer mouse or touch pad will deliver input to the app that can be processed exactly as if it had come from a touch screen. Therefore these alternative input possibilities can and should be supported as well.

A fifth improvement is for the app to support oversized touch drop activation zones and undersized or even invisible arrow cards. The touch drop activation zone is the region of the display that provides for the initiation of a touch drop interaction. The carry area 610 described above with reference FIG. 6b is an example of a touch drop activation zone. In the example of FIG. 6b, the carry area was the same as the carry arrow card. The carry area could alternatively include the derived value card 602 of FIG. 6b. The carry area could alternatively include graphic objects displayed on a carry card and overflow said carry card. Examples of said graphic objects are described in more detail below with reference to "bead tokens".

Normally, the touch activation zone for a graphic object is confined to the region of the display that coincides with the screen space of the graphic object. But modifying the activation zone to be larger can help provide a better experience in case the user accidentally initiates a touch drop interaction slightly outside the appropriate activation zone. Oversized touch drop activation zones are especially helpful when applied to the graphic objects of the "carry arrow card" and the "borrow arrow card". It has been observed during testing that users sometimes initiate an action on the carry arrow card by touching the screen somewhere above the carry arrow but still inside the digit card directly above it. Therefore, a helpful improvement is to expand the activation zone of the carry arrow card to include the entirety of the digit card directly above it. Likewise, it is a helpful improvement of the invention to expand the touch activation zone of the borrow arrow card to include the entirety of the digit card displayed just below it. An example termed a "borrow area" 910 is shown in FIG. 9a. When the borrow area is item 910, then the borrow action will commence if the user touches any portion of said borrow area. This modification to the design greatly enhances the usability of the GUI for children. It also provides for the possibility that carry arrow cards as well as borrow arrow cards optionally may present themselves in a rather small size without degrading the usability of the GUI. It is even an option that the arrows be presented in such a small size that they are not visible at all. Yet the touch activation zone for each such invisible arrow card still includes the region of the display occupied by the nearest digit card, and thus affords for a still fully functional GUI.

As stated previously, the embodiments described thus far disallow touch interactions that do not proceed in an order that corresponds to the steps of the standard algorithm for handwritten calculation of sums and differences. Among other things, this implies that digit manipulation should start on the right most column and proceed column by column to the left, except in the case of insufficiency whereby insufficiency circumstances are resolved as they arise. This restriction is enforced when the goal of the calculator is to help children become more familiar with the standard algorithm.

Under some circumstances it may actually be beneficial to disable these restrictions so that the GUI 200 may function in a less restrictive mode. For example, the GUI could enable touch drop interactions to commence from any digit card in the top row, thus allowing for the hundreds digits to be added first, followed by the tens digits followed by the ones digits, in contradiction to the ordering prescribed by the standard hand calculation algorithm, which dictates that ones digits should be added prior to tens digits, which must be added prior to hundreds digits.

Figure 13:
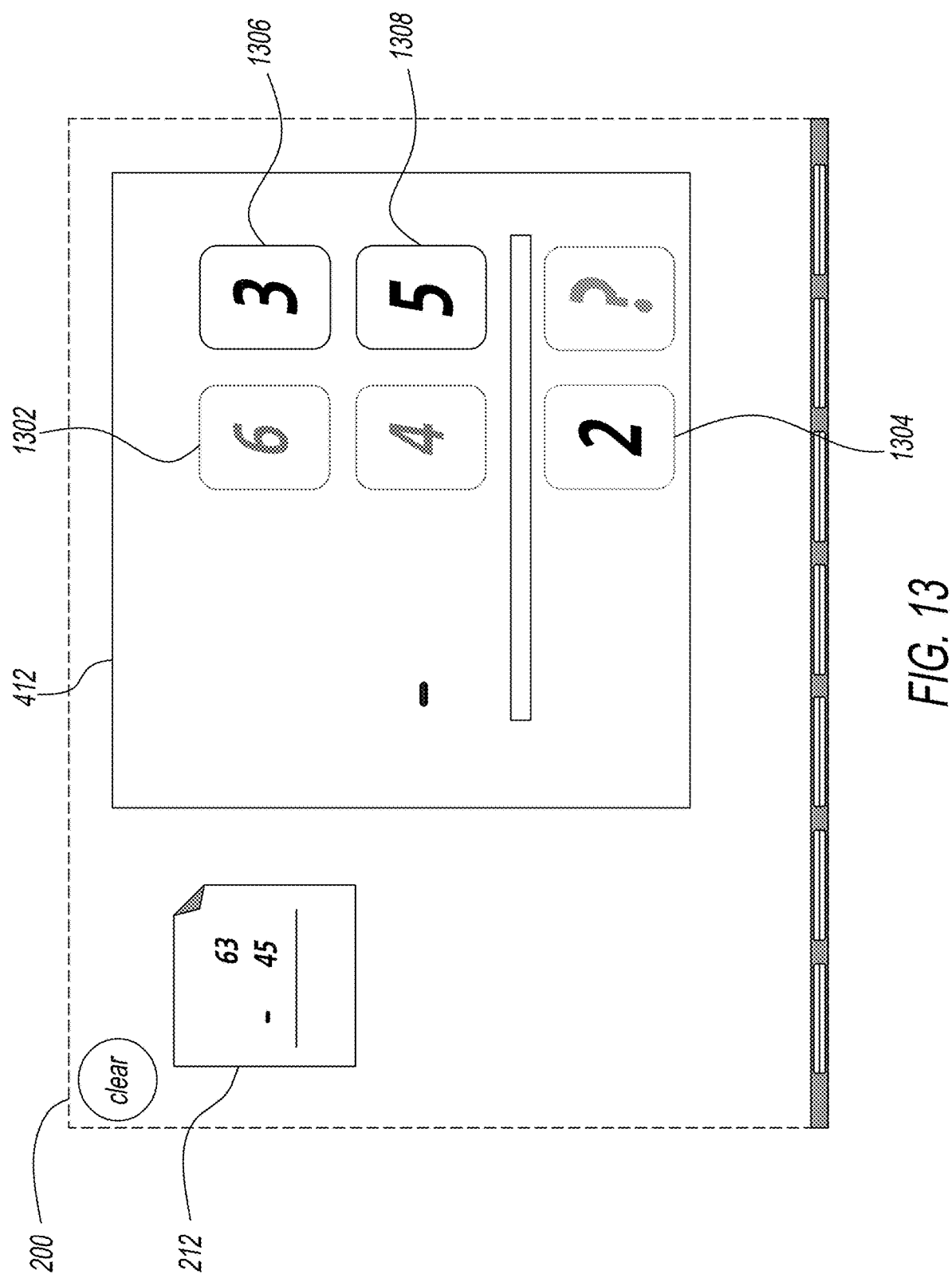
FIG. 13 is a GUI of a dead end in a subtraction problem.

A possible consequence of this relaxation of interaction restrictions is that users might transform the workspace into such a state as to render impossible any further progress toward completion of the specified calculation. An example of such an outcome appears in FIG. 13. The user has already performed a vertically constrained touch drop interaction 1302 which has resulted in a tens digit in the holding area 1304, representing the difference of "6" and "4". The completed touch drop interaction has caused the workspace to become unusable because the ones digits (items 1306 and 1308) cannot be directly manipulated due to an insufficiency circumstance and the insufficiency circumstance cannot be addressed because there are no longer minuend digits remaining in the next column to provide support for a borrow arrow interaction. If the goal of the calculator were completely limited to assisting with calculations, then this outcome would clearly be undesirable. However, a secondary goal of the calculator is to support the education of children with regard to arithmetic, and the unusable workspace may in fact provide a very helpful learning experience to children who are still trying to understand the mechanics of arithmetic. For this reason, alternative embodiments of the invention that relax the interaction restriction should be regarded as worthwhile embodiments under some circumstances. They can be programmed in a similar manner as the more restrictive embodiment, except for the fact that they should accept interaction with a larger multitude of touch targets (e.g. digit cards and arrow cards).

By integrating all these display techniques and gestures, an environment can thus be provided that facilitates calculation of sums and differences in a manner that is distinctly easier than hand-calculation, while still being recognizably similar to hand calculation. The presented invention therefore facilitates the education of children in hand calculation skills while enabling them to face higher academic challenges prior to their mastering those arithmetic skills.

Bead Tokens

FIGS. 14a to 25h illustrate an embodiment of the calculator that incorporates bead tokens into the digit cards. Bead tokens are icons that represent a number using both explicit and implicit beads. An explicit bead is a bead visible on a screen. An implicit bead is a bead that the user will perceive as being hidden by beads in front of it. If one bead token with 100 beads in a square array, for example, overlaps another bead token comprising 100 beads in a square array, then the user will see at least a portion of the overlapped bead token and perceive that the other beads on the overlapped bead token "are still there". By overlapping bead tokens, an apparent presentation of a very large number of beads can be made on a screen without actually having to render all of the beads. The embodiments presented herein will show how an apparent cube of one million beads can be presented on a touch screen with a resolution at least 300 pixels by 300 pixels. Individual beads on the face of the cube will be discernable by a user.

The bead tokens will be presented on digit cards. The number of apparent beads in a bead token will equal the place value of the digit card. A bead token on a tens digit card, for example, will have ten beads. The number of bead tokens on a card will equal the digit or pseudodigit on the card. A tens digit card with digit "3" on it will have 3 tens bead tokens on it as well. Digits and pseudodigits on a digit card may be placed on a top digit area of the digit card. Bead tokens may be placed on a bottom token area of a digit card.

Bead tokens on a carry card may be transformed as the carry card moves from a selected column to the next left column. If there are initially ten units beads in a horizontal row on a carry card in the units column, for example, the bead tokens will be shifted to the left with the carry card and will also move vertically up and/or down until they partially overlap and form a vertical line of 10 beads. The vertical line of 10 overlapping beads will be 1 tens bead token.

When bead tokens are displayed, each bead token may be a separate graphic file. When bead tokens are overlapped, the graphic files of the bead token may be rendered in an overlap order with an offset. As used herein, overlapping "to the left" means that the leftmost bead token is rendered first, then next bead token to the right is rendered next and so on. If bead tokens are each overlapped with a fixed offset, then the resulting image will be an oblique projection of a stack of individual bead tokens. Once a set of ten bead tokens are fully overlapped to form the next higher order (i.e. next higher place value) bead token, then the 10 graphics files of the individual bead tokens can be replaced with a single graphics file of the next higher order bead token. This substantially improves the performance by reducing computation time to render a bead token.

Bead tokens for different numbers in an arithmetic problem may be rendered in different colors. In a two number addition problem, for example, the augend may be one color, such a green, and the addend may be another color, such as blue. The color of the bead tokens may be preserved as a problem is calculated and bead tokens are moved to derived value cards. When bead tokens are carried from once place value column to the next higher order place value column, the bead token colors can still be preserved as the bead tokens overlap to form the next higher order bead token. In this instance, the next higher order bead token with the combined color bead tokens may continue to be rendered from the individual bead tokens of the original selected column.

Figure 14A:
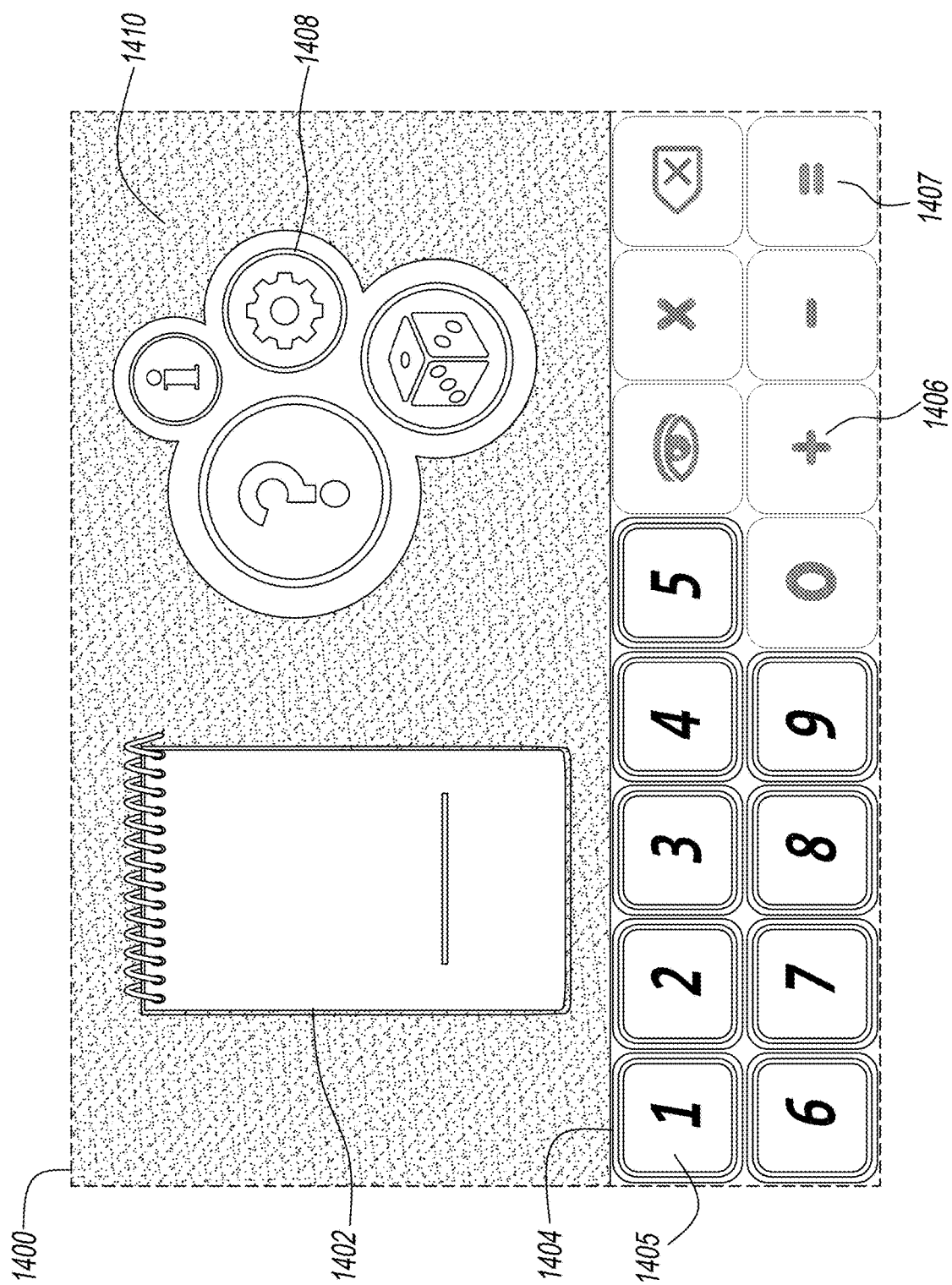
FIGS. 14a to 14c are successive GUIs showing the entering of an arithmetic problem.

FIG. 14a shows a GUI 1400 presented on a touch screen input/output device of an exemplary calculator. Said GUI comprises a display area 1402, a user input area 1404 (e.g. a keyboard) and one or more utility icons 1408. The utility icons may comprise a help button ("?"), information button ("i"), utility icon (gear), and a random problem selection button (dice). Other utility icons may be provided as well. A background pattern 1410 may be presented to highlight the functional areas of the GUI. A suitable background pattern is waves of sand or other natural looking uniform pattern. The user input area comprises a set of single digit numerals 1405, one or more arithmetic operators 1406 and an execution icon 1407 (e.g. an equals bar). The calculator may be configured to show active user input areas as bold colors and/or apparently dimensional objects, such as raised buttons, with distinct indicia. An example of active user input areas in FIG. 14a is the single digit numerals 1 to 9. User input areas that are not active may be rendered flat with grayed out or faint indicia. Examples in FIG. 14a are the arithmetic operators. The arithmetic operators are greyed out and inactive since the user has not input any digits yet.

Figure 14B:
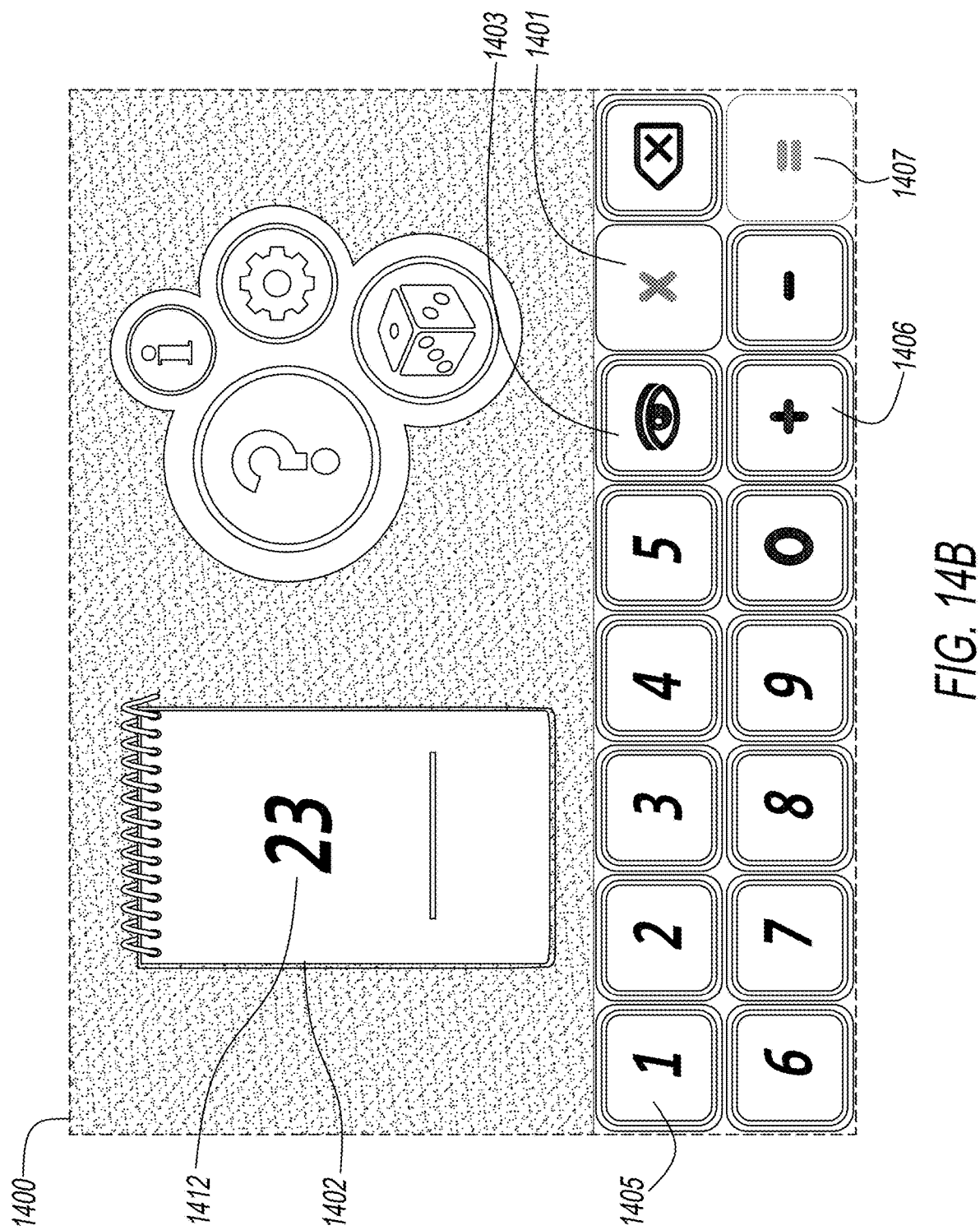

FIG. 14b shows the GUI 1400 of FIG. 14a after a user has input the digits "2" and "3". The number "23" is presented 1412 in the display area 1402. The plus operator 1406 and minus operator are shown as being active since now there is a first number input for an arithmetic problem. The execution icon 1407 is still inactive since the user has not selected an operator or a second number. The times icon 1401 is inactive simply because the times function has not been activated in the calculator. This may be an option for a parent or other responsible adult (e.g. a teacher) to activate or deactivate so that a child will first master addition and subtraction before proceeding to multiplication.

A view icon 1403 may be presented to allow a user to view what an entered number will look like expressed as a set of digit cards with digit tokens on them. The calculator described herein can display bead icons of up to ten million apparent beads on a digital display of 320×480 pixels (e.g. iPhone 1). An addition problem therefore with up to 7 digits per number can be entered. The solution may have up to 8 digits. Provision must be made, therefore, for a units column through a ten millions column. The calculator may be adapted to vary the position and width of the display area 1402, as well as the font of the numbers 1412 presented in the display area, in response to the number of digits entered for the first and second number of an arithmetic problem.

Figure 14C:
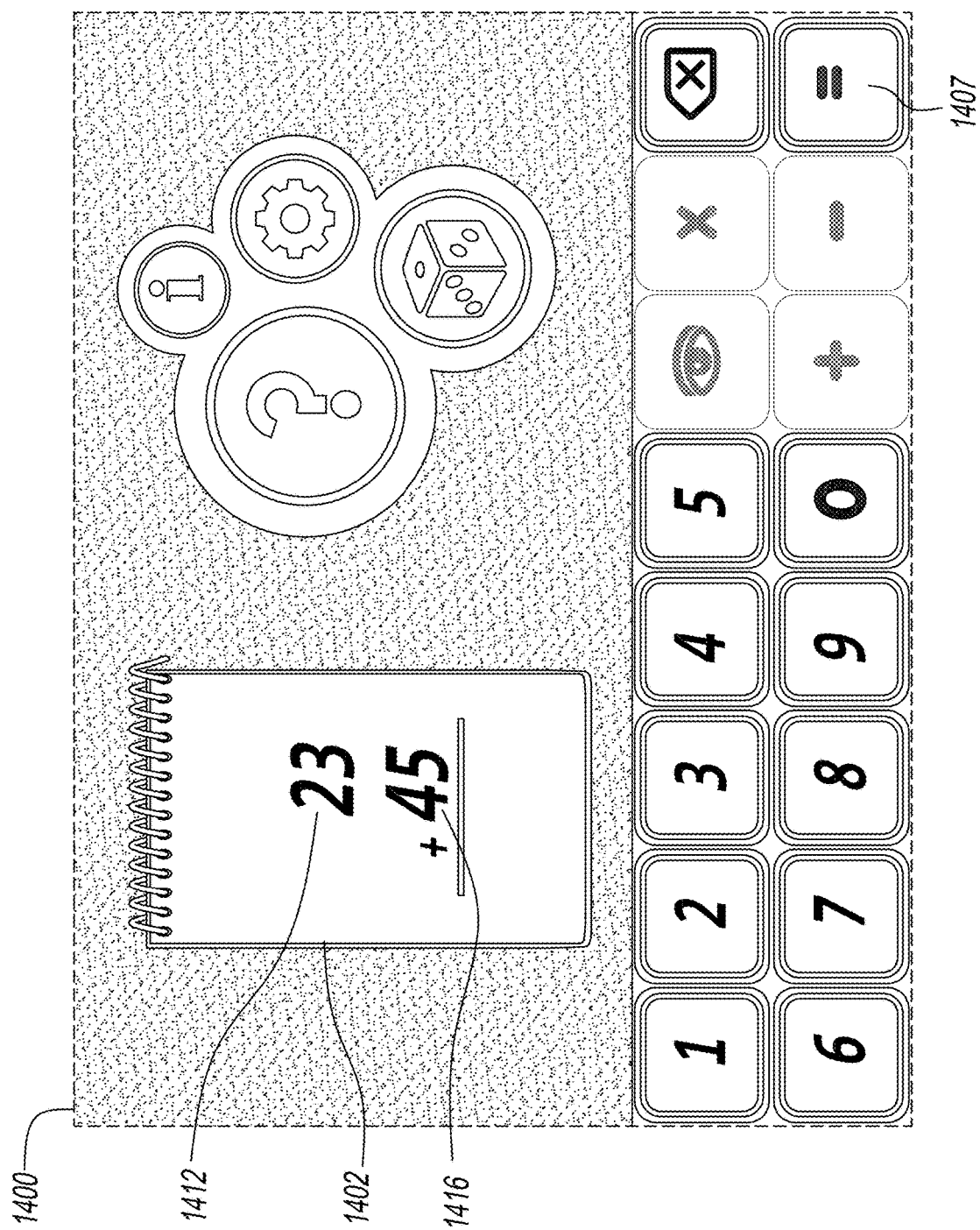

FIG. 14c shows the GUI 1400 after a user has chosen an arithmetic operator and a second number (item 1416). The equals bar 1407 then becomes active. Once the equals bar (or other execution icon) is chosen, the calculator transitions from the GUI in FIG. 14c to the GUI in FIG. 15a.

Addition with Bead Tokens

Figure 15A:
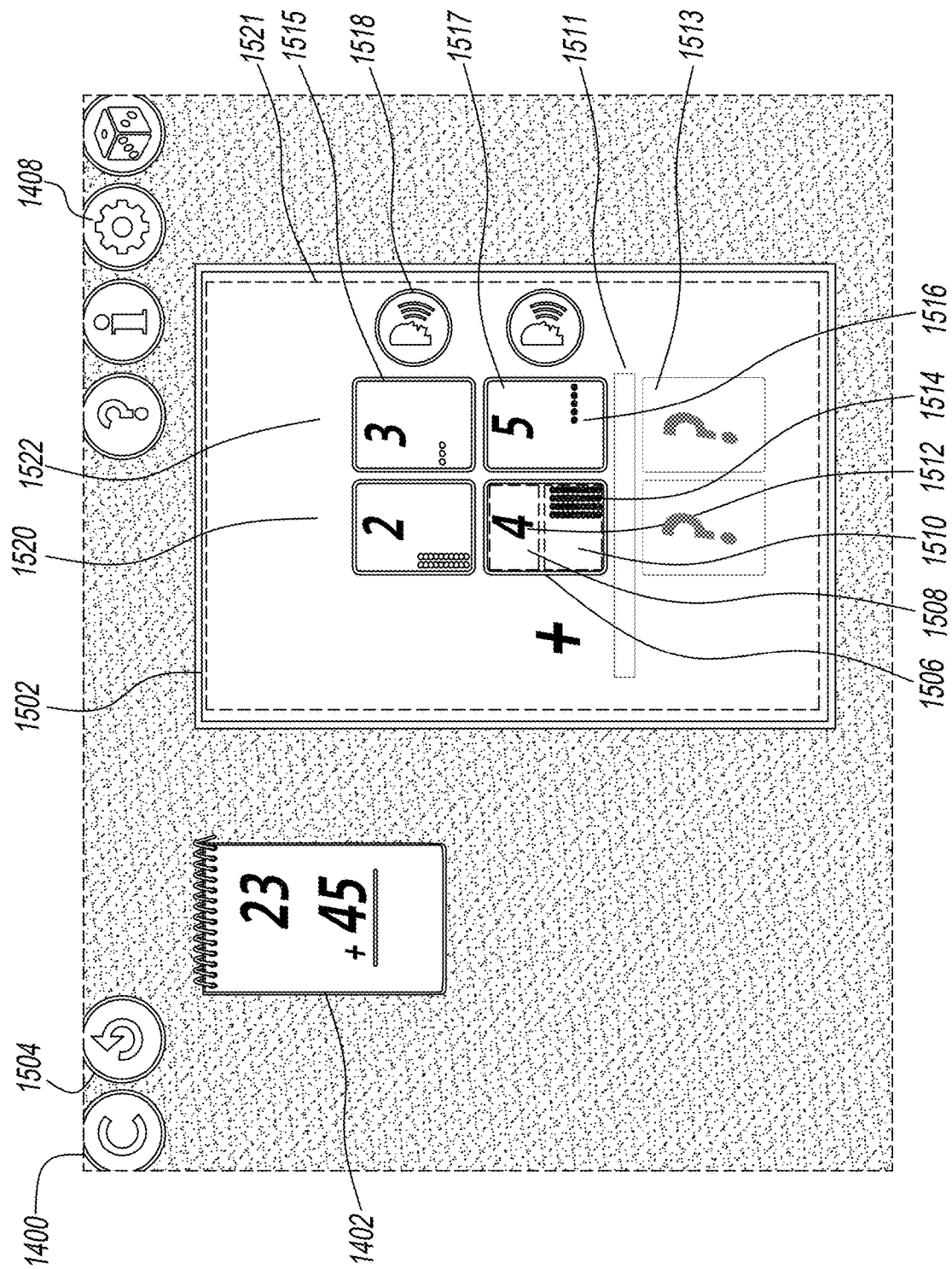
FIGS. 15a to 15d are successive GUIs showing an addition problem with bead tokens.

FIG. 15a shows the GUI 1400 after the equals bar icon is selected. The user input area has been removed, the display area 1402 has been reduced in size, and a workspace area 1502 has been presented. A redo button 1504 is presented. The redo button will cause the problem to reset. A "speak button 1518 has been presented. The speak button will cause the calculator to speak the number out loud.

Similar to the workspace area 412 of FIG. 4c, the workspace area in the present GUI shows the single digit numbers of the first and second numbers displayed in digit cards arranged in columns and rows. Since this is an addition problem, the first number will be referred to as the augend and the second number will be referred to as the addend. The digit cards are displayed above an equals bar area 1511 which in turn is above one or more holding areas 1513. The augend digit cards 1515 are in a first color, such as green. The addend digit cards 1517 are in a second color, such as purple. Each digit card 1506 comprises a top digit area 1508 and a bottom token area 1510. The numerical digit 1512 for each digit card is displayed in the digit area. The bead tokens

1514 are displayed in the token area. The digits and tokens have the color of their respective digit cards.

The number of bead tokens is equal to the numerical value of the digit in a digit card. The digit and token areas do not have to be explicitly rendered but may be implicit from the arrangement of the digit tokens or digits displayed in a digit card. As used herein, the phrase "displayed on" or the like means that the apparent base of a given bead token will at least partially cover a portion of a token area of digit card. As described in more detail below, bead tokens described herein will include oblique projections of stacks of beads. Any three dimensional projection may be used. The tokens are rendered from a top right perspective. This means that the viewer appears to be above and to the right of a token. Any perspective may be used.

A user will perceive a bead token as having a bottom even if the bottom is not directly visible. In a top right oblique projection, the top edge and right edge of the bottom of an object should still be visible to a user. Said bottom will be on a digit card if it obscures at least a portion of a token area.

The rendering of an oblique projection may extend below the bottom of a digit card as displayed on a screen. The user will nonetheless perceive the bead token as being on the card. This perception will be maintained even if the display device is not large enough to display an entire bead token and the bead token appears to extend off of the screen. The perception may be reinforced by the manipulation of large bead tokens on a screen during the process of a calculation. Thus a user may view an entire bead token before its position is shifted a final position so that said bead token does not entirely fit on a screen.

FIGS. 26A to 26D show illustrate details of various bead tokens for different place value columns. The broken lines on said figures are not part of the bead token designs.

The bead token for the units column 1522 is called a "units bead" (item 2602 FIG. 26A) and is a single bead 1516. The bead may be rendered as spherical or any other suitable shape, such as an ellipsoid or pyramid.

The bead token for the tens column 1520 is called a "tens stick" (item 2604 FIG. 26A) and is a representation of 10 overlapping units beads in a vertical line. It could alternatively be a representation of 10 overlapping units beads in an apparent normal direction to the plane 1521 of the digits cards.

The bead token for the hundreds column is called a "hundreds slab" (item 2606 FIG. 26a) and is an upper right oblique projection of 10 overlapping tens sticks arranged in a vertical slab extending in the normal direction to the plane of the digit cards.

The bead token for the thousands column is called a "thousands cube" (item 2608 FIG. 26a) and may be an upper right oblique projection of 10 overlapping hundreds slabs in a cube configuration.

The bead token for the ten thousands column is called a "ten thousands stick" (item 2612 FIG. 26b) and may be an upper right oblique projection of 10 overlapping thousands cubes stacked together in the normal direction to the plane of said digit cards and wherein a gap with a width of at least one units bead is between each of said thousands cubes in said ten thousands stick.

The bead token for the hundred thousands column is called a "hundred thousands slab" (item 2614 FIG. 26c) and may be an upper right oblique projection of 10 overlapping ten thousands sticks arranged in a vertical slab extending in the normal direction to the plane of said digit cards and wherein there is a gap with a width of at least one units bead between each of said ten thousands sticks in said hundred thousands slab.

The bead token for the millions column is called a "millions cube" (item 2616 FIG. 26d) and is an upper right oblique projection of 10 overlapping hundred thousands slabs arranged in a cube configuration and wherein there is a gap with a width of at least one units bead between each of said hundred thousands slabs in said millions cube. The millions cube may have a forward face showing individual beads thereupon. An output device resolution of at least 300×300 pixels is adequate for a user to discern individual beads on the forward face. Higher place order bead tokens, such as ten millions sticks, hundred millions slabs etc. may be similarly constructed from lower order bead tokens displayed with a constant offset between the lower order bead tokens such that the higher order bead token appears to be an oblique projection. As mentioned above, however, any three dimensional projection may be used, such as an isometric projection or perspective projection.

Bead tokens on the digit cards of the first number in an arithmetic problem may be left justified. The bead token on the digit cards of the second number in an arithmetic problem may be right justified. The left and right justifications may be preserved as digit cards are touch dropped to the holding areas below the equals bar area and the bead tokens are transferred to token areas on the corresponding derived value cards.

Similar to the display area, the workspace area 1502, digit cards and bead tokens may be scaled in size depending upon how many place values are required to calculate and display the solution to the arithmetic problem. The width of the digit cards in a given place value column may be scaled before the presentation of the workspace area to accommodate the expected total widths of the bead token bases to be displayed thereupon. For example, if a derived value card in the ten thousands column will be required to display 10 ten thousands sticks side by side, then all of the digit cards in the ten thousands column will be displayed wide enough to hold the bases of 10 ten thousands sticks prior to the rendering of the workspace area.

Figure 15B:
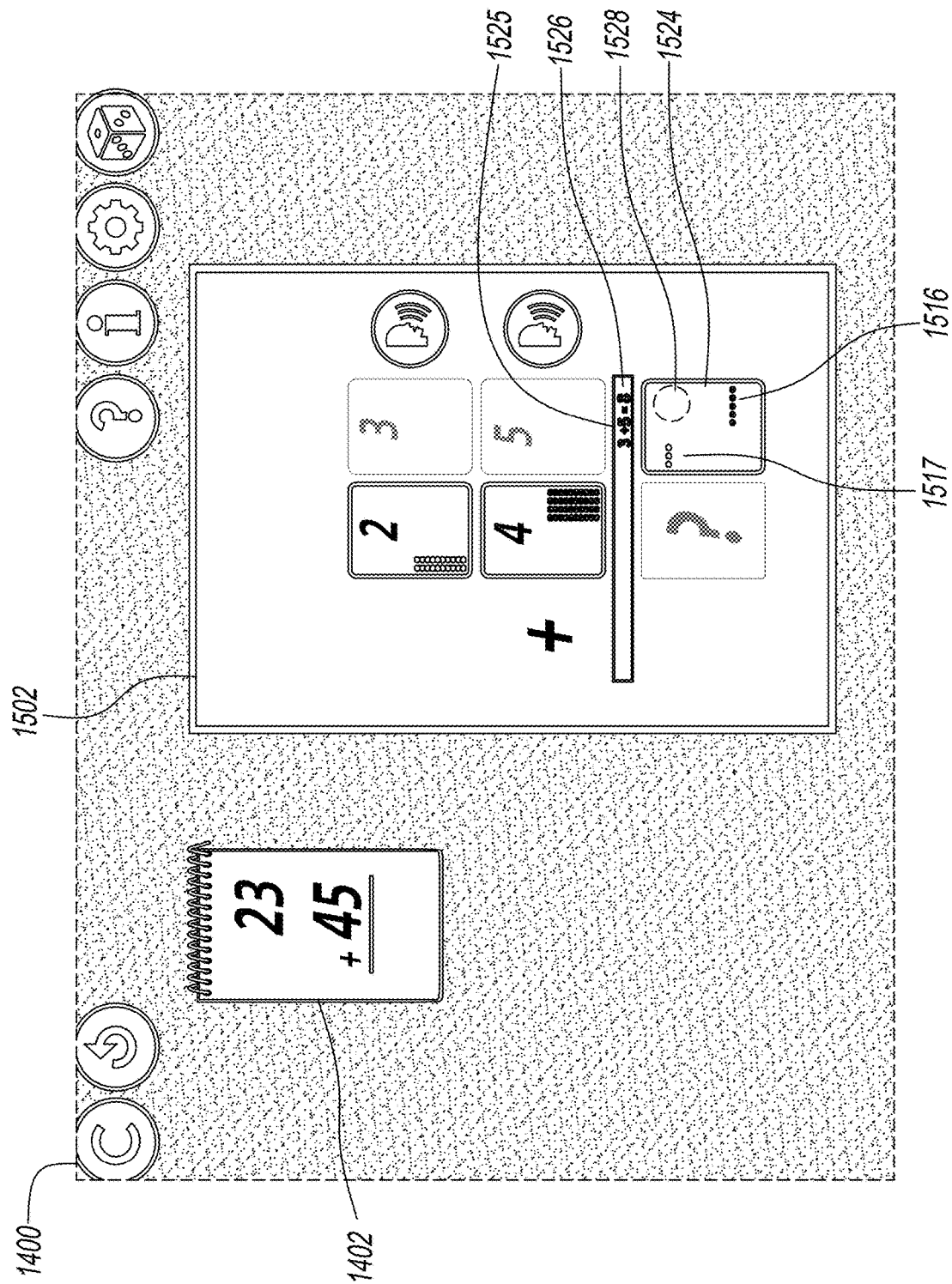

FIG. 15b shows the GUI 1400 after a user has touch dropped the augend and addend digit cards in the ones column. The bead tokens 1517 from the augend digit card are shown in the upper left of the derived value card 1524. The bead tokens 1516 for the addend digit card are shown in the lower right. A derived value equation 1525 is shown in the equals bar area. The derived value (item 1526) is "8". The touch drop is still reversible at this point since the user has not lifted his/her touch 1528.

Figure 15C:
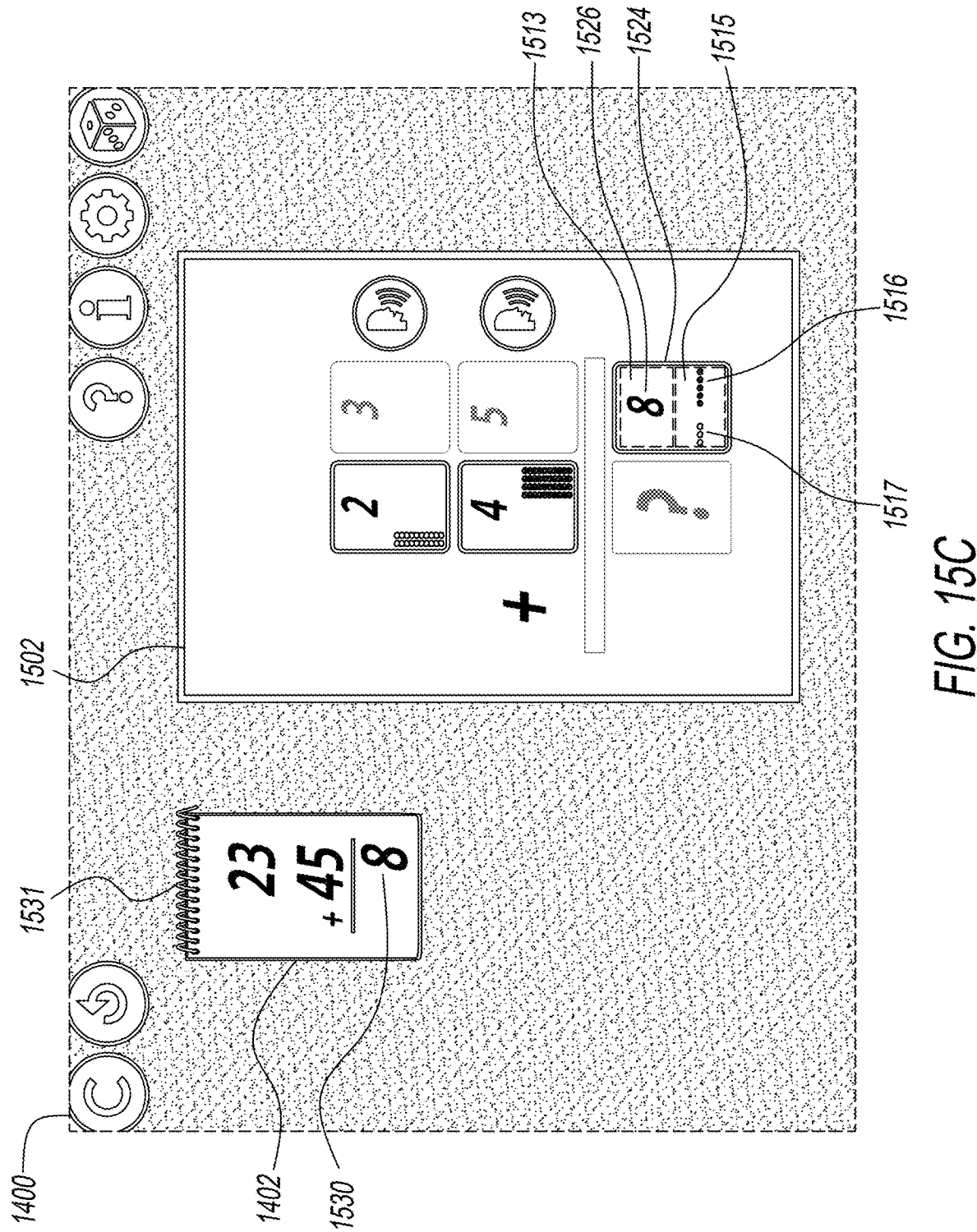

FIG. 15c shows the GUI 1400 after the user has lifted his/her finger from the touch screen and the calculator has completed the touch drop. The digit tokens 1517 from the addend digit card have moved down to the same level as the digit tokens 1516 from the augend digit card. The left and right justifications of the bead tokens have been preserved. The bead tokens are also shown in a single row within a token area 1515 in the lower portion of the derived value card 1524. The derived value digit (item 1526) is displayed in a digit area 1513 in the top of the derived value card. Since the user has completed the touch drop by lifting his/her finger, the derived value is also shown in a corresponding position 1530 in the display area 1402. This simulates what a user would see when doing the calculation on paper. The metaphor of paper is reinforced by illustrating a spiral 1531, like one would see in a spiral notebook, in the top of the display area.

Figure 15D:
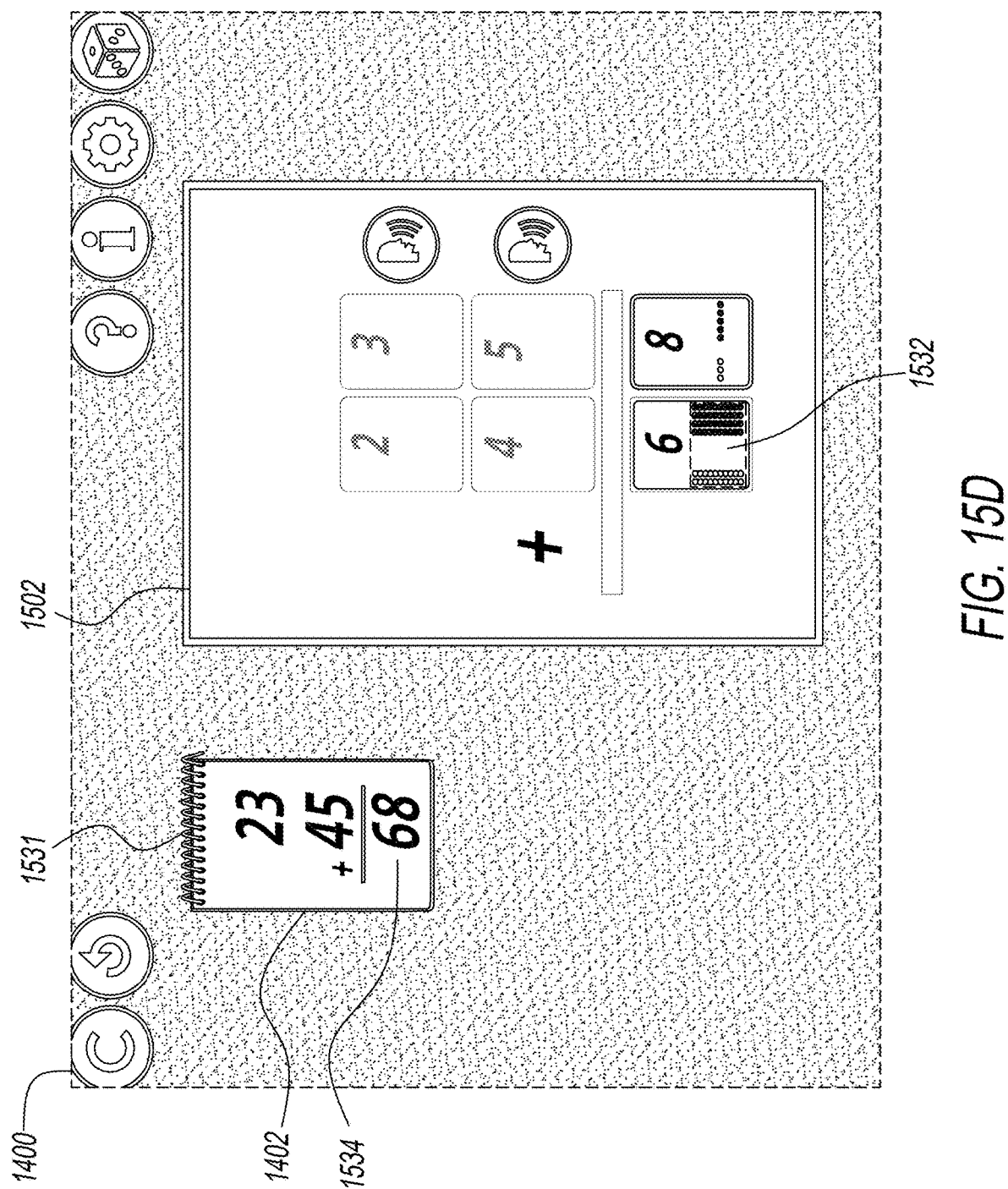

FIG. 15d shows the GUI 1400 after a touch drop has been executed on the digit cards in the tens column. The tens bars from the augend digit card and addend digit card are shown in a token area 1532 in the derived value card. The final answer to the arithmetic problem is shown in a corresponding location 1534 in the display area 1402.

Carrying with Bead Tokens

Figure 16A:
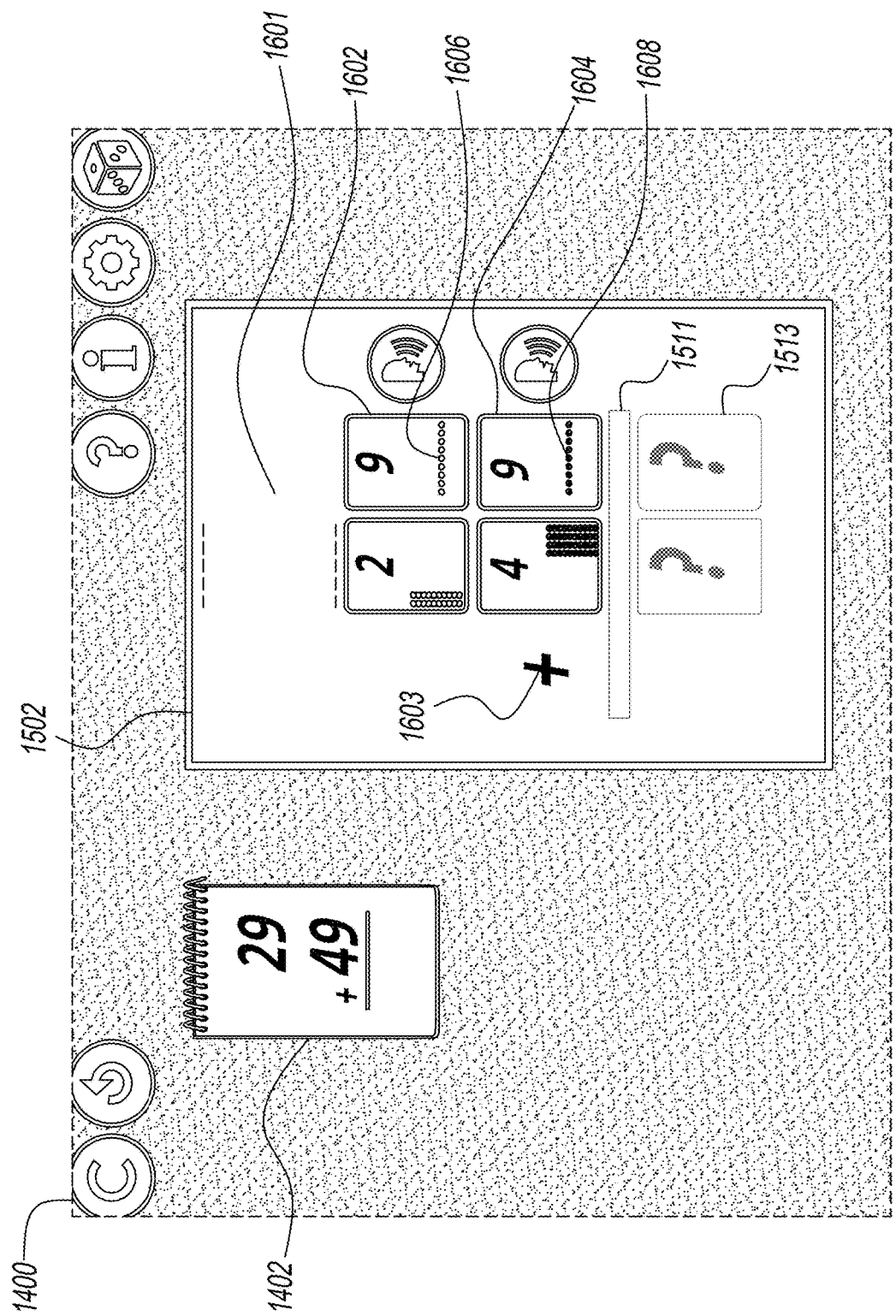
FIGS. 16a to 16f are successive GUIs showing carrying with bead tokens.

FIGS. 16a to 16f illustrate the steps of carrying with bead tokens. FIG. 16a shows the GUI 1400 of a calculator displaying the arithmetic problem "29+49". "29" is the first number of the arithmetic problem. "+" is the operator. "49" is the second number in the arithmetic number. The arithmetic problem is shown in the display area 1402.

The workspace area 1502 shows the arithmetic problem displayed on digit cards. The augend cards are shown above the addend cards. The operator 1603 is shown above the equals bar area 1511. The equals bar area is below the digit cards. One or more holding areas 1513 are shown below the equals bar area.

The workspace area has a row 1601 above the digit cards that will receive a carry card in subsequent operations. Rows and columns may be shown herein as parallel broken lines. The broken lines are not displayed on the GUI. The augend digit card 1602 in the ones place has a horizontal row 1606 of 9 bead tokens that are left justified. The addend digit card 1604 has a row 1608 of 9 bead tokens that are right justified. In the prior example illustrated in FIGS. 15a to 15d, there was enough room for the addend bead tokens and augend bead tokens to be displayed in a single row in a derived value card. That is not true in this arrangement. This forecasts to the user that there will be a need to do something different since there is not enough room to show all bead tokens in a single row.

Figure 16B:
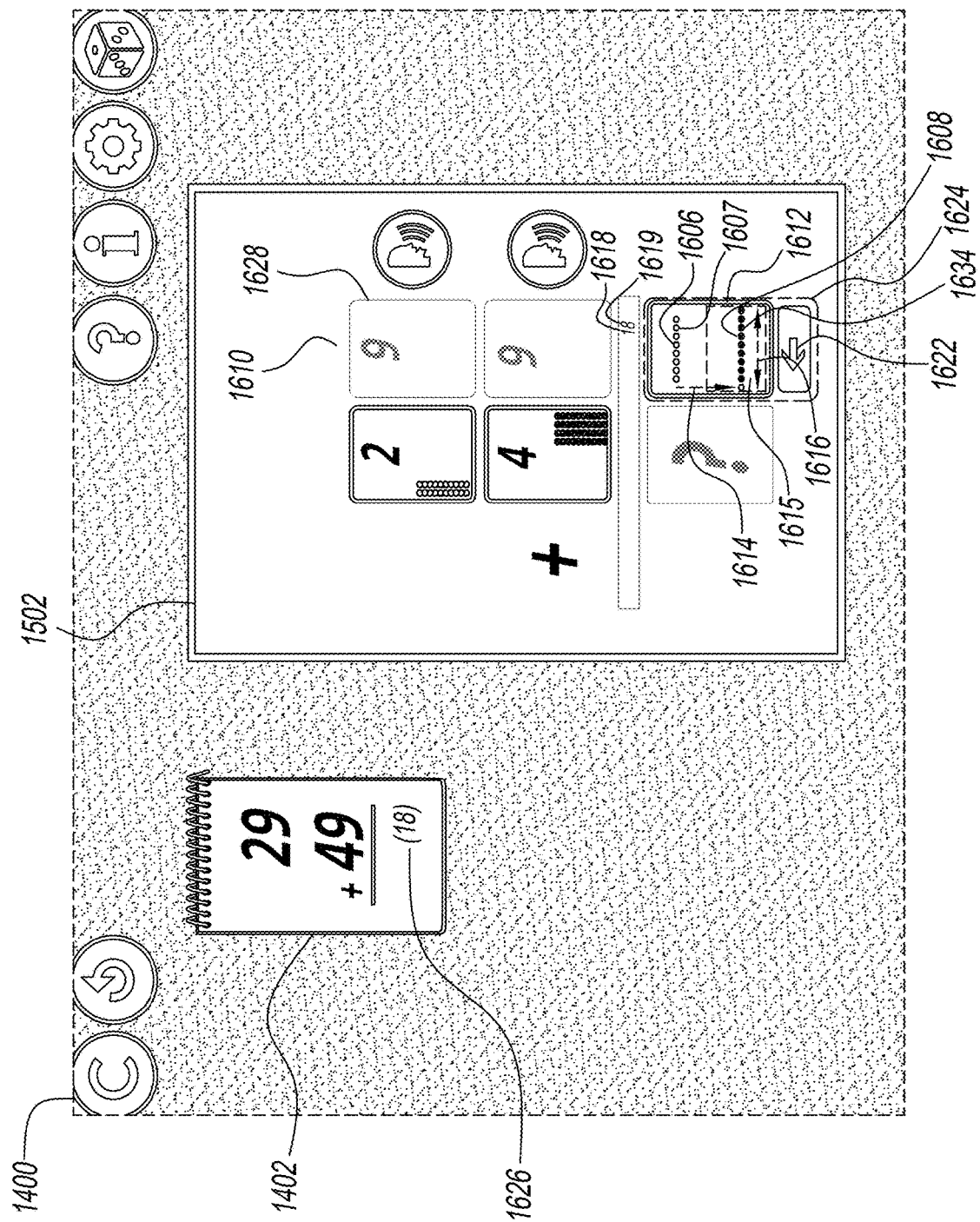

FIG. 16b shows the GUI after a user has selected the units column 1610 for a touch drop. The calculator has determined that the user selected the units column and calculated a derived value of "18" for the sum of the digit cards. This is a two digit number with the "1" (item 1618) being the tens digit and the "8" (item 1619) being the ones digit. The derived value remains in the equals bar.

The bead tokens 1606 from the augend and bead tokens 1608 for the addend are shown on the derived value card 1612. The bead tokens for the augend are shown as a row in a token area 1615 of the derived value card. The derived value card has a width 1616 that is only adequate to show ten bead tokens side by side. When the bead tokens for the augend and addend were shifted down during the touch drop, any augend bead tokens that could fit in the row of addend bead tokens dropped 1614 to the same row as the addend bead tokens. Thus there is a horizontal row 1634 of 10 bead tokens in the token area of the derived value card. The coloring of the bead tokens is preserved and will remain with the bead tokens for all subsequent transformations. The augend bead tokens that did not drop down are the remainder bead tokens 1607.

In this embodiment, once a digit card is touch dropped, a "ghost card" 1628 remains behind. The ghost card is a faint rendering of the digit card. It helps remind the user of what the digits were that led to a particular derived value. The user can also deduce these values from the color of the bead tokens in the derived value cards.

A pseudodigit 1626 is shown in the display are 1402 to indicate to the user the stage of calculation.

Since the derived value has been determined to be a two digit number, a carry area 1624 has been activated. A carry arrow 1622 has also been displayed. The carry area includes the derived value card and the carry arrow. The carry area is shown as a broken line rectangle.

The broken line is not displayed on the GUI. The carry area may also include the renderings of the bead tokens on the derived value card even if said renderings extend outside of the boundary of the derived value card.

Figure 16C:
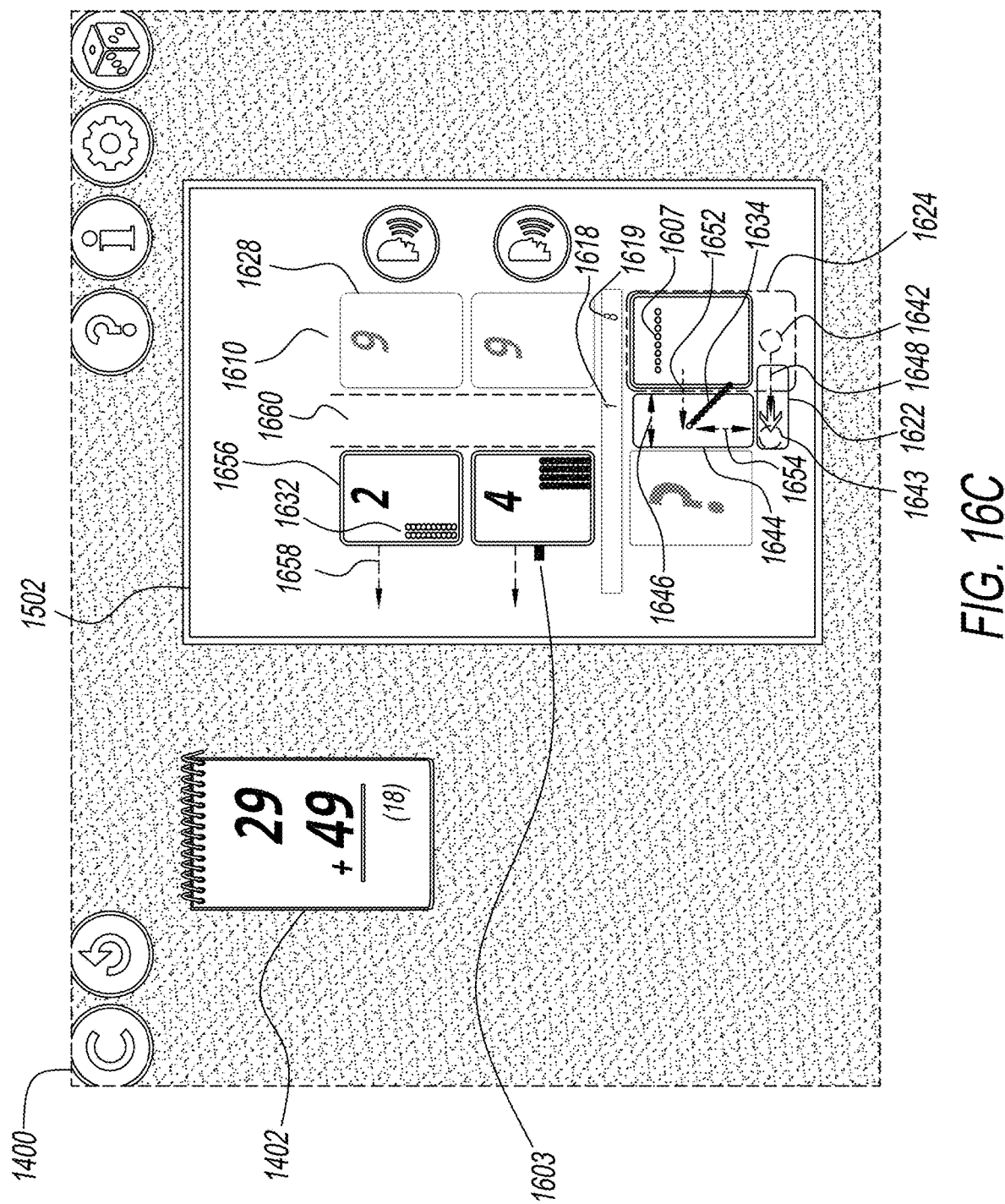

FIG. 16c shows the GUI 1400 after the user has selected 1642 the carry area and made a gesture 1648 to the left. In this touch screen embodiment, the selection was made by touching the screen in the carry area. The gesture to the left was sliding the user's finger to the left without breaking contact with the touch screen. The gesture is shown as a broken line arrow. The broken line arrow is not displayed on the GUI.

A carry card 1644 is displayed to the left of the derived value card after the user selects the carry area. The carry card has a left edge, right edge, top edge, bottom edge, width 1646, and a height. The width is variable. When the user makes the gesture to the left the calculator carries out the steps:
1) increase said width of said carry card;
2) shift to the left 1658 all higher place value digit cards 1656 in said first and second numbers that are in their original positions and are to the left of said selected column 1610 such that said shifting to the left of said higher place value digit cards forms a vertical passage 1660 to the left of said selected column; and
3) continuously shift said 10 bead tokens 1634 both to the left 1652 and vertically 1654 such that said 10 bead tokens overlap to form a next higher bead token (e.g. item 1632) corresponding to the place value of the column to the left of said selected column.

In this embodiment, the operator 1603 will not shift with the shifting digit cards 1656. The shifting digit cards may at least partially cover the operator. This will forecast to the user that the shifting digit cards may at some point shift back. The tens digit (item 1618) of the derived value will shift left with the gesture of the user. It will ultimately be placed in the carry card. The ones digit (item 1619) remains above the derived value card. It will ultimately be placed in the derived value card. The remainder beads 1607 remain in the derived value card. They will ultimately shift to the token area of the derived value card.

Since the user is still touching 1643 the screen, the calculator is adapted to reverse the process if the user moves his/her finger to the right. Thus a user can experiment with moving right and left to see how the bead tokens shift from a horizontal row of 10 lower order bead tokens to the bead token of the next higher place value column.

Figure 16D:
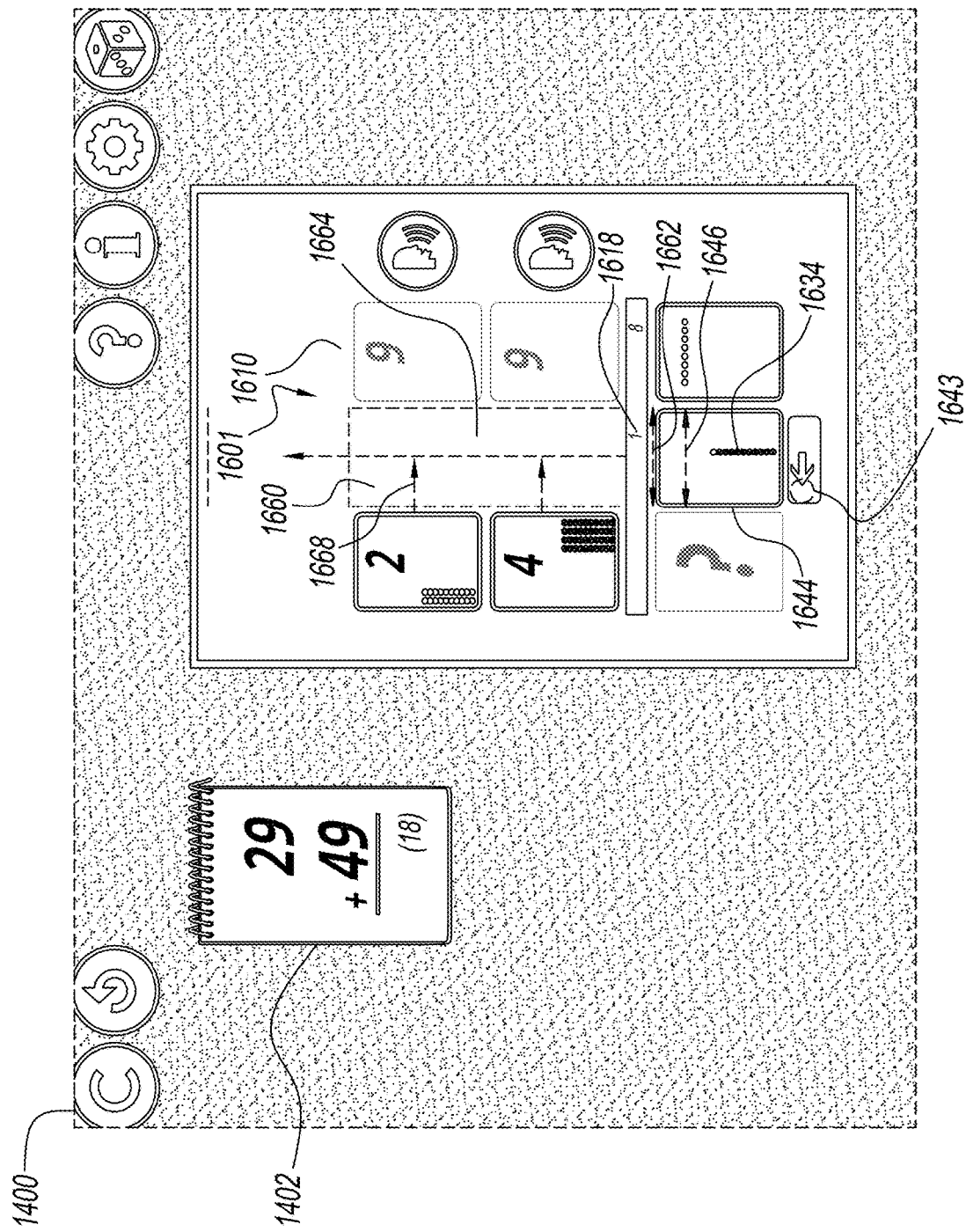

FIG. 16d shows the GUI 1400 after the user's gesture has increased the width 1646 of the carry card to a first desired carry card width 1662. The 10 bead tokens 1634 have been fully transformed to a single bead token of the next higher place value column (e.g. a tens stick). The carry card will no longer increase in width. The shift of the higher place value digit cards has been halted. In the illustrated embodiment, the user must lift his/her finger from its position 1643 on the touch screen in order for the next steps to take place. Alternatively, the next steps could take place automatically after the carry card reaches its desired width. The next steps the calculator performs are:
1) move 1664 said carry card 1644 with said next higher order bead token through said vertical passage 1660 to the row 1601 above said digit cards of said first number in said arithmetic problem; and 2) shift 1668 said higher place value digit cards back to said original positions.

In the illustrated embodiment, the tens digit (item 1618) is picked up by the carry card as it passes over it.

Figure 16E:
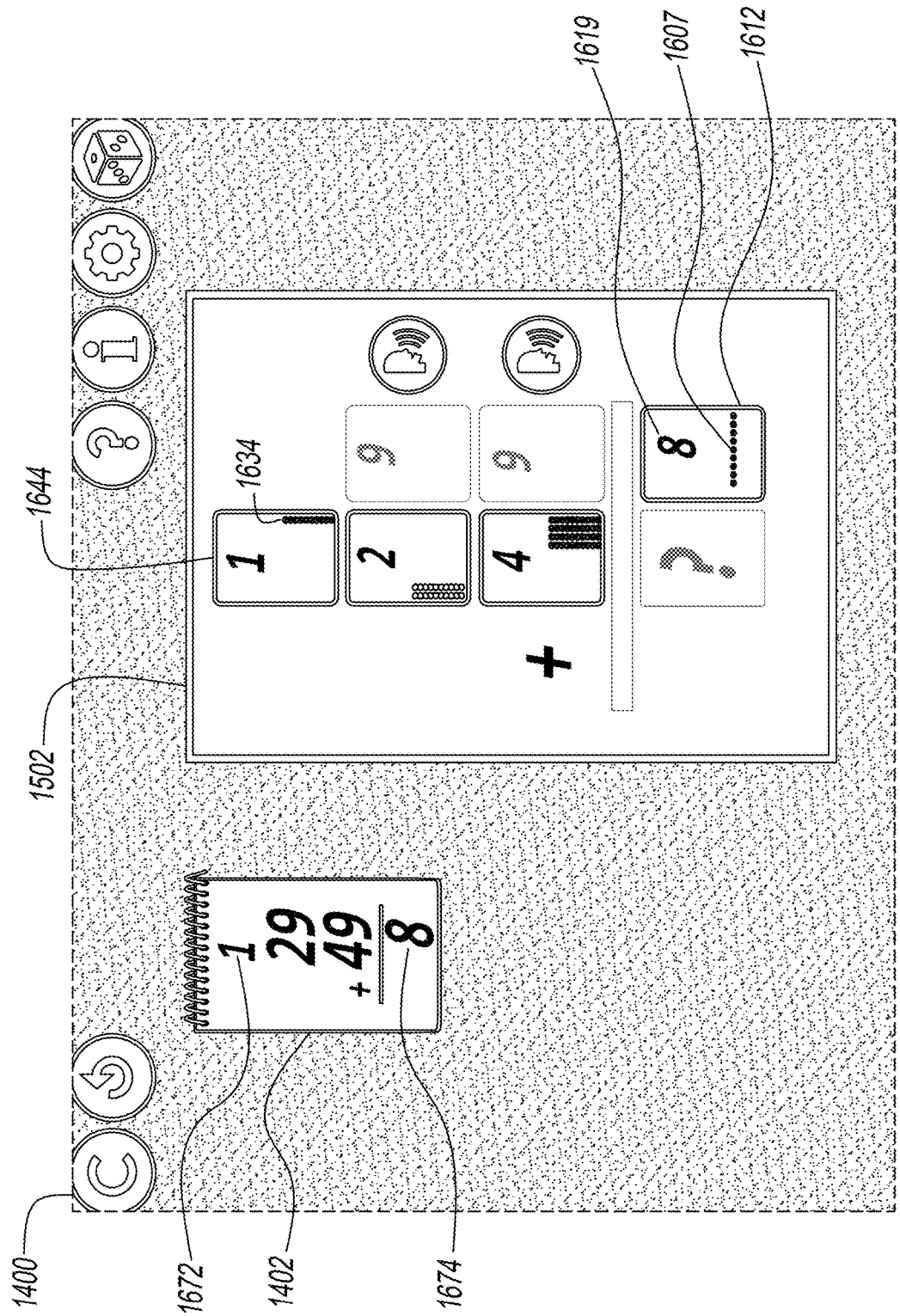

FIG. 16*e* shows the GUI 1400 after the completion of the carry operation. The ones digit (item 1619) of the derived value has been placed in a digit area of the derived value card 1612. The remaining bead tokens 1607 have been placed in a token area of the derived value card. The carry card 1644 is shown above the digit cards of the first and second number. The bead token 1634 from the carry operation is shown right justified in the carry card. The corresponding notations 1672 and 1674 from doing the problem on a piece of paper are shown in the display are 1402.

At this point, the system could replace the 10 graphic images shown overlapping as the bead token in the carry card with a single graphic image with the same color coding. This will significantly reduce computation time for higher order problems especially where there are a large number of beads implicitly represented in a bead token (e.g. a million bead cube).

Figure 16F:
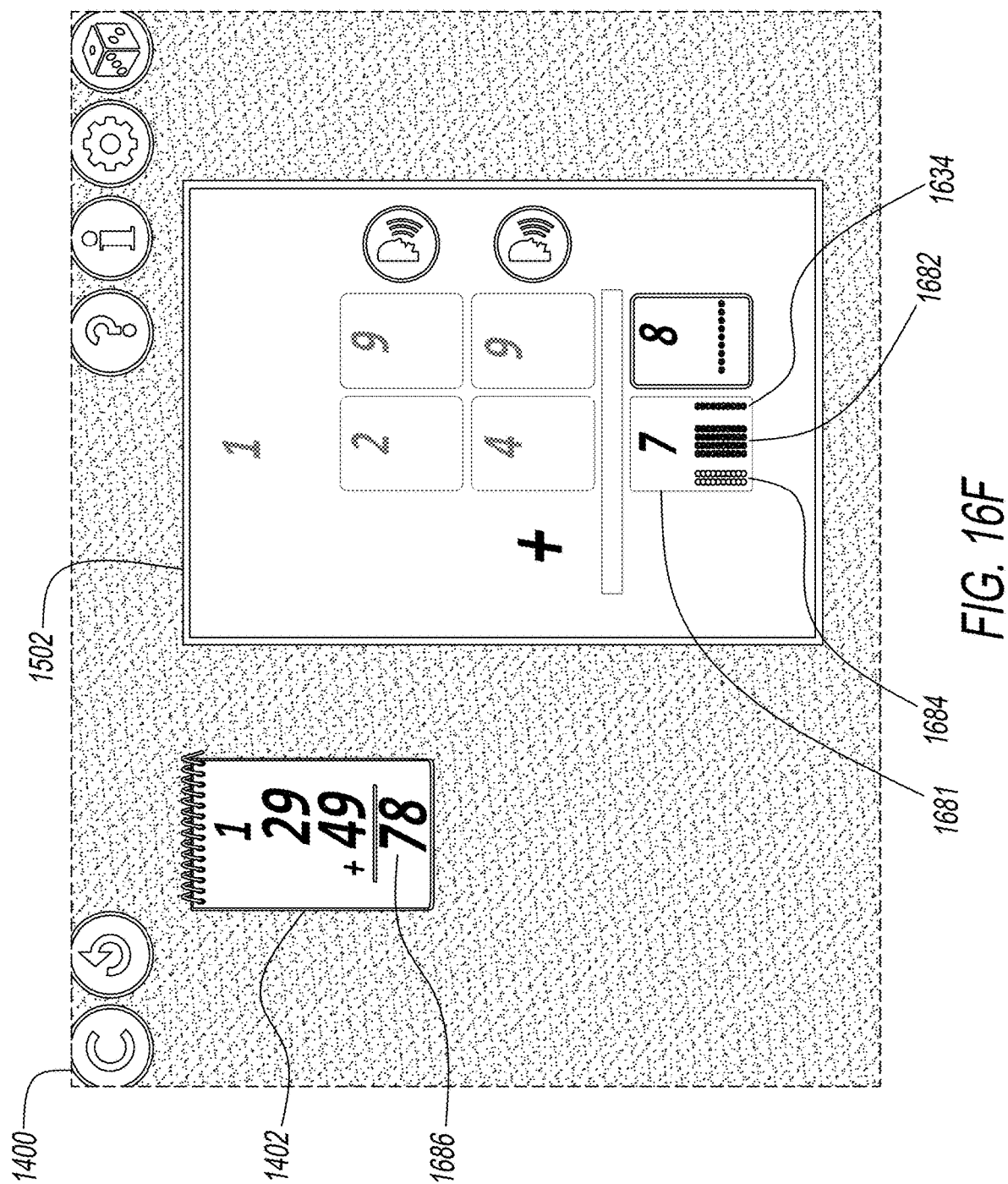

FIG. 16*f* shows the GUI 1400 after a user has touch dropped the carry card in the tens column. The augend bead tokens 1684 are left justified in the derived value card 1681. The carry bead token 1634 is right justified. The addend bead tokens 1682 are shifted left and are center justified between the augend bead tokens and the carry bead token. If this column had a two digit derived value, the remainder augend bead tokens would be in a row above the row of the addend bead token(s) and carry bead token. The lower row of augend, addend and carry bead tokens could then be carried by a similar operation to the next higher place value column. The coloring would be preserved. A surprising benefit of this method of choreographing the movement of bead tokens during carrying and subsequent touch dropping is that all bead tokens remain visible even of carried many place value columns. For example, in the arithmetic problem of 999,999+1, the single bead of the units column of the addend is continuously visible throughout all carry operations and can be seen in the final millions cube.

The solution (item 1686) is also shown in the display area 1402.

Bead Token Subtraction

Figure 17A:
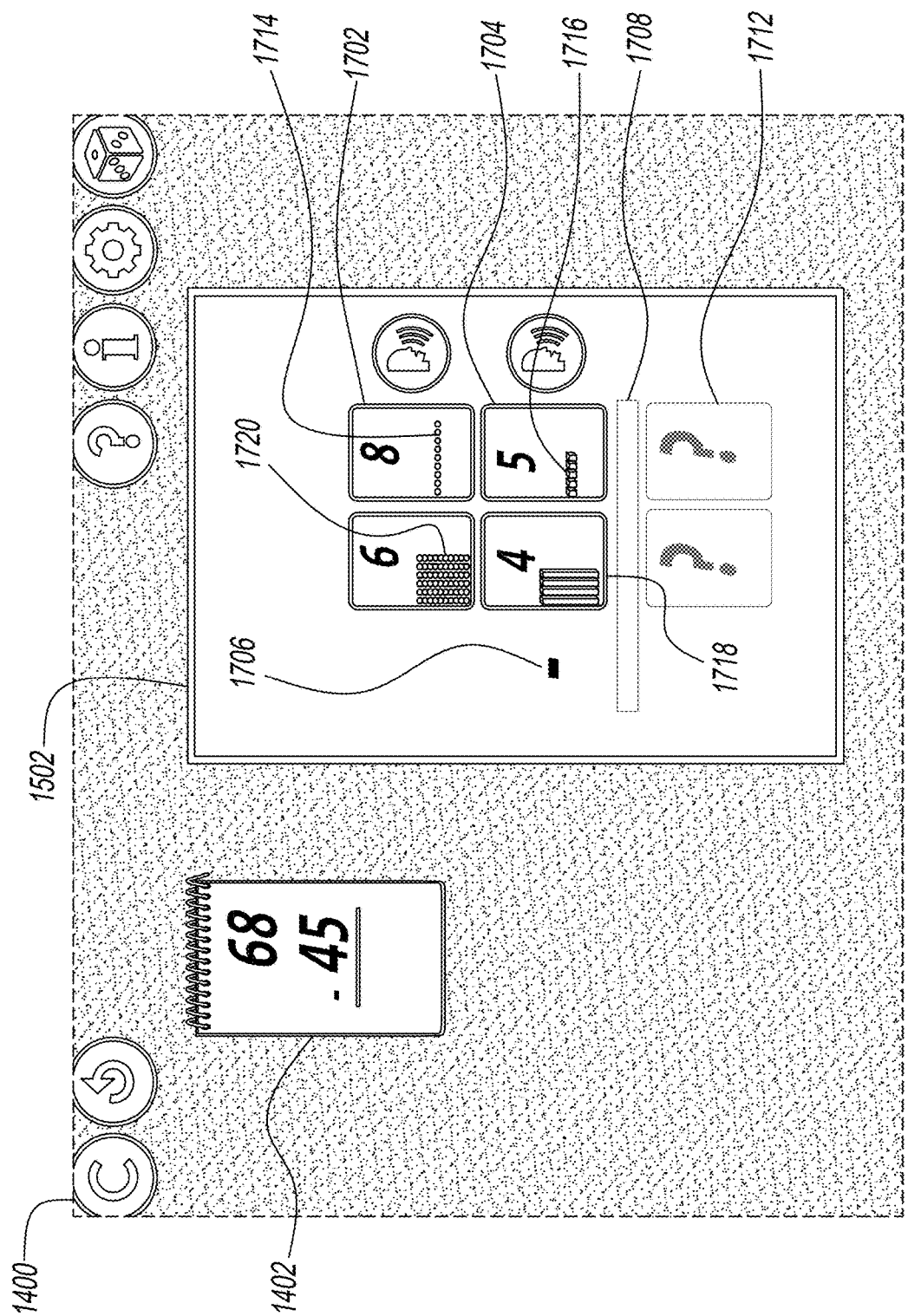
FIGS. 17a to 17d are successive GUIs showing subtraction with bead tokens and removal tokens.

FIGS. 17*a* to 17*d* show a sequential screen shots from a calculator adapted to show the steps of subtraction using bead tokens on digit cards. Referring to FIG. 17*a*, the GUI 1400 has a display area 1402 and a workspace area 1502. Both areas show a particular arithmetic problem to be solved, "68–45". This problem can be solved without any borrowing. An example with borrowing will be shown in FIGS. 18*a* to 18*h*.

FIG. 17*a* shows the arithmetic problem displayed as digits cards for the first number (item 1702) (i.e. the minuend) and the second number (item 1704) (i.e. the subtrahend). An operator 1706 is presented. The digit cards are above an equals bar area 1708. One or more holding areas 1712 are below the equals bar area.

The bead tokens 1714 shown in the minuend digit cards are the same as the bead tokens shown for addition problems. They are also left justified. The tokens 1716 in the subtrahend cards, however, will serve the function of removing bead tokens from the minuend cards. Hence they will be referred to herein as "removal tokens". A person of ordinary skill in the art will recognize that there are many physical metaphors that can be used to convey physical removal. The metaphor described herein is that of a drawer removing minuend bead tokens that are placed in it. Other metaphors include "anti" bead tokens, explosive bead tokens, or any metaphor that intuitively conveys the removal, transformation or destruction of minuend bead tokens. It is desirable that the removal tokens explicitly or implicitly illustrate the number of bead tokens than can be removed per removal token. Thus as shown in FIG. 17*a*, the removal token for the units column is a small drawer 1716 about the size of a corresponding units bead 1714. Similarly, the removal token 1718 for the tens column can be a tall drawer similar in dimension to a corresponding tens stick 1720. The removal drawers may have open tops so that bead tokens can be shown going in them. The walls may be rendered as semi-transparent so that the user can see the bead tokens after they are placed in the removal drawers. The removal tokens in the subtrahend cards are also left justified so that they will vertically align with the bead tokens of the minuend cards they are intended to remove.

Figure 17B:
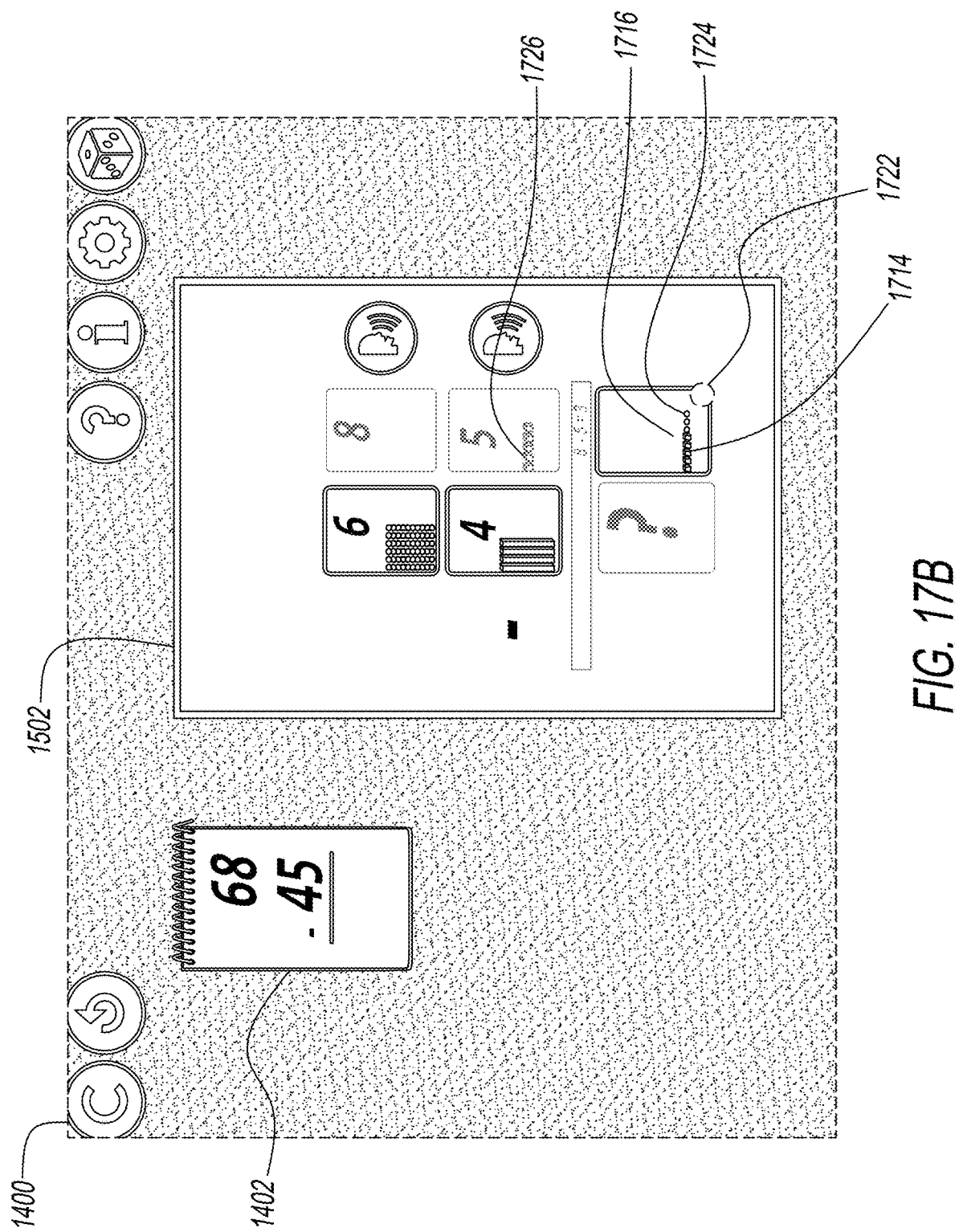

FIG. 17*b* shows the GUI 1400 after a user has touched 1722 a minuend card in the ones column and made a downward gesture. Similar to addition, the minuend card pushed the subtrahend card down after touching it and the subtrahend card stopped its downward motion when its bottom got to the bottom of the holding area. The removal tokens on the subtrahend card, however, remained visible and open as the minuend card was lowered. Ghosts 1726 of the removal tokens can be seen in the ghost of the minuend card in the minuend card's original position.

In the illustrated embodiment, the calculator is adapted to allow reversal of the touch drop as long as the user has not lifted his/her finger from the touch screen. Thus a user can experiment with lowering a raising digit cards. Once the user lifts his/her finger from the touch screen, however, the calculator is adapted to automatically and irreversibly complete the touch drop operation.

Figure 17C:
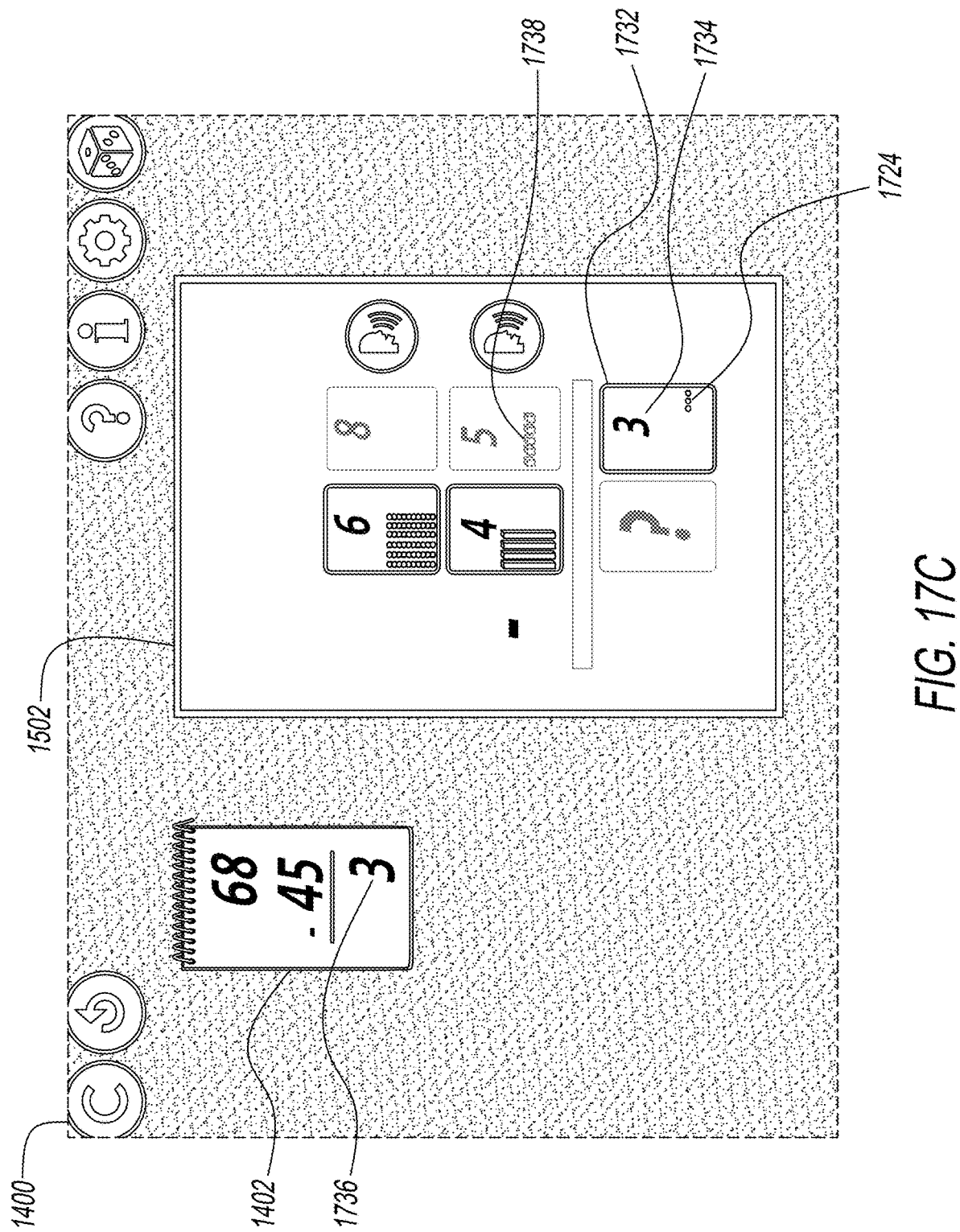

FIG. 17*c* shows the GUI 1400 after the calculator has auto completed the touch drop. A derived value card 1732 is presented in the holding area. A derived value digit (item 1734) is presented in a digit area. The remaining minuend bead tokens 1724 are shown in a token area.

They have been right justified. Prior to the current display, the calculator was adapted to show the removal tokens retract into the derived value card and then disappear. A ghost image 1738 of the original removal tokens, however, is presented in the subtrahend card as a reminder of the removal tokens of the original problem. The display area 1402 has also been updated with the corresponding derived value digit (item 1736).

Figure 17D:
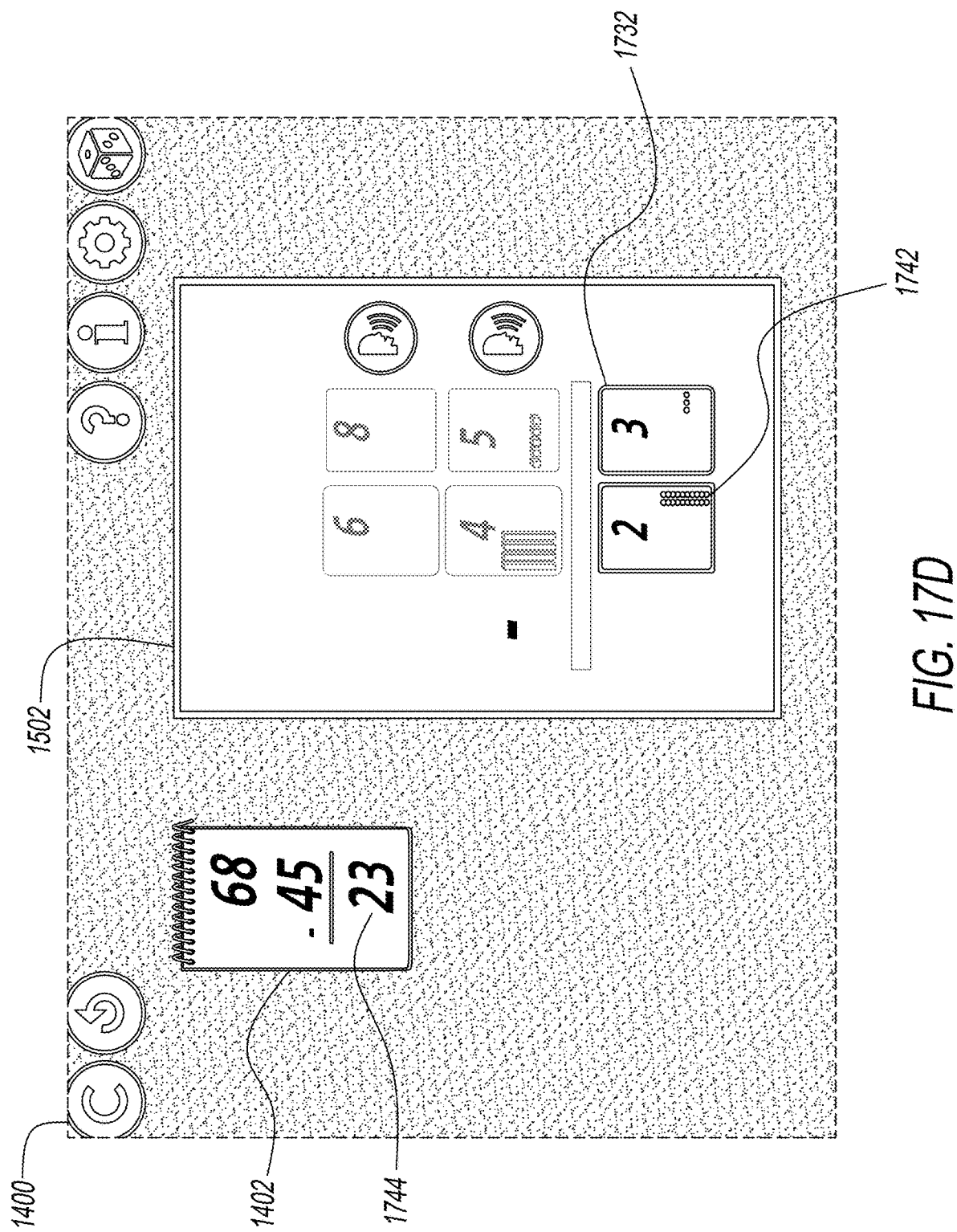

FIG. 17*d* shows the final solution to the arithmetic problem. The workspace area 1502 shows the derived value card 1742 for the tens column and the derived value card 1732 for the ones column. The display area 1402 shows the final answer (item 1744) as well.

Borrowing of Bead Tokens

Figure 18A:
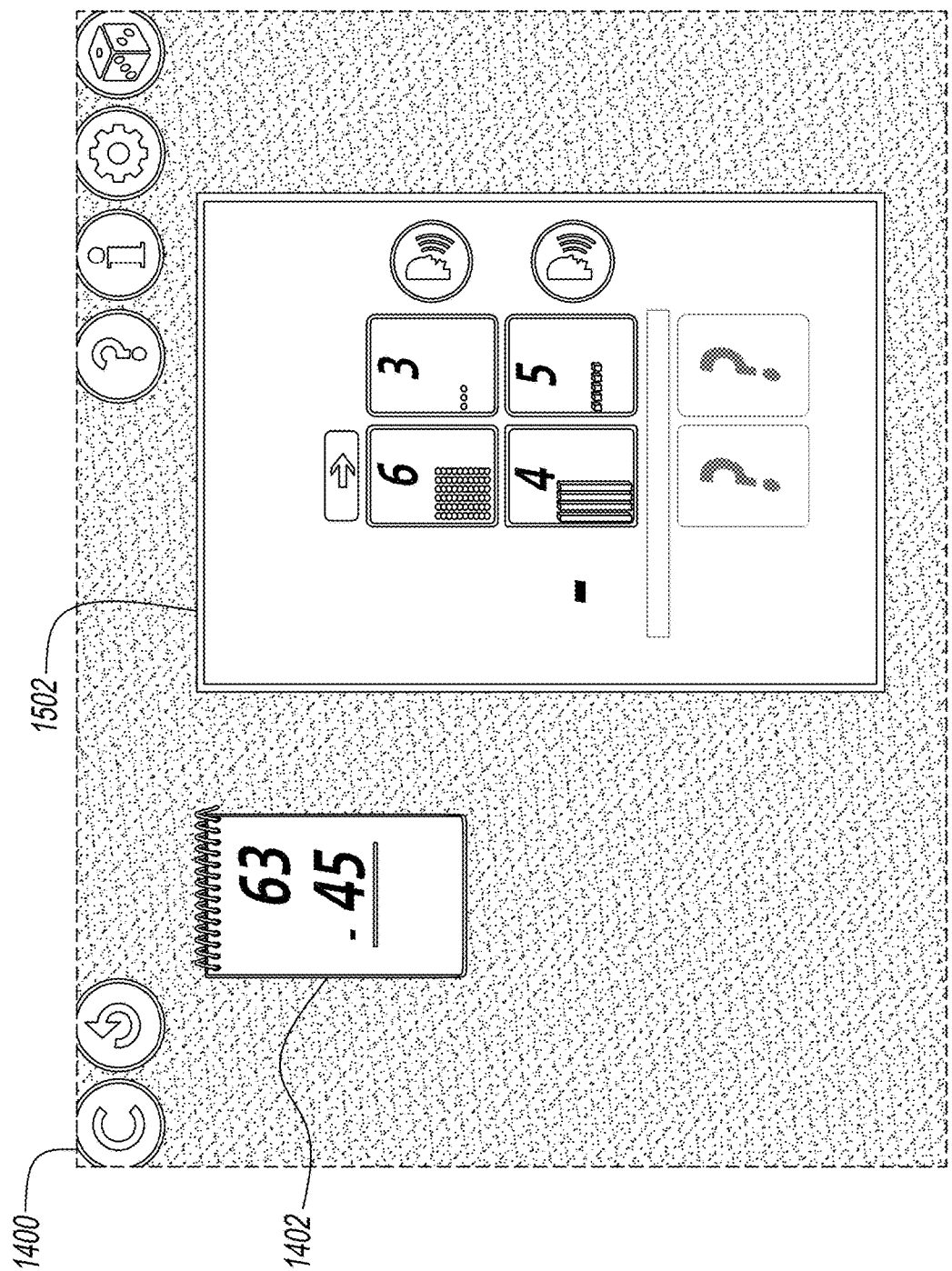
FIGS. 18a to 18h are successive GUIs showing borrowing with bead tokens in a subtraction problem.
Figure 18B:
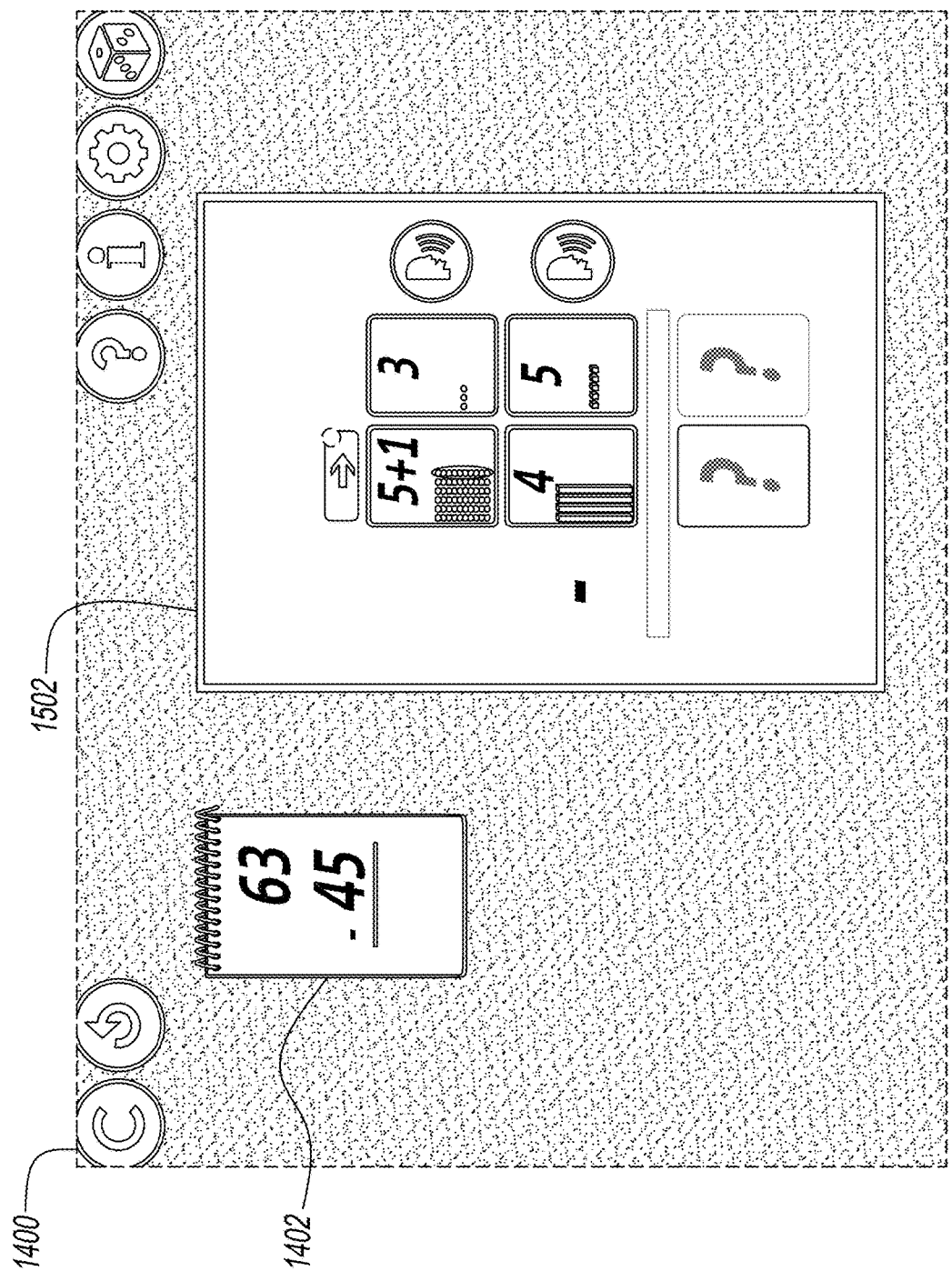
Figure 18C:
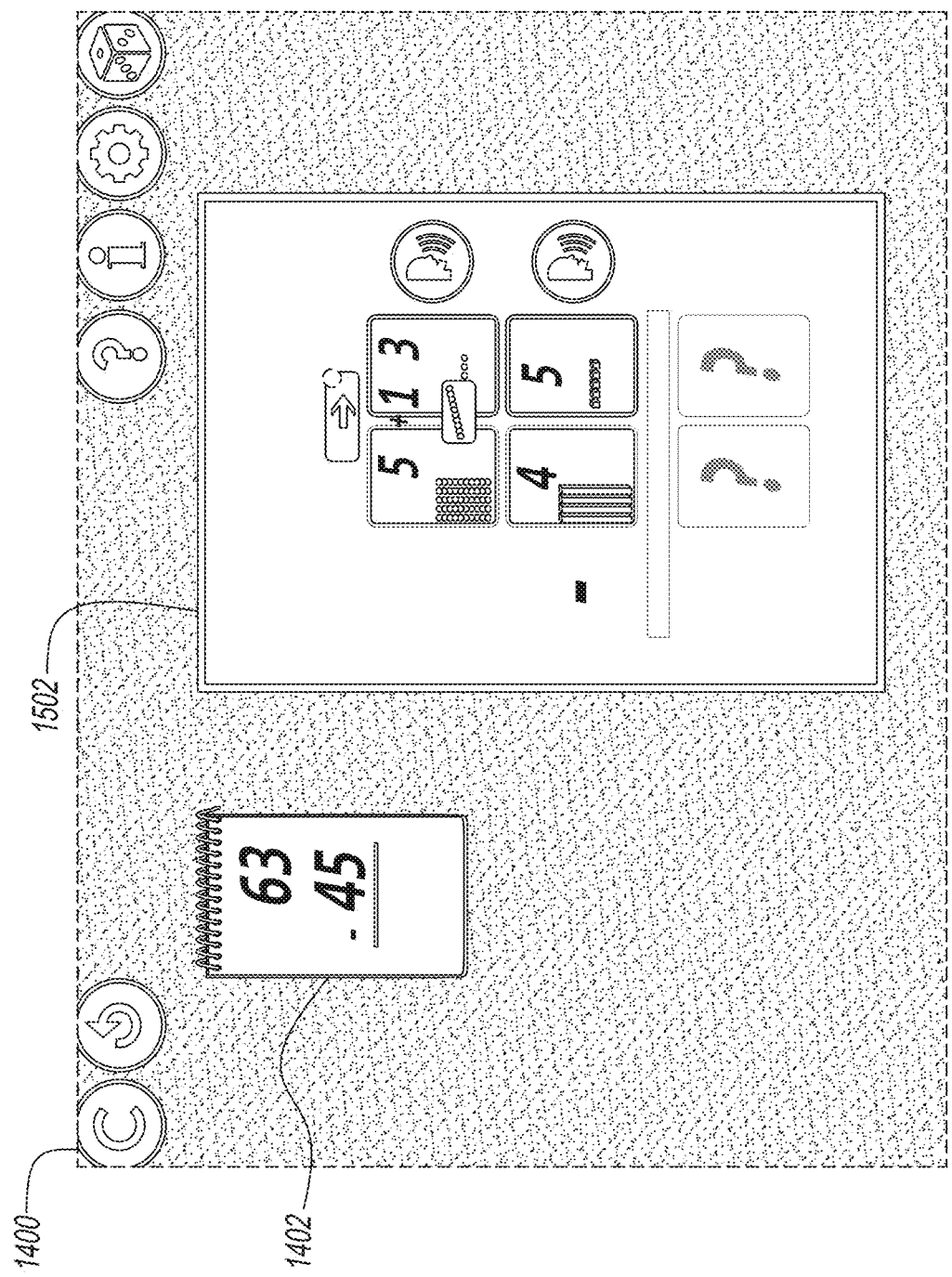
Figure 18D:
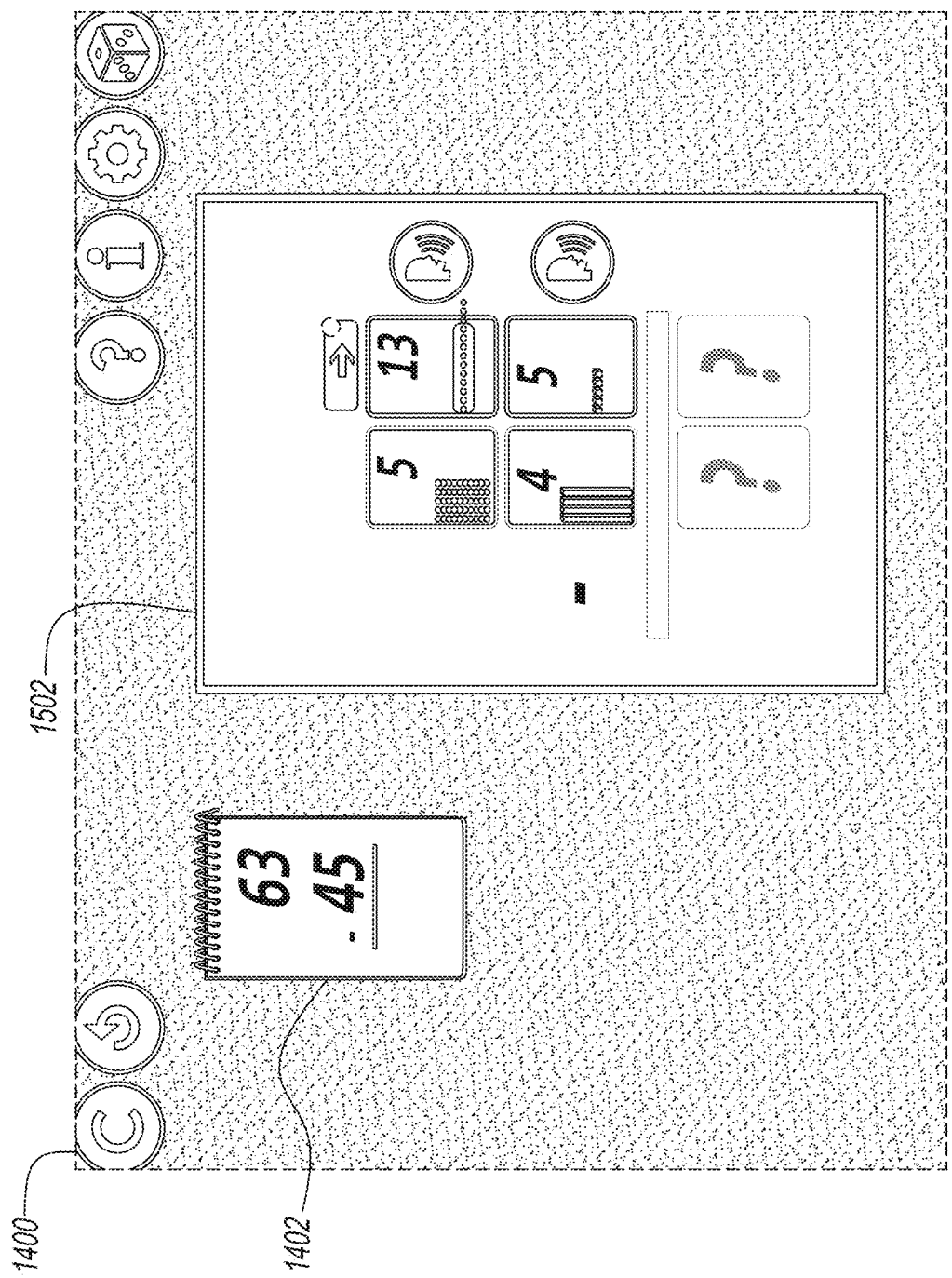
Figure 18E:
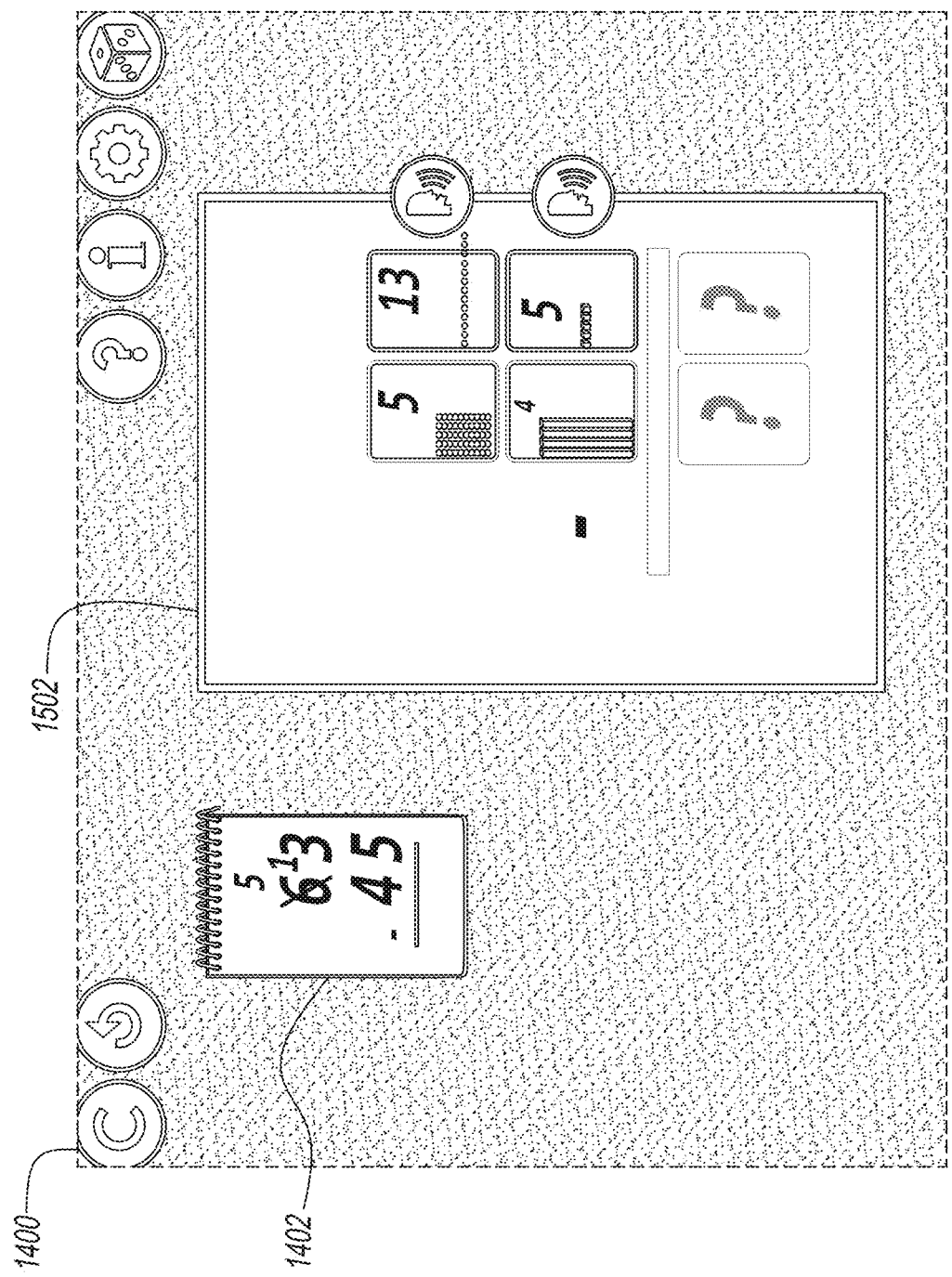
Figure 18F:
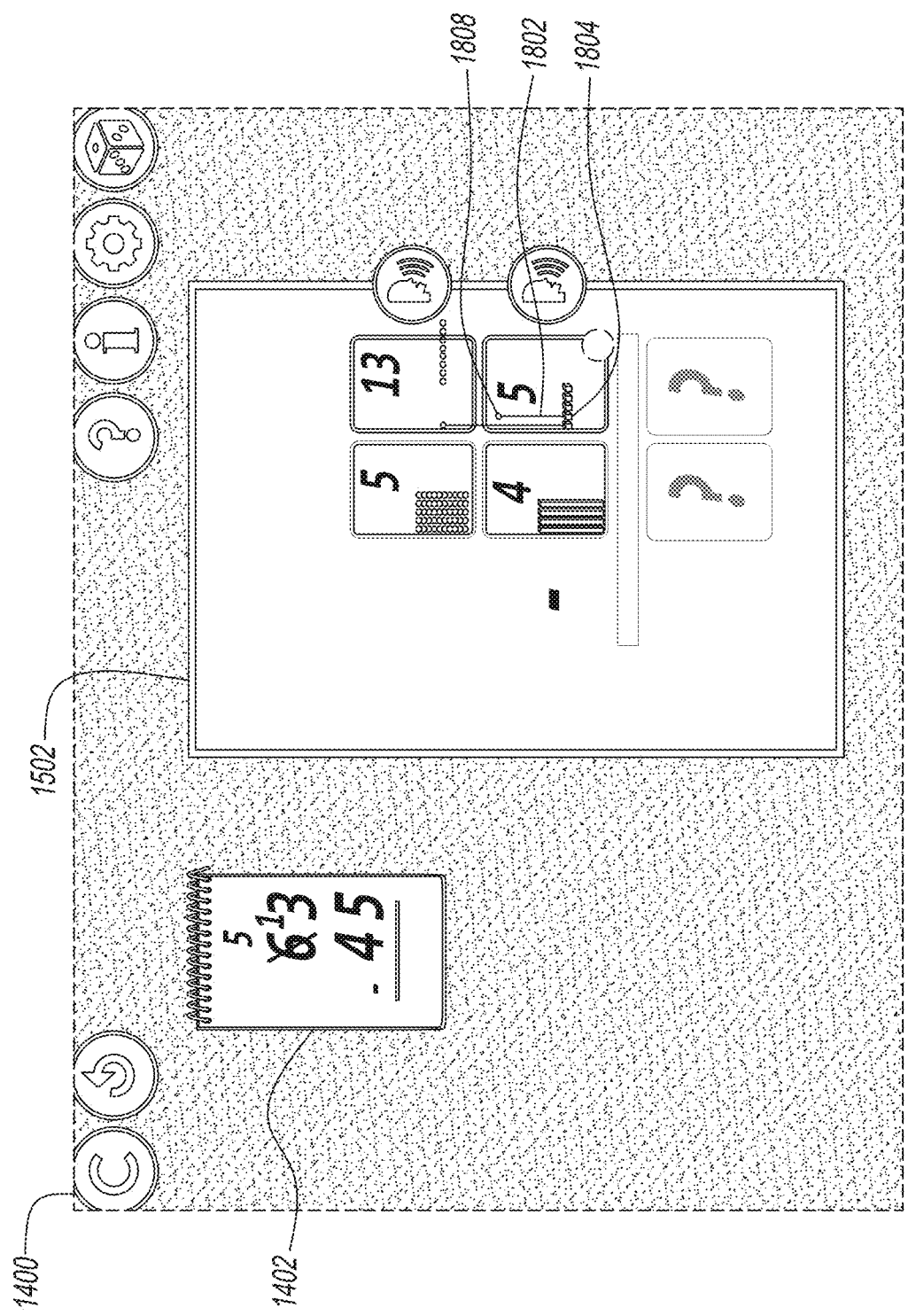
Figure 18G:
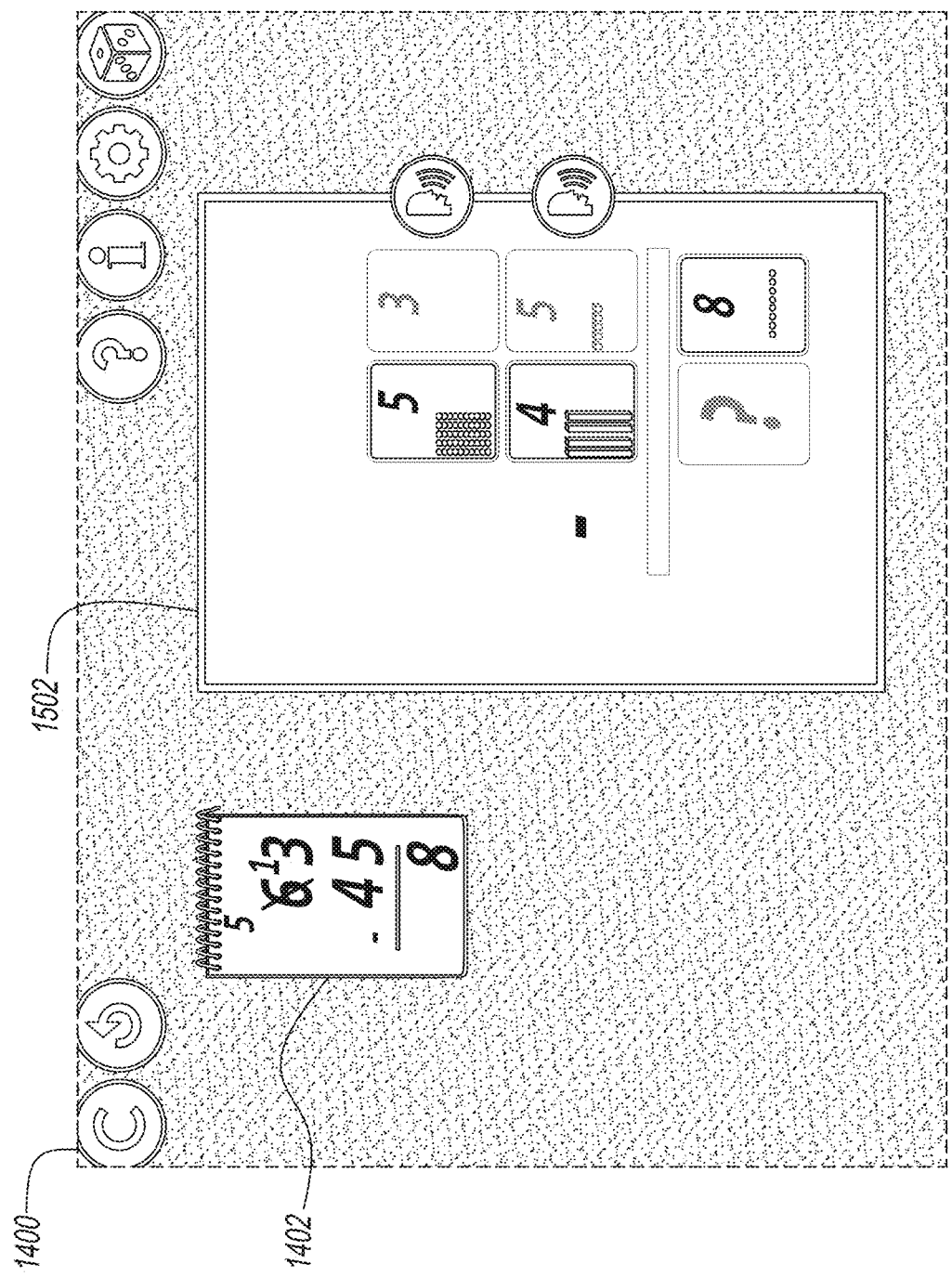
Figure 18H:
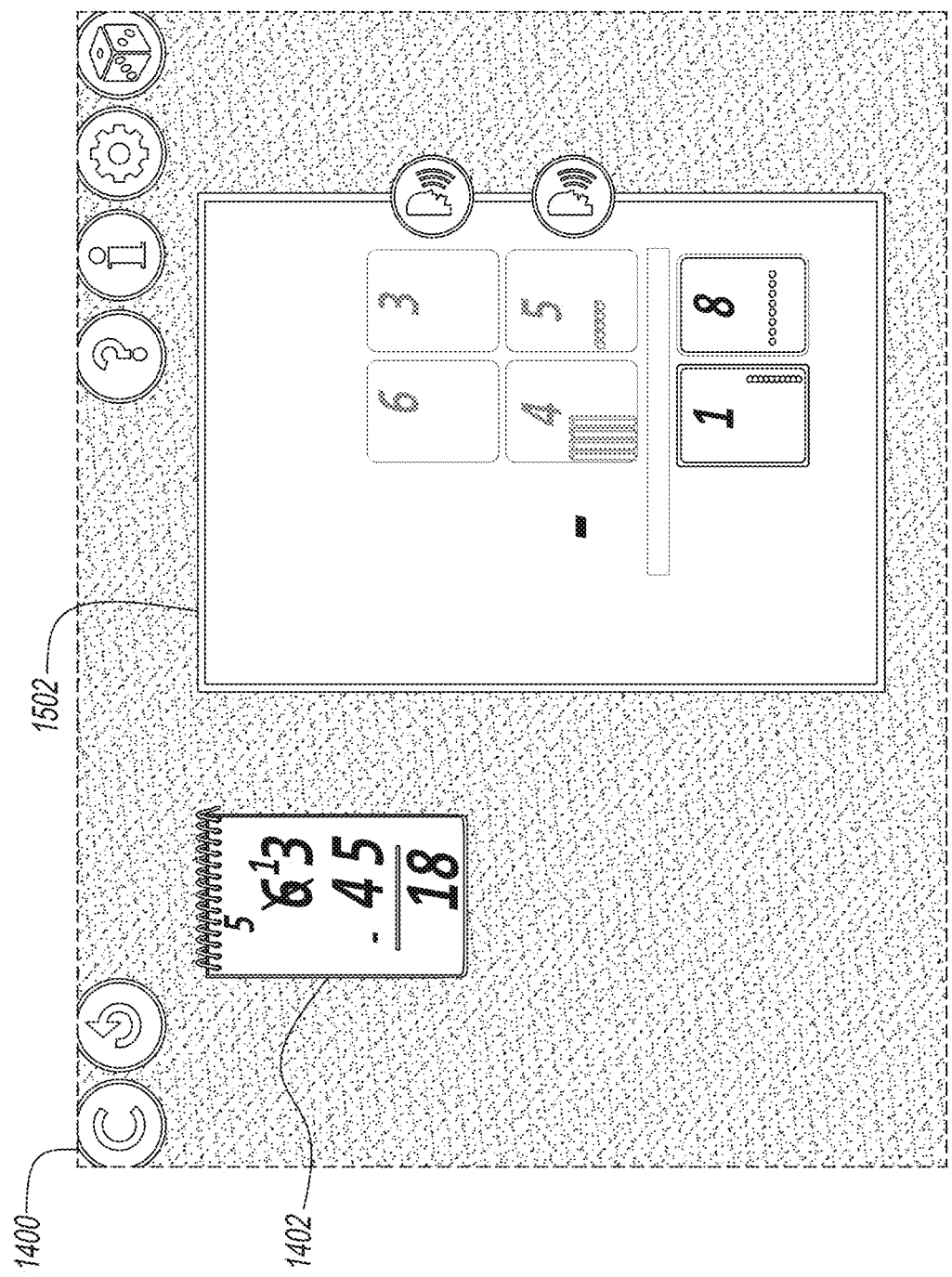
Figure 19A:
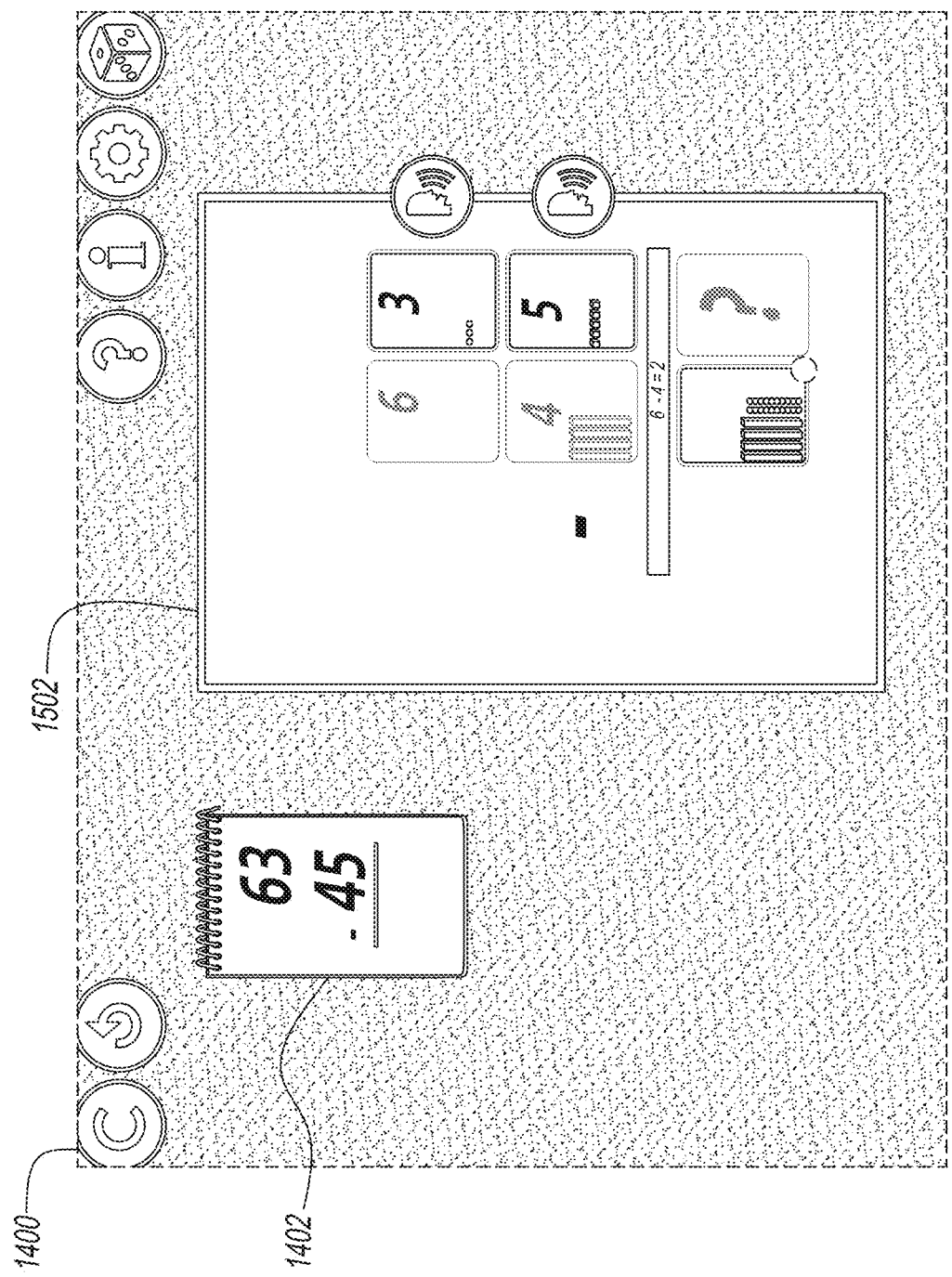
FIGS. 19a to 19d are successive GUIs showing a dead end in subtraction with bead tokens.
Figure 19B:
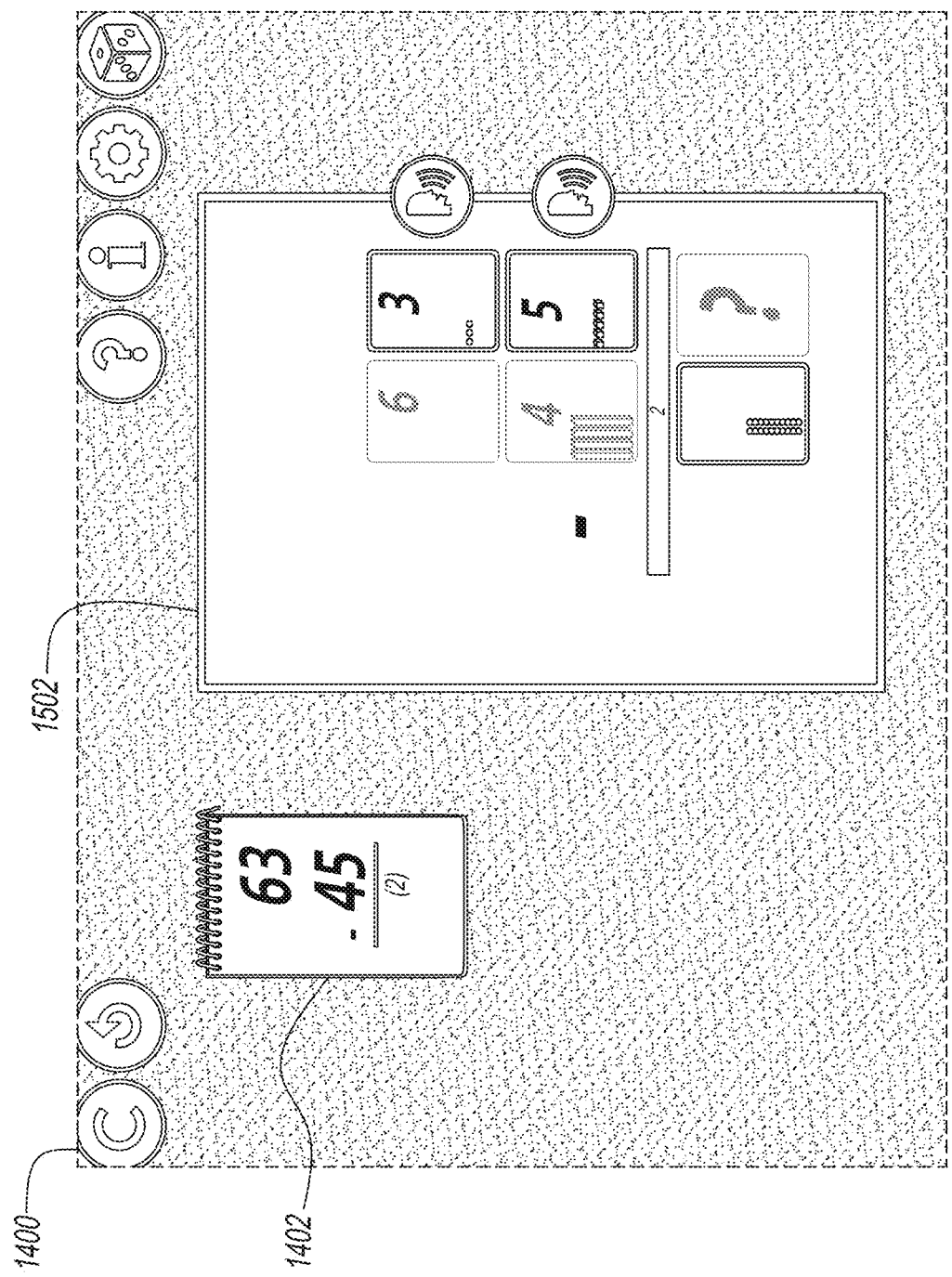
Figure 19C:
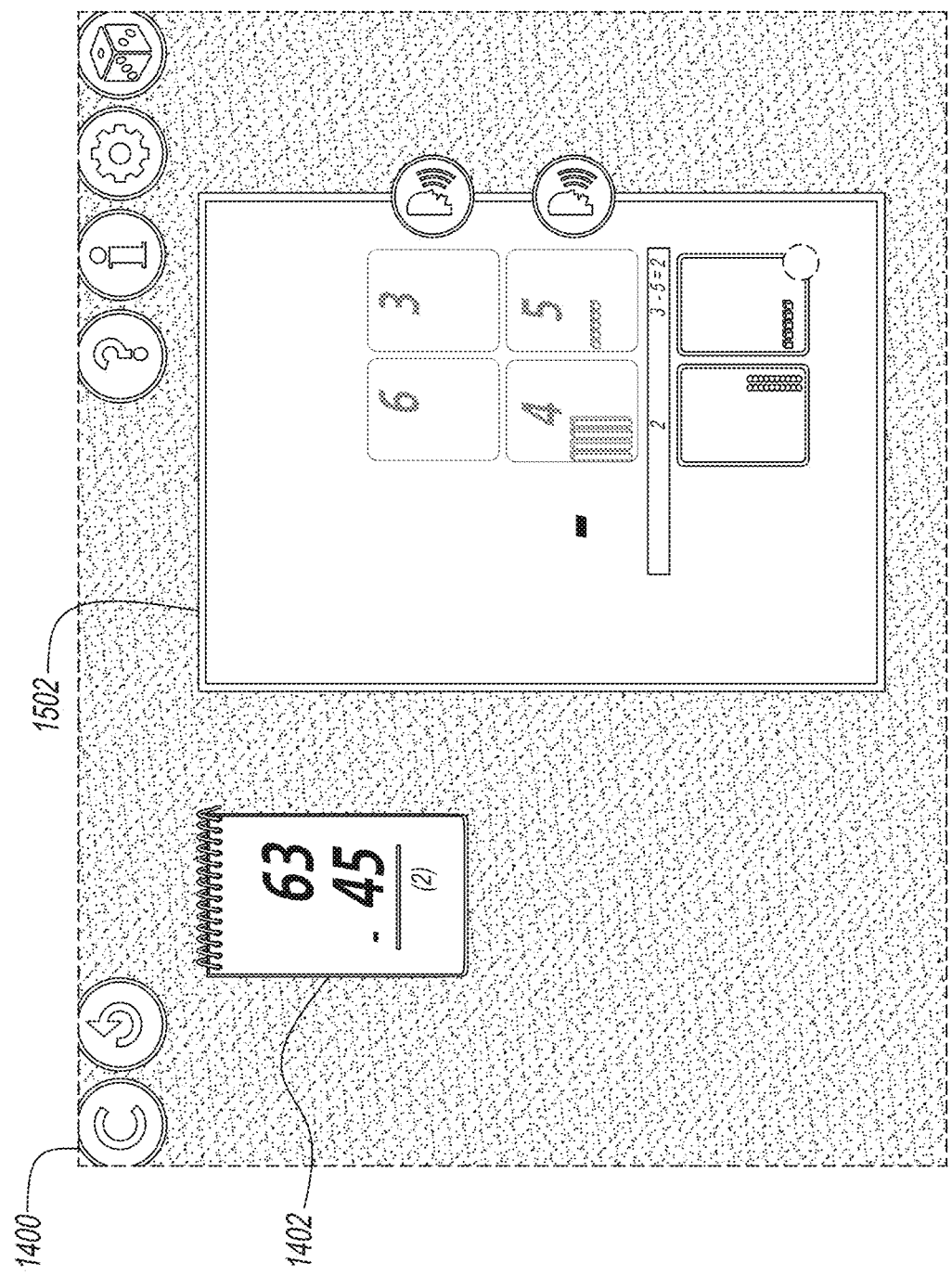
Figure 19D:
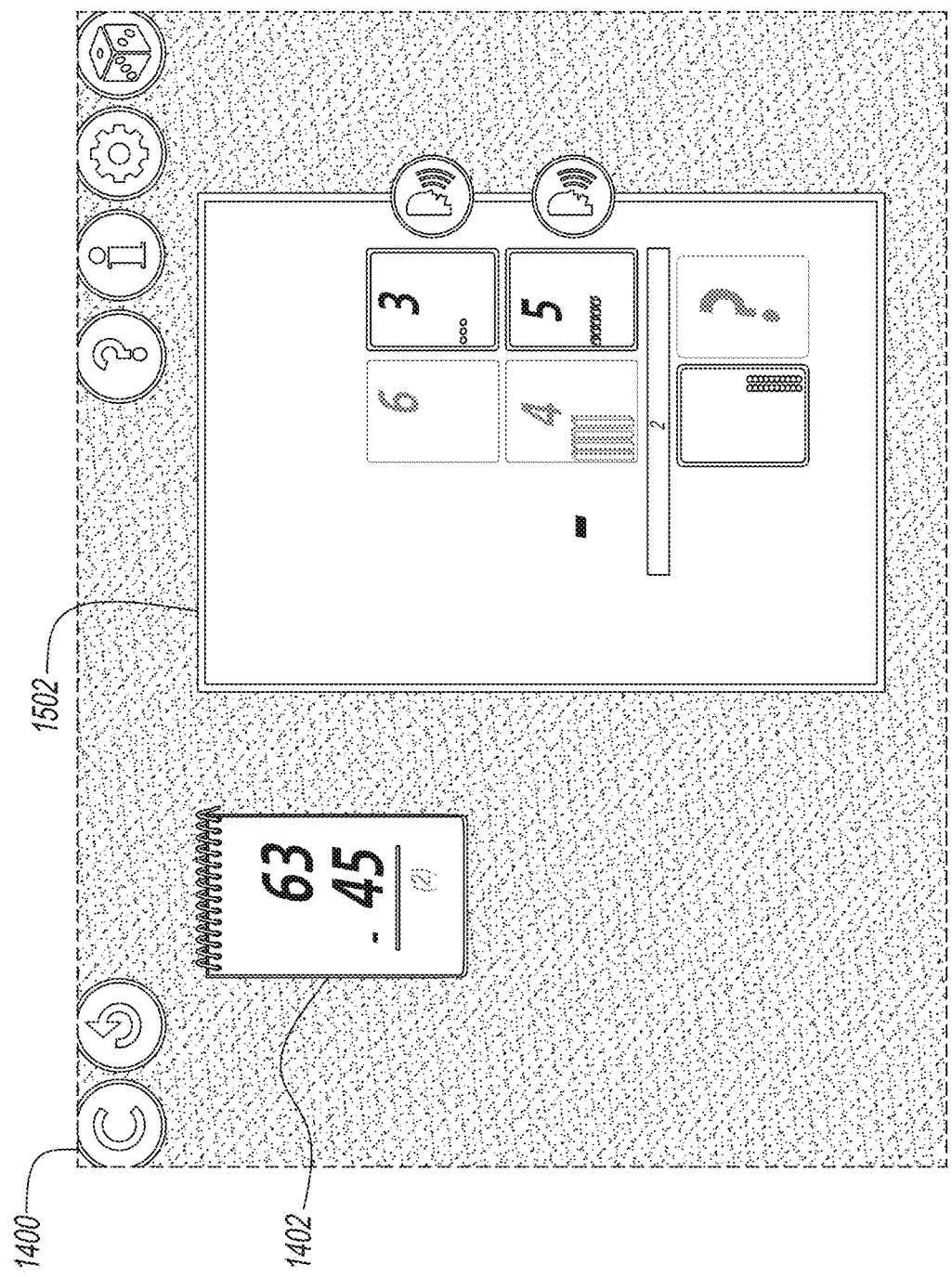

FIGS. 18*a* to 18*h* show successive GUIs 1400 of an embodiment of the calculator that has borrowing of bead tokens for a subtraction problem. FIG. 18*f* shows an alternative method of removing bead tokens. Lines 1802 proceed up from removal tokens 1804 and pull down minuend bead to be removed 1808.

Allowing a Borrowing Dead End

FIGS. 19*a* to 19*d* show successive GUIs 1400 of an embodiment of the calculator that allows a user to touch drop digit cards in different place value columns of a subtraction problem in any order, even if said order leads to a dead end since a given minuend digit card is no longer available to borrow from.

Scaling Display of the Digit Cards

Figure 20:
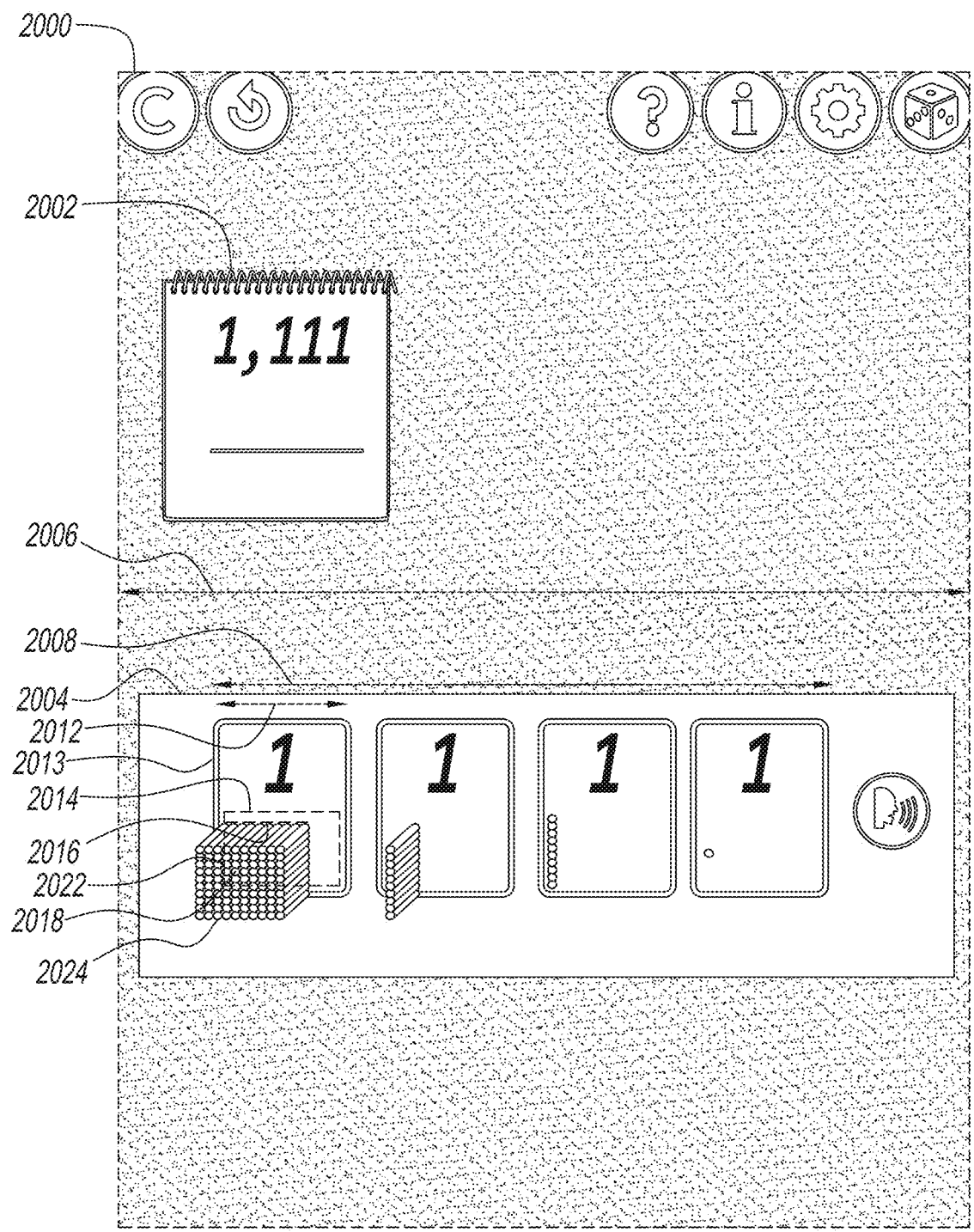
FIG. 20 is a GUI showing bead tokens for different place value columns.
Figure 21:
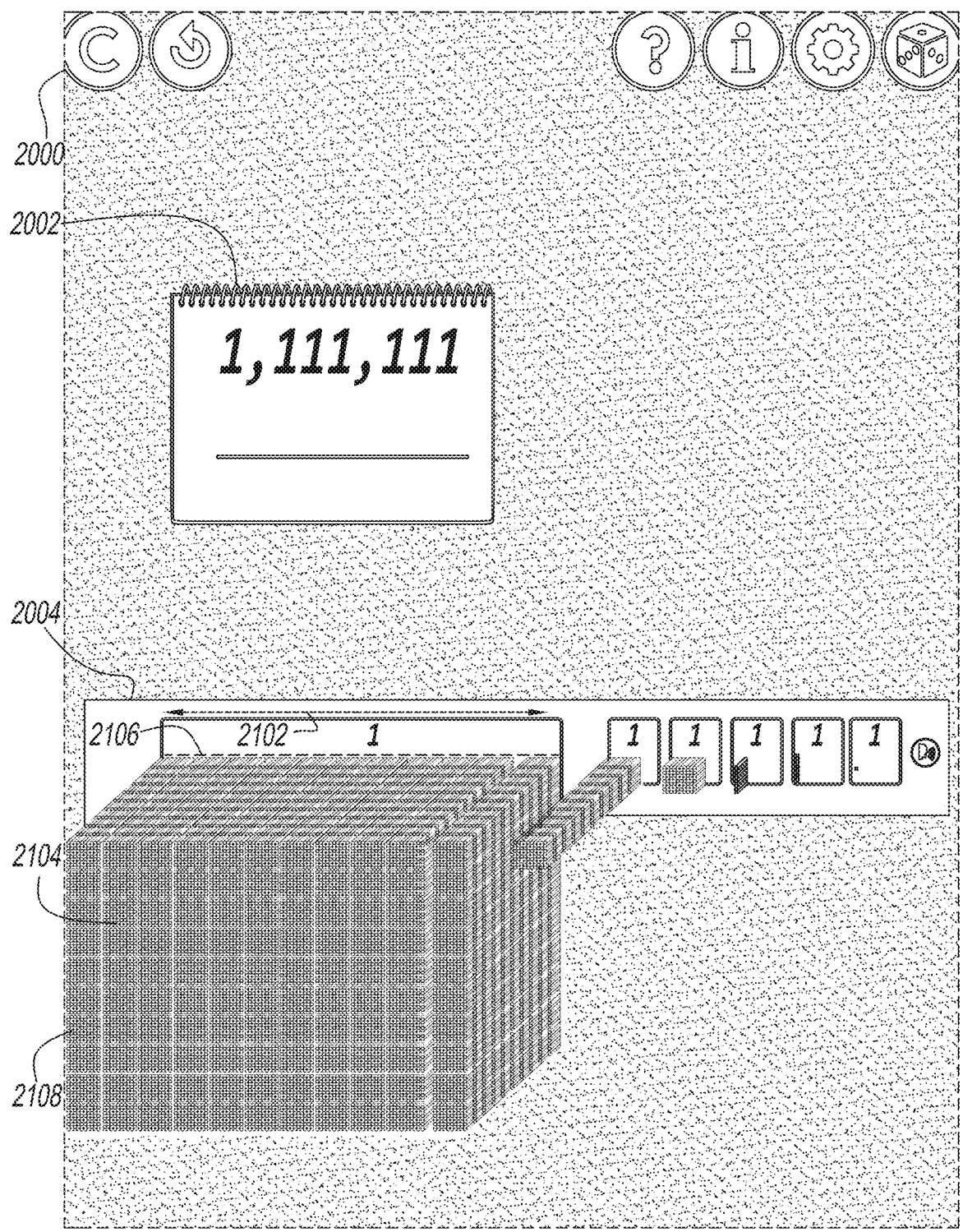
FIG. 21 is a GUI showing bead tokens for large place value columns.
Figure 22A:
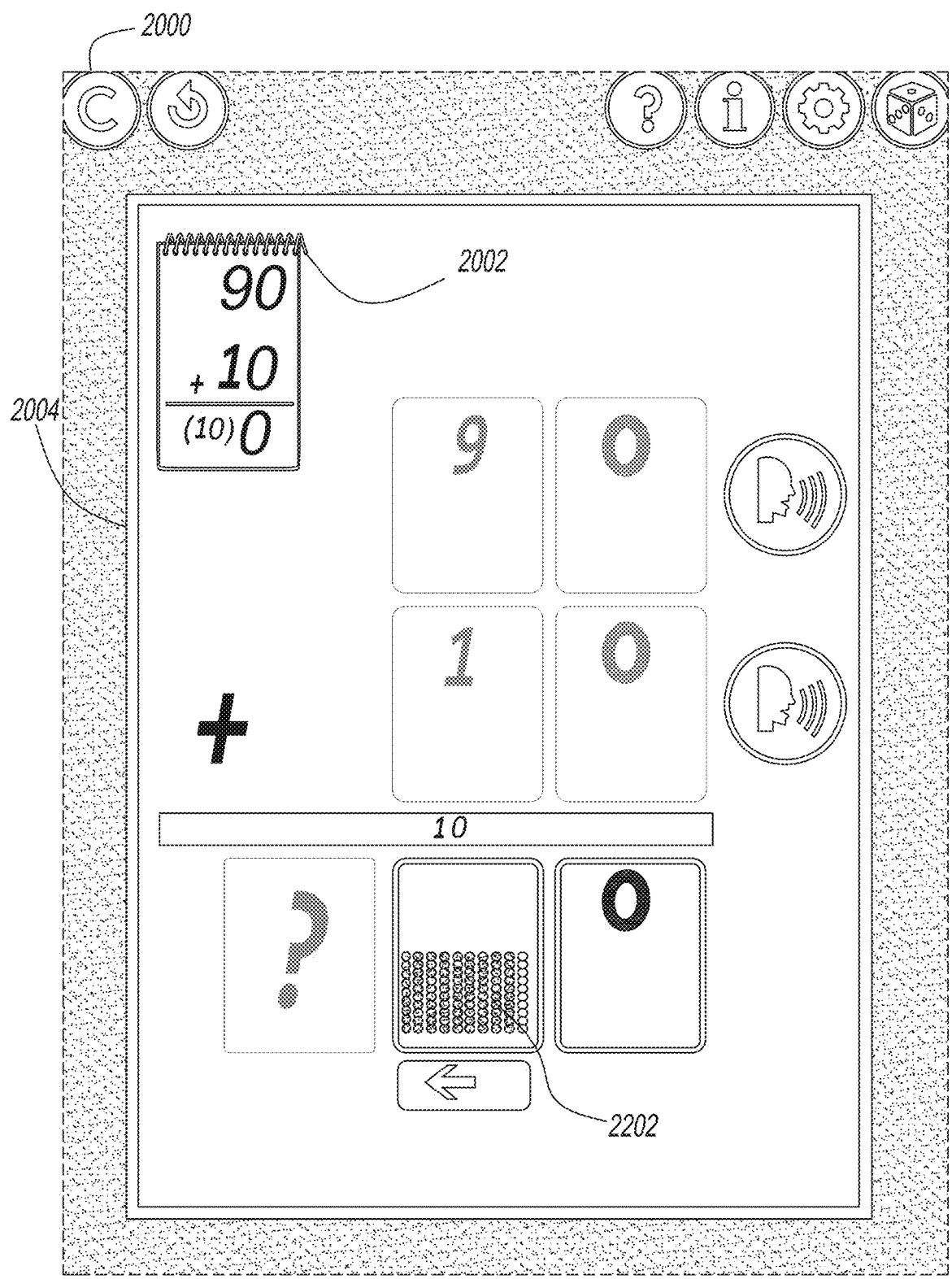
FIGS. 22a to 22d are successive GUIs showing an embodiment of carrying with bead tokens.
Figure 22B:
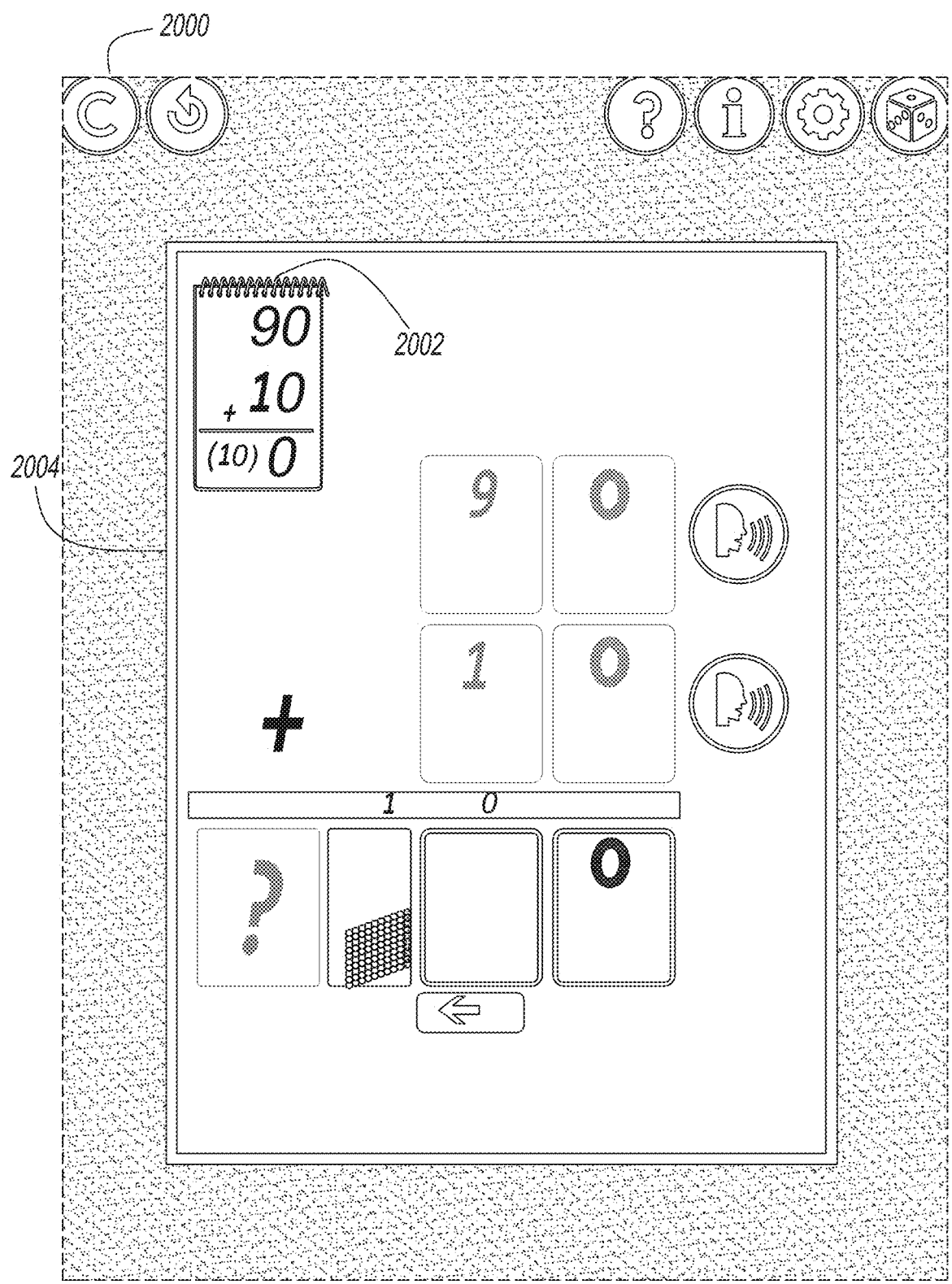
Figure 22C:
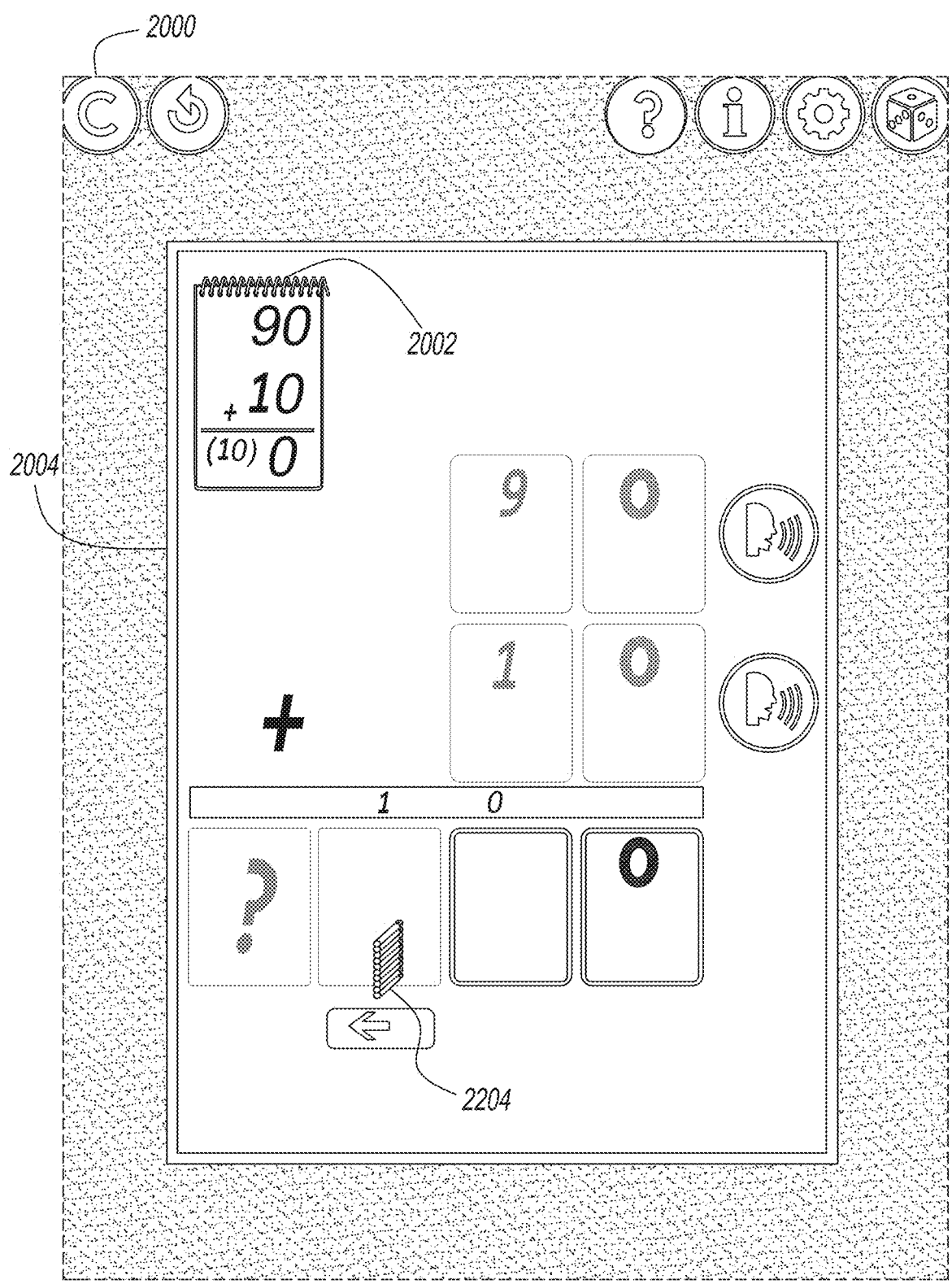
Figure 22D:
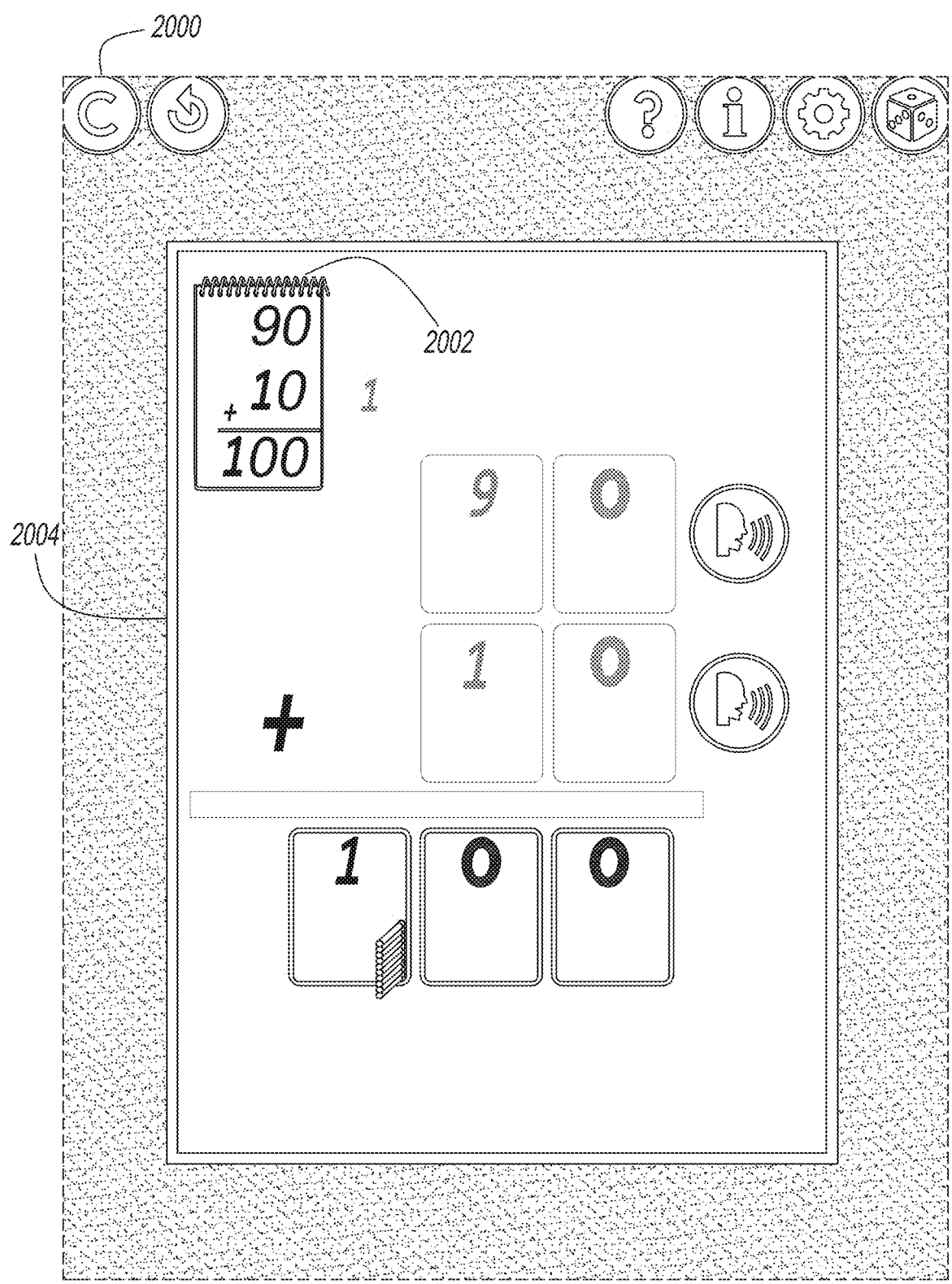

FIGS. 20 and 21 show alternative GUIs 2000 of an embodiment of the calculator that determines the proper scaling of digit cards so that all required digit cards will fit within the physical width of a display. FIGS. 20 and 21 also show how bead tokens can be displayed so that it appears that bead tokens are on a digit card even if their total rendered image extends outside of a digit card boundary.

In FIG. 20 the GUI 2000 of the display of the calculator has a physical width 2006. The widths 2012 of all of the digit cards are proportionally scaled so that all digit cards will fit 2008 within the width of the display. The display shown in FIG. 20 is the display after the first number of an arithmetic problem has been entered and the user has selected the view button (item 1403 FIG. 14b). If the user had entered the entire arithmetic problem and selected the execute button (item 1407 FIG. 14c), then the calculator would have determined the required widths of the derived value cards and would have proportionally adjusted the widths of the derived value cards so that they would all physically fit within the width of the display.

FIG. 20 also shows the upper edge 2016 of the base of a bead token 2018 can be aligned with the top 2014 of a token area 2022 of a digit card 2013. Thus the bead token will appear to be on said digit card even though a portion 2024 of the rendering of the bead token is outside of the token area.

FIG. 20 also shows a display area 2002.

FIG. 21 shows an additional example where the top edge 2106 of the base of a bead token 2104 fits within the width 2102 of a digit card but the full rendering of the bead token itself would extend beyond the physical edges 2108 of the display screen of the calculator.

Transition of 10 Tens Bars to 1 Hundreds Slab

FIGS. 22a to 22d show successive GUIs 2000 of an embodiment of the calculator that is adapted to carry 10 tens bars (item 2202 FIG. 22a) from a tens column and transition said 10 tens bars into 1 hundreds slab (item 2204 FIG. 22c) during a carry operation.

Transition of 10 Hundreds Slabs to 1 Thousands Cube

Figure 23A:
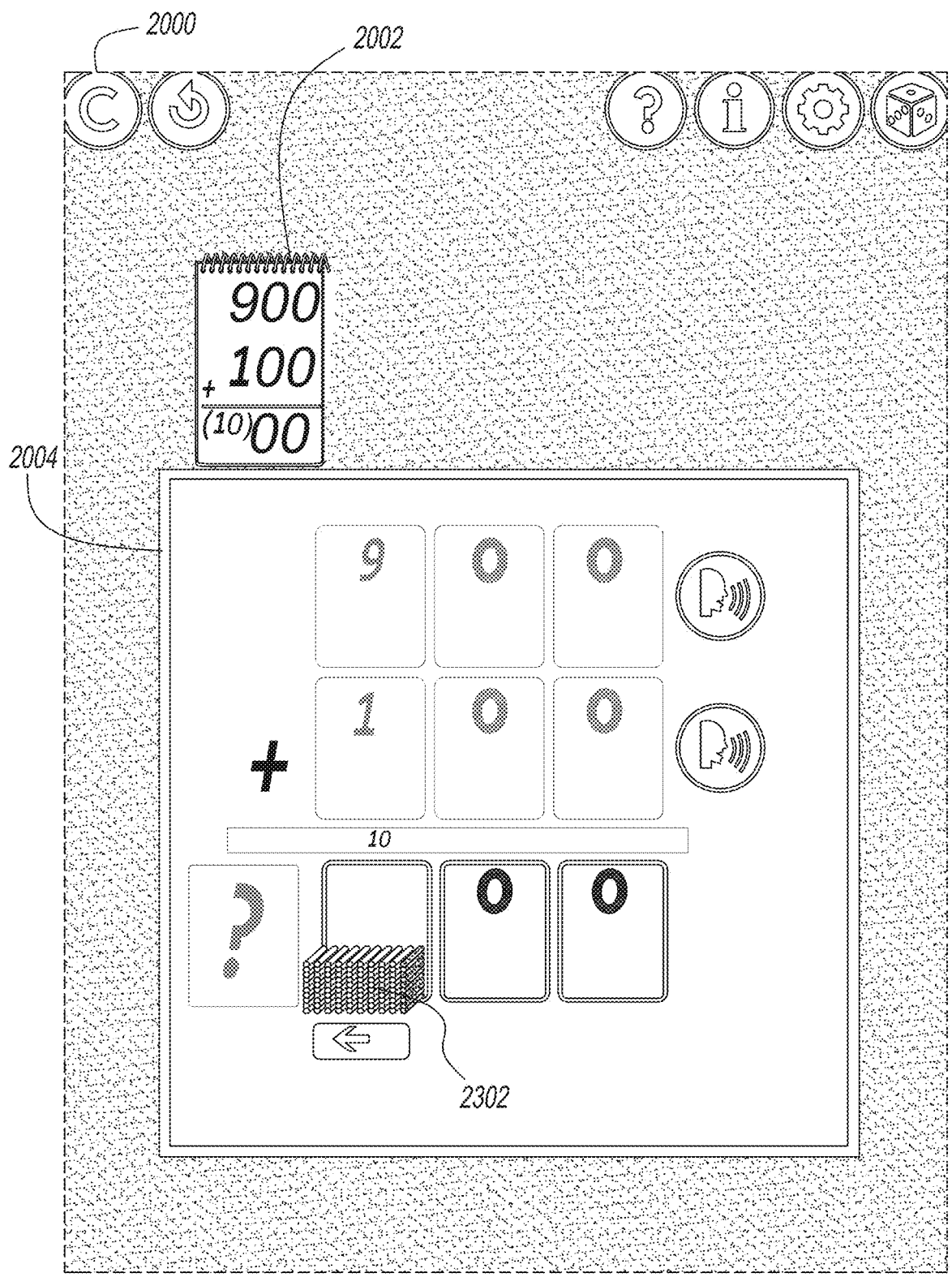
FIGS. 23a to 23c are successive GUIs showing an embodiment of carrying with bead tokens.
Figure 23B:
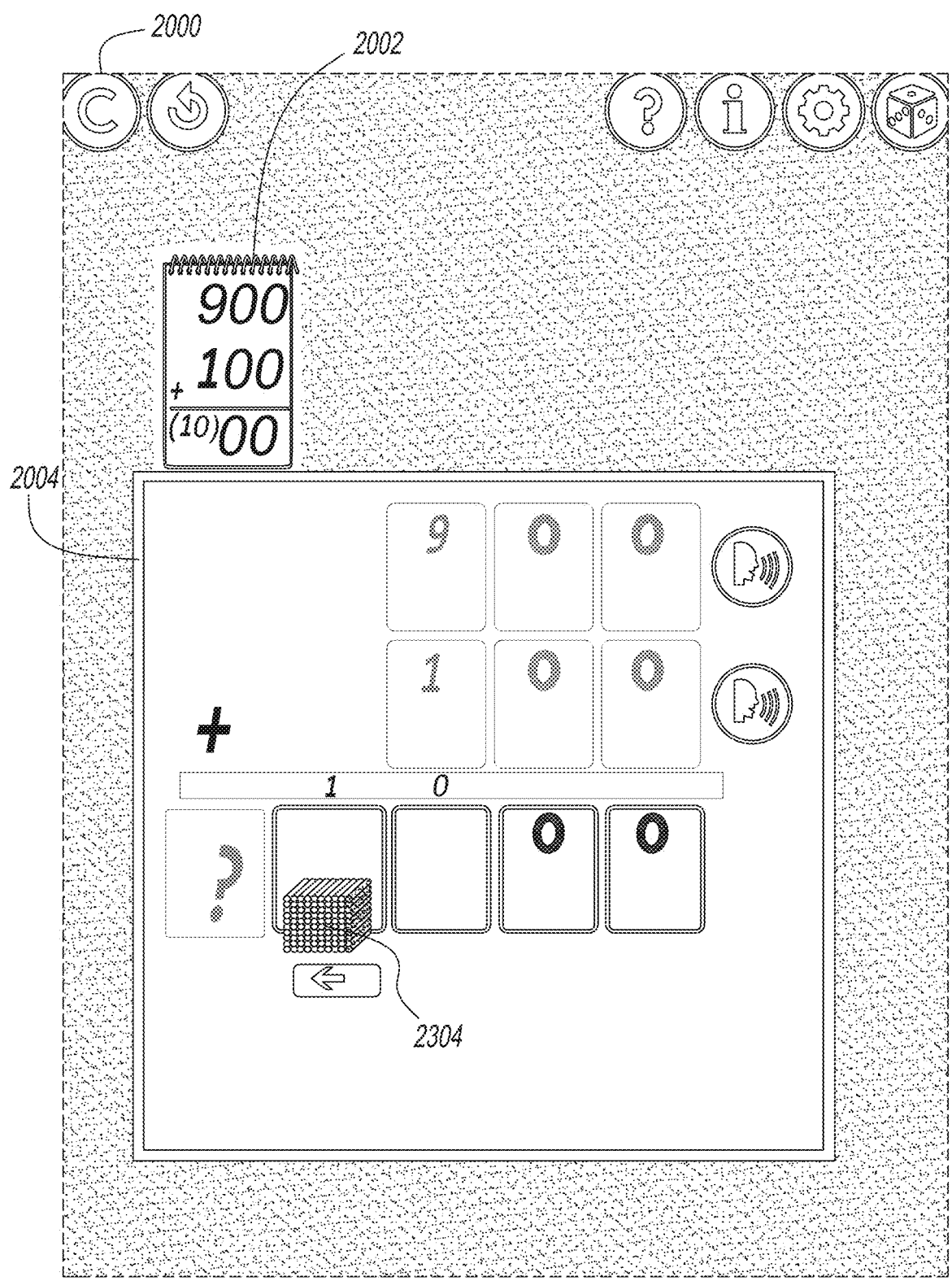
Figure 23C:
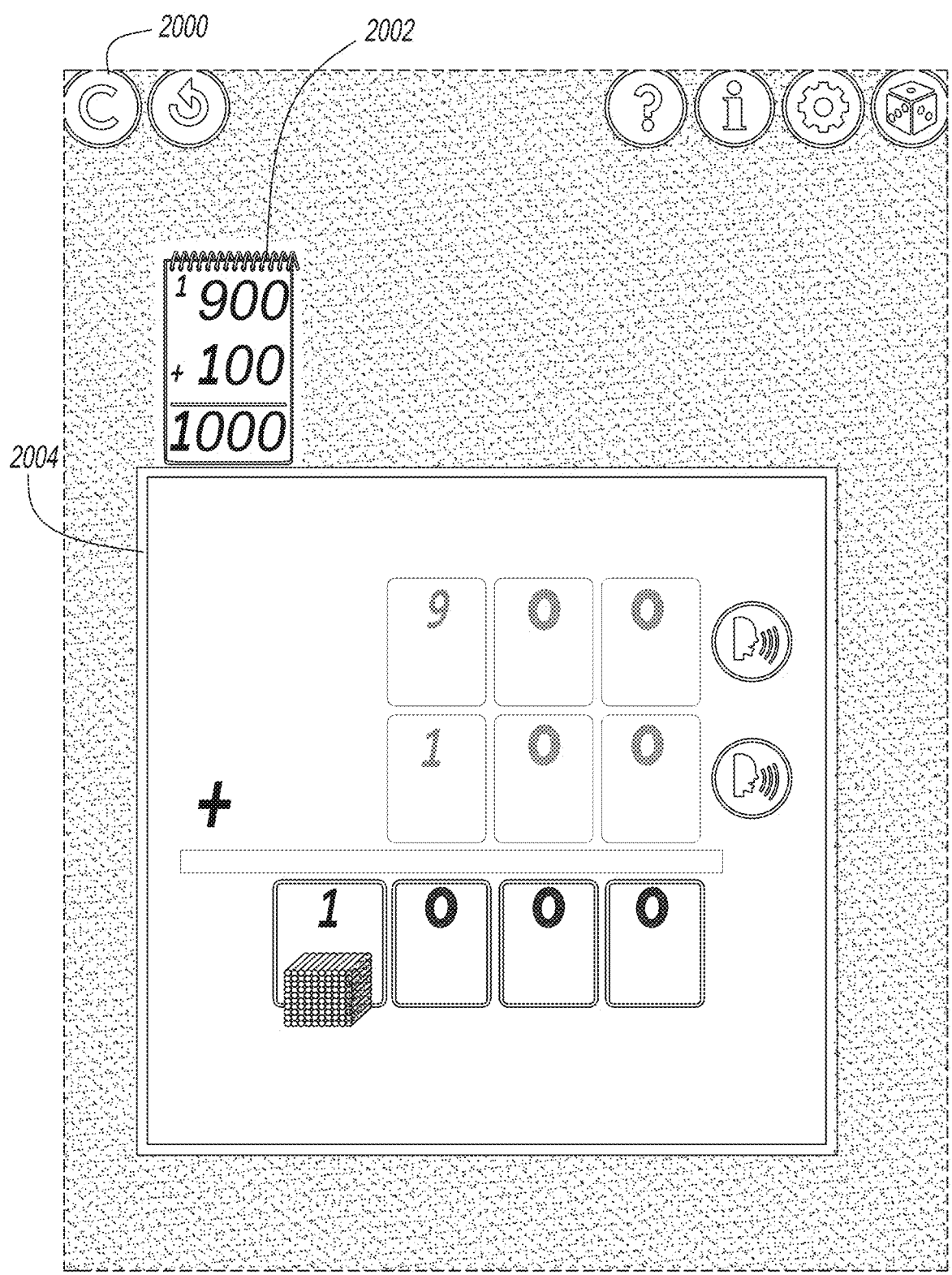

FIGS. 23a to 23c show successive GUIs 2000 of an embodiment of the calculator that is adapted to carry 10 hundreds slabs (item 2302 FIG. 23a) from a hundreds column and transition said 10 hundreds slabs into 1 thousands cube (item 2304 FIG. 23b) during a carry operation.

Transition of 10 Thousands Cubes to 1 Ten Thousands Stick

FIGS. 24a to 24f show successive GUIs 2000 of an embodiment of the calculator that is adapted to carry 10 thousands cubes (item 2402 FIG. 24b) from a thousands column and transition said 10 thousands cubes into 1 ten thousands stick (item 2404 FIG. 24e) during a carry operation. FIGS. 24a to 24f also show how a calculator may be adapted to determine the relative widths of the digit cards in each place value column prior to display of a workspace area 2004 such that all derived value cards that will be used in the course of the calculation will be wide enough to accommodate the bead tokens that will be displayed thereupon.

Figure 24A:
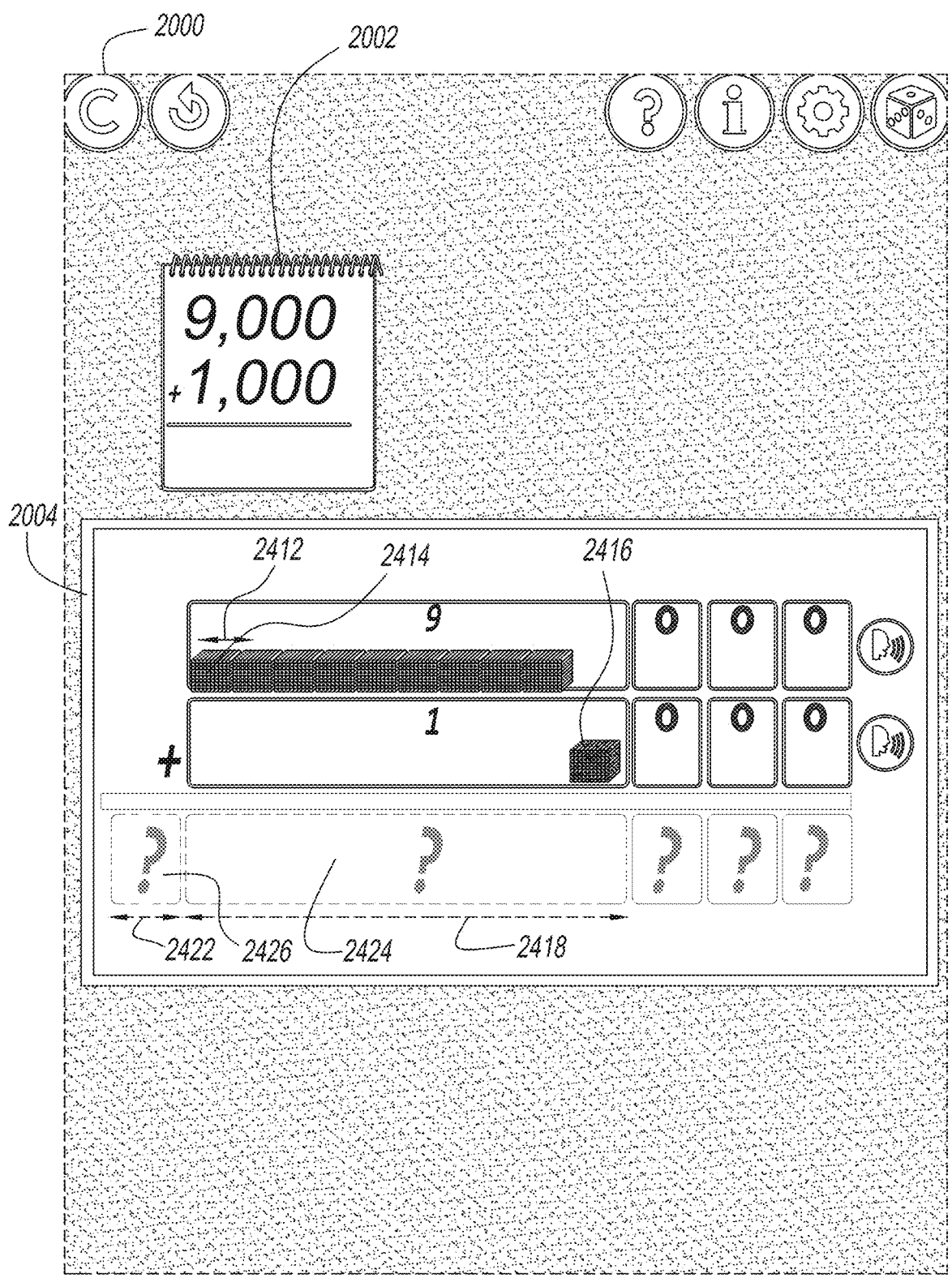
FIGS. 24a to 24f are successive GUIs showing an embodiment of carrying with bead tokens.
Figure 24B:
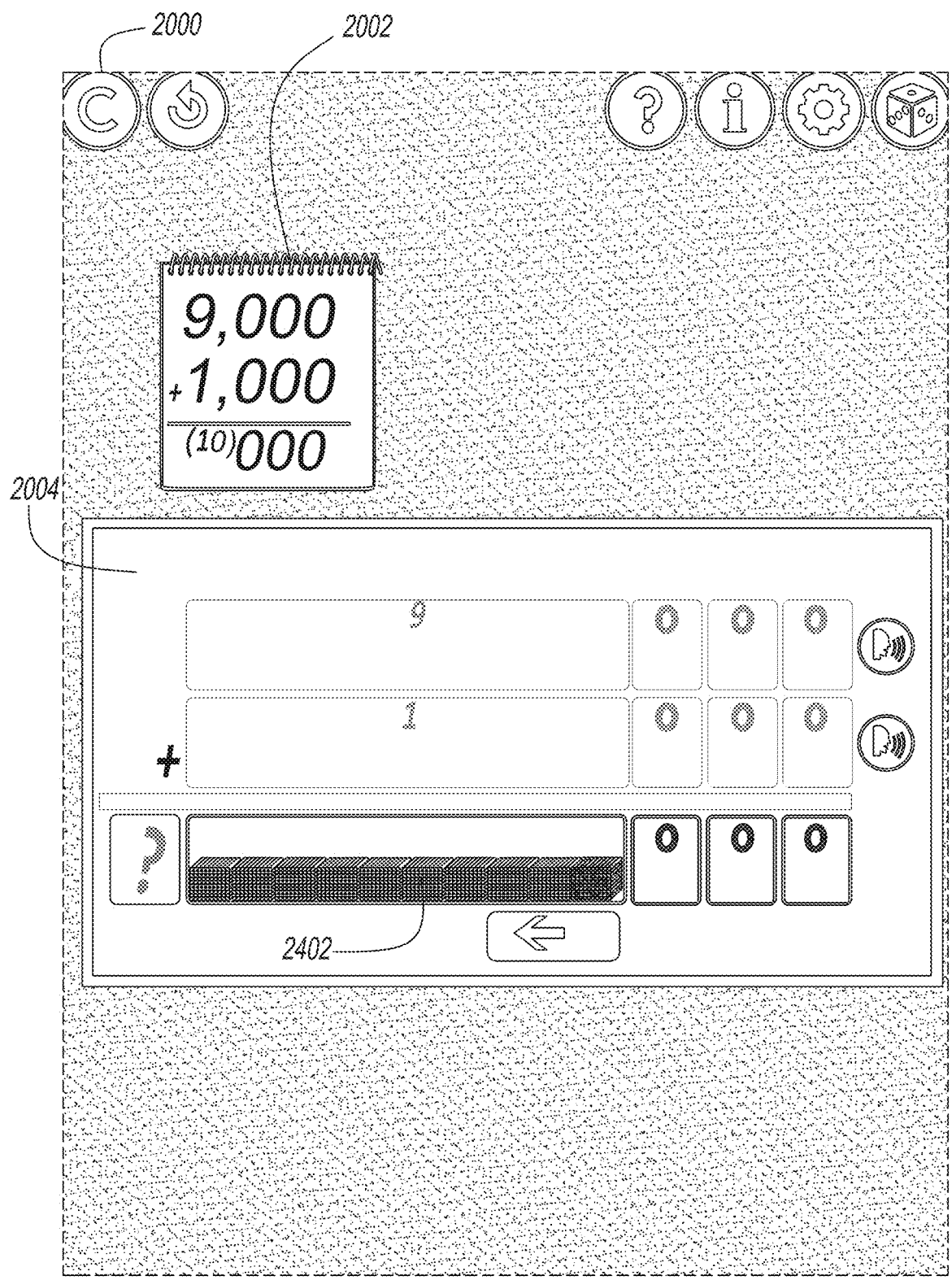
Figure 24C:
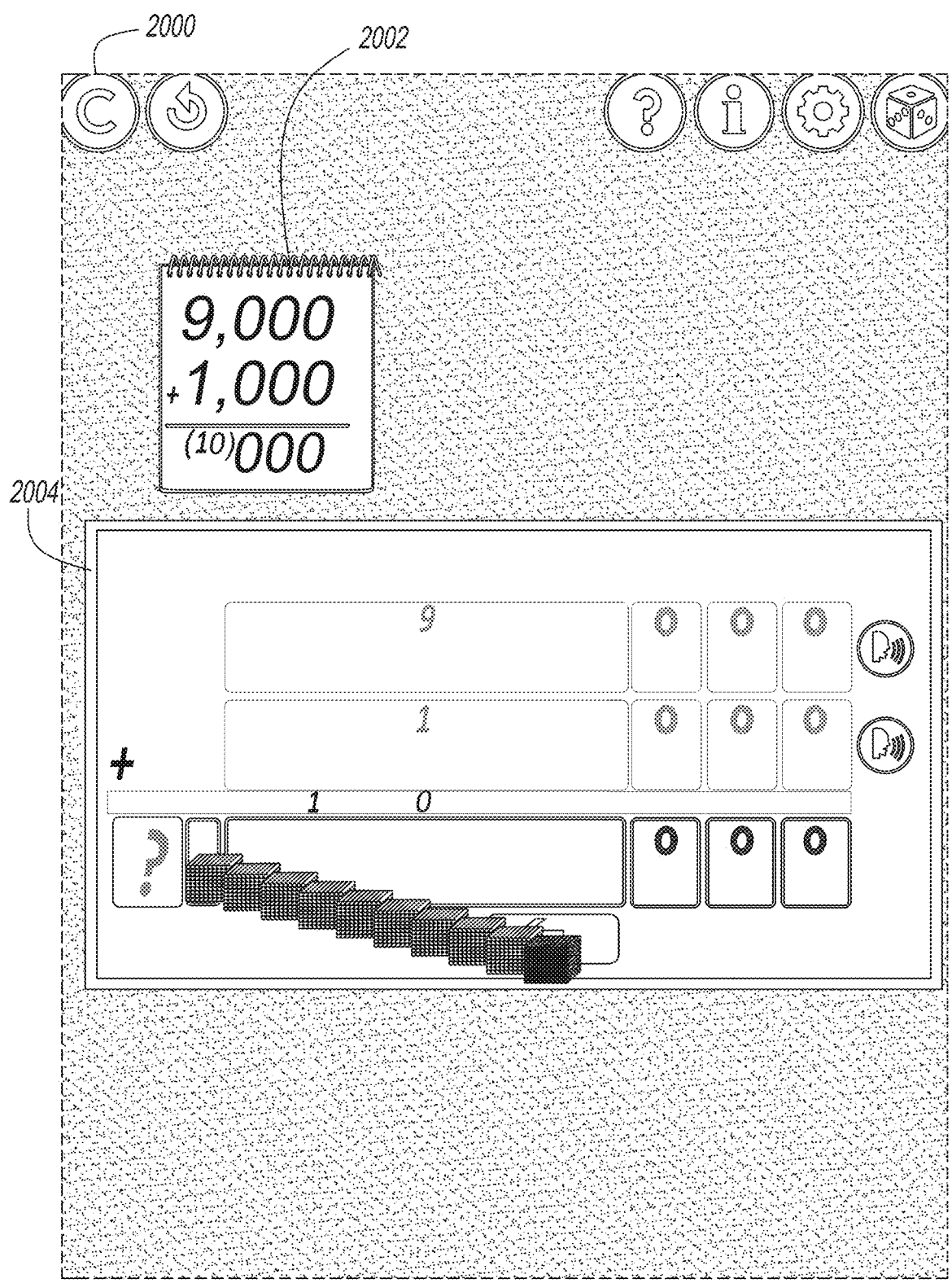
Figure 24D:
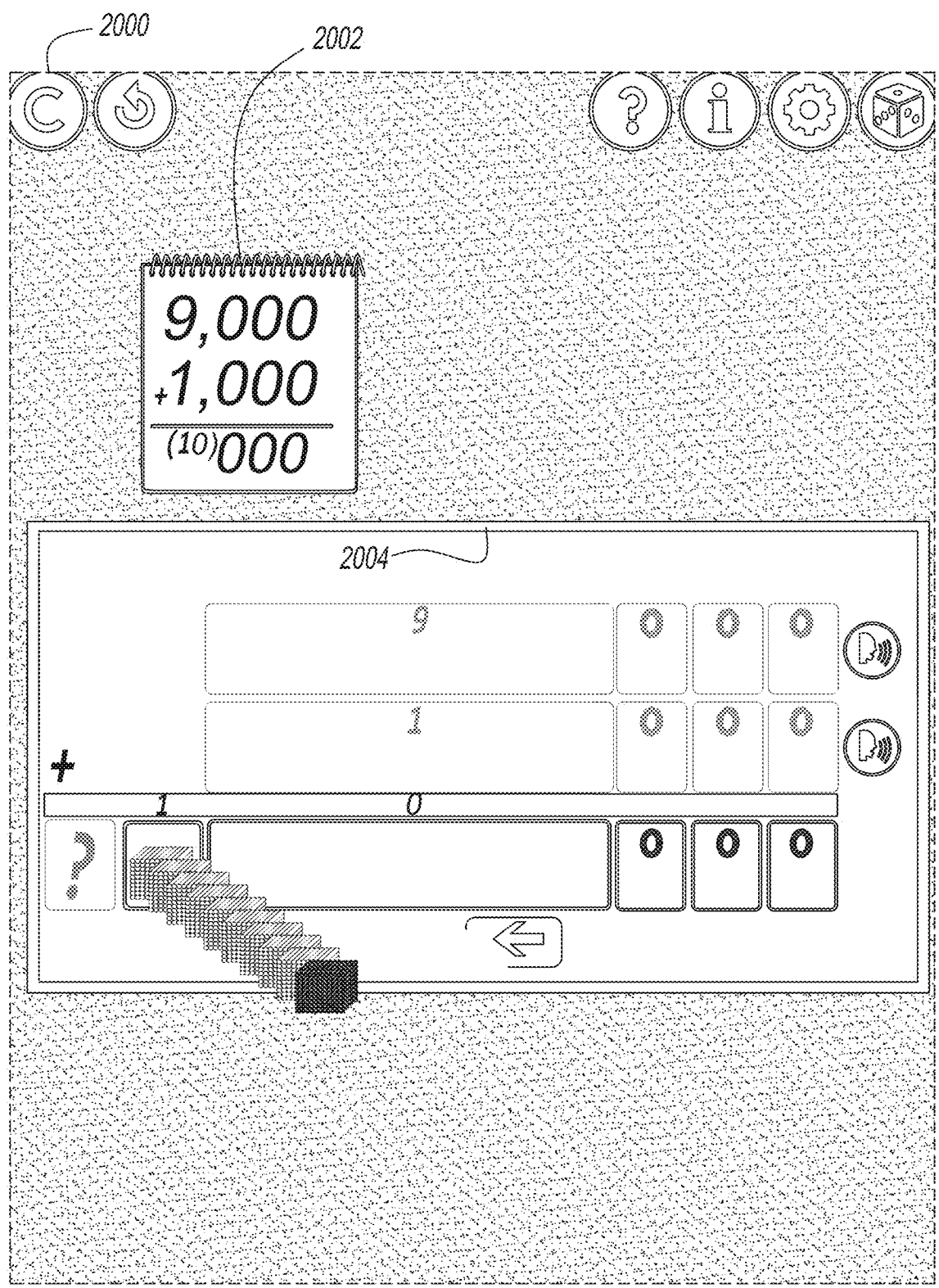
Figure 24E:
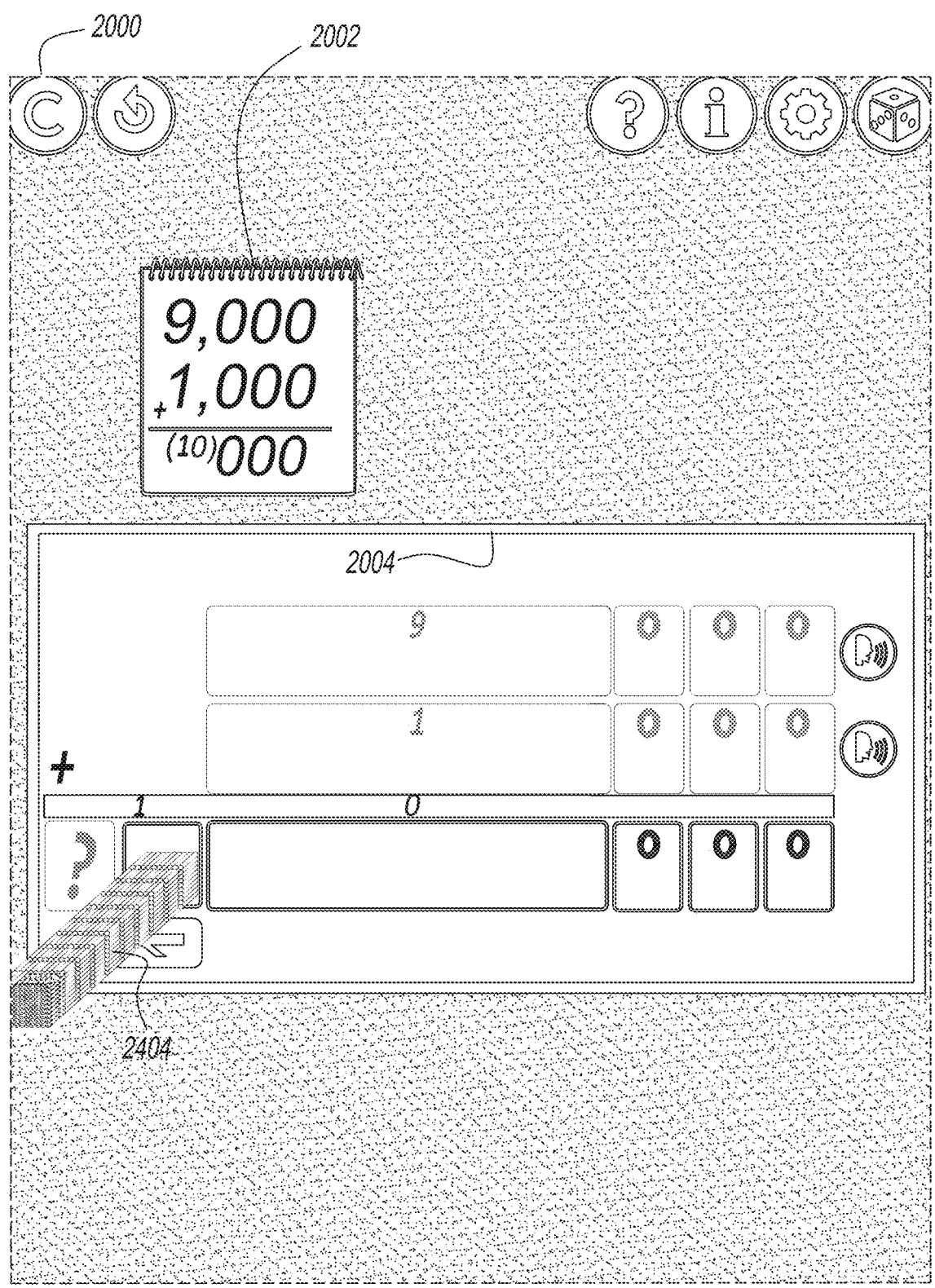
Figure 24F:
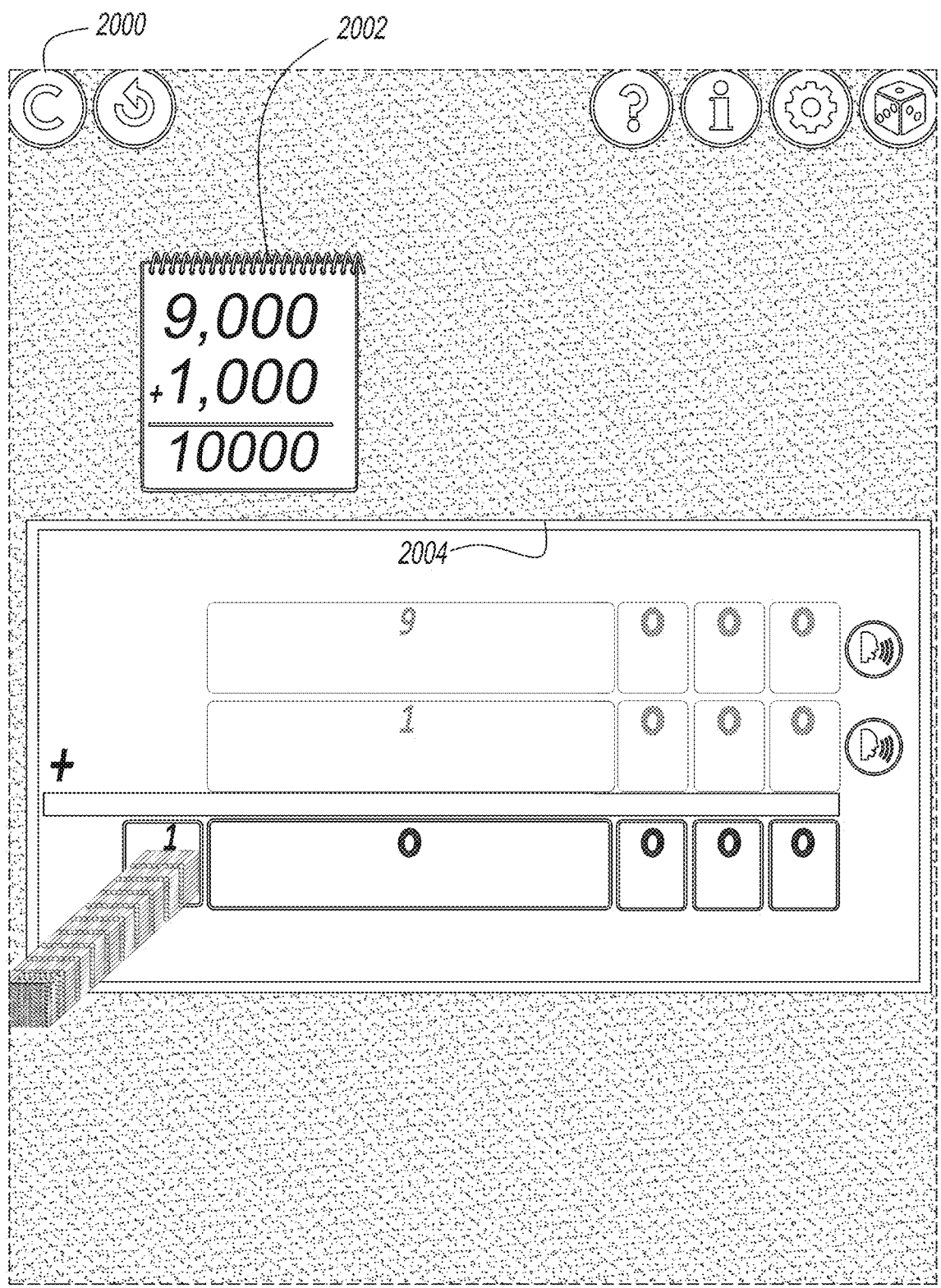

Referring to FIG. 24a, the arithmetic problem to be solved is "9,000+1,000". The bead tokens to be displayed in the augend thousands column digit card are 9 thousands cubes (item 2414). Each thousands cube has a base with a width 2412. In the course of calculation the solution to the arithmetic problem in the workspace area 2004, 10 thousands cubes will be carried to the ten thousands column and transformed into a single ten thousands stick. Prior to displaying the workspace area 2004, the calculator carried out the following steps:

1) determine a total number of columns required to be displayed and derived value cards to be calculated during the course of calculating a solution to said arithmetic problem;
2) determine the maximum number of said bead tokens to be displayed on said derived value cards during the course of said solution to said arithmetic problem; and
3) adjust the width (e.g. items 2422 and 2418) of said digit cards to be displayed in each column to be equal to or greater than said maximum number of tokens to be displayed on said derived value cards in each column times the width of said bases of said bead tokens for each column.

In this example, the derived value card 2424 in the thousands column will have to display 10 thousands cubes side by side. The width 2418 of said derived value card is set to be at least 10 times the width 2412 of a single thousands cube. During the course of calculating the solution to the arithmetic problem, 10 thousands cubes will have to be transformed into 1 ten thousands stick and carried to the ten thousands column. A ten thousands stick, however, has a base width of only 1 thousands cube. The predetermined width 2422 of the ten thousands derived value card 2426, therefore, is only at least the width of 1 thousands cube. If the arithmetic problem were "5900+1000", then the width of the derived value card in the ten thousands column would be predetermined to be at least 6 times the width of a ten thousands cube since there will be 6 ten thousands sticks displayed thereupon. The scaling of all digit cards would then be predetermined so that all derived value cards can fit on the screen of the display device.

Transition of 10 Ten Thousands Sticks to 1 Hundred Thousands Slab

FIGS. 25a to 25h show successive GUIs 2000 of an embodiment of the calculator that is adapted to carry 10 ten thousands sticks (item 2502 FIG. 25b) from a ten thousands column and transition said 10 ten thousands sticks into 1 hundred thousands slab (item 2504 FIG. 25g) during a carry operation. FIGS. 25a to 25h also show the order in which said 10 ten thousands sticks are displayed must be reversed during the course of said transition to a hundred thousands slab.

Figure 25A:
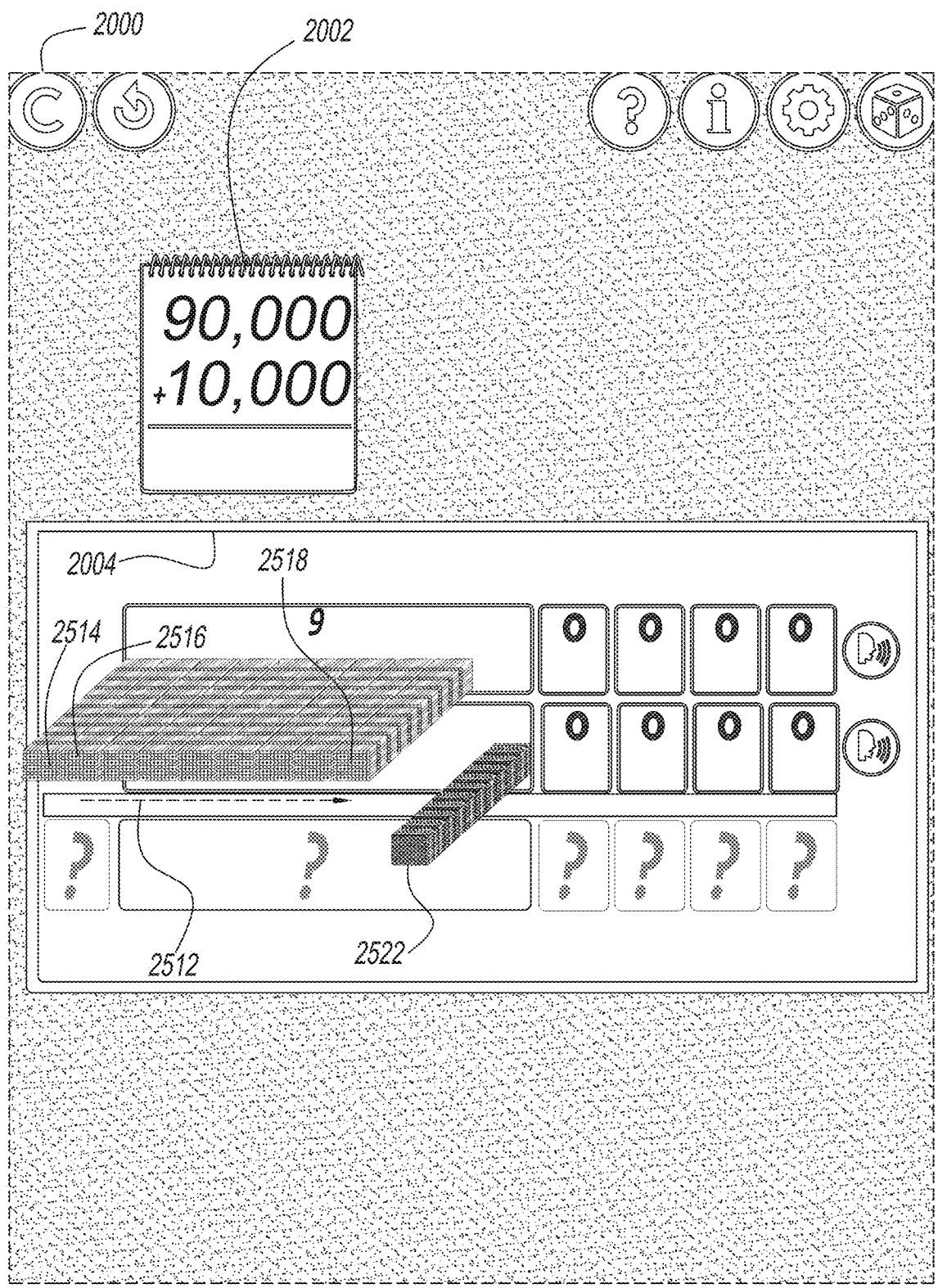
FIGS. 25a to 25h are successive GUIs showing an embodiment of carrying with bead tokens.

FIG. 25a shows an example arithmetic problem of "90000+10000". The initial display of the problem in the workspace 2004 shows 9 ten thousands sticks in the ten thousands augend card and 1 ten thousands stick in the ten thousands addend card. The calculator comprises digital instructions to render each ten thousands sticks from a stored graphics image of a ten thousands stick. The renderings are performed from left to right 2512. This is termed "overlapping from left to right". Thus the first augend ten thousands stick 2514 is rendered before the second augend ten thousands stick 2516 and so on. The rendering may either be done as the image for the screen is built, or it may be done before hand with the final result displayed. The left to right rendering continues with the ten thousands stick 2522 of the addend rendered after the last ten thousands stick 2518 of the augend. In general, the left to right rendering of all bead tokens can be done with proper overlapping of bead tokens in adjacent place value columns. In certain circumstances, however, the ordering of the rendering of at least some bead tokens must be reversed. An example is discussed as follows with reference to the transition of 10 ten thousands sticks to 1 hundred thousands slab during a carry operation.

Figure 25B:
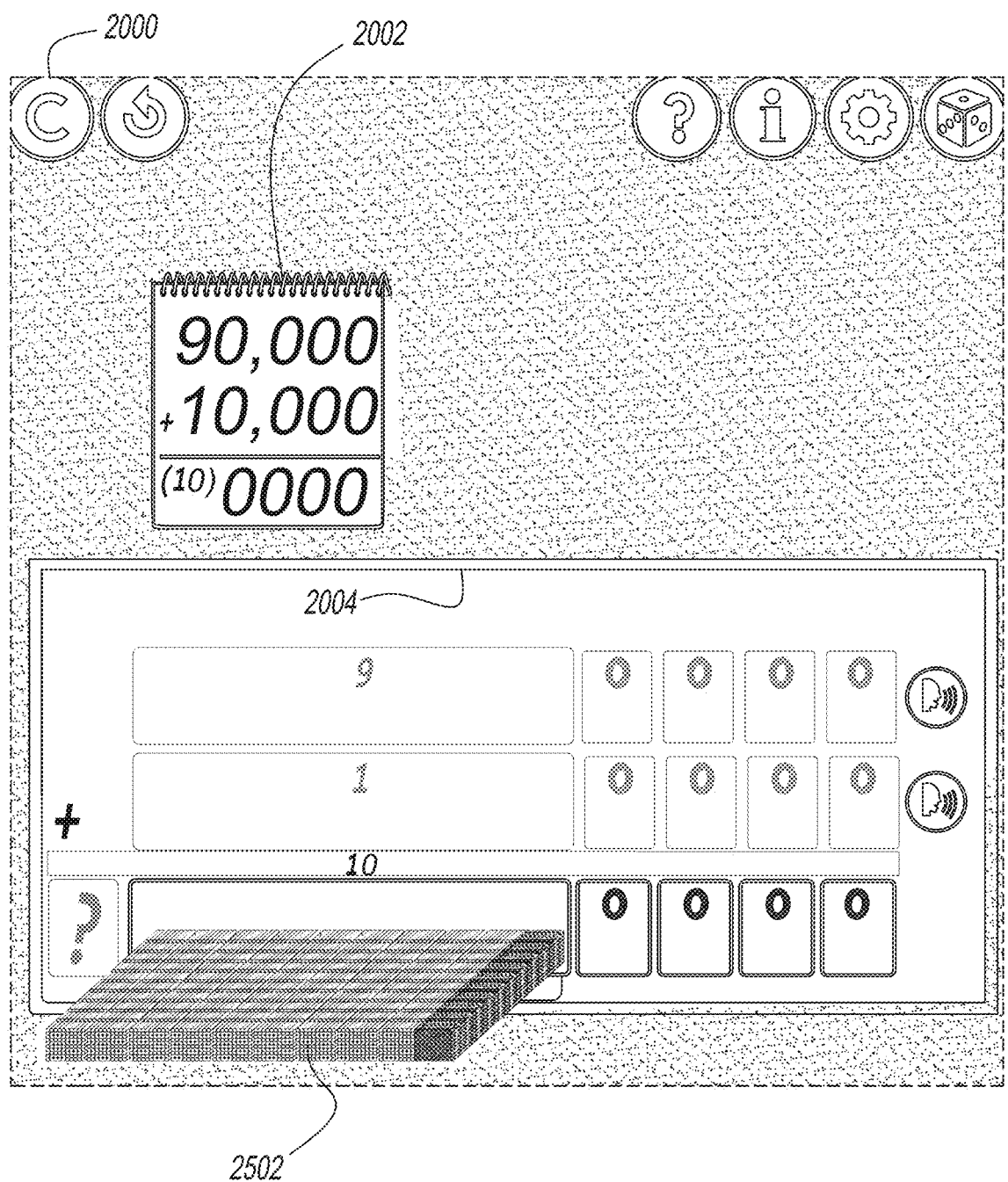

FIG. 25*b* shows 10 ten thousands sticks 2502 displayed in a derived value card and ready for carrying to the hundred thousands column.

Figure 25C:
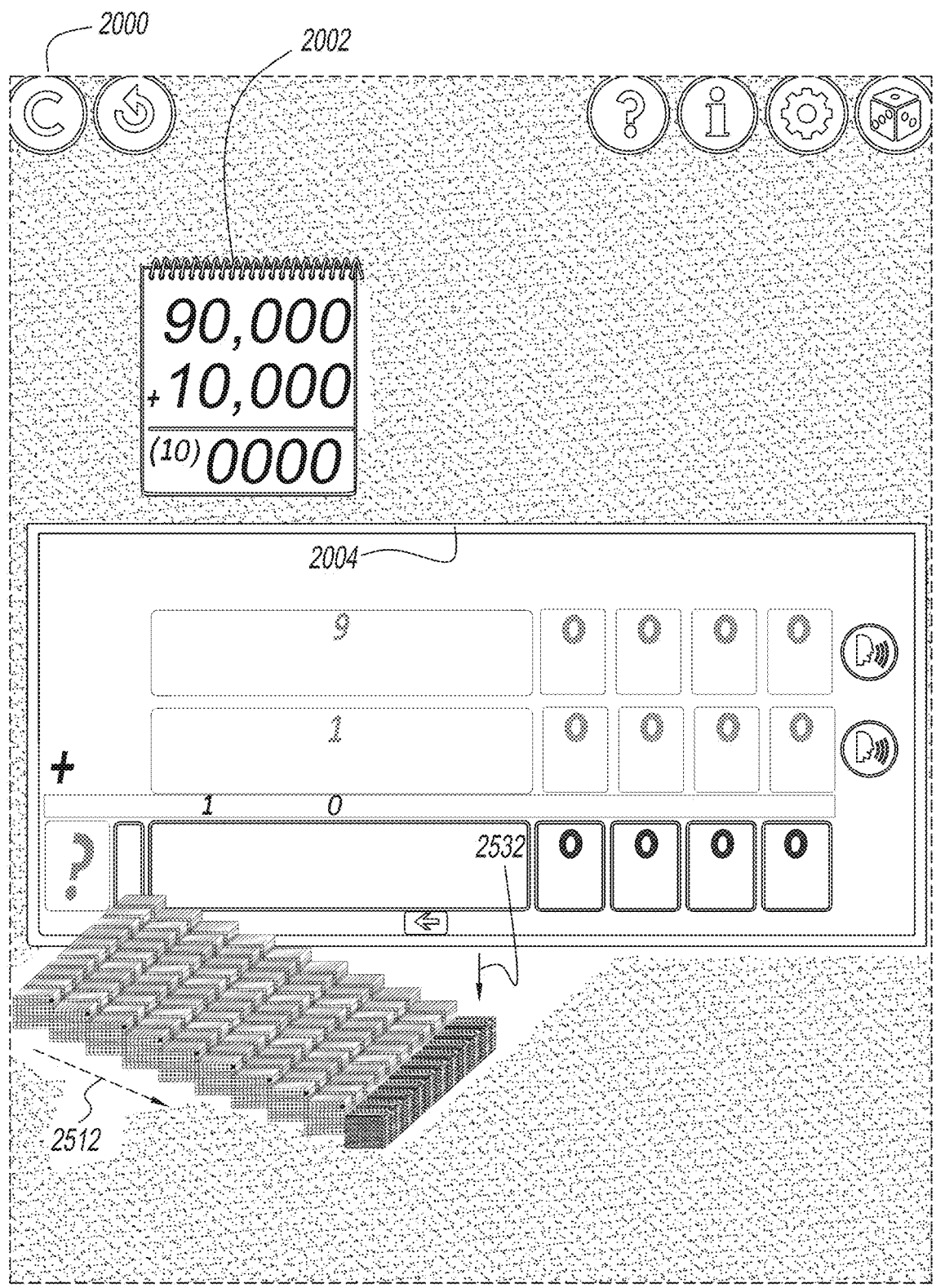

FIG. 25*c* shows a first intermediate stage of the carry operation. The ten thousands sticks are moved down 2532 in a downward sloping diagonal array. The order of rendering is still left to right 2512.

Figure 25D:
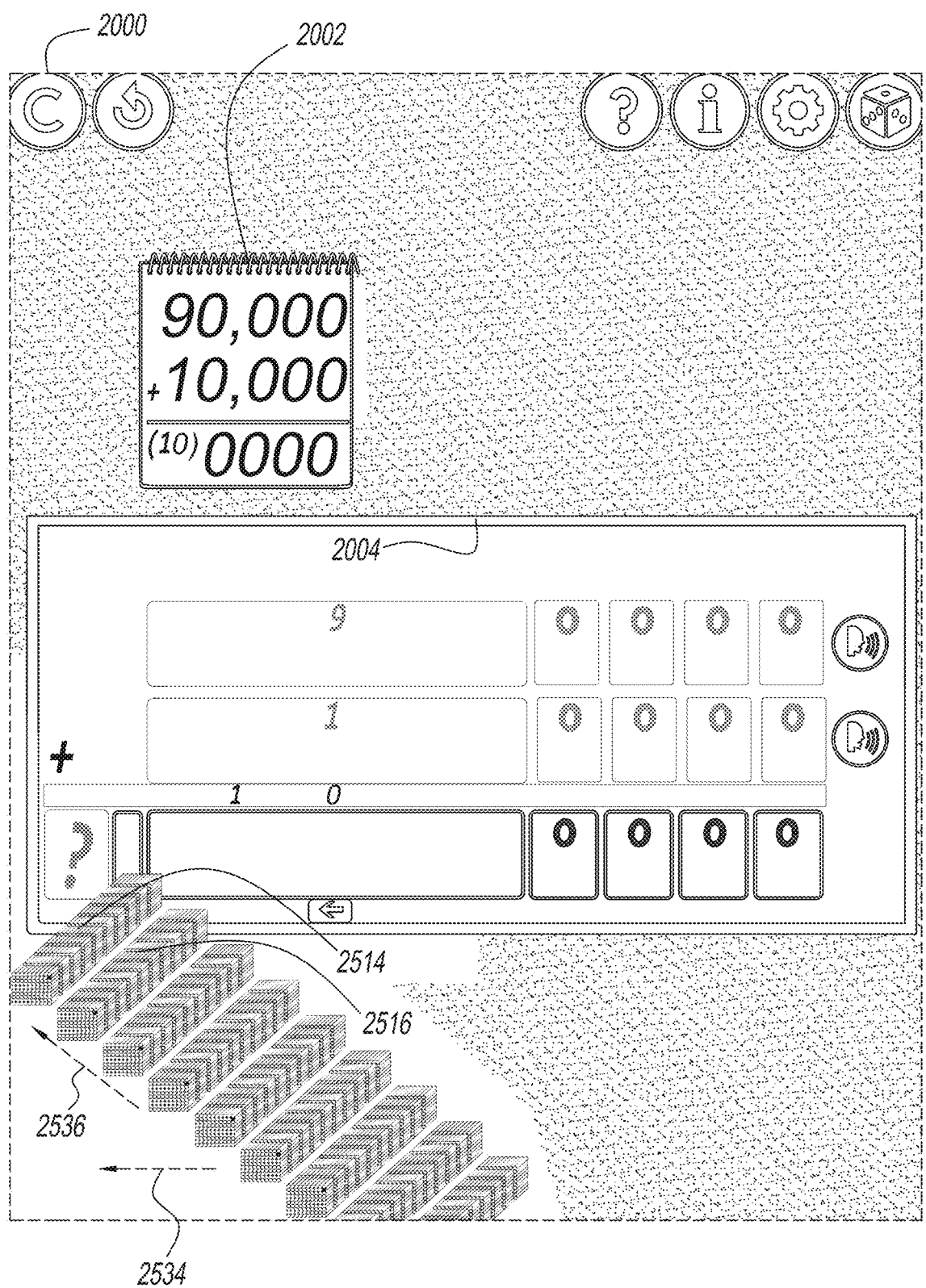

Referring to FIG. 25*d*, once the ten thousands sticks are low enough so that each ten thousands stick (e.g. item 2516) is below its adjacent ten thousands stick (e.g. item 2514) to the left, the ten thousands sticks will then be moved to the left 2534. The order of the rendering of each ten thousands stick is then reversed 2536 so that the ten thousands sticks are overlapping right to left.

Figure 25E:
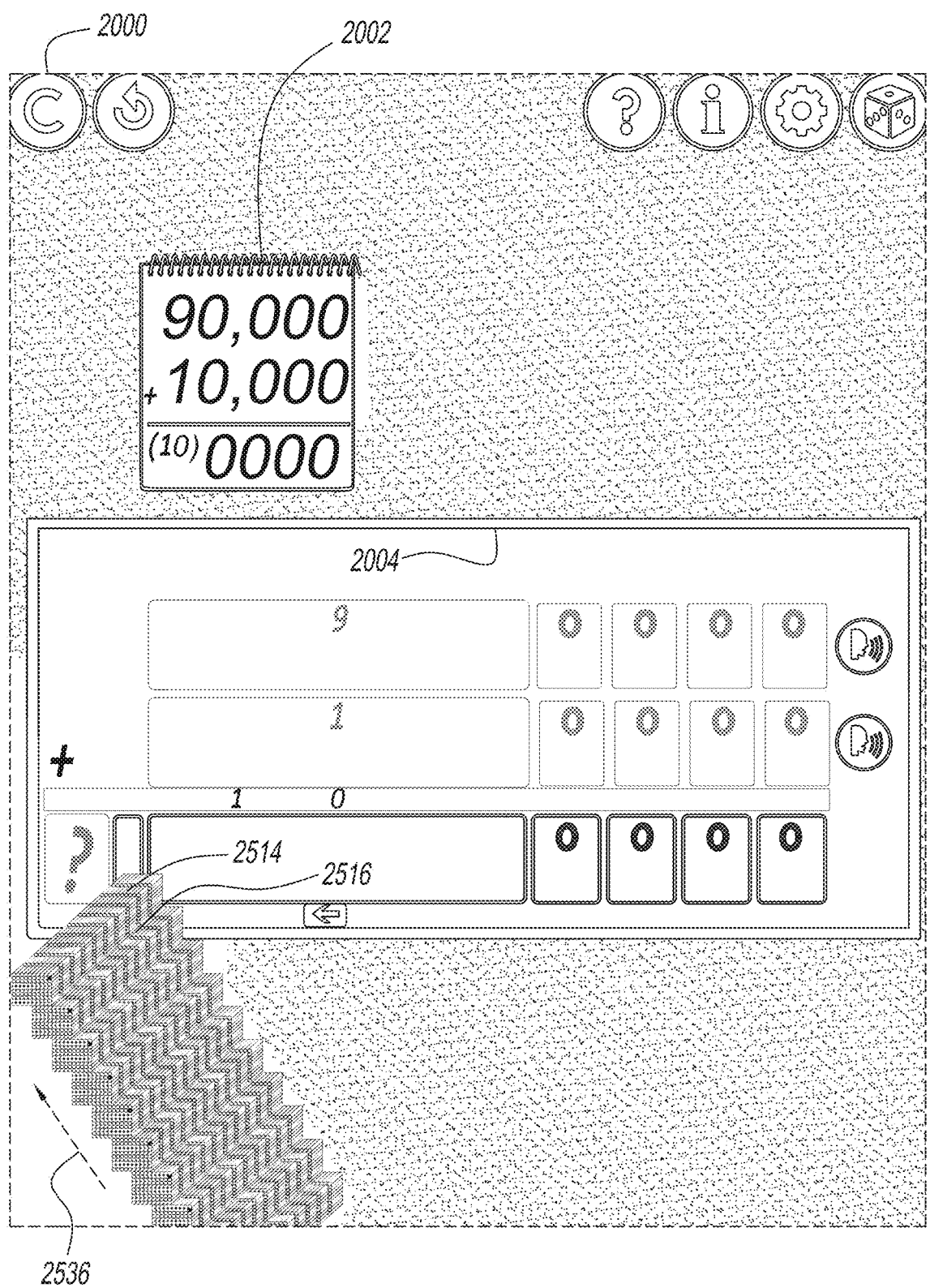
Figure 25F:
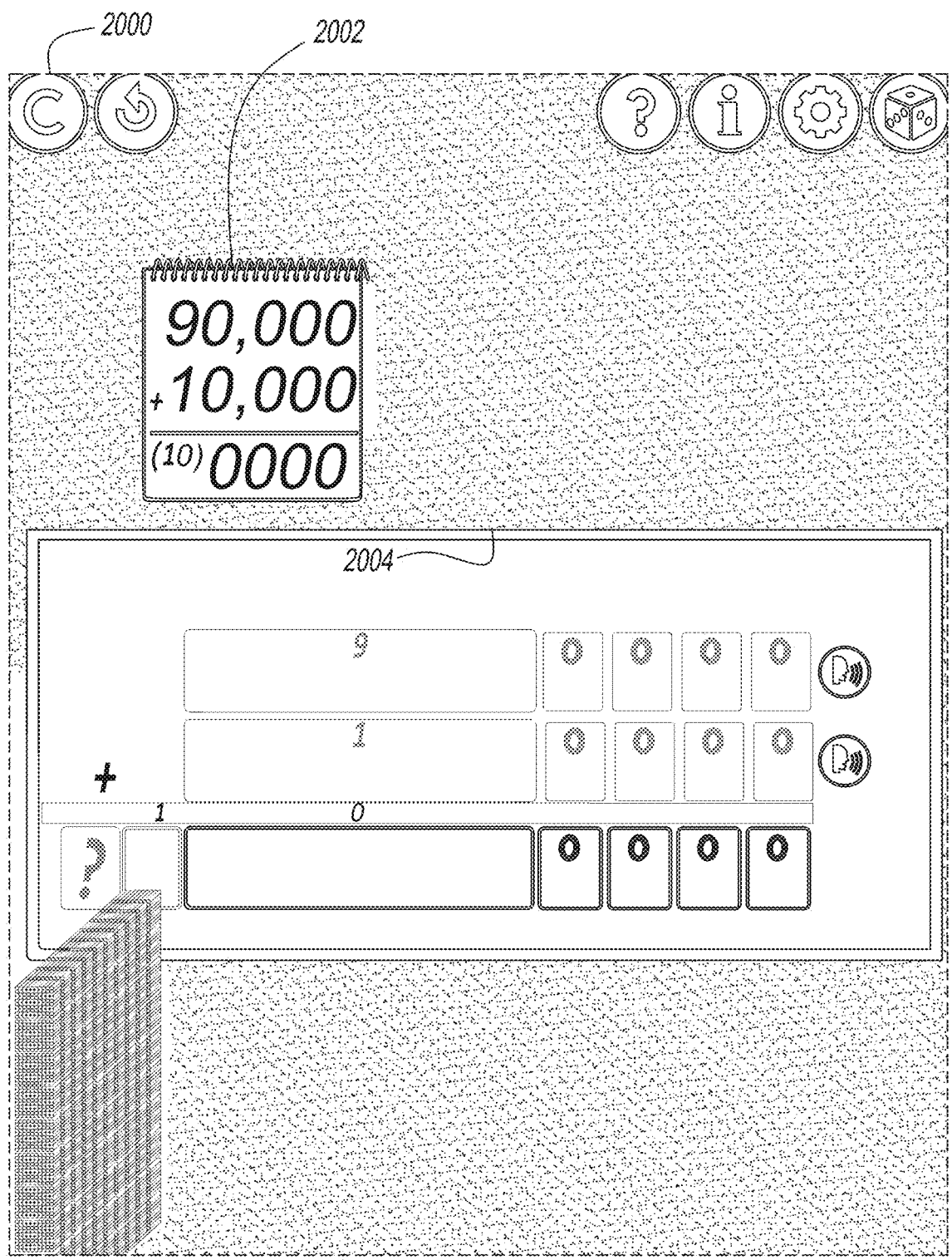

Referring to FIG. 25*e*, the ten thousands sticks are aligning vertically. The right to left rendering makes sure that an upper ten thousands sticks (e.g. item 2514) appropriately obscures a portion of the ten thousands stick immediately below it (e.g. item 2516).

Figure 25G:
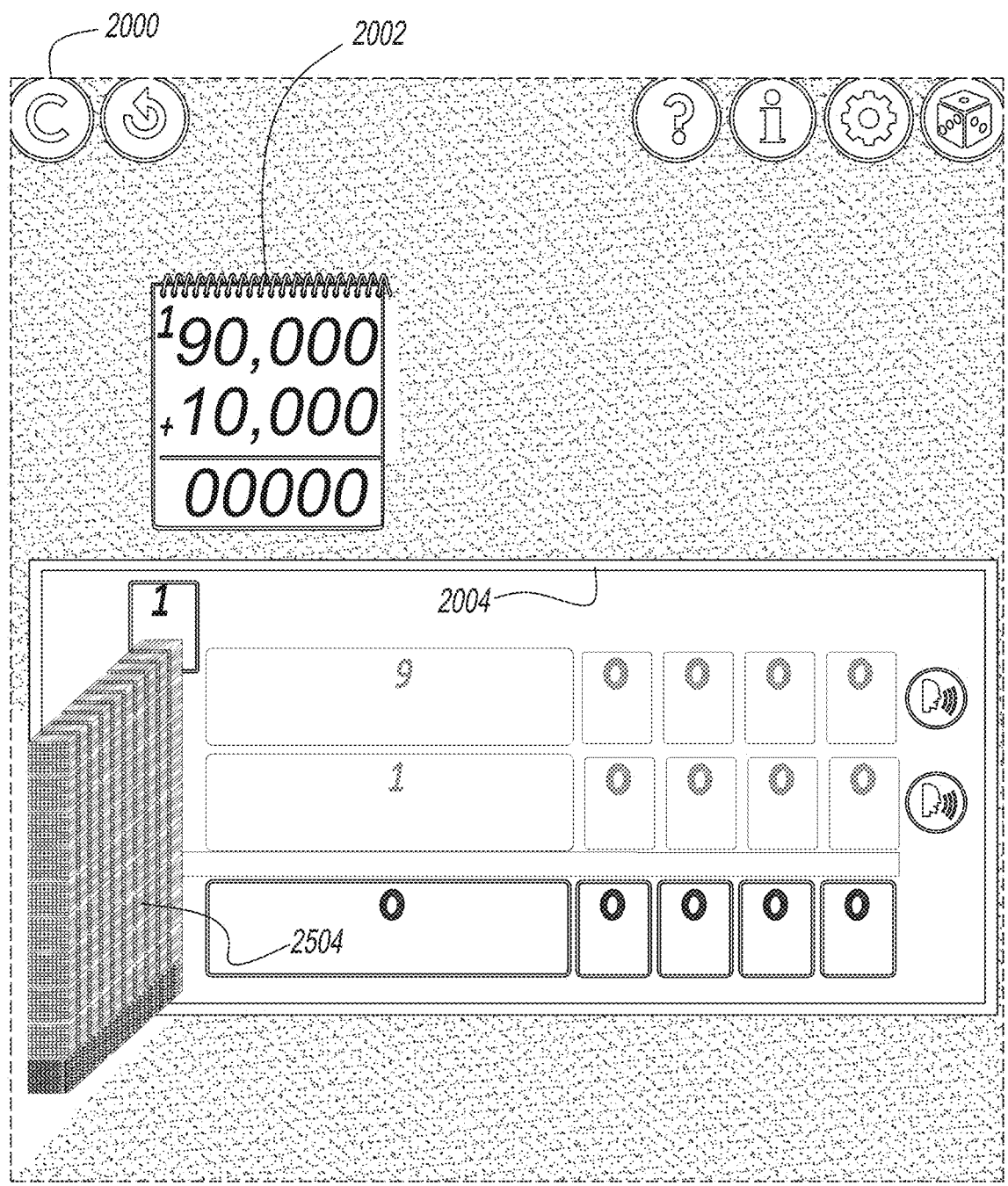
Figure 25H:
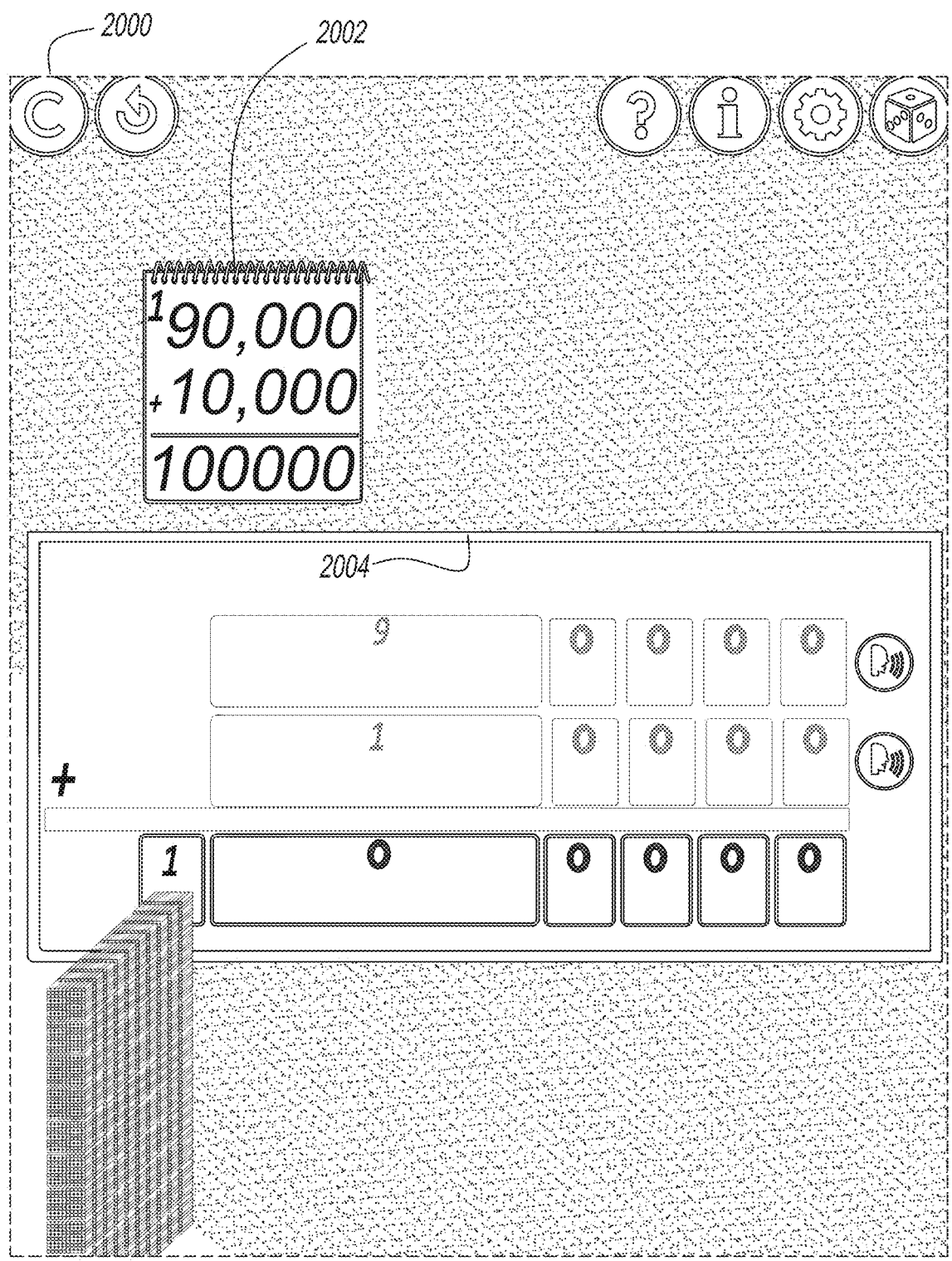
Figure 26A:
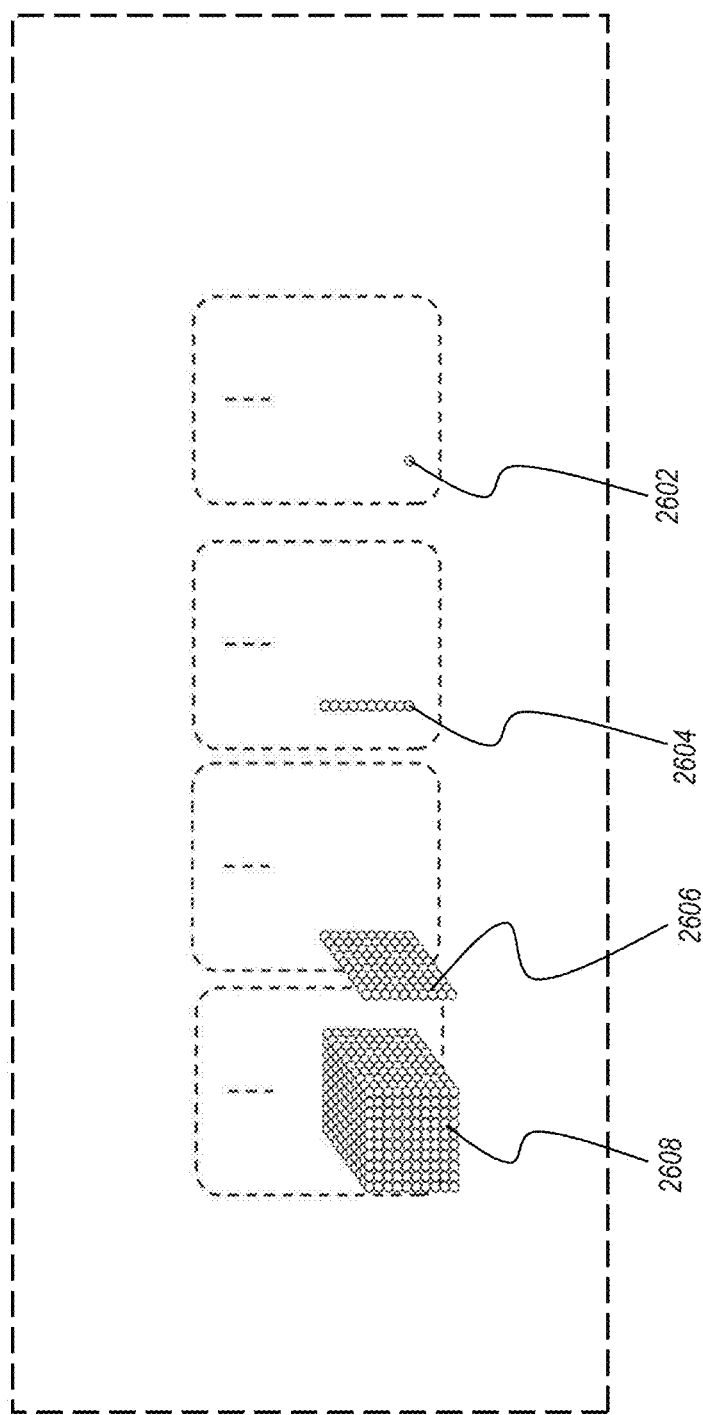
FIGS. 26a to 26d are representations of different bead tokens for different place value columns.
Figure 26B:
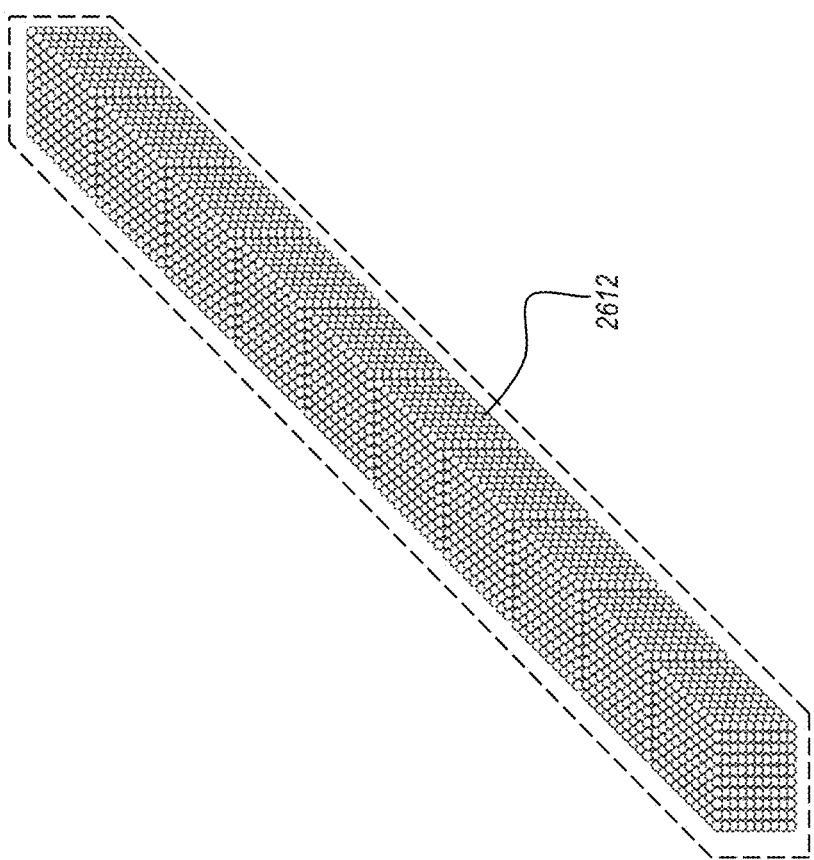
Figure 26C:
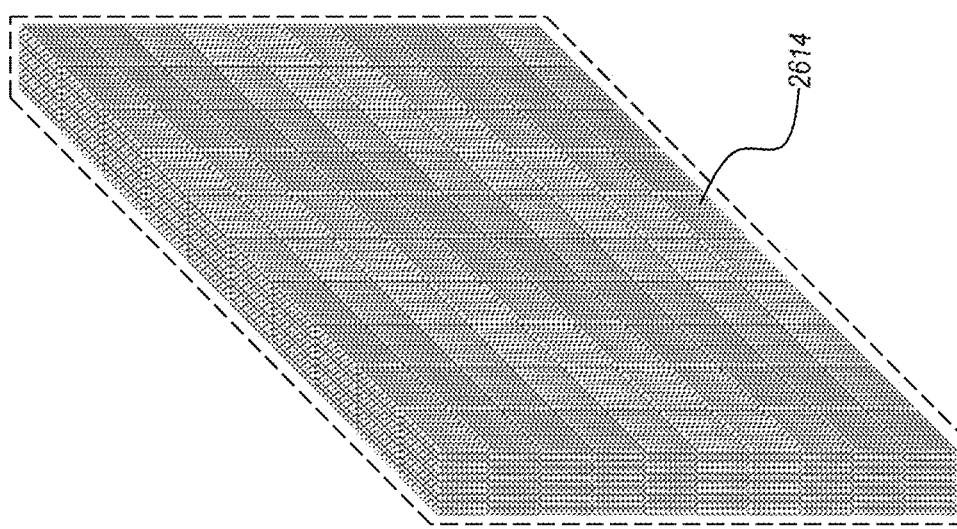
Figure 26D:
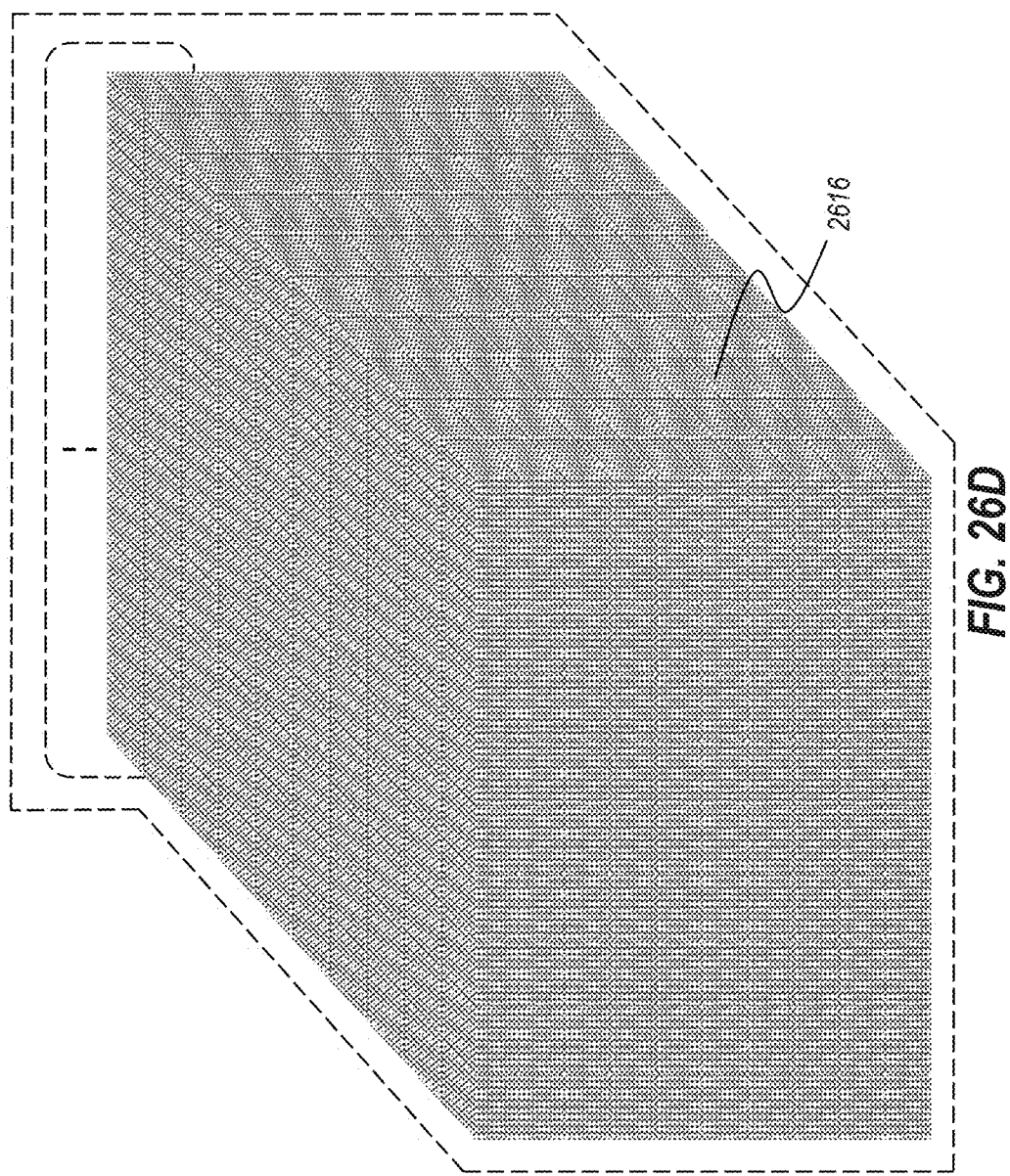

FIG. 25*g* shows the final hundred thousands slab 2504. At this point, the multiple graphics files used to render the hundred thousands slab can be replaced with a single graphics file for the slab itself. This significantly improves the performance of the computer implemented calculator in rendering various GUIs, particularly when there are many orders of magnitude in the arithmetic problem. Rendering a single file for the image of a millions cube, for example, is much faster than rendering 1 million images of the individual beads represented in a millions cube. The calculator nonetheless can handle the graphics requirements of the arithmetic problem "999999+1" while showing all carry operations from the ones column to the millions column and still individually show the original ones bead of the augend in the final millions cube of the millions place derived value card.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

I claim:

1. A calculator comprising:
a) an input device adapted to sense an action by a user;
b) an output device adapted to present digital images;
c) a digital processor adapted to receive input from said input device, process said input and present said digital images on said output device; and
d) a permanent digital memory comprising digital instructions to cause said digital processor to execute the steps of:
  i) display a workspace area on said output device wherein said workspace area comprises a display of an arithmetic problem wherein:
    1) said arithmetic problem comprises a first number comprising single digit numerals, a second number comprising single digit numerals and an arithmetic operator;
    2) said single digit numerals of said first and second numbers are displayed as digit cards in a plane, wherein:
      a) each of said digit cards has a generally rectangular shape with a width, a height, a top, a bottom, and a perimeter;
      b) said digit cards are arranged in original positions in columns and rows corresponding to said arithmetic problem;
      c) said digit cards of said first number are displayed in an upper row of said rows; and
      d) said digit cards of said second number are displayed in a lower row of said rows wherein said lower row is immediately below said upper row;
    3) an equals bar area is displayed below said digit cards wherein said equals bar area has a height; and
    4) said workplace area comprises a holding area below said equals bar area wherein said holding area has a top, a bottom and a height wherein said height of said holding area is equal to or greater than said height of said digit cards;
  ii) receive from said input device a selection by a user of an upper digit card of said first number, wherein said upper digit card is in a selected column in said workspace area;
  iii) receive from said input device an indication by said user of a gesture towards said holding area;
  iv) move said upper digit card towards said holding area in response to said gesture by said user;
  v) move a lower digit card that is below said upper digit card when said bottom of said upper digit card touches said top of said lower digit card such that said upper digit card appears to be pushing said lower digit card down;
  vi) stop said downward motion of said lower digit card when said bottom of said lower digit card reaches said bottom of said holding area;
  vii) display said upper digit card with continued downward motion such that said upper digit card covers an overlapping portion of said lower digit card after said lower digit card stops said downward motion; and
  viii) after said bottom of said upper digit card reaches said bottom of said holding area, execute the steps of:
    1) calculate a derived value of said operator operating on said digits in said upper digit card and said lower digit card; and
    2) display said derived value in said upper digit card wherein said upper digit card then becomes a derived value card.

2. The calculator of claim 1 wherein said permanent digital memory comprises digital instructions to cause said digital processor to execute the steps of:
   a) present a display area on said output device prior to said display of said arithmetic problem in said workspace area;
   b) present a user input area on said output device, said user input area comprising:
      i) a set of single digit numerals;
      ii) one or more arithmetic operators; and
      iii) an execution icon;
   c) receive from said input device one or more actions by said user indicating a choice of one or more of said single digit numerals indicating said first number, one of said arithmetic operators, and one or more of said single digits indicating said second number wherein said choices of digit numerals and arithmetic operator define said arithmetic problem;
   d) display said arithmetic problem in said display area in accordance with said choice of said first number, arithmetic operator and second number;
   e) receive from said input device an action by said user indicating a choice of said execution icon; and
   f) display said workspace area on said output device wherein said workspace area comprises a display of said arithmetic problem.

3. The calculator of claim 2 wherein said display area and said workspace area are shown at the same time on said display device.

4. The calculator of claim 3 wherein said display area shows a paper-based intermediate step in performing said calculation after said derived value is shown in said derived value card.

5. The calculator of claim 1 which comprises a touch screen and wherein:
   a) said input device is said touch screen; and
   b) said output device is said touch screen.

6. The calculator of claim 5 wherein said permanent digital memory comprises digital instructions to cause said digital processor to execute the steps of:
   a) interpret a user finger touch of a digit card as a selection of said digit card;
   b) interpret a user moving said finger while touching said screen as a motion to be conveyed to said selected digit card; and
   c) interpret said user lifting said finger from said touch screen as said user completing said gesture.

7. The calculator of claim 6 wherein said motion to be conveyed to said selected upper digit card is vertical motion only irrespective of the horizontal position of said finger of said user.

8. The calculator of claim 1 wherein said permanent digital memory comprises digital instructions to cause said digital processor to execute the steps of:
   a) when said operator is an addition operator, determine if said derived value is a two digit number wherein said two digit number comprises a tens digit and a ones digit; and
   b) when said derived value is a two digit number, execute the steps of:
      i) activate a carry area in said workspace area;
      ii) receive from said user a selection of said carry area;
      iii) receive from said user a gesture to the left;
      iv) display a carry card to the left of said derived value card wherein said carry card has a left edge, a right edge, a top edge, a bottom edge, a width, and a height and wherein said width of said carry card is variable; and
      v) in response to said gesture to the left, execute the steps of:
         1) increase said width of said carry card;
         2) shift to the left all higher order digit cards in said first and second numbers that are in their original positions and are to the left of said selected column such that said shifting to the left of said higher order digit cards forms a vertical passage to the left of said selected column;
         3) shift said tens digit in said derived value to the left such that said tens digit is aligned with said vertical passage; and
         4) halt said shift of said higher order digit cards when said width of said carry card equals a first desired carry card width; and
      vi) after said width of said carry card equals said first desired carry card width, execute the steps of:
         1) move said carry card vertically through said vertical passage to a row above said digit cards of said first number in said arithmetic problem;
         2) display said tens digit of said derived value in said carry card; and
         3) shift said higher order digit cards back to said original positions.

9. The calculator of claim 8 wherein:
a) prior to said display of said derived value card in said holding area, an equation is presented in said equals bar area showing a calculation of said derived value from said digits in said upper digit card and said lower digit card.

10. The calculator of claim 1 wherein:
a) each of said digit cards for said first and second number comprises a top digit area and a bottom token area;
b) each of said digits in said first and second number are displayed in said digit areas;
c) each of said token areas displays a number of bead tokens wherein said number of bead tokens is equal to the value of the digit in the digit area of the same digit card;
d) each of said column has a place value corresponding to one of a ones column, a tens column, a hundreds column, a thousands column, a ten thousands column, a hundred thousands column, a millions column or a ten millions column; and
e) each of said columns has a bead token corresponding to said place value.

11. The calculator of claim 10 wherein:
a) the bead token for the ones column is a units bead and is a representation of a single bead;
b) the bead token for the tens column is a tens stick and is a representation of 10 overlapping units beads in a vertical line; and
c) the bead token for the hundreds column is a hundreds slab and is an upper right oblique projection of 10 overlapping tens sticks arranged in a vertical slab extending in the normal direction to the plane of said digit cards.

12. The calculator of claim 11 wherein:
a) the bead token for the thousands column is a thousands cube and is an upper right oblique projection of 10 overlapping hundreds slabs in a cube configuration;
b) the bead token for the ten thousands column is a ten thousands stick and is a an upper right oblique projection of 10 overlapping thousands cubes stacked together in the normal direction to the plane of said digit cards and wherein a gap with a width of at least one units bead is between each of said thousands cubes in said ten thousands stick; and c) the bead token for the hundred thousands column is a hundred thousands slab and is an upper right oblique projection of 10 overlapping ten thousands sticks arranged in a vertical slab extending in the normal direction to the plane of said digit cards and wherein there is a gap with a width of at least one units bead between each of said ten thousands sticks in said hundred thousands slab.

13. The calculator of claim 12 wherein:

a) the bead token for the millions column is a millions cube and is an upper right oblique projection of 10 overlapping hundred thousands slabs arranged in a cube configuration and wherein there is a gap with a width of at least one units bead between each of said hundred thousands slabs in said millions cube;

b) said millions cube comprises forward face; and c) said output device has a resolution of at least 300 pixels by 300 pixels such that individual units beads represented in said forward face of said millions cube can be discerned by said user.

14. The calculator of claim 11 wherein said permanent digital memory comprises digital instructions to cause said digital processor to execute the steps of:

a) when said operator is an addition operator:
  i) display said bead tokens for said first number in a first color;
  ii) display said bead tokens for said second number in a second color; and
  iii) after said derived value card is displayed, display said bead tokens from said first digit card and said second digit card in a token area of said derived value card.

15. The calculator of claim 14 wherein said permanent digital memory comprises digital instructions to cause said digital processor to execute the steps of:

a) when said operator is an addition operator:
  i) determine a place value for said selected column; and
  ii) determine if said derived value is a two digit number wherein said two digit number comprises a tens digit and a ones digit; and b) when said derived value is a two digit number, execute the steps of:
  i) activate a carry area in said workspace area;
  ii) display a horizontal row of 10 bead tokens on the token area on said derived value card wherein said bead tokens are the bead tokens associated with the place value of said selected column;
  iii) receive from said user a selection of said carry area;
  iv) receive from said user a gesture to the left;
  v) display a carry card to the left of said derived value card wherein said carry card has a left edge, a right edge, a top edge, a bottom edge, a width, and a height and wherein said width of said carry card is variable; and
  vi) in response to said gesture to the left, execute the steps of:
    1) increase said width of said carry card;
    2) shift to the left all higher place value digit cards in said first and second numbers that are in their original positions and are to the left of said selected column such that said shifting to the left of said higher place value digit cards forms a vertical passage to the left of said selected column;
    3) continuously shift said 10 bead tokens both to the left and vertically such that said 10 bead tokens overlap to form a next higher bead token corresponding to the place value of the column to the left of said selected column;
    4) halt said shift left of said higher place value digit cards when said width of said carry card equals a first desired carry card width; and
    5) display said next higher bead token on said carry card; and
  vii) after said width of said carry card equals said first desired carry card width, execute the steps of:
    1) move said carry card with said next higher order bead token through said vertical passage to a row above said digit cards of said first number in said arithmetic problem; and
    2) shift said higher place value digit cards back to said original positions.

16. The calculator of claim 15 wherein:

a) when said 10 bead tokens are ten thousands sticks shown overlapping left to right on said derived value card and said 10 bead tokens are to be shown overlapping bottom to top in a hundred thousands slab, and in response to said shift left of said carry area, execute the steps of:
  i) shift said 10 ten thousands sticks initially downward in an expanding downward sloping diagonal array with said 10 ten thousands sticks displayed overlapping from left to right; and
  ii) when each ten thousands stick in said expanding downward sloping diagonal array is below its adjacent ten thousands stick to the left, shift said ten thousands sticks to the left in a collapsing downward sloping diagonal array and display said ten thousands sticks overlapping from right to left until said ten thousands sticks are in a vertical array forming a hundred thousands slab.

17. The calculator of claim 15 wherein:

a) each of said bead tokens has a base with a width; and b) said permanent digital memory comprises digital instructions to cause said digital processor to execute the steps of:
  i) prior to said display of said workspace area:
    1) determine a total number of columns required to be displayed and derived value cards to be calculated during the course of calculating a solution to said arithmetic problem;
    2) determine the maximum number of said bead tokens to be displayed on said derived value cards during the course of said solution to said arithmetic problem; and
    3) adjust the width of said digit cards to be displayed in each column to be equal to or greater than said maximum number of tokens to be displayed on said derived value cards in each column times the width of said bases of said bead tokens for each column.

18. The calculator of claim 17 wherein:

a) said display has a width; and b) said widths of said derived value cards are proportionally scaled such that all derived value cards will fit within said width of said display.

19. The calculator of claim 17 wherein:
a) each base of said bead tokens has an upper edge; and
b) one or more of said bead tokens is presented on a digit card with said upper edge aligned with a top to said token area.

\* \* \* \* \*